(12) United States Patent
Buzon et al.

(10) Patent No.: US 12,466,803 B2
(45) Date of Patent: Nov. 11, 2025

(54) BCKDK INHIBITORS AND/OR DEGRADERS

(71) Applicant: Pfizer Inc., New York, NY (US)

(72) Inventors: Leanne Marie Buzon, Stonington, CT (US); Kimberly O'Keefe Cameron, Niantic, CT (US); Kevin Francis Deboyace, Mystic, CT (US); Kevin James Filipski, Reading, MA (US); David Andrew Griffith, Sudbury, MA (US); Bethany Lyn Kormos, Somerville, MA (US); Shenping Liu, Waterford, CT (US); Luis Angel Martinez Alsina, Gales Ferry, CT (US); Matthew Richard Reese, Mystic, CT (US); Rachel Jane Roth Flach, Rockland, MA (US); Yuan Zhang, Mansfield, MA (US)

(73) Assignee: Pfizer Inc., New York, NY (US)

( * ) Notice: Subject to any disclaimer, the term of this patent is extended or adjusted under 35 U.S.C. 154(b) by 0 days.

(21) Appl. No.: 18/060,027

(22) Filed: Nov. 30, 2022

(65) Prior Publication Data

US 2023/0167080 A1    Jun. 1, 2023

Related U.S. Application Data

(60) Provisional application No. 63/383,562, filed on Nov. 14, 2022, provisional application No. 63/284,797, filed on Dec. 1, 2021.

(51) Int. Cl.
| | |
|---|---|
| *C07D 333/68* | (2006.01) |
| *A61P 3/04* | (2006.01) |
| *A61P 9/00* | (2006.01) |

(52) U.S. Cl.
CPC ........... *C07D 333/68* (2013.01); *A61P 3/04* (2018.01); *A61P 9/00* (2018.01); *C07B 2200/13* (2013.01)

(58) Field of Classification Search
CPC . C07D 333/68; A61P 9/00; A61P 3/04; C07B 2200/13
See application file for complete search history.

(56) References Cited

U.S. PATENT DOCUMENTS

| | | |
|---|---|---|
| 3,773,919 A | 11/1973 | Boswell et al. |
| 4,485,045 A | 11/1984 | Regen |
| 4,544,545 A | 10/1985 | Ryan et al. |
| 4,673,564 A | 6/1987 | Kawata et al. |
| 4,894,235 A | 1/1990 | Kohne et al. |
| 5,013,556 A | 5/1991 | Woodle et al. |
| 5,340,591 A | 8/1994 | Nakano et al. |
| 5,456,923 A | 10/1995 | Nakamichi et al. |
| 5,464,863 A | 11/1995 | Nagamine et al. |
| 5,612,359 A | 3/1997 | Murugesan |
| 5,707,646 A | 1/1998 | Yajima et al. |
| 5,939,099 A | 8/1999 | Grabowski et al. |
| 6,043,265 A | 3/2000 | Murugesan et al. |
| 9,078,865 B2 | 7/2015 | Lee |
| 2003/0124028 A1* | 7/2003 | Carlson ............... C40B 60/14 422/68.1 |

FOREIGN PATENT DOCUMENTS

| | | | |
|---|---|---|---|
| CN | 108997282 A | * 12/2018 | ............ A23L 33/00 |
| CN | 111635937 A | 9/2020 | |
| CN | 114903994 A | 8/2022 | |
| EA | 200702590 A1 | 6/2008 | |
| EP | 0901786 A2 | 3/1999 | |
| EP | 0613894 B1 | 5/1999 | |
| EP | 1888058 B1 | 5/2009 | |
| JP | 02-241267 A | 9/1990 | |
| WO | 00/01389 A1 | 1/2000 | |
| WO | 2005/116014 A1 | 12/2005 | |
| WO | 2007/122482 A1 | 12/2007 | |
| WO | 09/016462 A2 | 2/2009 | |
| WO | 2010/031361 A1 | 2/2010 | |
| WO | 2010/023594 A1 | 3/2010 | |
| WO | 2010/086820 A1 | 8/2010 | |
| WO | 2010/103437 A1 | 9/2010 | |
| WO | 2010/103438 A1 | 9/2010 | |

(Continued)

OTHER PUBLICATIONS

Pathania S, Narang RK, Rawal RK. Role of sulphur-heterocycles in medicinal chemistry: An update. Eur J Med Chem. Oct. 15, 2019; 180:486-508. (Year: 2012).*

(Continued)

*Primary Examiner* — James H Alstrum-Acevedo
*Assistant Examiner* — Pierre Paul Eleniste
(74) *Attorney, Agent, or Firm* — Young-In J. Oh

(57) ABSTRACT

Described herein are compounds of Formula I,

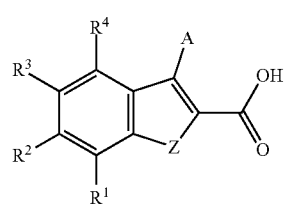

wherein the variables are defined herein, their use as branched-chain alpha keto acid dehydrogenase kinase inhibitors and/or degraders, pharmaceutical compositions containing such compounds and their use to treat, for example, diabetes, kidney disease, NASH and heart failure.

16 Claims, 3 Drawing Sheets

(56) References Cited

FOREIGN PATENT DOCUMENTS

| WO | 2010/106457 A2 | 9/2010 | | |
|---|---|---|---|---|
| WO | 2010/128414 A1 | 11/2010 | | |
| WO | 2010/128425 A1 | 11/2010 | | |
| WO | 2010/140092 A1 | 12/2010 | | |
| WO | 2011/005611 A1 | 1/2011 | | |
| WO | WO-2018033832 A1 * | 2/2018 | ........... | A61K 31/506 |
| WO | 2018/109607 A1 | 6/2018 | | |
| WO | 2020/261144 A1 | 12/2020 | | |
| WO | 2020/261205 A1 | 12/2020 | | |
| WO | 2022175959 A1 | 8/2022 | | |
| WO | 2023/100061 A1 | 6/2023 | | |

OTHER PUBLICATIONS

Standards of Medical Care in Diabetes—2020 abridged for Primary care providers. Clinical Diabetes, 38(1), 10-38. https://doi.org/10.2337/cd20-as01 (Year: 2020).*

Subbaiah, M. a. M., & Meanwell, N. A. (2021). Bioisosteres of the Phenyl Ring: Recent strategic applications in lead optimization and drug design. Journal of Medicinal Chemistry, 64(19), 14046-14128. (Year: 2021).*

Patani GA, LaVoie EJ. Bioisosterism: A Rational Approach in Drug Design. Chem Rev. Dec. 19, 1996;96(8):3147-3176. (Year: 1996).*

Liantonio et al. In-vivo administration of CLC-K kidney chloride channels inhibitors increases water diuresis in rats: a new drug target for hypertension? J Hypertens. Jan. 2012;30(1): 153-67. (Year: 2012).*

International Search Report and Written Opinion in International Application No. PCT/IB2022/061495, mailed on Feb. 9, 2023, 14 pages.

Shih-Chia Tso et al: "Benzothiophene Carboxylate Derivatives as NoAllosteric Inhibitors of Branched-chain alpha-Ketoacid Dehydrogenase Kinase", Journal of Biological Chemistry, vol. 289, No. 30, Jun. 3, 2014, pp. 20583-20593.

Carpino, P.A., Goodwin, B. Expert Opin. Ther. Pat, 2010, 20(12), 1627-51.

Demong, D.E. et al. Annual Reports in Medicinal Chemistry 2008, 43, 119-137.

Haleblian, J Pharm Sci, 64 (8), 1269-1288 (Aug. 1975).

Do et. al., J. Med. Chem. 2019, 62, 2690-2707.

Jones, R.M. et al. in Medicinal Chemistry 2009, 44, 149-170.

Joshi MA, et.al.: Impaired growth and neurological abnormalities in branched-chain alpha-keto acid dehydrogenase kinase-deficient mice. Biochem J 2006, 400:153-62.).

Kharitonenkov, A. et al., Current Opinion in Investigational Drugs 2009, 10(4)359-364.

Lai L, et.al.: Energy metabolic reprogramming in the hypertrophied and early stage failing heart: a multisystems approach. Circ Heart Fail 2014, 7:1022-31.

Lake AD, et. al.: Branched chain amino acid metabolism profiles in progressive human nonalcoholic fatty liver disease. Amino Acids 2015, 47:603-15.).

Lerin C, et.al.: Defects in muscle branched-chain amino acid oxidation contribute to impaired lipid metabolism. Mol Metab 2016, 5:926-36.).

Li T, et.al.: Defective Branched-Chain Amino Acid Catabolism Disrupts Glucose Metabolism and Sensitizes the Heart to Ischemia-Reperfusion Injury. Cell Metab 2017, 25:374-85.

Lotta LA, et. Al.: Genetic Predisposition to an Impaired Metabolism of the Branched-Chain Amino Acids and Risk of Type 2 Diabetes: A Mendelian Randomisation Analysis. PLoS Med 2016, 13:e1002179.

Lynch CJ, Adams SH: Branched-chain amino acids in metabolic signalling and insulin resistance. Nat Rev Endocrinol 2014, 10:723-36.).

Medina, J.C., Annual Reports in Medicinal Chemistry, 2008, 43, 75-85.

Menni C, et. al.: Biomarkers for type 2 diabetes and impaired fasting glucose using a nontargeted metabolomics approach. Diabetes 2013, 62:4270-6.

Newgard CB, et. al.: A branched-chain amino acid-related metabolic signature that differentiates obese and lean humans and contributes to insulin resistance. Cell Metab 2009, 9:311-26.).

Ratziu, A critical review of endpoints for non-cirrhotic NASH therapeutic trials, Journal of Hepatology, 2018, 68. 353-361.

Sjögren, RJO, Rizo-Roca D, Chibalin AV, Chorell E, Furrer R, Katayma S, Harada J, Karlsson HKR, Handschin C, Moritz T, Krook A, Naslund E, Zierath JR. Diabetologia, 2021, 64, 2077-2091.).

Sun H, et. al.: Catabolic Defect of Branched-Chain Amino Acids Promotes Heart Failure. Circulation 2016, 133:2038-49.).

Wang TJ, et.al.: Metabolite profiles and the risk of developing diabetes. Nat Med 2011, 17:448-53.

Wang W, et.al.: Defective branched chain amino acid catabolism contributes to cardiac dysfunction and remodeling following myocardial infarction. Am J Physiol Heart Circ Physiol 2016, 311:H1160-H9.

White PJ, et.al: The BCKDH Kinase and Phosphatase Integrate BCAA and Lipid Metabolism via Regulation of ATP-Citrate Lyase. Cell Metab 2018, 27(6), 1281-1293).

Zhang, S., et al., Drug Discovery Today, 12(9/10), 373-381 (2007)).

Zhong, M., Current Topics in Medicinal Chemistry, 2010, 10(4), 386-396.

National Center for Biotechnology Information. PubChem Compound Database; CID=154335780. Retrieved Apr. 18, 2020. https://pubchem.ncbi.nlm.nih.gov/compound/154335780.

National Center for Biotechnology Information. PubChem Compound Database; CID=62380857. Retrieved Oct. 22, 2012. https://pubchem.ncbi.nlm.nih.gov/compound/62380857.

National Center for Biotechnology Information. PubChem Compound Database; CID=62785029. Retrieved Oct. 22, 2012. https://pubchem.ncbi.nlm.nih.gov/compound/62785029.

* cited by examiner

BCKDK INHIBITORS AND/OR DEGRADERS

CROSS-REFERENCE TO RELATED APPLICATIONS

This application claims the benefit of U.S. Provisional Patent Application Ser. No. 63/284,797 filed Dec. 1, 2021 and U.S. Provisional Patent Application Ser. No. 63/383,562 filed Nov. 14, 2022. The related applications are incorporated herein in their entirety by reference.

FIELD

This application provides compounds that are branched-chain alpha keto acid dehydrogenase kinase inhibitors and/or degraders, pharmaceutical compositions containing such compounds and their use to treat for example, diabetes, NASH, kidney disease and heart failure.

BACKGROUND OF THE INVENTION

Branched-chain amino acids (BCAAs) account for about 40% of the essential amino acids in healthy subjects and must be acquired through a well-balanced diet. Branched-chain amino acids are toxic in excess but are required for protein synthesis and cellular signaling processes. BCAAs are transaminated by branched-chain aminotransferase (BCAT) to their alpha-keto acid forms: alpha-ketoisocaproate (KIC/ketoleucine), 2-keto-3-methylvalerate (KMV/ketoisoleucine) and alpha-ketoisovalerate (KIV/ketovaline). The branched-chain keto acids (BCKAs) are then oxidatively decarboxylated by the branched-chain ketoacid dehydrogenase (BCKDH) enzyme complex, which consists of multiple copies of BCKDH E☐☐☐☐ tetramers, BCKDH E2, and BCKDH E3 subunits. The complex is regulated by inhibitory phosphorylation, which is mediated by BCKDH kinase (BCKDK), and this same phosphorylation site is dephosphorylated by the phosphatase PPM1K. Inhibition of complex phosphorylation promotes BCKDH activity and thus the irreversible catabolism of BCKA. (Lynch C J, Adams S H: Branched-chain amino acids in metabolic signalling and insulin resistance. Nat Rev Endocrinol 2014, 10:723-36.) Deletion of Bckdk in mice confirms this regulation as mice lacking Bckdk display increased BCKDH activity in multiple tissues. (Joshi M A, Jeoung N H, Obayashi M, Hattab E M, Brocken E G, Liechty E A, Kubek M J, Vattem K M, Wek R C, Harris R A: Impaired growth and neurological abnormalities in branched-chain alpha-keto acid dehydrogenase kinase-deficient mice. Biochem J 2006, 400:153-62.)

U.S. Pat. No. 9,078,865 is directed to for example, methods of decreasing plasma levels of one or more branched-chain amino acids or branched-chain alpha-ketoacids comprising administering to an individual in need thereof a therapeutically effective amount of at least one compound of the formula: phenyl-$CH_2$—$(CH_2)_n$—COOH wherein n is 0, 2, 4, 6 or 8 in order to treat for example an inborn error of metabolism in newborns known as maple syrup urine disease (MSUD). MSUD, also called branched-chain ketoaciduria, is an autosomal recessive disorder.

There is a strong correlation with BCAA catabolism and cardiometabolic health. Increased BCAA/BCKA levels have been observed in plasma of type 2 diabetic patients in multiple studies. (Wang T J, Larson M G, Vasan R S, Cheng S, Rhee E P, McCabe E, Lewis G D, Fox C S, Jacques P F, Fernandez C, O'Donnell C J, Carr S A, Mootha V K, Florez J C, Souza A, Melander O, Clish C B, Gerszten R E: Metabolite profiles and the risk of developing diabetes. Nat Med 2011, 17:448-53; Newgard C B, An J, Bain J R, Muehlbauer M J, Stevens R D, Lien L F, Haqq A M, Shah S H, Arlotto M, Slentz C A, Rochon J, Gallup D, Ilkayeva O, Wenner B R, Yancy W S, Jr., Eisenson H, Musante G, Surwit R S, Millington D S, Butler M D, Svetkey L P: A branched-chain amino acid-related metabolic signature that differentiates obese and lean humans and contributes to insulin resistance. Cell Metab 2009, 9:311-26.)

Reduced PPM1K and increased BCKDK levels were observed in human NASH. (Lake A D, Novak P, Shipkova P, Aranibar N, Robertson D G, Reily M D, Lehman-McKeeman L D, Vaillancourt R R, Cherrington N J: Branched chain amino acid metabolism profiles in progressive human nonalcoholic fatty liver disease. Amino Acids 2015, 47:603-15.)

Reduced mRNA levels for enzymes in the catabolic pathway have also been observed in skeletal muscle of human diabetic patients. (Lerin C, Goldfine A B, Boes T, Liu M, Kasif S, Dreyfuss J M, De Sousa-Coelho A L, Daher G, Manoli I, Sysol J R, Isganaitis E, Jessen N, Goodyear L J, Beebe K, Gall W, Venditti C P, Patti M E: Defects in muscle branched-chain amino acid oxidation contribute to impaired lipid metabolism. Mol Metab 2016, 5:926-36.)

Similarly, metabolomics and RNA profiling data from mouse hearts also suggest that genes in the BCAA/BCKA catabolic pathway are downregulated in heart failure. (Lai L, Leone T C, Keller M P, Martin O J, Broman A T, Nigro J, Kapoor K, Koves T R, Stevens R, Ilkayeva O R, Vega R B, Attie A D, Muoio D M, Kelly D P: Energy metabolic reprogramming in the hypertrophied and early stage failing heart: a multisystems approach. Circ Heart Fail 2014, 7:1022-31; Sun H, Olson K C, Gao C, Prosdocimo D A, Zhou M, Wang Z, Jeyaraj D, Youn J Y, Ren S, Liu Y, Rau C D, Shah S, Ilkayeva O, Gui W J, William N S, Wynn R M, Newgard C B, Cai H, Xiao X, Chuang D T, Schulze P C, Lynch C, Jain M K, Wang Y: Catabolic Defect of Branched-Chain Amino Acids Promotes Heart Failure. Circulation 2016, 133:2038-49.)

These data collectively suggest that BCAA catabolism is impaired in multiple human disease states. One mechanism to increase BCAA catabolism is a BCKDK inhibitor and/or a BCKDK degrader. By inhibiting and/or degrading BCKDK, BCKDH activity will increase and BCAA catabolism will be increased.

In recent years, inhibitors of BCKDK have been reported in the literature and patent applications including the commonly assigned PCT applications PCT/IB2020/056066 and PCT/IB2020/055974 published as WO2020/261205 and WO2020/261144, respectively, both on Dec. 30, 2020. Although there has been some early research related to BCKDK there remains a need for pharmaceutical agents that have BCKDK inhibiting/degrading activity and are useful in the treatment, prevention or diminution of the manifestations of the maladies described herein.

SUMMARY OF THE INVENTION

This application is directed to compounds of the Formula I

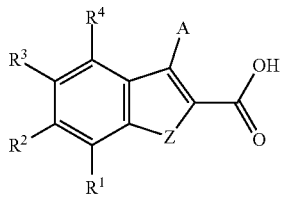

Formula I wherein
Z is O or S;
A is

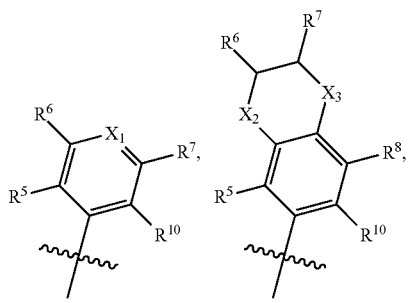

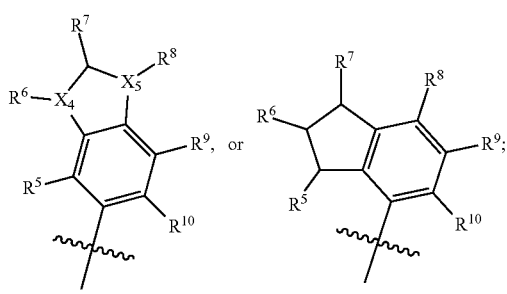

$X_1$ is $CR^{11}$ or N;

each of $X_2$ and $X_3$ are independently $CR^{11}$ or O, wherein if $X_2$ is O then $X_3$ is $CR^{11}$;

each of $X_4$ and $X_5$ are both C or one of $X_4$ and $X_5$ is C and the other is O; wherein, if $X_4$ is O, then $R^6$ is absent and if $X_5$ is O, then $R^8$ is absent;

each of $R^1$, $R^3$ and $R^4$ are independently selected from H and fluoro;

$R^2$ is H, fluoro or chloro;

each of $R^5$, $R^6$, $R^7$, $R^8$, $R^9$ and $R^{11}$ are independently selected from H, halo, hydroxyl, amino, cyano, $(C_1-C_4)$alkyl, $(C_3-C_6)$cycloalkyl, $(C_1-C_4)$alkoxy, $(C_1-C_4)$fluoroalkyl, $(C_3-C_6)$fluorocycloalkyl, $(C_1-C_4)$fluoroalkoxy, or $(C_1-C_4)$alkyl-$(C_1-C_4)$alkoxy; and $R^{10}$ is H, hydroxy, fluoro, chloro, cyano, or $(C_1-C_4)$alkyl;
wherein when A is

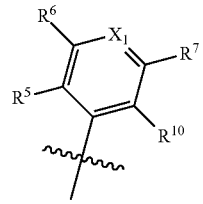

and $X_1$ is $CR^{11}$, i) at least one of $R^1$, $R^2$, $R^3$, $R^4$, $R^5$, $R^6$, $R^7$, $R^{10}$ and $R^{11}$ is halo and at least one other of $R^1$, $R^2$, $R^3$, $R^4$, $R^5$, $R^6$, $R^7$, $R^{10}$ and $R^{11}$ is other than H; or ii) Z is S and $R^2$ is halo;

or a pharmaceutically acceptable salt of said compounds.

This application is also directed a compound of Formula I

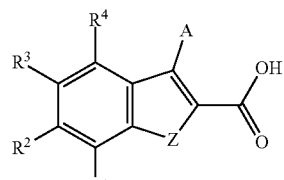

Formula I wherein
Z is O or S;
A is

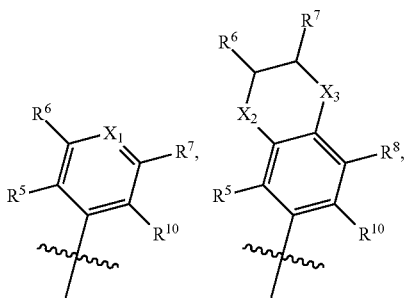

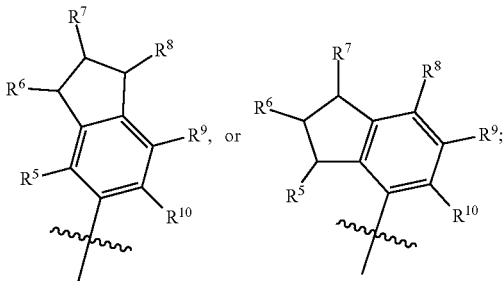

$X_1$ is $CR^{11}$ or N;
each of $X_2$ and $X_3$ are independently $CR^{11}$ or O, wherein if $X_2$ is O then $X_3$ is $CR^{11}$;
each of $R^1$, $R^3$ and $R^4$ are independently selected from H and fluoro;
$R^2$ is H, fluoro or chloro;
each of $R^5$, $R^6$, $R^7$, $R^8$, $R^9$ and $R^{11}$ are independently selected from H, halo, hydroxyl, amino, cyano, $(C_1-C_4)$ alkyl, $(C_3-C_6)$cycloalkyl, $(C_1-C_4)$alkoxy, $(C_1-C_4)$fluoroalkyl, $(C_3-C_6)$fluorocycloalkyl, $(C_1-C_4)$fluoroalkoxy, or $(C_1-C_4)$alkyl-$(C_1-C_4)$alkoxy; and $R^{10}$ is H, fluoro, chloro, cyano, or $(C_1-C_4)$alkyl; wherein when A is

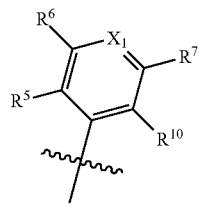

and $X_1$ is $CR^{11}$, at least one of $R^1$, $R^2$, $R^3$, $R^4$, $R^5$, $R^6$, $R^7$, $R^{10}$ and $R^{11}$ is halo and at least one other of $R^1$, $R^2$, $R^3$, $R^4$, $R^5$, $R^6$, $R^7$, $R^{10}$ and $R^{11}$ is other than H;

or a pharmaceutically acceptable salt of said compound.

This application is also directed at methods of treating fatty liver, nonalcoholic fatty liver disease, nonalcoholic steatohepatitis, nonalcoholic steatohepatitis with liver fibrosis, nonalcoholic steatohepatitis with cirrhosis, nonalcoholic steatohepatitis with cirrhosis, hepatocellular carcinoma, kidney renal clear cell carcinoma, head and neck squamous cell carcinoma, colorectal adenocarcinoma, mesothelioma, stomach adenocarcinoma, adrenocortical carcinoma, kidney papillary cell carcinoma, cervical and endocervical carcinoma, bladder urothelial carcinoma, lung adenocarcinoma, Type I diabetes, Type II diabetes mellitus, idiopathic Type I diabetes (Type Ib), latent autoimmune diabetes in adults (LADA), early-onset Type 2 diabetes (EOD), youth-onset atypical diabetes (YOAD), maturity onset diabetes of the young (MODY), malnutrition-related diabetes, gestational diabetes, coronary heart disease, ischemic stroke, restenosis after angioplasty, peripheral vascular disease, intermittent claudication, myocardial infarction, dyslipidemia, postprandial lipemia, conditions of impaired glucose tolerance (IGT), conditions of impaired fasting plasma glucose, metabolic acidosis, ketosis, arthritis, diabetic retinopathy, macular degeneration, cataract, diabetic nephropathy, glomerulosclerosis, chronic renal failure, diabetic neuropathy, metabolic syndrome, syndrome X, hyperglycemia, hyperinsulinemia, hypertriglyceridemia, insulin resistance, impaired glucose metabolism, skin and connective tissue disorders, foot ulcerations and ulcerative colitis, endothelial dysfunction and impaired vascular compliance, hyper apo B lipoproteinemia, kidney disease, end-stage kidney disease, chronic kidney disease at risk of progression, and maple syrup urine disease by administering to a human in need of such treatment a therapeutically effective amount of a compound of Formula I or a pharmaceutically acceptable salt of said compound.

This application is also directed at methods of treating or reducing the risk of hospitalization for heart failure, cardiovascular death, congestive heart failure, heart failure with New York Heart Association Class I-IV symptoms, heart failure with reduced left ventricular function (HF-rEF), heart failure with preserved left ventricular function (HF-pEF), heart failure with midrange ejection fraction (HF-mrEF), cardiovascular death, heart failure in patients with Type II diabetes mellitus, coronary heart disease, unstable angina, peripheral arterial disease peripheral vascular disease, renovascular disease, pulmonary hypertension, vasculitis, acute coronary syndromes and modification of cardiovascular risk by administering to a human in need of such treatment a therapeutically effective amount of a compound of Formula I or a pharmaceutically acceptable salt of said compound.

This application is also directed at pharmaceutical compositions having a therapeutically effective amount of a compound of Formula I or a pharmaceutically acceptable salt of said compound and a pharmaceutically acceptable carrier, vehicle or diluent.

This application is also is also directed at pharmaceutical combination compositions that include: a therapeutically effective amount of a composition having:

a first compound, said first compound being a compound of Formula I or a pharmaceutically acceptable salt of said compound;

a second compound, said second compound being an anti-diabetic agent; a non-alcoholic steatohepatitis treatment agent, a non-alcoholic fatty liver disease treatment agent or an anti-heart failure treatment agent and a pharmaceutical carrier, vehicle or diluent.

This application is also directed at crystal forms of compounds of Formula I.

It is to be understood that both the foregoing general description and the following detailed description are exemplary and explanatory only and are not restrictive of the invention, as claimed.

DETAILED DESCRIPTION OF THE INVENTION

Figure 1:
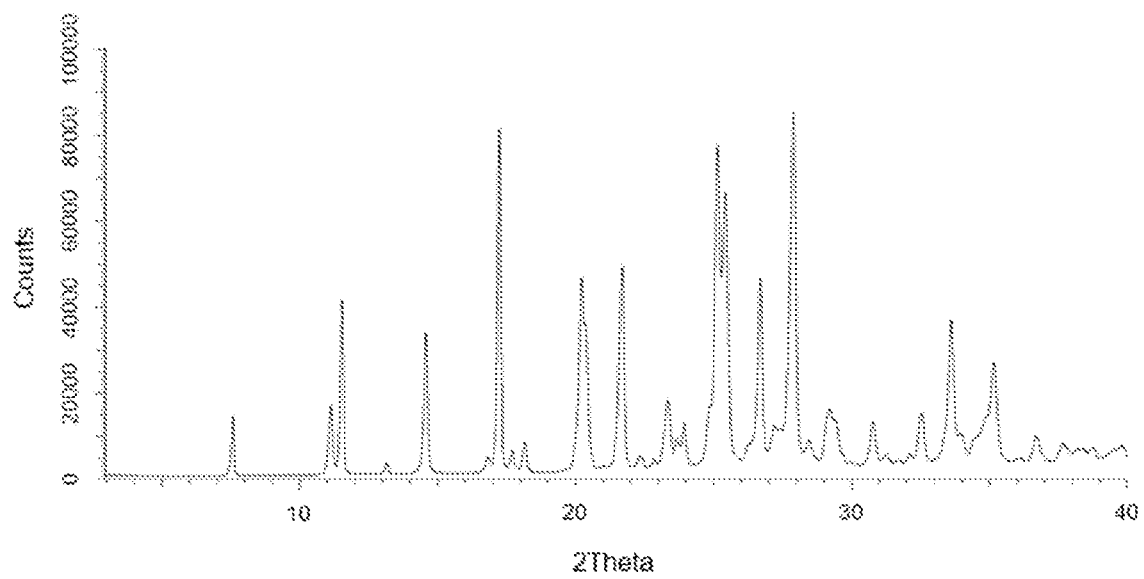
FIG. 1 is a characteristic X-ray powder diffraction pattern showing 6-Fluoro-3-(2,4,5-trifluoro-3-methoxyphenyl)-1-benzothiophene-2-carboxylic acid (Example 9), Form 1 Anhydrous (Vertical Axis: Intensity (CPS); Horizontal Axis: Two theta (degrees)).

This application may be understood more readily by reference to the following detailed description of exemplary embodiments of the invention and the examples included therein.

It is to be understood that this invention is not limited to specific synthetic methods of making that may of course vary. It is also to be understood that the terminology used herein is for the purpose of describing particular embodiments only and is not intended to be limiting. In this specification and in the claims that follow, reference will be made to a number of terms that shall be defined to have the following meanings:

As used herein in the specification, "a" or "an" may mean one or more. As used herein in the claim(s), when used in conjunction with the word "comprising", the words "a" or "an" may mean one or more than one. As used herein "another" may mean at least a second or more.

The term "about" refers to a relative term denoting an approximation of plus or minus 10% of the nominal value it refers, in one embodiment, to plus or minus 5%, in another embodiment, to plus or minus 2%. For the field of this disclosure, this level of approximation is appropriate unless the value is specifically stated to require a tighter range.

The term "and/or" means one or more. For example, "X and/or Y" shall be understood to mean either "X and Y" or "X or Y" and shall be taken to provide explicit support for both meanings or for either meaning. Similarly, when more than 2 expressions are listed, such as in "X, Y and/or Z", it shall be understood to mean either i) "X and Y", "X, Y and Z", "X and Z", or "Y and Z", or ii) "X or Y or Z" and shall be taken to provide explicit support for all meanings.

The term "alkyl", alone or in combination, means an acyclic, saturated hydrocarbon group of the formula CnH2n+1 which may be linear or branched. Examples of such groups include methyl, ethyl, n-propyl, isopropyl, butyl, sec-butyl, isobutyl and t-butyl. The carbon atom content of alkyl and various other hydrocarbon-containing moieties is indicated by a prefix designating a lower and upper number of carbon atoms in the moiety, that is, the prefix Ci-Cj indicates a moiety of the integer "i" to the integer "j" carbon atoms, inclusive. Thus, for example, $C_1$-$C_3$ alkyl refers to alkyl of one to three carbon atoms, inclusive.

"Fluoroalkyl" means an alkyl as defined herein substituted with one, two or three fluoro atoms. Exemplary ($C_1$)fluoroalkyl compounds include fluoromethyl, difluoromethyl and trifluoromethyl; exemplary ($C_2$)fluoroalkyl compounds include 1-fluoroethyl, 2-fluoroethyl, 1,1-difluoroethyl, 1,2-difluoroethyl, 1,1,1-trifluoroethyl, 1,1,2-trifluoroethyl, and the like.

"Cycloalkyl" refers to a nonaromatic ring that is fully hydrogenated group of the formula CnH2n-1. Examples of such carbocyclic rings include cyclopropyl and cyclobutyl.

"Fluorocycloalkyl" means a nonaromatic cycloalkyl ring as defined herein substituted with one, two or three fluoro atoms. Exemplary (C3)fluorocycloalkyl compounds include fluorocyclopropyl, difluorocyclopropyl and trifluorocyclopropyl; exemplary (C4)fluorocycloalkyl compounds include 1-fluorocyclobutyl, 2-fluorocyclobutyl, 1,1-difluorocyclobutyl, 1,2-difluorocyclobutyl, 1,1,1-trifluorocyclobutyl, 1,1,2-trifluorocyclobutyl, and the like.

By "alkoxy" is meant straight chain saturated alkyl or branched chain saturated alkyl bonded through an oxy. Exemplary of such alkoxy groups (assuming the designated length encompasses the particular example) are methoxy, ethoxy, propoxy, isopropoxy, butoxy, isobutoxy, tertiary butoxy, pentoxy, isopentoxy, neopentoxy, tertiary pentoxy, hexoxy, isohexoxy, heptoxy and octoxy.

"Fluoroalkoxy" means an alkoxy as defined herein substituted with one, two or three fluoro atoms. Exemplary ($C_1$)fluoroalkoxy compounds include fluoromethoxy, difluoromethoxy and trifluoromethoxy; exemplary ($C_2$)fluoroalkyl compounds include 1-fluoroethoxy, 2-fluoroethoxy, 1,1-difluoroethoxy, 1,2-difluoroethoxy, 1,1,1-trifluoroethoxy, 1,1,2-trifluoroethoxy, and the like.

"Halo" refers to bromo, chloro, fluoro or iodo.

"Compounds" when used herein includes any pharmaceutically acceptable derivative or variation, including conformational isomers (e.g., cis and trans isomers), atropisomers (i.e. stereoisomers from hindered rotation), and all optical isomers (e.g., enantiomers and diastereomers), racemic, diastereomeric and other mixtures of such isomers, as well as solvates, hydrates, isomorphs, polymorphs, tautomers, esters, salt forms, and prodrugs. The expression "prodrug" refers to compounds that are drug precursors which following administration, release the drug in vivo via some chemical or physiological process (e.g., a prodrug on being brought to the physiological pH or through enzyme action is converted to the desired drug form). Exemplary prodrugs upon cleavage release the corresponding free acid, and such hydrolyzable ester-forming residues of the compounds of Formula I include but are not limited to those having a carboxyl moiety wherein the free hydrogen is replaced by ($C_1$-$C_4$)alkyl, ($C_2$-$C_7$)alkanoyloxymethyl, 1-(alkanoyloxy)ethyl having from 4 to 9 carbon atoms, 1-methyl-1-(alkanoyloxy)-ethyl having from 5 to 10 carbon atoms, alkoxycarbonyloxymethyl having from 3 to 6 carbon atoms, 1-(alkoxycarbonyloxy)ethyl having from 4 to 7 carbon atoms, 1-methyl-1-(alkoxycarbonyloxy)ethyl having from 5 to 8 carbon atoms, N-(alkoxycarbonyl)aminomethyl having from 3 to 9 carbon atoms, 1-(N-(alkoxycarbonyl)amino) ethyl having from 4 to 10 carbon atoms, 3-phthalidyl, 4-crotonolactonyl, gamma-butyrolacton-4-yl, di-N,N—($C_1$-$C_2$)alkylamino($C_2$-$C_3$)alkyl (such as p-dimethylaminoethyl), carbamoyl-($C_1$-$C_2$)alkyl, N,N-di($C_1$-$C_2$)alkylcarbamoyl-($C_1$-$C_2$)alkyl and piperidino-, pyrrolidino- or morpholino($C_2$-$C_3$)alkyl.

As used herein, an arrowhead, "" or wavy line, denotes a point of attachment of a substituent to another group.

The term "mammal" refers to human, livestock or companion animals.

The term "companion animal" or "companion animals" refers to animals kept as pets or household animals. Examples of companion animals include dogs, cats, and rodents including hamsters, guinea pigs, gerbils and the like, rabbits, ferrets.

The term "livestock" refers to animals reared or raised in an agricultural setting to make products such as food or fiber, or for its labor. In some embodiments, livestock are suitable for consumption by mammals, for example humans. Examples of livestock animals include cattle, goats, horses, pigs, sheep, including lambs, and rabbits.

"Patient" refers to warm blooded animals such as, for example, guinea pigs, mice, rats, gerbils, cats, rabbits, dogs, cattle, goats, sheep, horses, monkeys, chimpanzees, and humans.

The term "treating" or "treatment" means an alleviation of symptoms associated with a disease, disorder or condition, or halt of further progression or worsening of those symptoms. Depending on the disease and condition of the patient, the term "treatment" as used herein may include one or more of curative, palliative and prophylactic treatment. Treatment can also include administering a pharmaceutical formulation in combination with other therapies.

"Therapeutically effective amount" means an amount of a compound of the present invention that (i) treats or prevents the particular disease, condition, or disorder, (ii) attenuates, ameliorates, or eliminates one or more symptoms of the particular disease, condition, or disorder, or (iii) prevents or delays the onset of one or more symptoms of the particular disease, condition, or disorder described herein.

The term "pharmaceutically acceptable" means the substance (e.g., the compounds of the invention) and any salt thereof, or composition containing the substance or salt of the invention that is suitable for administration to a patient.

In one embodiment of the compounds, Z is S; A is

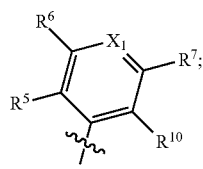

$R^2$ is fluoro or chloro; and $X_1$ is $CR^{11}$; or a pharmaceutically acceptable salt thereof.

In another embodiment of the compounds, $R^1$, $R^3$ and $R^4$ are each H, and $R^2$ is fluoro; or a pharmaceutically acceptable salt thereof.

In another embodiment of the compounds, $R^5$ is fluoro, chloro, cyano or $(C_1-C_4)$alkyl and $R^{10}$ is H, fluoro or chloro; or a pharmaceutically acceptable salt thereof.

In another embodiment of the compounds, $R^6$ and $R^7$ are each independently selected from H, fluoro, chloro, cyano, $(C_1-C_4)$alkyl, and $(C_1-C_4)$alkoxy; or a pharmaceutically acceptable salt thereof.

In another embodiment of the compounds, $R^{11}$ is H, fluoro, chloro, cyano, $(C_1-C_4)$alkyl, or $(C_1-C_4)$alkoxy; or a pharmaceutically acceptable salt thereof.

In one embodiment of the method of treatment, the method provides treating fatty liver, nonalcoholic fatty liver disease, nonalcoholic steatohepatitis, nonalcoholic steatohepatitis with liver fibrosis, nonalcoholic steatohepatitis with cirrhosis or nonalcoholic steatohepatitis with cirrhosis and hepatocellular carcinoma comprising administering to a human in need of such treatment a therapeutically effective amount of a compound described herein or a pharmaceutically acceptable salt of said compound.

In another embodiment of the method of treatment, non-alcoholic steatohepatitis is treated.

In another embodiment of the method of treatment, the method provides treating or reducing the risk of hospitalization for heart failure, cardiovascular death, congestive heart failure, heart failure with reduced left ventricular function (HF-rEF), heart failure with preserved left ventricular function (HF-pEF), cardiovascular death, heart failure in patients with Type II diabetes mellitus, coronary heart disease, peripheral vascular disease, renovascular disease, pulmonary hypertension, vasculitis, acute coronary syndromes and modification of cardiovascular risk comprising administering to a human in need of such treatment a therapeutically effective amount of a compound as described herein or a pharmaceutically acceptable salt of said compound.

In another embodiment of the method of treatment, heart failure is treated.

In another embodiment of the method treatment, the method provides treating Type I diabetes, Type II diabetes mellitus, idiopathic Type I diabetes (Type Ib), latent autoimmune diabetes in adults (LADA), early-onset Type 2 diabetes (EOD), youth-onset atypical diabetes (YOAD), maturity onset diabetes of the young (MODY), malnutrition-related diabetes, gestational diabetes, coronary heart disease, ischemic stroke, restenosis after angioplasty, peripheral vascular disease, intermittent claudication, myocardial infarction, dyslipidemia, post-prandial lipemia, conditions of impaired glucose tolerance (IGT), conditions of impaired fasting plasma glucose, metabolic acidosis, ketosis, arthritis, diabetic retinopathy, macular degeneration, cataract, diabetic nephropathy, glomerulosclerosis, chronic renal failure, diabetic neuropathy, metabolic syndrome, syndrome X, hyperglycemia, hyperinsulinemia, hypertriglyceridemia, insulin resistance, impaired glucose metabolism, skin and connective tissue disorders, foot ulcerations and ulcerative colitis, endothelial dysfunction and impaired vascular compliance, hyper apo B lipoproteinemia, kidney disease, end-stage kidney disease, chronic kidney disease at risk of progression, and maple syrup urine disease comprising administering to a human in need of such treatment a therapeutically effective amount of a compound described herein or a pharmaceutically acceptable salt of said compound.

In another embodiment of the method of treatment, kidney disease is treated.

In another embodiment of the method of treatment, the method provides treating hepatocellular carcinoma, kidney renal clear cell carcinoma, head and neck squamous cell carcinoma, colorectal adenocarcinoma, mesothelioma, stomach adenocarcinoma, adrenocortical carcinoma, kidney papillary cell carcinoma, cervical and endocervical carcinoma bladder urothelial carcinoma, lung adenocarcinoma comprising administering to a human in need of such treatment a therapeutically effective amount of a compound described herein or a pharmaceutically acceptable salt thereof.

In another embodiment of the method of treatment, hepatocellular carcinoma is treated.

In one embodiment of the pharmaceutical composition, the composition includes a therapeutically effective amount of a compound as described herein or a pharmaceutically acceptable salt of said compound and a pharmaceutically acceptable carrier, vehicle or diluent.

In another embodiment of the pharmaceutical composition, the composition includes a pharmaceutical combination that includes: a therapeutically effective amount of a composition comprising:
  a first compound, said first compound being a compound as described herein or a pharmaceutically acceptable salt of said compound;
  a second compound, said second compound being an anti-diabetic agent; a non-alcoholic steatohepatitis treatment agent, a non-alcoholic fatty liver disease treatment agent, kidney disease treatment agent, or an anti-heart failure treatment agent and a pharmaceutical carrier, vehicle or diluent.

In another embodiment of the pharmaceutical composition, the combination composition includes as a second compound, 4-(4-(1-isopropyl-7-oxo-1,4,6,7-tetrahydrospiro [indazole-5,4'-piperidine]-1'-carbonyl)-6-methoxypyridin-2-yl)benzoic acid; [(1R,5S,6R)-3-{2-[(2S)-2-methylazetidin-1-yl]-6-(trifluoromethyl)pyrimidin-4-yl}-3-azabicyclo [3.1.0]hex-6-yl]acetic acid; 2-[(1R,3R,5S)-3-({5-cyclopropyl-3-[2-(trifluoromethoxy)phenyl]-1,2-oxazol-4-yl}methoxy)-8-azabicyclo[3.2.1]octan-8-yl]-4-fluoro-1,3-benzothiazole-6-carboxylic acid; (S)-2-(5-((3-ethoxypyridin-2-yl)oxy)pyridin-3-yl)-N-(tetrahydrofuran-3-yl)pyrimidine-5-carboxamide; or 2-[(4-{6-[(4-cyano-2-fluorobenzyl)oxy]pyridin-2-yl}piperidin-1-yl)methyl]-1-[(2S)-oxetan-2-ylmethyl]-1H-benzimidazole-6-carboxylic acid, or a pharmaceutically acceptable salt thereof.

In another embodiment of the pharmaceutical composition, in the combination composition said non-alcoholic steatohepatitis treatment agent or non-alcoholic fatty liver disease treatment agent is an ACC inhibitor, GLP1 Receptor agonist, a DGAT-2 inhibitor, an FXR agonist, metformin, incretin analogs, or an incretin receptor modulator.

In another embodiment of the pharmaceutical composition, in the combination composition the anti-diabetic agent is an SGLT-2 inhibitor, metformin, incretin analogs, an incretin receptor modulator, a DPP-4 inhibitor, or a PPAR agonist.

In another embodiment of the pharmaceutical composition, in the combination composition said anti-diabetic agent is metformin, sitagliptin or ertugliflozin.

In another embodiment of the pharmaceutical composition, said anti-heart failure agent is an ACE inhibitor, an SGLT-2 inhibitor, an angiotensin receptor blocker, an angiotensin-receptor neprilysin inhibitor, a beta adrenergic receptor blocker, a calcium channel blocker, or a vasodilator.

In another embodiment of the pharmaceutical composition, said anti-heart failure agent is valsartan, sacubitril, dapagliflozin, empagliflozin, canagliflozin or ertugliflozin.

In one embodiment of the crystal form, the powder x-ray diffraction pattern has 2-theta values of (CuKα radiation, wavelength of 1.54056 Å) 7.6±0.2, 14.6±0.2, and 27.9±0.2.

In another embodiment of the crystal form, the powder x-ray diffraction pattern has 2-theta values of (CuKα radiation, wavelength of 1.54056 Å) 10.2±0.2, 13.9±0.2, and 24.7±0.2.

One embodiment includes use of a compound of Formula I or a pharmaceutically acceptable salt of said compound for the manufacture of a medicament in treating fatty liver, nonalcoholic fatty liver disease, nonalcoholic steatohepatitis, nonalcoholic steatohepatitis with liver fibrosis, nonalcoholic steatohepatitis with cirrhosis or nonalcoholic steatohepatitis with cirrhosis and hepatocellular carcinoma including administering to a mammal, such as a human, in need of such treatment a therapeutically effective amount.

Another embodiment includes use of a compound of Formula I or a pharmaceutically acceptable salt of said compound for the manufacture of a medicament in treating or reducing the risk of hospitalization for heart failure, cardiovascular death, congestive heart failure, heart failure with New York Heart Association Class I-IV symptoms, heart failure with reduced left ventricular function (HF-rEF), heart failure with preserved left ventricular function (HF-pEF), heart failure with midrange ejection fraction (HF-mrEF), cardiovascular death, heart failure in patients with Type II diabetes mellitus, coronary heart disease, unstable angina, peripheral arterial disease peripheral vascular disease, renovascular disease, pulmonary hypertension, vasculitis, acute coronary syndromes and modification of cardiovascular risk including administering to a mammal, such as a human, in need of such treatment a therapeutically effective amount.

Another embodiment includes use of a compound of Formula I or a pharmaceutically acceptable salt of said compound for the manufacture of a medicament in treating Type I diabetes, Type II diabetes mellitus, idiopathic Type I diabetes (Type Ib), latent autoimmune diabetes in adults (LADA), early-onset Type 2 diabetes (EOD), youth-onset atypical diabetes (YOAD), maturity onset diabetes of the young (MODY), malnutrition-related diabetes, gestational diabetes, coronary heart disease, ischemic stroke, restenosis after angioplasty, peripheral vascular disease, intermittent claudication, myocardial infarction, dyslipidemia, postprandial lipemia, conditions of impaired glucose tolerance (IGT), conditions of impaired fasting plasma glucose, metabolic acidosis, ketosis, arthritis, diabetic retinopathy, macular degeneration, cataract, diabetic nephropathy, glomerulosclerosis, chronic renal failure, diabetic neuropathy, metabolic syndrome, syndrome X, hyperglycemia, hyperinsulinemia, hypertriglyceridemia, insulin resistance, impaired glucose metabolism, skin and connective tissue disorders, foot ulcerations and ulcerative colitis, endothelial dysfunction and impaired vascular compliance, hyper apo B lipoproteinemia, kidney disease, end-stage kidney disease, chronic kidney disease at risk of progression, and maple syrup urine disease including administering to a mammal, such as a human, in need of such treatment a therapeutically effective amount of a compound of Formula I or a pharmaceutically acceptable salt of said compound.

Another embodiment of includes use of a compound of Formula I or a pharmaceutically acceptable salt of said compound for the manufacture of a medicament in treating hepatocellular carcinoma, kidney renal clear cell carcinoma, head and neck squamous cell carcinoma, colorectal adenocarcinoma, mesothelioma, stomach adenocarcinoma, adrenocortical carcinoma, kidney papillary cell carcinoma, cervical and endocervical carcinoma bladder urothelial carcinoma, lung adenocarcinoma including administering to a mammal, such as a human, in need of such treatment a therapeutically effective amount of a compound of Formula I or a pharmaceutically acceptable salt of said compound.

Another embodiment includes a compound selected from any of the Examples described herein, or a pharmaceutically acceptable salt thereof.

Another embodiment includes a prodrug of any of the Examples described herein, or a pharmaceutically acceptable salt thereof.

Another embodiment includes a phosphate ester prodrug of any of the Examples described herein, or a pharmaceutically acceptable salt thereof.

Another embodiment includes any novel genus of intermediates described in the General Schemes or Examples.

Another embodiment includes any novel specific intermediate described in the Preparations and Examples described herein.

Another embodiment includes any novel process described herein.

All pharmaceutically acceptable isotopically-labelled compounds of Formula I are within scope of this application wherein one or more atoms are replaced by atoms having the same atomic number, but an atomic mass or mass number different from the atomic mass or mass number usually found in nature.

Examples of isotopes suitable for inclusion in the compounds of the invention include isotopes of hydrogen, such as $^2$H and $^3$H, carbon, such as $^{11}$C, $^{13}$C and $^{14}$C, chlorine, such as $^{36}$Cl, fluorine, such as $^{18}$F, nitrogen, such as $^{13}$N and $^{15}$N, oxygen, such as $^{15}$O, $^{17}$O and $^{18}$O, and sulphur, such as $^{35}$S.

Certain isotopically-labelled compounds of Formula I for example, those incorporating a radioactive isotope, are useful in drug and/or substrate tissue distribution studies. The radioactive isotopes tritium, i.e. $^3$H, and carbon-14, i.e. $^{14}$C, are particularly useful for this purpose in view of their ease of incorporation and ready means of detection.

Substitution with heavier isotopes such as deuterium, i.e. $^2$H, may afford certain therapeutic advantages resulting from greater metabolic stability, for example, increased in vivo half-life or reduced dosage requirements, and hence may be preferred in some circumstances.

Substitution with positron emitting isotopes, such as $^{11}$C, $^{18}$F, $^{15}$O and $^{13}$N, can be useful in Positron Emission Tomography (PET) studies for examining substrate receptor occupancy.

Isotopically-labelled compounds of Formula I can generally be prepared by conventional techniques known to those skilled in the art or by processes analogous to those described in the accompanying Examples and Preparations using an appropriate isotopically-labelled reagent in place of the non-labelled reagent previously employed.

Certain compounds of Formula I and intermediates described herein may exist in more than one crystal form (generally referred to as "polymorphs"). Polymorphs may be prepared by crystallization under various conditions, for example, using different solvents or different solvent mixtures for recrystallization; crystallization at different temperatures; and/or various modes of cooling, ranging from very fast to very slow cooling during crystallization. Polymorphs may also be obtained by heating or melting the compound followed by gradual or fast cooling. The presence of polymorphs may be determined by solid probe NMR spectroscopy, IR spectroscopy, differential scanning calorimetry, powder X-ray diffraction or such other techniques.

Salts encompassed within the term "pharmaceutically acceptable salts" refer to the compounds of this invention which are generally prepared by reacting the free base or free acid with a suitable organic or inorganic acid, or a suitable organic or inorganic base, respectively, to provide a salt of the compound of the invention that is suitable for administration to a patient. Base salts are preferred, however, some compounds may also form acid salts. Suitable acid addition salts are formed from acids which form non-toxic salts. Examples include the acetate, adipate, aspartate, benzoate, besylate, bicarbonate/carbonate, bisulphate/sulphate, borate, camsylate, citrate, cyclamate, edisylate, esylate, formate, fumarate, gluceptate, gluconate, glucuronate, hexafluorophosphate, hibenzate, hydrochloride/chloride, hydrobromide/bromide, hydroiodide/iodide, isethionate, lactate, malate, maleate, malonate, mesylate, methylsulphate, naphthylate, 2-napsylate, nicotinate, nitrate, orotate, oxalate, palmitate, pamoate, phosphate/hydrogen phosphate/dihydrogen phosphate, pyroglutamate, saccharate, stearate, succinate, tannate, tartrate, tosylate, trifluoroacetate and xinofoate salts.

Suitable base salts are formed from bases which form non-toxic salts. Examples include the aluminium, arginine, calcium, choline, diethylamine, glycine, lysine, magnesium, meglumine, olamine, potassium, sodium, trimethamine and zinc salts. Hemisalts of acids and bases may also be formed, for example, hemisulfate and hemicalcium salts. For a review on suitable salts, see *Handbook of Pharmaceutical Salts: Properties, Selection, and Use* by Stahl and Wermuth (Wiley-VCH, 2002).

Hemisalts of acids and bases may also be formed, for example, hemisulfate and hemicalcium salts. For a review on suitable salts, see Handbook of Pharmaceutical Salts: Properties, Selection, and Use by Stahl and Wermuth (Wiley-VCH, 2002).

Pharmaceutically acceptable salts of compounds of Formula I may be prepared by one or more of three methods:
  (i) by reacting the compound of Formula I with the desired acid or base;
  (ii) by removing an acid- or base-labile protecting group from a suitable precursor of the compound of the invention or by ring-opening a suitable cyclic precursor, for example, a lactone or lactam, using the desired acid or base; or
  (iii) by converting one salt of the compound of the invention to another by reaction with an appropriate acid or base or by means of a suitable ion exchange column.

All three reactions are typically carried out in solution. The resulting salt may precipitate out and be collected by filtration or may be recovered by evaporation of the solvent. The degree of ionization in the resulting salt may vary from completely ionized to almost non-ionized.

The compounds of Formula I, and pharmaceutically acceptable salts thereof, may exist in unsolvated and solvated forms. The term 'solvate' is used herein to describe a molecular complex comprising the compound of Formula I, or a pharmaceutically acceptable salt thereof, and one or more pharmaceutically acceptable solvent molecules, for example, ethanol. The term 'hydrate' is employed when said solvent is water.

A currently accepted classification system for organic hydrates is one that defines isolated site, channel, or metal-ion coordinated hydrates—see *Polymorphism in Pharmaceutical Solids* by K. R. Morris (Ed. H. G. Brittain, Marcel Dekker, 1995). Isolated site hydrates are ones in which the water molecules are isolated from direct contact with each other by intervening organic molecules. In channel hydrates, the water molecules lie in lattice channels where they are next to other water molecules. In metal-ion coordinated hydrates, the water molecules are bonded to the metal ion.

When the solvent or water is tightly bound, the complex may have a well-defined stoichiometry independent of humidity. When, however, the solvent or water is weakly bound, as in channel solvates and hygroscopic compounds, the water/solvent content may be dependent on humidity and drying conditions. In such cases, non-stoichiometry will be the norm.

Also included within the scope of the invention are multi-component complexes (other than salts and solvates) wherein the drug and at least one other component are present in stoichiometric or non-stoichiometric amounts. Complexes of this type include clathrates (drug-host inclusion complexes) and co-crystals. The latter are typically defined as crystalline complexes of neutral molecular constituents which are bound together through non-covalent interactions, but could also be a complex of a neutral molecule with a salt. Co-crystals may be prepared by melt crystallization, by recrystallization from solvents, or by physically grinding the components together—see Chem Commun, 17, 1889-1896, by O. Almarsson and M. J. Zaworotko (2004). For a general review of multi-component complexes, see J Pharm Sci, 64 (8), 1269-1288, by Haleblian (August 1975).

Also included within the scope of the invention are active metabolites of compounds of Formula I (including prodrugs), that is, compounds formed in vivo upon administration of the drug, often by oxidation or dealkylation. Some examples of metabolites in accordance with the invention include:
  (i) where the compound of Formula I contains a methyl group, a hydroxymethyl derivative thereof (—$CH_3$->—$CH_2OH$) and
  (ii) where the compound of Formula I contains an alkoxy group, a hydroxy derivative thereof (—OR->—OH).

The compounds of the invention may exist in a continuum of solid states ranging from fully amorphous to fully crystalline. The term 'amorphous' refers to a state in which the material lacks long-range order at the molecular level and, depending upon temperature, may exhibit the physical properties of a solid or a liquid. Typically such materials do not give distinctive X-ray diffraction patterns and, while exhibiting the properties of a solid, are more formally described as a liquid. Upon heating, a change from solid to liquid properties occurs which is characterized by a change of state, typically second order ('glass transition'). The term 'crystalline' refers to a solid phase in which the material has a regular ordered internal structure at the molecular level and gives a distinctive X-ray diffraction pattern with defined peaks. Such materials when heated sufficiently will also exhibit the properties of a liquid, but the change from solid to liquid is characterised by a phase change, typically first order ('melting point').

The compounds of Formula I may also exist in a mesomorphic state (mesophase or liquid crystal) when subjected to suitable conditions. The mesomorphic state is intermediate between the true crystalline state and the true liquid state (either melt or solution). Mesomorphism arising as the result of a change in temperature is described as 'thermotropic' and that resulting from the addition of a second component, such as water or another solvent, is described as 'lyotropic'. Compounds that have the potential to form lyotropic mesophases are described as 'amphiphilic' and consist of molecules which possess an ionic (such as —COO$^-$Na$^+$, —COO$^-$K$^+$, or —SO$_3$$^-$Na$^+$) or non-ionic (such as —N$^-$N$^+$(CH$_3$)$_3$) polar head group. For more information, see *Crystals and the Polarizing Microscope* by N. H. Hartshorne and A. Stuart, 4$^{th}$ Edition (Edward Arnold, 1970).

The compounds of Formula I may exhibit polymorphism and/or one or more kinds of isomerism (e.g. optical, geometric or tautomeric isomerism). The compounds of Formula I may also be isotopically labelled. Such variation is implicit to the compounds of Formula I defined as they are by reference to their structural features and therefore within the scope of the invention.

The term "room temperature or ambient temperature" means a temperature between 18 to 25° C., "HPLC" refers to high-pressure liquid chromatography, "MPLC" refers to medium-pressure liquid chromatography, "TLC" refers to thin-layer chromatography, "MS" refers to mass spectrum or mass spectroscopy or mass spectrometry, "NMR" refers to nuclear magnetic resonance spectroscopy, "DCM" refers to dichloromethane, "DMSO" refers to dimethyl sulfoxide, "DME" refers to 1,2-dimethoxyethane, "EtOAc" refers to ethyl acetate, "MeOH" refers to methanol, "Ph" refers to the phenyl group, "Pr" refers to propyl, "trityl" refers to the triphenylmethyl group, "ACN" refers to acetonitrile, "DEAD" refers to diethyl azodicarboxylate, and "DIAD" refers to diisopropyl azodicarboxylate.

In general the compounds of this invention can be made by processes which include processes analogous to those known in the chemical arts, particularly in light of the description contained herein. Certain processes for the manufacture of the compounds of this invention are provided as further features of the invention and are illustrated by the following reaction schemes. Other processes may be described in the experimental section. Specific synthetic schemes for preparation of the compounds of Formula I are outlined below.

As used herein, the expressions "reaction-inert solvent" and "inert solvent" refer to a solvent or a mixture thereof which does not interact with starting materials, reagents, intermediates or products in a manner which adversely affects the yield of the desired product.

As an initial note, in the preparation of the Formula I compounds it is noted that some of the preparation methods useful for the preparation of the compounds described herein may require protection of remote functionality (e.g., primary amine, secondary amine, carboxyl in Formula I precursors). The need for such protection will vary depending on the nature of the remote functionality and the conditions of the preparation methods. The need for such protection is readily determined by one skilled in the art. The use of such protection/deprotection methods is also within the skill in the art. For a general description of protecting groups and their use, see T. W. Greene, *Protective Groups in Organic Synthesis*, John Wiley & Sons, New York, 1991.

For example, certain compounds contain primary amines or carboxylic acid functionalities which may interfere with reactions at other sites of the molecule if left unprotected. Accordingly, such functionalities may be protected by an appropriate protecting group which may be removed in a subsequent step. Suitable protecting groups for amine and carboxylic acid protection include those protecting groups commonly used in peptide synthesis (such as N-tert-butoxycarbonyl, benzyloxycarbonyl, and 9-fluorenylmethylenoxycarbonyl for amines and lower alkyl or benzyl esters for carboxylic acids), which are generally not chemically reactive under the reaction conditions described and can typically be removed without chemically altering other functionality in the Formula I compound.

The compounds of Formula I and intermediates may contain asymmetric or chiral centers, and, therefore, exist in different stereoisomeric forms. Unless specified otherwise, it is intended that all stereoisomeric forms of the compounds as well as mixtures thereof, including racemic mixtures are included herein. In addition, all geometric and positional isomers are included within the scope of the compounds. For example, if a compound incorporates a double bond or a fused ring, both the cis- and trans-forms, as well as mixtures, are embraced within the scope of the invention.

In addition, the compounds of Formula I and intermediates embrace all atropisomers and stereoisomeric mixtures thereof, including racemic mixtures. Atropisomers include those that can be isolated as separate stereoisomers and retain their stereoisomeric purity for various lengths of time including moderate and long times. Atropisomers also include those isomers that cannot be readily separated as separate stereoisomers due to interconversion over some time period including short to moderate times.

Chiral compounds of the invention (and chiral precursors thereof) may be obtained in enantiomerically-enriched form using chromatography, typically high pressure liquid chromatography (HPLC) or supercritical fluid chromatography (SFC), on a resin with an asymmetric stationary phase and with a mobile phase consisting of a hydrocarbon, typically heptane or hexane, containing from 0 to 50% isopropanol, typically from 2 to 20%, and from 0 to 5% of an alkylamine, typically 0.1% diethylamine (DEA) or isopropylamine. Concentration of the eluent affords the enriched mixture.

Diastereomeric mixtures can be separated into their individual diastereoisomers on the basis of their physical chemical differences by methods well known to those skilled in the art, such as by chromatography and/or fractional crystallization. Enantiomers can be separated by converting the enantiomeric mixture into a diastereomeric mixture by reaction with an appropriate optically active compound (e.g. chiral auxiliary such as a chiral alcohol or Mosher's acid chloride), separating the diastereoisomers and converting (e.g. hydrolyzing) the individual diastereoisomers to the corresponding pure enantiomers. Enantiomers can also be separated by use of a chiral HPLC column. Alternatively, the specific stereoisomers may be synthesized by using an optically active starting material, by asymmetric synthesis using optically active reagents, substrates, catalysts or solvents, or by converting one stereoisomer into the other by asymmetric transformation.

Where the compounds possess two or more stereogenic centers and the absolute or relative stereochemistry is given in the name, the designations R and S refer respectively to each stereogenic center in ascending numerical order (1, 2, 3, etc.) according to the conventional IUPAC number schemes for each molecule. Where the compounds possess one or more stereogenic centers and no stereochemistry is given in the name or structure, it is understood that the name or structure is intended to encompass all forms of the compound, including the racemic form.

The compounds of this invention may contain olefin-like double bonds. When such bonds are present, the compounds of the invention exist as cis and trans configurations and as mixtures thereof. The term "cis" refers to the orientation of two substituents with reference to each other and the plane of the ring (either both "up" or both "down"). Analogously, the term "trans" refers to the orientation of two substituents with reference to each other and the plane of the ring (the substituents being on opposite sides of the ring).

It is also possible that the intermediates and compounds of Formula I may exist in different tautomeric forms, and all such forms are embraced within the scope of the invention. The term "tautomer" or "tautomeric form" refers to structural isomers of different energies which are interconvertible via a low energy barrier. For example, proton tautomers (also known as prototropic tautomers) include interconversions via migration of a proton, such as keto-enol and imine-enamine isomerizations. A specific example of a proton tautomer is the tetrazole moiety where the proton may migrate between the four ring nitrogen as follows.

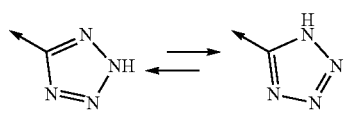

Valence tautomers include interconversions by reorganization of some of the bonding electrons.

Included within the scope of the claimed compounds present invention are all stereoisomers, geometric isomers and tautomeric forms of the compounds of Formula I, including compounds exhibiting more than one type of isomerism, and mixtures of one or more thereof. Also included are acid addition or base salts wherein the counterion is optically active, for example, D-lactate or L-lysine, or racemic, for example, DL-tartrate or DL-arginine.

Compounds of Formula I may be prepared according to the General Schemes and Examples provided herein.

General Schemes

Compounds of Formula I may be prepared according to Schemes I-X wherein variables A, $X_1$, $X_2$, $X_3$, $R^1$, $R^2$, $R^3$, $R^4$, $R^5$, $R^6$, $R^7$, $R^8$, $R^9$, $R^{10}$, $R^{11}$, and Z are given the meaning previously described unless otherwise noted. Furthermore, in Schemes I-X, the variable $R^{14}$ is H or $C_1$-$C_6$(alkyl), $R^{15}$ is $C_1$-$C_6$(alkyl), R* is H or $C_1$-$C_6$(alkyl) and R** is H or $C_1$-$C_6$(alkyl), or R* and R** are joined together with the O atoms and B group to form a heterocyclic compound optionally substituted with 1, 2, 3, 4, 5 or 6 C1-$C_6$(alkyl).

Scheme I

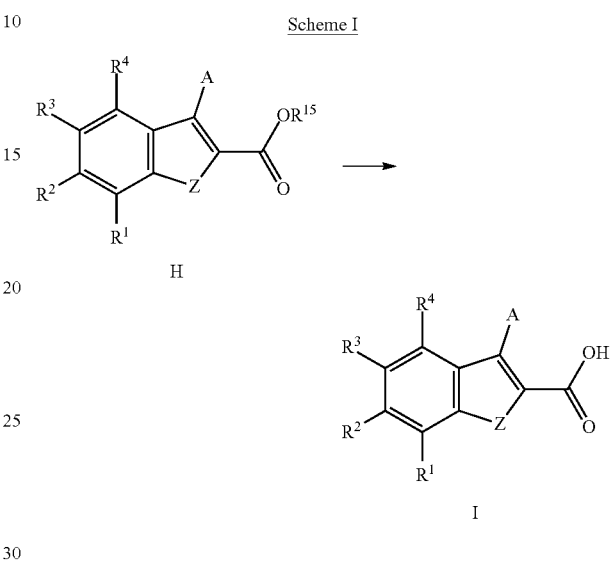

Compounds of Formula I may be prepared as shown in Scheme I, by hydrolysis of compounds of Formula H. Those skilled in the art will recognize that there are a variety of methods for ester hydrolysis. Formula I benzothiophene acid compounds or benzofuran acid compounds may be prepared from a Formula H ester by a hydrolysis reaction with an appropriate hydroxide source. Conditions for this transformation include but are not limited to the reaction of an ester with an inorganic hydroxide, including the following exemplary procedures. The Formula H ester is hydrolyzed to the corresponding Formula I for example, by reaction with sodium hydroxide, or with lithium hydroxide. Suitable solvents include methanol, ethanol, water, 2-methyltetrahydrofuran, and tetrahydrofuran. The reaction is heated at a temperature of about 25° C. to about 90° C., typically about 25° C., for about one hour to about 16 hours, typically about 16 hours.

Scheme II

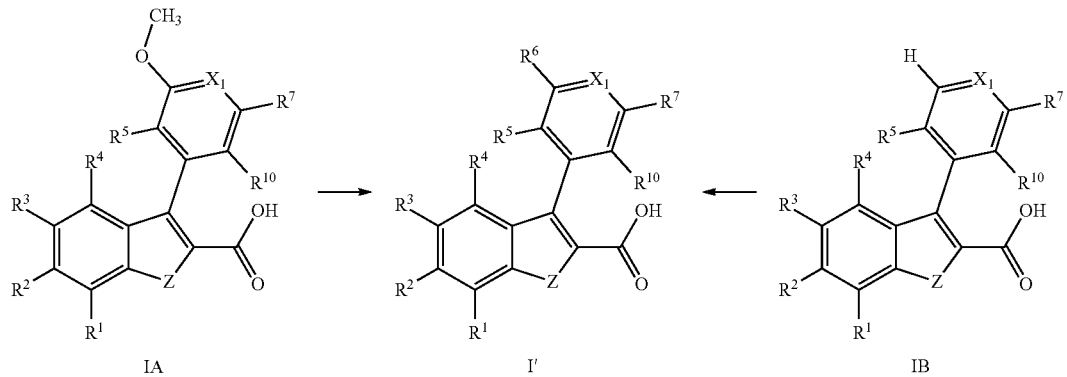

The Formula I' compounds, wherein Formula I benzothiophene acid compounds or benzofuran acid compounds having A as

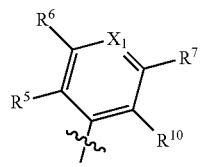

may be alternatively prepared using a late-stage aryl ring modification of Formula IA or IB acid as shown in Scheme II. For example, a Formula IA acid with a methoxy group can be dealkylated by a variety of reagents including boron tribromide in a suitable solvent such as dichloromethane at about 0° C. to about 25° C., usually for about 16 hours. A Formula IB acid with an acidic hydrogen on that same aryl ring can be deprotonated by various methods known to those skilled in the art. For example, deprotonation of a compound of Formula IB can be accomplished with n-butyllithium or lithium diisopropylamide, preferably lithium diisopropylamide in a suitable solvent such as tetrahydrofuran at a temperature of approximately −60° C. for about 1 hour. The anion can then be trapped with many electrophiles such as N-chlorosuccinimide at about −60° C. for about 1 hour.

The Formula H ester can be prepared from a corresponding compound of Formula E or Formula F via different methods know by those skilled in the art, as shown in Scheme III. As an example, a Suzuki reaction with coupling partners such as the compounds of Formula D and Formula G could provide compounds of Formula H. This derivatization can be accomplished using a variety of reagents including potassium fluoride, tripotassium phosphate, potassium carbonate, potassium bicarbonate and cesium carbonate, preferably potassium fluoride, in a range of solvents, including tetrahydrofuran, 1,4-dioxane, toluene and water. The reaction may proceed with many suitable catalysts and catalyst-ligand combinations. Exemplary catalysts and catalyst-ligand combinations include chloro(2-dicyclohexylphosphino-2',4',6'-triisopropyl-1,1'-biphenyl)[2-(2'-amino-1,1'-biphenyl)]palladium(II) (XPhos Pd G2), tris(dibenzylideneacetone)dipalladium(0), tetrakis(triphenylphosphine)palladium(0), methanesulfonyl[(tri-tert-butylphosphine)-2-(2-aminobiphenyl)]palladium(II) [P(t-Bu)₃Pd G3], allylpalladium(II) chloride dimer, [1,1'-bis(diphenylphosphino)ferrocene]dichloropalladium(II), bis[di-tert-butyl(4-dimethylaminophenyl)phosphine]dichloropalladium(II) [Pd(amphos)₂Cl₂] and/or chloro[(tri-tert-butylphosphine)-2-(2-aminobiphenyl)] palladium(II) [P(t-Bu)₃Pd G2]. Exemplary ligands include tri-tert-butylphosphine, tri-tert-butylphosphonium tetrafluoroborate and 2-dicyclohexylphosphino-2',6'-dimethoxybiphenyl.

Scheme III

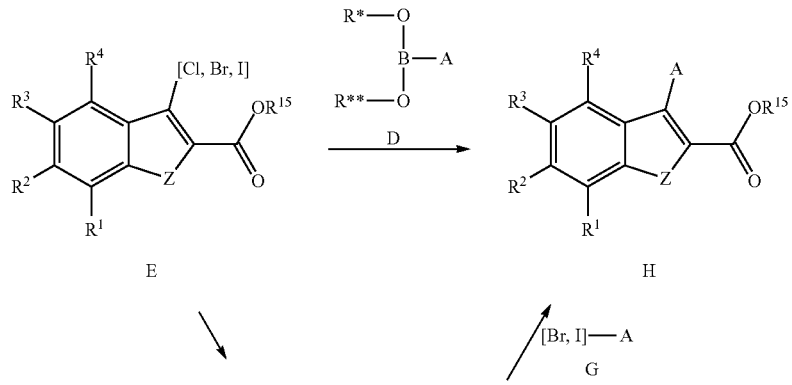

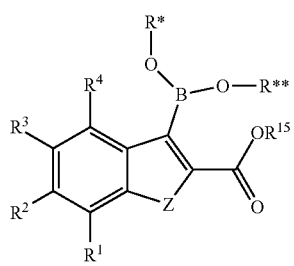

Heating could be required for the reaction to proceed, with temperatures from about 60° C. to about 120° C., usually around 80° C., for a period of about 1 to 24 hours, usually about 16 hours. In cases where atropisomerism may be observed, separation using chiral technologies known to those skilled in the art may provide the single atropisomers.

in the art. For example, compounds of Formula L may be brominated using a suitable reagent such as N-bromosuccinimide in a variety of suitable organic solvents, preferably dichloromethane. A suitable temperature for the reaction is about 25° C. to about 35° C. over 20 hours. Aryl bromides of Formula M may be derivatized to compounds of Formula

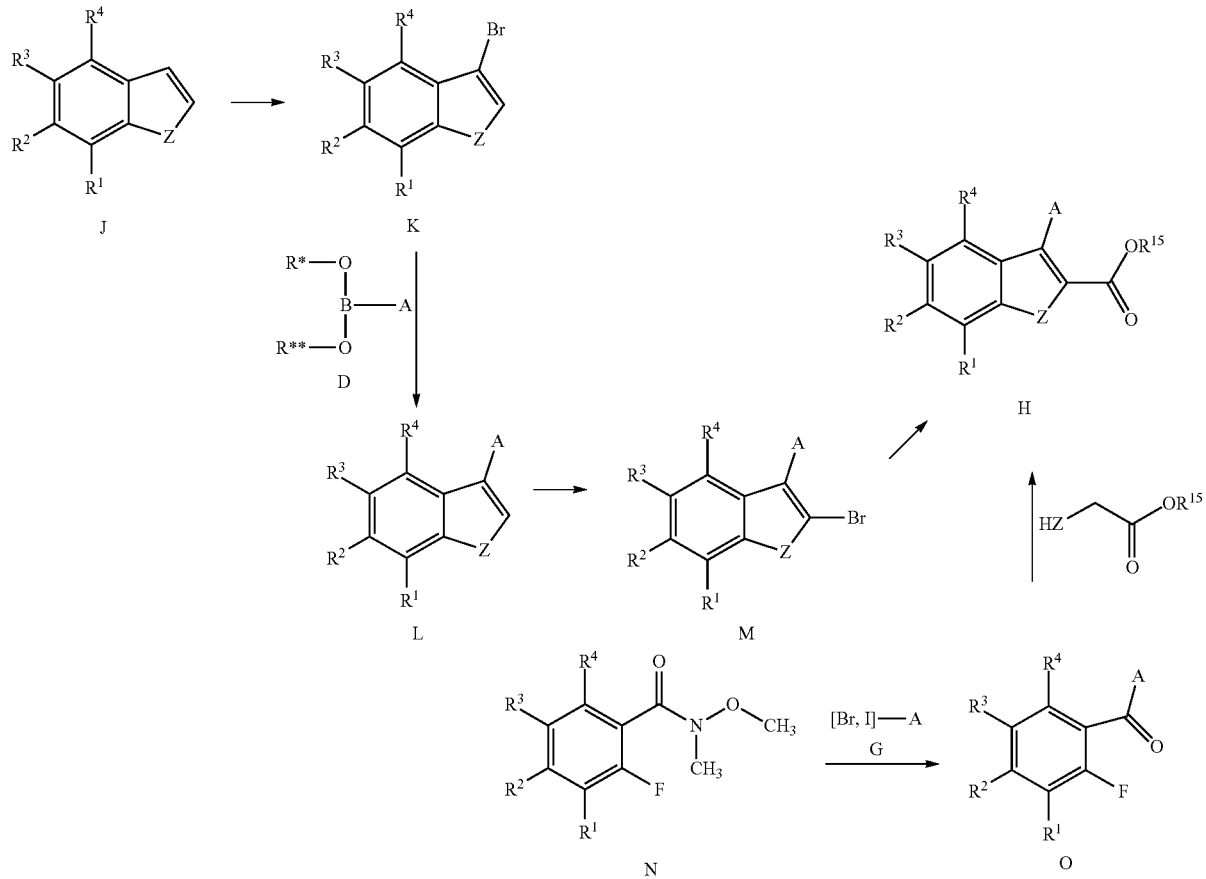

Scheme IV

Alternatively, as shown in Scheme IV, esters of Formula H may be synthesized by additional methods available to one skilled in the art. For example, compounds of Formula K may be obtained by brominating a compound of Formula J using a suitable reagent such as N-bromosuccinimide in a variety of suitable polar solvents such as N,N-dimethylformamide, acetonitrile, or preferably acetic acid. A suitable temperature for the reaction is about 80° C. over 16 hours. Compounds of Formula H may be prepared from a corresponding compound of Formula K via different methods known by those skilled in the art. As shown in Scheme IV, a Suzuki coupling reaction with the corresponding coupling partner such as a compound of Formula D may provide the compound of Formula H. This derivatization can be accomplished by a variety of reagents including but not limited to cesium carbonate and tetrakis(triphenylphosphine)palladium(0) in a suitable solvent system such as 1,4-dioxane and water. The reaction may proceed at a temperature of 80° C. for a period of 16 hours. Further exemplary Suzuki coupling reaction conditions are described for Scheme III.

Aryl bromides such as the compound of Formula M may be prepared by a variety of methods available to one skilled H via a catalyzed esterification under a carbon monoxide atmosphere. A list of suitable catalyst-ligand combinations includes but is not limited to [1,1'-bis(diphenylphosphino)ferrocene]dichloropalladium(II), dichloromethane complex. A variety of bases may be used for this transformation, preferably N,N-diisopropylethylamine. The reaction may proceed with heating about 70° C. over a period of 16 hours. A variety of protic solvents may be used for this esterification but methanol is preferred.

A compound of Formula H may be also prepared from a Formula N compound via reaction of a Weinreb amide compound such as the one described by the Formula N compound, after a metal-halogen exchange of an aryl halide of Formula G, to provide a compound of Formula O. This metal-halogen exchange may be performed under different conditions known to those skilled in the art. For example, reagents such as isopropylmagnesium chloride and tert-butyllithium may be used but preferably n-butyllithium is employed. A variety of aprotic solvents may be used for this reaction, such as diethyl ether, 2-methyltetrahydrofuran, and tetrahydrofuran. The reaction may proceed for about 3 hours at a temperature about −78° C. Condensation of a Formula O compound with an acetate as shown in Scheme IV may provide a compound of Formula H. An example of this transformation may involve the use of ethyl sulfanylacetate and other reagents such as potassium carbonate and N,N-dimethylformamide. The reaction may be heated to 100° C. for about 16 hours to afford a compound of Formula H.

or the reaction may be heated up to the refluxing temperature of the appropriate solvent. Suitable reaction times are typically between about 1 hour and 16 hours. Aryl boronic esters of Formula F may in turn be prepared from aryl halides of Formula E via Miyaura reaction with a boronic ester source such as 4,4,4',4',5,5,5',5'-octamethyl-2,2'-bi-1,3,2-dioxa- Scheme V

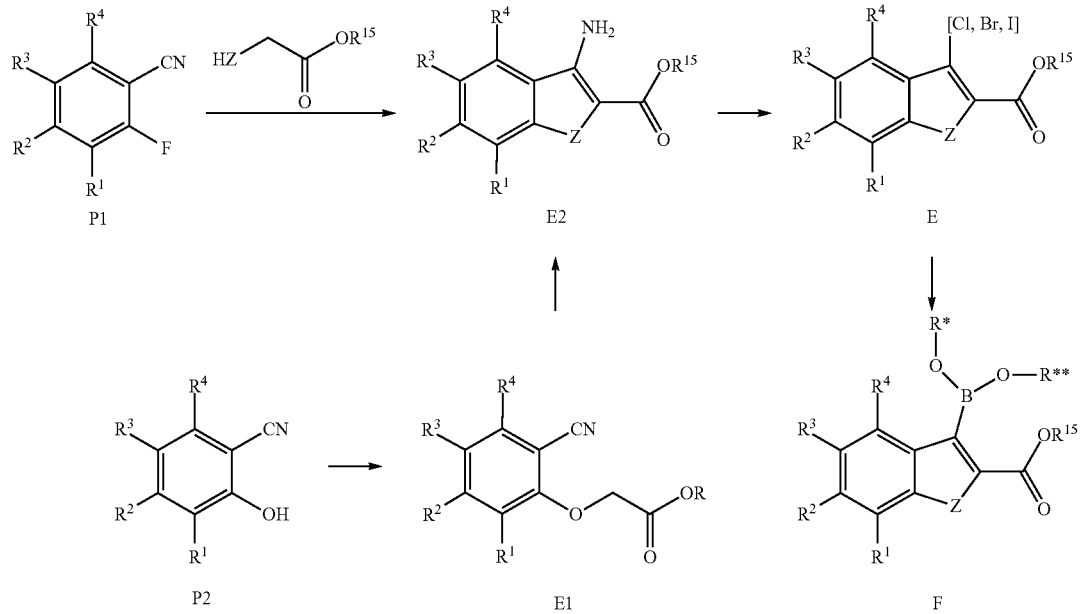

The amino-benzothiophene and amino-benzofuran compounds of Formula E2 may be prepared from Formula P1 or Formula P2 nitriles via an alkylation followed by an internal condensation with the nitrile group, as shown in Scheme V. Conditions for this transformation include but are not limited to the reaction of a Formula P1 compound with alkyl sulfanylacetate to provide the desired amino-benzothiophene upon treatment with a base. A list of suitable bases for this reaction includes sodium hydroxide, potassium carbonate, and triethylamine. Dimethyl sulfoxide and N,N-dimethylformamide can be used as solvents and the use of 18-crown-6 could facilitate this condensation. The reaction may be performed at a temperature of about 0° C. to about 130° C. in certain cases, typically about 0° C., for about 3 hours to about 16 hours, typically about 3 hours. Alkylation of a Formula P2 compound with an alkyl bromoacetate may provide compounds of Formula E1. As an example, this transformation may proceed with acetonitrile as a suitable solvent and potassium carbonate as a suitable base. The reaction may be performed at a temperature of 15° C. for about 16 hours. The desired amino-benzofuran may be obtained from cyclization of a Formula E1 compound with tetrahydrofuran as a suitable solvent and potassium tert-butoxide as a suitable base. The reaction may proceed for about 2 hours at a temperature about 0° C.

Esters of Formula E may be prepared for example via a Sandmeyer reaction of an amine of Formula E2. This can be accomplished with a variety of reagents depending on the desired aryl halide of Formula E. They include copper(II) bromide, copper(I) iodide, copper(II) chloride, diiodomethane, tert-butyl nitrite and 3-methylbutyl nitrite in a suitable solvent such acetonitrile. The reaction may proceed at 0° C.

borolane. The reaction may take place in a variety of suitable solvents including 1,4-dioxane and a suitable base such as potassium acetate may be used. The transformation may require the use of a catalyst-ligand combination such as [1,1'-bis(diphenylphosphino)ferrocene]dichloropalladium (II). The reaction may be heated up to the refluxing temperature of the appropriate solvent. Suitable reaction times are typically about 16 hours.

Scheme VI

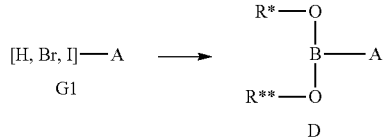

The requisite boronic acids or esters of Formula D above may be prepared by a variety of methods known to one skilled in the art, as shown in Scheme VI. For instance, compounds of Formula D can be obtained by Miyaura borylation of an aryl halide, typically aryl bromide or aryl iodide, of Formula G1. A variety of catalyst and catalyst-ligand combinations may be used, including but not limited to, [1,1'-bis(diphenylphosphino)ferrocene]dichloropalladium(II) and chloro(2-dicyclohexylphosphino-2',4',6'-triisopropyl-1,1'-biphenyl)[2-(2'-amino-1,1'-biphenyl)]palladium (II). Various ligands and reagents may be used to affect the Miyaura transformation such as 2-dicyclohexylphosphino-2',4',6'-triisopropylbiphenyl, tetrahydroxydiborane, 4,4,4',4', 5,5,5',5'-octamethyl-2,2'-bi-1,3,2-dioxaborolane, potassium acetate, sodium tert-butoxide, and ethane-1,2-diol. Suitable solvents for this reaction may be N,N-dimethylformamide, 1,4-dioxane and methanol. The reaction may proceed at a temperature of about 50° C. to about 100° C. over a period of about 16 hours.

Alternatively, boronic acids or esters of Formula D can be prepared via metal-halogen exchange or deprotonation of a compound of Formula G1. Reagents such as n-butyllithium and isopropylmagnesium chloride may be used to perform the exchange. A variety of reagents such as 4,4,5,5-tetramethyl-2-(propan-2-yloxy)-1,3,2-dioxaborolane and trimethyl borate can be used as the boronate source. The reaction may be performed at temperatures of about −78° C. to about 25° C., preferably at −78° C. over a period of about 1 hour. Aprotic solvents such as diethyl ether, 2-methyltetrahydrofuran, methyl tert-butyl ether, but preferably tetrahydrofuran, may be used.

An alternative method to obtain a boronic acid or ester of Formula D may be borylation via CH activation of an arene such as compounds of Formula G1. An example of this transformation may use (1,5-cyclooctadiene)(methoxy)iridium(I) dimer as the catalyst and 4,4'-di-tert-butyl-2,2'-bipyridine as a ligand. An appropriate boronate source for this reaction may be 4,4,5,5-tetramethyl-1,3,2-dioxaborolane and tetrahydrofuran can be used as a suitable solvent for this derivatization. A temperature of about 80° C., over a period of about 16 hours, may be required to obtain the desired boronic acid or ester.

Scheme VII

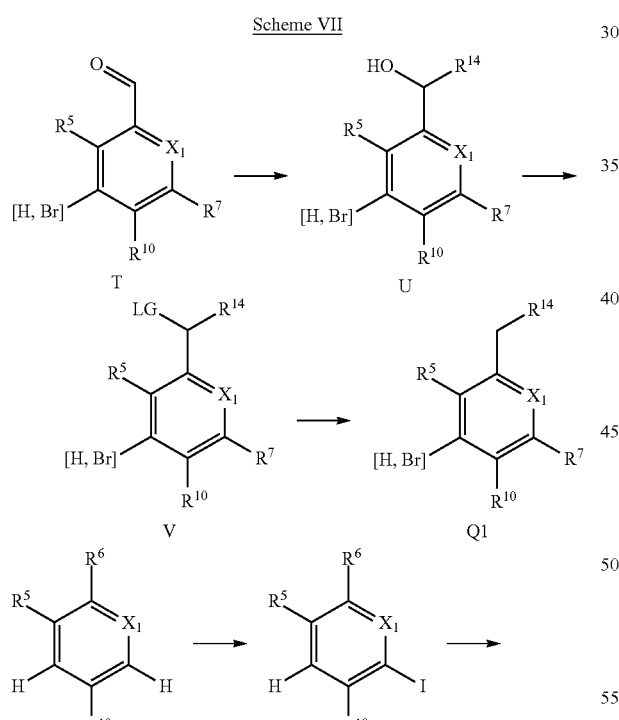

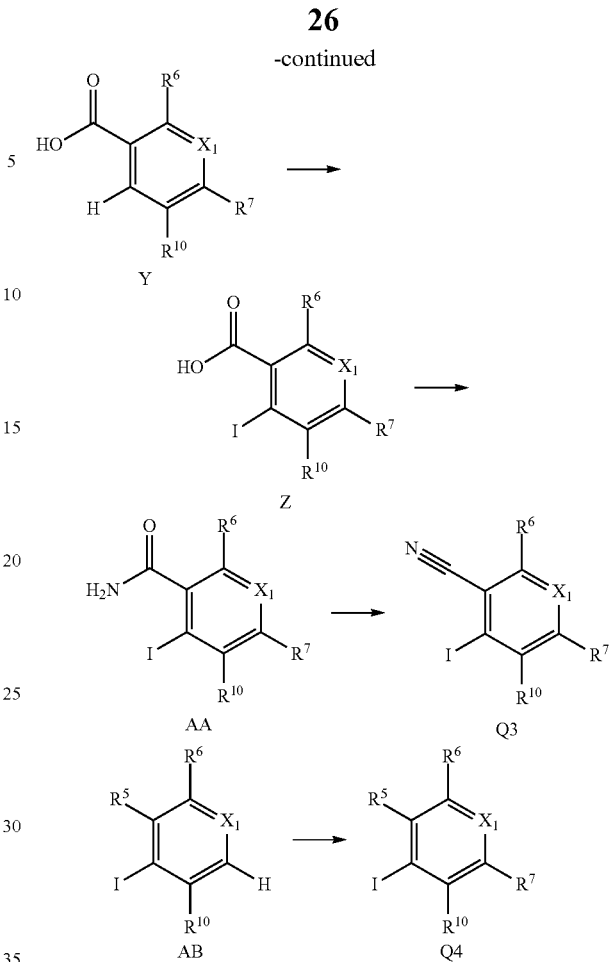

Arenes of Formula $Q_1$, $Q_2$, $Q_3$ and $Q_4$ can be prepared from various traditional modifications known to those skilled in the art, as shown in Scheme VII. Examples of these modifications may include but are not limited to the reaction of an aldehyde of Formula T with a suitable reagent such as methylmagnesium bromide in tetrahydrofuran, at a temperature about −78° C. to 0° C. over a period of about 2 hours. The secondary alcohol of Formula U may be reacted with an activating group such as methanesulfonyl chloride to yield a compound of Formula V, wherein LG is a leaving group such as mesylate, tosylate, or triflate. An appropriate base to use for this reaction may be triethylamine and a suitable solvent for this transformation may be dichloromethane at a temperature of about 0° C. for about 30 minutes. Reduction of a compound of Formula V can be accomplished with lithium triethylborohydride. A variety of aprotic solvents may be used for this reaction, but tetrahydrofuran may be preferred. An appropriate reaction temperature may be about 0° C. over a period of about 30 minutes to yield a compound such as a Formula $Q_1$ arene.

A compound of Formula $Q_2$ may be prepared from a compound of Formula W via iodination and a subsequent halogen dance reaction known to those skilled in the art. The iodination of a compound of Formula W may be performed with n-butyllithium and an electrophile such as iodine at a temperature of about −78° C. to about 20° C. over a period of about 3 hours. Many aprotic solvents can be used for this process, but tetrahydrofuran may be preferred. The halogen may be migrated upon treatment of a compound of Formula X with a base such as lithium diisopropylamide in a suitable solvent such as tetrahydrofuran. A typical temperature for this reaction may be −65° C. to about 20° C. over a period of 2 hours.

Benzoic acids of Formula Y can be iodinated via a palladium-catalyzed process to provide compounds of Formula Z. A variety of catalysts such as palladium(II) acetate may be used to perform this reaction along with reagents such as iodine and (diacetoxyiodo)benzene. Aprotic solvents such as N,N-dimethylformamide at a temperature of about 120° C. for about 16 hours may be needed for the transformation to occur. A Formula AA compound can be prepared from a compound of Formula Z via conditions known to those skilled in the art. As an example, a compound of Formula Z may be treated with 1H-benzotriazol-1-ol, 1-[3-(dimethylamino)propyl]-3-ethylcarbodiimide hydrochloride, 4-methylmorpholine and an aqueous ammonium hydroxide solution. Many aprotic solvents can be used for this reaction, but tetrahydrofuran may be preferred. The reaction temperature may be about 15° C. over a period of about 16 hours. Aryl nitriles of Formula Q3 may be synthesized from a compound of Formula AA under dehydration conditions. Various reagents may be suitable for this transformation such as trifluoroacetic anhydride and pyridine. Dichloromethane may be a solvent suitable for this reaction, at a temperature of about 15° C. over a period of about 16 hours.

Modifications of iodoarenes of Formula AB can be accomplished with a suitable base such as lithium diisopropylamide at a temperature of about −78° C. to 25° C. Many electrophiles can then be used to obtain a compound of Formula $Q_4$, for example, iodomethane over a period of about 1 hour. A period of about 16 hours may be required for the derivatization to occur.

nucleophilic reagent such as sodium methoxide in methanol. A suitable temperature for the reaction may be about 25° C., for typically about 16 hours. A compound of Formula AD may be mono-debrominated to provide a compound of Formula Q5 using various conditions known to those skilled in the art. As an example, a base such n-butyllithium may be used with a suitable solvent such as diethyl ether. A typical reaction temperature for this reaction may be −78° C. over a period of about 5 hours.

Alternatively, an arene of Formula $Q_5$ can be prepared from a Formula AE aryl bromide. For example, borylation of a Formula AE compound with a base such as lithium diisopropylamide may yield the desired aryl boronic acid of Formula AF. This transformation may be performed in many suitable solvents such as tetrahydrofuran and diethyl ether but preferably in methyl tert-butyl ether. The lithium-aryl complex may be quenched with an electrophile such as trimethyl borate that upon treatment with an aqueous acid such as hydrogen chloride will produce an arene of Formula AF. The typical temperature for this reaction may be about −70° C. to about 0° C. for about a period of 4 hours. A phenol of Formula AG can be prepared via hydroxylation of boronic acids of Formula AE using a variety of reagents, preferably hydrogen peroxide. When a solvent is used, suitable solvents include ethanol, methanol, N,N-dimethylformamide, or preferably dichloromethane. Suitable temperatures for the aforesaid reaction are typically between 30° C. and 40° C. Suitable reaction times are typically about 16 hours. The aryl ethers of Formula $Q_5$ can be conveniently prepared from the corresponding Formula AG phenol by reaction under a

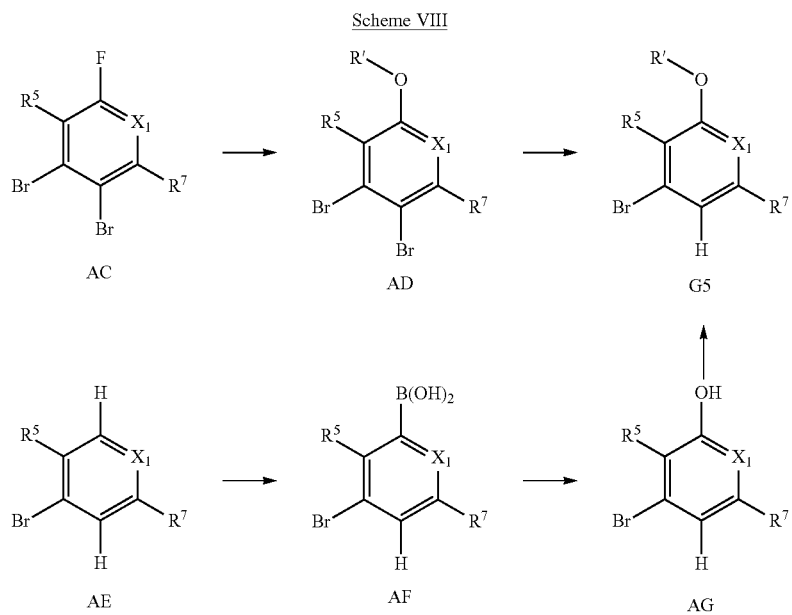

Scheme VIII

Additionally, a compound of Formula Q5 wherein R' is $(C_1-C_4)$ alkyl or $(C_1-C_4)$ fluoroalkyl may be prepared via alternate routes, as shown in Scheme VIII. A nucleophilic substitution of a leaving group on an arene such as the compound of Formula AC may yield a compound of Formula AD. For example, compounds of Formula AD, where an aryl ether is shown, may be prepared using a suitable variety of conditions including alkylation with iodomethane in a suitable polar, aprotic solvent such as acetone at a temperature between about −10° C. and 30° C., preferably ambient temperature, for about 16 hours with the addition of an inorganic base such as potassium carbonate. It will be apparent to those skilled in the art that there are other ways to effect this transformation in addition to those described.

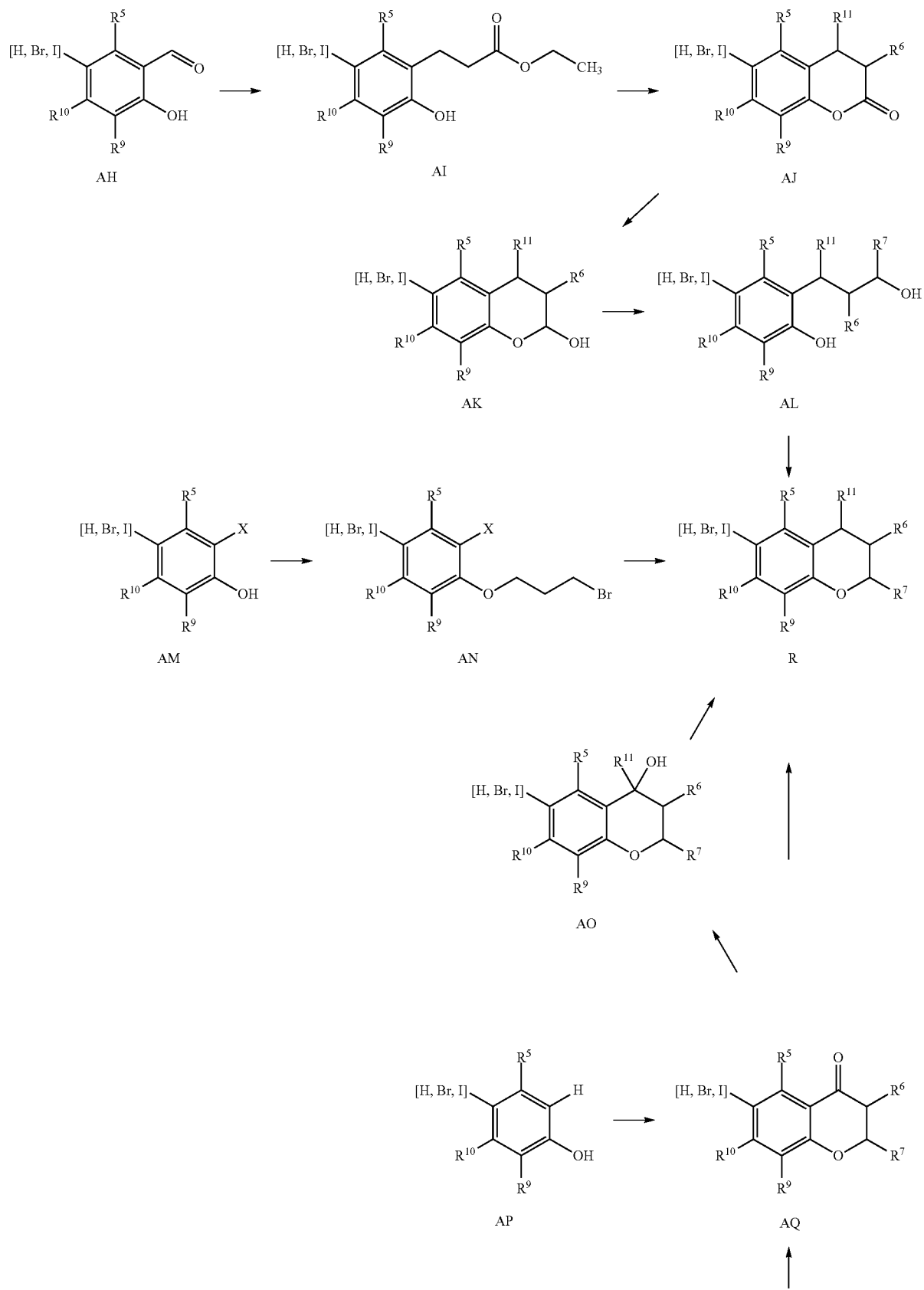
Scheme IX

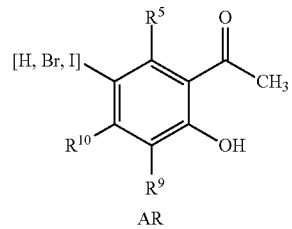

AR

There are a large variety of approaches that those skilled in the art may pursue to make compounds of Formula R, as shown in Scheme IX wherein X represents halo. For example, a compound of Formula AH may be reacted with ethyl (triphenyl-$\lambda^5$-phosphanylidene)acetate in a suitable solvent such as dichloromethane to yield an aryl ethyl prop-2-enoate. A typical temperature for this transformation may be about 25° C. over a period of 16 hours. The resulting alkene may be reduced with a catalyst such as nickel(II) hexahydrate in combination with sodium borohydride to produce a compound of Formula AI. A variety of solvents or combination of solvents may be used but preferably a mixture of tetrahydrofuran and methanol. The reaction may be performed at a temperature of about 0° C. for a period of about 1 hour. An acid-catalyzed condensation, with an acid such as p-toluenesulfonic acid, of a phenol of Formula AI may produce a compound of Formula AJ. A typical reaction time may be 16 hours at a suitable temperature of about 130° C. A compound of Formula AK may be prepared from a compound of Formula AJ with a reducing reagent such as diisobutylaluminum hydride. A suitable solvent for this transformation may be dichloromethane over a period of about 3 hours. Suitable temperatures for the reaction are between about −78° C. and 0° C., preferably about −78° C.

For compounds of the Formula AK, additional derivatization may be performed by addition of alkylating agents including but not limited to methyl magnesium bromide in a suitable aprotic solvent such as diethyl ether to produce a diol of Formula AL. Suitable temperatures for the reaction are between about 0° C. and 25° C., preferably about 0° C. Reaction times are from about 3 to about 16 hours, typically about 3 hours. An acid-mediated dehydration of a compound of Formula AL may produce lastly a compound of Formula R. An example of a reagent combination that may be used for this reaction is a mixture of sulfuric acid and acetic acid. Typically, the reaction may be performed over a period of about 3 hours at a suitable temperature of about 100° C.

An additional method to obtain compounds of Formula R may come from a compound of Formula AM. As an example, alkylation of a phenol of Formula AM with an electrophile such as 1,3-dibromopropane in a suitable solvent such as acetonitrile may be carried out in the presence of an inorganic base such as potassium carbonate. A suitable temperature for this derivatization may be about 80° C. over a period of 16 hours. A compound of Formula R may be prepared from a compound of Formula AN. This transformation may occur using a base such as n-butyllithium. This reaction may proceed over a variety of aprotic solvents such as methyl tert-butyl ether, diethyl ether, 2-methyltetrahydrofuran, or preferable tetrahydrofuran. The reaction may yield a compound of Formula R over a period of 2 to about 16 hours at a temperature of about −78° C. to about room temperature. Alternatively, a compound of Formula AP may be used to synthesize a compound of Formula R. A compound of Formula AQ may be prepared by treating a compound of Formula AP with a reagent such as (2E)-but-2-enoic acid in the presence of an acid such as methanesulfonic acid. The reaction may proceed at a temperature of about 100° C. over a period of about 16 hours. Reduction of a compound of Formula AQ may be performed by an organo-silane such as triethylsilane under acidic conditions. Typically, trifluoroacetic acid may be used. A suitable temperature to run the reaction is about 25° C. over a period of about 3 days.

A base-promoted condensation of a compound of Formula AR with the appropriate aldehyde may produce a compound of Formula AQ. Typically, pyrrolidine may be used for this transformation in a suitable protic solvent such as ethanol. The temperature of the reaction may range from about 20° C. to about 70° C. over a period of about 3 hours. A compound of Formula R may be obtained after a reduction of a compound of Formula AQ under similar reaction conditions as described above using an organo-silane reagent such as triethylsilane and an acid such as trifluoroacetic acid. The compound of Formula AQ may be additionally derivatized upon treatment with alkylating reagents such as methylmagnesium bromide in a suitable solvent such as tetrahydrofuran to produce compounds of Formula AO. Cerium(III) chloride may be used to facilitate this transformation, which can be accomplished at a temperature of about −50° C. to about 25° C. over a period of about 16 hours. A reductive dehydration of a compound of Formula AO may produce lastly a compound of Formula R upon treatment with a reagent such as triethylsilane in combination with boron trifluoride diethyl etherate. A typical reaction temperature may be about 0° C. over a period of 30 minutes.

Scheme X

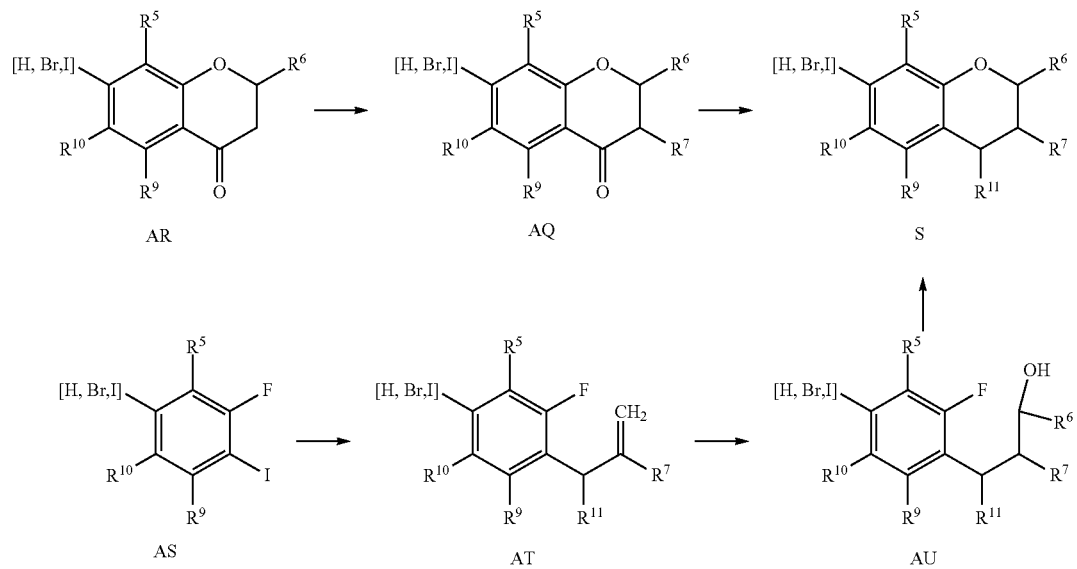

Compounds of Formula AR can be further elaborated prior to a Suzuki coupling by a variety of methods known to those skilled in the art. Such transformations include but are not limited to the examples shown in Scheme X. For example, compounds of the Formula AR may be derivatized at the alpha position of the ketone by a variety of methods. As an example, an alkylation at the alpha position to the ketone may be initiated by enolate formation with a combination of reagents such as lithium diisopropylamide and N,N,N',N',N",N"-hexamethylphosphoric triamide. A variety of suitable polar aprotic solvents such as diethyl ether or preferably tetrahydrofuran may be used. Suitable temperatures for the reaction are between about −78° C. and 0° C. Addition of an electrophile may produce a compound of Formula AQ after a typical reaction time of about 4 hours in total. A reduction of the carbonyl in a compound of Formula AQ to produce a compound of Formula S may be carried out using an organosilane such as triethylsilane under acidic conditions. Typically, trifluoroacetic acid may be used. A suitable temperature to run the reaction is about 50° C. over a period of about 16 hours. It will be apparent to those skilled in the art that many of these derivatives may themselves be suitable for further manipulation to access additional compounds of Formula S.

In a similar manner, derivatization of a compound of Formula AS may also produce compounds of Formula S. For example, a metal-halogen exchange of a compound of Formula AS with a suitable reagent such as (propan-2-yl) magnesium chloride in a suitable aprotic solvent such as tetrahydrofuran, may be followed by reaction with an electrophile in the presence of copper(I) iodide to yield a compound of Formula AT. Various electrophiles may be used for similar transformations known to those skilled in the art, as an example, use of 3-bromo-2-methylprop-1-ene may produce a compound of Formula AT at a typical temperature of about −20° C. to about 25° C. The reaction may require a period of about 16 hours. A hydroboration-oxidation of a compound of Formula AT may yield a compound of Formula AU. Many reagents may be used to accomplish the aforesaid transformation; as an example use of borane in tetrahydrofuran along with the use of sodium hydroxide and hydrogen peroxide may produce a compound of Formula AU. A typical reaction temperature may be about 0° C. to about 60° C. in a step-wise approach over a period of about 4 hours. An intramolecular nucleophilic aromatic substitution of a compound of Formula AU may yield a compound of Formula S. As an example, use of sodium hydride with a compound of Formula AU under a variety of solvents known to those skilled in the art but preferably a mixture of toluene and N,N-dimethylformamide can produce a compound of Formula S. Suitable temperatures to run the reaction are between about 0° C. and room temperature. Suitable reaction times are about 16 hours. It will be apparent to those skilled in the art that many of these derivatives may themselves be suitable for further manipulation to access additional compounds of Formula S.

The starting materials and reagents for the above-described Formula I compounds are also readily available or can be easily synthesized by those skilled in the art using conventional methods of organic synthesis. For example, many of the compounds used herein, are related to, or are derived from compounds in which there is a large scientific interest and commercial need, and accordingly many such compounds are commercially available or are reported in the literature or are easily prepared from other commonly available substances by methods which are reported in the literature.

This application is also directed at pharmaceutical compositions having a therapeutically effective amount of a compound of Formula I or a pharmaceutically acceptable salt of said compound and a pharmaceutically acceptable carrier, vehicle or diluent.

The compounds of this invention may also be used in conjunction with other pharmaceutical agents (e.g., anti-atheroaclerotic and antithrombotic agents) for the treatment of the disease/conditions described herein. This application is also directed at pharmaceutical combination compositions that include: a therapeutically effective amount of a composition having:

a first compound, said first compound being a compound of any of Formula I or a pharmaceutically acceptable salt of said compound;

a second compound, said second compound being a treatment agent for kidney disease, an anti-diabetic agent; a non-alcoholic steatohepatitis treatment agent, a non-alcoholic fatty liver disease treatment agent or an anti-heart failure treatment agent and a pharmaceutical carrier, vehicle or diluents.

In one embodiment, said treatment agent for kidney disease is useful for treating acute and/or chronic kidney disease.

In one embodiment, said non-alcoholic steatohepatitis treatment agent or non-alcoholic fatty liver disease treatment agent is an ACC inhibitor, a KHK inhibitor, a DGAT-2 inhibitor, an FXR agonist, a GLP-1R agonist, metformin, incretin analogs, or an incretin receptor modulator.

In another embodiment, said anti-diabetic agent is an SGLT-2 inhibitor, metformin, incretin analogs, an incretin receptor modulator, a DPP-4 inhibitor, or a PPAR agonist.

In another embodiment, said anti-diabetic agent is metformin, sitagliptin or ertugliflozin.

In another embodiment, said anti-heart failure agent is an ACE inhibitor, an angiotensin receptor blocker, an angiotensin-receptor neprilysin inhibitor, a beta adrenergic receptor blocker, a calcium channel blocker, or a vasodilator.

Combination Agents

The compounds can be administered alone or in combination with one or more additional therapeutic agents. By "administered in combination" or "combination therapy" it is meant that a compound and one or more additional therapeutic agents are administered concurrently to the mammal being treated. When administered in combination, each component may be administered at the same time or sequentially in any order at different points in time. Thus, each component may be administered separately but sufficiently closely in time so as to provide the desired therapeutic effect. The phrases "concurrent administration," "co-administration," "simultaneous administration," and "administered simultaneously" mean that the compounds are administered in combination. Thus, the methods of prevention and treatment described herein include use of combination agents.

The combination agents are administered to a mammal in a therapeutically effective amount. By "therapeutically effective amount" it is meant an amount of a compound of Formula I that, when administered alone or in combination with an additional therapeutic agent to a mammal, is effective to treat the desired disease/condition (e.g., NASH, heart failure, kidney disease or diabetes).

Given the NASH/NAFLD activity of the compounds of this invention, they may be co-administered with other agents for the treatment of non-alcoholic steatohepatitis (NASH) and/or non-alcoholic fatty liver disease (NAFLD) and associated disease/conditions, such as Orlistat, TZDs and other insulin-sensitizing agents, FGF21 analogs, Metformin, Omega-3-acid ethyl esters (e.g. Lovaza), Fibrates, HMG-CoA reductase inhibitors (e.g., pravastatin, lovastatin, atorvastatin, simvastatin, fluvastatin, NK-104 (a.k.a. itavastatin, or nisvastatin or nisbastatin) and ZD-4522 (a.k.a. rosuvastatin, or atavastatin or visastatin)), Ezetimibe, proprotein convertase subtilisin kexin type-9 (PCSK9) inhibitors (e.g. evolocumab, alirocumab), Probucol, Ursodeoxycholic acid, TGR5 agonists, FXR agonists, Vitamin E, Betaine, Pentoxifylline, CB1 antagonists, Carnitine, N-acetylcysteine, Reduced glutathione, lorcaserin, the combination of naltrexone with buproprion, SGLT2 inhibitors (including dapagliflozin, canagliflozin, empagliflozin, tofogliflozin, ertugliflozin, ASP-1941, THR1474, TS-071, ISIS388626 and LX4211 as well as those in WO2010023594), Phentermine, Topiramate, GLP-1 receptor agonists, GIP receptor agonists, dual GLP-1 receptor/glucagon receptor agonists (i.e., OPK88003, MED10382, JNJ-64565111, NN9277, BI 456906), dual GLP-1 receptor/GIP receptor agonists (i.e., Tirzepatide (LY3298176), NN9423), Angiotensin-receptor blockers an acetyl-CoA carboxylase (ACC) inhibitor, a diacylglycerol O-acyltransferase 1 (DGAT-1) inhibitor, such as those described in WO09016462 or WO2010086820, AZD7687 or LCQ908, a diacylglycerol O-acyltransferase 2 (DGAT-2) inhibitor, a PNPLA3 inhibitor, an FGF21 analog, an FGF19 analog, a PPAR agonist, an FXR agonist, an AMPK activator, an SCD1 inhibitor or an MPO inhibitor.

Exemplary GLP-1 receptor agonists include liraglutide, albiglutide, exenatide, albiglutide, lixisenatide, dulaglutide, semaglutide, HM15211, LY3298176, Medi-0382, NN-9924, TTP-054, TTP-273, efpeglenatide, those described in WO2018109607, and those described in PCT/IB2019/054867 filed Jun. 11, 2019 including the following:

2-({4-[2-(4-chloro-2-fluorophenyl)-1,3-benzodioxol-4-yl]piperidin-1-yl}methyl)-1-[(2S)-oxetan-2-ylmethyl]-1H-benzimidazole-6-carboxylic acid;

2-({4-[2-(4-chloro-2-fluorophenyl)-1,3-benzodioxol-4-yl]piperidin-1-yl}methyl)-7-fluoro-1-[(2S)-oxetan-2-ylmethyl]-1H-benzimidazole-6-carboxylic acid;

2-({4-[(2S)-2-(4-chloro-2-fluorophenyl)-1,3-benzodioxol-4-yl]piperidin-1-yl}methyl)-1-[(2S)-oxetan-2-ylmethyl]-1H-benzimidazole-6-carboxylic acid;

2-({4-[(2S)-2-(4-chloro-2-fluorophenyl)-1,3-benzodioxol-4-yl]piperidin-1-yl}methyl)-7-fluoro-1-[(2S)-oxetan-2-ylmethyl]-1H-benzimidazole-6-carboxylic acid;

2-({4-[2-(4-chloro-2-fluorophenyl)-2-methyl-1,3-benzodioxol-4-yl]piperidin-1-yl}methyl)-1-[(2S)-oxetan-2-ylmethyl]-1H-benzimidazole-6-carboxylic acid;

2-({4-[2-(4-Cyano-2-fluorophenyl)-2-methyl-1,3-benzodioxol-4-yl]piperidin-1-yl}methyl)-1-[(2S)-oxetan-2-ylmethyl]-1H-benzimidazole-6-carboxylic acid;

2-({4-[2-(5-Chloropyridin-2-yl)-2-methyl-1,3-benzodioxol-4-yl]piperidin-1-yl}methyl)-1-[(2S)-oxetan-2-ylmethyl]-1H-benzimidazole-6-carboxylic acid;

2-({4-[2-(4-Chloro-2-fluorophenyl)-2-methyl-1,3-benzodioxol-4-yl]piperidin-1-yl}methyl)-3-(1,3-oxazol-2-ylmethyl)-3H-imidazo[4,5-b]pyridine-5-carboxylic acid;

2-({4-[2-(4-chloro-2-fluorophenyl)-2-methyl-1,3-benzodioxol-4-yl]piperidin-1-yl}methyl)-1-[(1-ethyl-1H-imidazol-5-yl)methyl]-1H-benzimidazole-6-carboxylic acid;

2-({4-[2-(4-chloro-2-fluorophenyl)-2-methyl-1,3-benzodioxol-4-yl]piperidin-1-yl}methyl)-1-(1,3-oxazol-4-ylmethyl)-1H-benzimidazole-6-carboxylic acid;

2-({4-[2-(4-chloro-2-fluorophenyl)-2-methyl-1,3-benzodioxol-4-yl]piperidin-1-yl}methyl)-1-(pyridin-3-ylmethyl)-1H-benzimidazole-6-carboxylic acid;

2-({4-[2-(4-chloro-2-fluorophenyl)-2-methyl-1,3-benzodioxol-4-yl]piperidin-1-yl}methyl)-1-(1,3-oxazol-5-ylmethyl)-1H-benzimidazole-6-carboxylic acid;

2-({4-[2-(4-chloro-2-fluorophenyl)-2-methyl-1,3-benzodioxol-4-yl]piperidin-1-yl}methyl)-1-[(1-ethyl-1H-1,2,3-triazol-5-yl)methyl]-1H-benzimidazole-6-carboxylic acid;

2-({4-[2-(4-chloro-2-fluorophenyl)-2-methyl-1,3-benzodioxol-4-yl]piperidin-1-yl}methyl)-1-(1,3-oxazol-2-ylmethyl)-1H-benzimidazole-6-carboxylic acid;

2-({4-[2-(4-chloro-2-fluorophenyl)-7-fluoro-2-methyl-1,3-benzodioxol-4-yl]piperidin-1-yl}methyl)-1-[(2S)-oxetan-2-ylmethyl]-1H-benzimidazole-6-carboxylic acid;

2-({4-[2-(4-cyano-2-fluorophenyl)-2-methyl-1,3-benzodioxol-4-yl]piperidin-1-yl}methyl)-1-(1,3-oxazol-2-ylmethyl)-1H-benzimidazole-6-carboxylic acid;

2-({4-[(2S)-2-(4-chloro-2-fluorophenyl)-2-methyl-1,3-benzodioxol-4-yl]piperidin-1-yl}methyl)-7-fluoro-1-[(2S)-oxetan-2-ylmethyl]-1H-benzimidazole-6-carboxylic acid;

2-({4-[(2S)-2-(4-chloro-2-fluorophenyl)-2-methyl-1,3-benzodioxol-4-yl]piperidin-1-yl}methyl)-1-[(2S)-oxetan-2-ylmethyl]-1H-benzimidazole-6-carboxylic acid;

2-({4-[(2S)-2-(4-chloro-2-fluorophenyl)-2-methyl-1,3-benzodioxol-4-yl]piperidin-1-yl}methyl)-7-fluoro-1-[(2S)-oxetan-2-ylmethyl]-1H-benzimidazole-6-carboxylic acid;

2-({4-[(2S)-2-(4-Cyano-2-fluorophenyl)-2-methyl-1,3-benzodioxol-4-yl]piperidin-1-yl}methyl)-1-[(2S)-oxetan-2-ylmethyl]-1H-benzimidazole-6-carboxylic acid;

2-({4-[(2S)-2-(5-Chloropyridin-2-yl)-2-methyl-1,3-benzodioxol-4-yl]piperidin-1-yl}methyl)-1-[(2S)-oxetan-2-ylmethyl]-1H-benzimidazole-6-carboxylic acid;

2-({4-[(2S)-2-(4-chloro-2-fluorophenyl)-2-methyl-1,3-benzodioxol-4-yl]piperidin-1-yl}methyl)-1-[(1-ethyl-1H-imidazol-5-yl)methyl]-1H-benzimidazole-6-carboxylic acid;

2-({4-[(2R)-2-(4-Cyano-2-fluorophenyl)-2-methyl-1,3-benzodioxol-4-yl]piperidin-1-yl}methyl)-1-[(2S)-oxetan-2-ylmethyl]-1H-benzimidazole-6-carboxylic acid;

2-({4-[(2R)-2-(5-Chloropyridin-2-yl)-2-methyl-1,3-benzodioxol-4-yl]piperidin-1-yl}methyl)-1-[(2S)-oxetan-2-ylmethyl]-1H-benzimidazole-6-carboxylic acid;

2-({4-[(2R)-2-(4-chloro-2-fluorophenyl)-2-methyl-1,3-benzodioxol-4-yl]piperidin-1-yl}methyl)-1-[(1-ethyl-1H-imidazol-5-yl)methyl]-1H-benzimidazole-6-carboxylic acid;

2-({4-[2-(5-Chloropyridin-2-yl)-2-methyl-1,3-benzodioxol-4-yl]piperidin-1-yl}methyl)-1-[(2S)-oxetan-2-ylmethyl]-1H-benzimidazole-6-carboxylic acid;

2-({4-[(2S)-2-(5-Chloropyridin-2-yl)-2-methyl-1,3-benzodioxol-4-yl]piperidin-1-yl}methyl)-1-[(2S)-oxetan-2-ylmethyl]-1H-benzimidazole-6-carboxylic acid;

2-({4-[(2R)-2-(5-Chloropyridin-2-yl)-2-methyl-1,3-benzodioxol-4-yl]piperidin-1-yl}methyl)-1-[(2S)-oxetan-2-ylmethyl]-1H-benzimidazole-6-carboxylic acid;

2-({4-[2-(5-Chloropyridin-2-yl)-2-methyl-1,3-benzodioxol-4-yl]piperidin-1-yl}methyl)-1-[(2S)-oxetan-2-ylmethyl]-1H-benzimidazole-6-carboxylic acid, DIAST-X2; and 2-[(4-{6-[(4-Cyano-2-fluorobenzyl)oxy]pyridin-2-yl}piperidin-1-yl)methyl]-1-[(2S)-oxetan-2-ylmethyl]-1H-benzimidazole-6-carboxylic acid, or pharmaceutically acceptable salts thereof.

Exemplary ACC inhibitors include 4-(4-[(1-isopropyl-7-oxo-1,4,6,7-tetrahydro-1'H-spiro[indazole-5,4'-piperidin]-1'-yl)carbonyl]-6-methoxypyridin-2-yl)benzoic acid; and firsocostat (GS-0976) and pharmaceutically acceptable salts thereof.

Exemplary FXR Agonists include tropifexor (2-[(1R,3R,5S)-3-({5-cyclopropyl-3-[2-(trifluoromethoxy)phenyl]-1,2-oxazol-4-yl}methoxy)-8-azabicyclo[3.2.1]octan-8-yl]-4-fluoro-1,3-benzothiazole-6-carboxylic acid); cilofexor (GS-9674); obeticholic acid; LY2562175; Met409; TERN-101; and EDP-305 and pharmaceutically acceptable salts thereof.

Exemplary DGAT2 inhibitors include (S)-2-(5-((3-ethoxypyridin-2-yl)oxy)pyridin-3-yl)-N-(tetrahydrofuran-3-yl)pyrimidine-5-carboxamide;

2-(5-((3-ethoxy-5-fluoropyridin-2-yl)oxy)pyridin-3-yl)-N-((3R,4S)-4-fluoropiperidin-3-yl)pyrimidine-5-carboxamide;

2-(5-((3-ethoxy-5-fluoropyridin-2-yl)oxy)pyridin-3-yl)-N-((3S,5S)-5-fluoropiperidin-3-yl)pyrimidine-5-carboxamide;

2-(5-((3-ethoxypyridin-2-yl)oxy)pyridin-3-yl)-N-((3R,4S)-4-fluoropiperidin-3-yl)pyrimidine-5-carboxamide;

2-(5-((3-ethoxypyridin-2-yl)oxy)pyridin-3-yl)-N-((3R,4R)-4-fluoropiperidin-3-yl)pyrimidine-5-carboxamide;

2-(5-((3-ethoxy-5-fluoropyridin-2-yl)oxy)pyridin-3-yl)-N-((3R,4R)-4-fluoropiperidin-3-yl)pyrimidine-5-carboxamide; and 2-(5-((3-ethoxypyridin-2-yl)oxy)pyridin-3-yl)-N-((3S,5S)-5-fluoropiperidin-3-yl)pyrimidine-5-carboxamide, or a pharmaceutically acceptable salt thereof.

Exemplary KHK inhibitors include [(1R,5S,6R)-3-{2-[(2S)-2-methylazetidin-1-yl]-6-(trifluoromethyl)pyrimidin-4-yl}-3-azabicyclo[3.1.0]hex-6-yl]acetic acid and pharmaceutically acceptable salts thereof.

Given the anti-diabetic activity of the compounds of this invention they may be co-administered with other anti-diabetic agents. Suitable anti-diabetic agents include insulin, metformin, GLP-1 receptor agonists (described herein above), an acetyl-CoA carboxylase (ACC) inhibitor (described herein above), SGLT2 inhibitors (described herein above), monoacylglycerol O-acyltransferase inhibitors, phosphodiesterase (PDE)-10 inhibitors, AMPK activators, sulfonylureas (e.g., acetohexamide, chlorpropamide, diabinese, glibenclamide, glipizide, glyburide, glimepiride, gliclazide, glipentide, gliquidone, glisolamide, tolazamide, and tolbutamide), meglitinides, α-amylase inhibitors (e.g., tendamistat, trestatin and AL-3688), an α-glucoside hydrolase inhibitor (e.g., acarbose), α-glucosidase inhibitors (e.g., adiposine, camiglibose, emiglitate, miglitol, voglibose, pradimicin-Q, and salbostatin), PPARy agonists (e.g., balaglitazone, ciglitazone, darglitazone, englitazone, isaglitazone, pioglitazone and rosiglitazone), PPAR a/y agonists (e.g., CLX-0940, GW-1536, GW-1929, GW-2433, KRP-297, L-796449, LR-90, MK-0767 and SB-219994), protein tyrosine phosphatase-1B (PTP-1B) inhibitors (e.g., trodusquemine, hyrtiosal extract, and compounds disclosed by Zhang, S., et al., *Drug Discovery Today,* 12(9/10), 373-381 (2007)), SIRT-1 activators (e.g., resveratrol, GSK2245840 or GSK184072), dipeptidyl peptidase IV (DPP-IV) inhibitors (e.g., those in WO2005116014, sitagliptin, vildagliptin, alogliptin, dutogliptin, linagliptin and saxagliptin), insulin secretagogues, fatty acid oxidation inhibitors, A2 antagonists, c-jun amino-terminal kinase (JNK) inhibitors, glucokinase activators (GKa) such as those described in WO2010103437, WO201010343f8, WO2010013161, WO2007122482, TTP-399, TTP-355, TTP-547, AZD1656, ARRY403, MK-0599, TAK-329, AZD5658 or GKM-001, insulin, insulin mimetics, glycogen phosphorylase inhibitors (e.g. GSK1362885), VPAC2 receptor agonists, glucagon receptor modulators such as those described in Demong, D. E. et al. Annual Reports in Medicinal Chemistry 2008, 43, 119-137, GPR119 modulators, particularly agonists, such as those described in WO2010140092, WO2010128425, WO2010128414, WO2010106457, Jones, R. M. et al. in Medicinal Chemistry 2009, 44, 149-170 (e.g. MBX-2982, GSK1292263, APD597 and PSN821), FGF21 derivatives or analogs such as those described in Kharitonenkov, A. et al. et al., Current Opinion in Investigational Drugs 2009, 10(4) 359-364, TGR5 (also termed GPBAR1) receptor modulators, particularly agonists, such as those described in Zhong, M., Current Topics in Medicinal Chemistry, 2010, 10(4), 386-396 and INT777, GPR40 agonists, such as those described in Medina, J. C., Annual Reports in Medicinal Chemistry, 2008, 43, 75-85, including but not limited to TAK-875, GPR120 modulators, particularly agonists, high affinity nicotinic acid receptor (HM74A) activators, and SGLT1 inhibitors, such as GSK1614235. A further representative listing of anti-diabetic agents that can be combined with the compounds of this application can be found, for example, at page 28, line 35 through page 30, line 19 of WO2011005611.

Other antidiabetic agents could include inhibitors or modulators of carnitine palmitoyl transferase enzymes, inhibitors of fructose 1,6-diphosphatase, inhibitors of aldose reductase, mineralocorticoid receptor inhibitors, inhibitors of TORC2, inhibitors of CCR2 and/or CCR5, inhibitors of PKC isoforms (e.g. PKC☐, PKC☐, PKC☐), inhibitors of fatty acid synthetase, inhibitors of serine palmitoyl transferase, modulators of GPR81, GPR39, GPR43, GPR41, GPR105, Kv1.3, retinol binding protein 4, glucocorticoid receptor, somatostain receptors (e.g. SSTR1, SSTR2, SSTR3 and SSTR5), inhibitors or modulators of PDHK2 or PDHK4, inhibitors of MAP4K4, modulators of IL1 family including IL1beta, modulators of RXRalpha. In addition suitable anti-diabetic agents include mechanisms listed by Carpino, P. A., Goodwin, B. Expert Opin. Ther. Pat, 2010, 20(12), 1627-51.

Given the anti-heart failure activity of the compounds of this application, they may be co-administered with other anti-heart failure agents such as ACE inhibitors (e.g. captopril, enalapril, fosinopril, Lisinopril, perindopril, quinapril, Ramipril, trandolapril), Angiotensin II receptor blockers (e.g., Candesartan, Losartan, Valsartan), Angiotensin-receptor neprilysin inhibitors (sacubitril/valsartan), $I_f$ channel blocker Ivabradine, Beta-Adrenergic blocking agents (e.g., bisoprolol, metoprolol succinate, carvedilol), SGLT2 inhibitors, Aldosterone antagonists (e.g., spironolactone, eplerenone), cardiac myosin activator (e.g. omecamtiv mecarbil), guanylate cyclase stimulator (e.g. vericiguat), cardiac myosin inhibitor (e.g. mavacamten), SERCA2a activator (e.g. istaroxime), hydralazine and isosorbide dinitrate, diuretics (e.g., furosemide, bumetanide, torsemide, chlorothiazide, amiloride, hydrochlorothiazide, Indapamide, Metolazone, Triamterene), or digoxin.

The compounds of Formula I may also be used in combination with antihypertensive agents and such antihypertensive activity is readily determined by those skilled in the art according to standard assays (e.g., blood pressure measurements). Examples of suitable anti-hypertensive agents include: alpha adrenergic blockers; beta adrenergic blockers; calcium channel blockers (e.g., diltiazem, verapamil, nifedipine and amlodipine); vasodilators (e.g., hydralazine), diuretics (e.g., chlorothiazide, hydrochlorothiazide, flumethiazide, hydroflumethiazide, bendroflumethiazide, methylchlorothiazide, trichloromethiazide, polythiazide, benzthiazide, ethacrynic acid tricrynafen, chlorthalidone, torsemide, furosemide, musolimine, bumetanide, triamterene, amiloride, spironolactone); renin inhibitors; ACE inhibitors (e.g., captopril, zofenopril, fosinopril, enalapril, ceranopril, cilazopril, delapril, pentopril, quinapril, ramipril, lisinopril); AT-1 receptor antagonists (e.g., losartan, irbesartan, valsartan); ET receptor antagonists (e.g., sitaxsentan, atrsentan and compounds disclosed in U.S. Pat. Nos. 5,612, 359 and 6,043,265); Dual ET/AII antagonist (e.g., compounds disclosed in WO 00/01389); neutral endopeptidase (NEP) inhibitors; vasopeptidase inhibitors (dual NEP-ACE inhibitors) (e.g., gemopatrilat and nitrates). An exemplary antianginal agent is ivabradine.

Examples of suitable calcium channel blockers (L-type or T-type) include diltiazem, verapamil, nifedipine and amlodipine and mybefradil.

Examples of suitable cardiac glycosides include digitalis and ouabain.

In one embodiment, a Formula I compound may be co-administered with one or more diuretics. Examples of suitable diuretics include (a) loop diuretics such as furosemide (such as LASIX™), torsemide (such as DEMADEX™), bumetanide (such as BUMEX™), and ethacrynic acid (such as EDECRIN™); (b) thiazide-type diuretics such as chlorothiazide (such as DIURIL™, ESIDRIX™ or HYDRODIURIL™), hydrochlorothiazide (such as MICROZIDE™ or ORETIC™), benzthiazide, hydroflumethiazide (such as SALURON™), bendroflumethiazide, methychlorthiazide, polythiazide, trichlormethiazide, and indapamide (such as LOZOL™); (c) phthalimidine-type diuretics such as chlorthalidone (such as HYGROTON™), and metolazone (such as ZAROXOLYN™); (d) quinazoline-type diuretics such as quinethazone; and (e) potassium-sparing diuretics such as triamterene (such as DYRENIUM™), and amiloride (such as MIDAMOR™ or MODURETIC™).

In another embodiment, a compound of Formula I may be co-administered with a loop diuretic. In still another embodiment, the loop diuretic is selected from furosemide and torsemide. In still another embodiment, one or more compounds of Formula I may be co-administered with furosemide. In still another embodiment, one or more compounds of Formula I may be co-administered with torsemide which may optionally be a controlled or modified release form of torsemide.

In another embodiment, a compound of Formula I may be co-administered with a thiazide-type diuretic. In still another embodiment, the thiazide-type diuretic is selected from the group consisting of chlorothiazide and hydrochlorothiazide. In still another embodiment, one or more compounds of Formula I may be co-administered with chlorothiazide. In still another embodiment, one or more compounds of Formula I may be co-administered with hydrochlorothiazide.

In another embodiment, one or more compounds of Formula I may be co-administered with a phthalimidine-type diuretic. In still another embodiment, the phthalimidine-type diuretic is chlorthalidone.

Examples of suitable mineralocorticoid receptor antagonists include spironolactone and eplerenone.

Examples of suitable phosphodiesterase inhibitors include: PDE III inhibitors (such as cilostazol); and PDE V inhibitors (such as sildenafil).

Those skilled in the art will recognize that the compounds of this invention may also be used in conjunction with other cardiovascular or cerebrovascular treatments including PCI, stenting, drug-eluting stents, stem cell therapy and medical devices such as implanted pacemakers, defibrillators, or cardiac resynchronization therapy.

The compounds of Formula I may also be used in combination with drugs used in the management of chronic kidney disease including phosphate binders (e.g. sucroferric oxyhydroxide, sevelamer, calcium acetate), sodium bicarbonate, erythropoietin-stimulating agents, oral or intravenous iron agents (e.g. iron sucrose, ferric carboxymaltose, ferumoxytol), potassium binders, calcitriol, or SGLT2 inhibitors (e.g. dapagliflozin, empagliflozin, or other SGLT2 inhibitors recited herein).

Particularly when provided as a single dosage unit, the potential exists for a chemical interaction between the combined active ingredients. For this reason, when a Formula I compound and a second therapeutic agent are combined in a single dosage unit they may be formulated such that although the active ingredients are combined in a single dosage unit, the physical contact between the active ingredients is minimized (that is, reduced). For example, one active ingredient may be enteric coated. By enteric coating one of the active ingredients, it is possible not only to minimize the contact between the combined active ingredients, but also, it is possible to control the release of one of these components in the gastrointestinal tract such that one of these components is not released in the stomach but rather is released in the intestines. One of the active ingredients may also be coated with a material that effects a sustained release throughout the gastrointestinal tract and also serves to minimize physical contact between the combined active ingredients. Furthermore, the sustained-released component can be additionally enteric coated such that the release of this component occurs only in the intestine. Still another approach would involve the formulation of a combination product in which the one component is coated with a sustained and/or enteric release polymer, and the other component is also coated with a polymer such as a low viscosity grade of hydroxypropyl methylcellulose (HPMC) or other appropriate materials as known in the art, in order to further separate the active components. The polymer coating serves to form an additional barrier to interaction with the other component.

These as well as other ways of minimizing contact between the components of combination products, whether administered in a single dosage form or administered in separate forms but at the same time by the same manner, will be readily apparent to those skilled in the art, once armed with the present disclosure.

In combination therapy treatment, both the compounds of this invention and the other drug therapies are administered to mammals (e.g., humans, male or female) by conventional methods.

The Formula I compounds of this invention, their prodrugs and the salts of such compounds and prodrugs are all adapted to therapeutic use as agents that inhibit and/or degrade BCKDK in mammals, particularly humans and thus are useful for the treatment of the various conditions (e.g., those described herein) in which such action is implicated.

The disease/conditions that can be treated with compounds of Formula I, include, but are not limited to NASH/NAFLD, diabetes, kidney disease, and heart failure and associated disease/conditions.

In particular, inhibition and/or degradation of BCKDK is associated with NASH/NAFLD and associated disease/conditions because increased BCAA levels were observed in human NASH samples (Lake A D, Novak P, Shipkova P, Aranibar N, Robertson D G, Reily M D, Lehman-McKeeman L D, Vaillancourt R R, Cherrington N J: Branched chain amino acid metabolism profiles in progressive human nonalcoholic fatty liver disease. Amino Acids 2015, 47:603-15). Reduced levels of PPM1K mRNA and increased BCKDK protein levels were also observed in human NASH (Lake A D, Novak P, Shipkova P, Aranibar N, Robertson D G, Reily M D, Lehman-McKeeman L D, Vaillancourt R R, Cherrington N J: Branched chain amino acid metabolism profiles in progressive human nonalcoholic fatty liver disease. Amino Acids 2015, 47:603-15). Treatment of obese mice or rats with a BCKDK inhibitor and/or degrader reduced hepatic steatosis and triglyceride content, and overexpression of PPM1K in rats reduced hepatic triglyceride content (White P J, McGarrah R W, Grimsrud P A, Tso S C, Yang W H, Haldeman J M, Grenier-Larouche T, An J, Lapworth A L, Astapova I, Hannou S A, George T, Arlotto M, Olson L B, Lai M, Zhang G F, Ilkayeva O, Herman M A, Wynn R M, Chuang D T, Newgard C B: The BCKDH Kinase and Phosphatase Integrate BCAA and Lipid Metabolism via Regulation of ATP-Citrate Lyase. Cell Metab 2018, 27(6), 1281-1293). Further, regulatory authority recognized conditional approval for Phase III studies in NASH is based on histological surrogate markers obtained by liver biopsy. These generally accepted surrogates are i) resolution of NASH without worsening of fibrosis (i.e. a numerical increase in fibrosis stage); ii) a one or more stage reduction in fibrosis without worsening of NASH. Details may be found in: Ratziu, A critical review of endpoints for non-cirrhotic NASH therapeutic trials, Journal of Hepatology, 2018, 68. 353-361, and references therein.

Accordingly, given the positive correlation between activation of BCKDK with the development of NASH/NAFLD and associated disease/conditions, Formula I compounds of this invention, their prodrugs and the salts of such compounds and prodrugs, by virtue of their pharmacologic action, are useful for the prevention, arrestment and/or regression of fatty liver, nonalcoholic fatty liver disease, nonalcoholic steatohepatitis, nonalcoholic steatohepatitis with liver fibrosis, nonalcoholic steatohepatitis with cirrhosis, or nonalcoholic steatohepatitis with cirrhosis and hepatocellular carcinoma.

In addition, increased BCKDK is associated with heart failure and associated disease/conditions because an increase in BCKA have been observed in hearts from patients with heart failure. (Sun H, Olson K C, Gao C, Prosdocimo D A, Zhou M, Wang Z, Jeyaraj D, Youn J Y, Ren S, Liu Y, Rau C D, Shah S, Ilkayeva O, Gui W J, William N S, Wynn R M, Newgard C B, Cai H, Xiao X, Chuang D T, Schulze P C, Lynch C, Jain M K, Wang Y: Catabolic Defect of Branched-Chain Amino Acids Promotes Heart Failure. Circulation 2016, 133:2038-49.)

In heart failure, the regulatory phosphatase that activates BCKDH (PPM1K) is downregulated, and BCKDK is upregulated; thus BCAA catabolism is likely impaired in heart failure. (Sun H, Olson K C, Gao C, Prosdocimo D A, Zhou M, Wang Z, Jeyaraj D, Youn J Y, Ren S, Liu Y, Rau C D, Shah S, Ilkayeva O, Gui W J, William N S, Wynn R M, Newgard C B, Cai H, Xiao X, Chuang D T, Schulze P C, Lynch C, Jain M K, Wang Y: Catabolic Defect of Branched-Chain Amino Acids Promotes Heart Failure. Circulation 2016, 133:2038-49.)

Both BCKDH and BCKDK are expressed ubiquitously; however, the regulatory phosphatase PPM1K, which dephosphorylates BCKDH, is expressed most highly in cardiac tissue. Mice lacking PPM1K develop aging-induced heart failure and have worsened heart function when subjected to a transverse aortic constriction (TAC) heart failure model. (Sun H, Olson K C, Gao C, Prosdocimo D A, Zhou M, Wang Z, Jeyaraj D, Youn J Y, Ren S, Liu Y, Rau C D, Shah S, Ilkayeva O, Gui W J, William N S, Wynn R M, Newgard C B, Cai H, Xiao X, Chuang D T, Schulze P C, Lynch C, Jain M K, Wang Y: Catabolic Defect of Branched-Chain Amino Acids Promotes Heart Failure. Circulation 2016, 133:2038-49.)

Use of an inhibitor and/or degrader of BCKDK improved cardiac function in three different preclinical heart failure models (TAC, left anterior descending artery ligation/myocardial infarct, and ischemia/reperfusion). (Sun H, Olson K C, Gao C, Prosdocimo D A, Zhou M, Wang Z, Jeyaraj D, Youn J Y, Ren S, Liu Y, Rau C D, Shah S, Ilkayeva O, Gui W J, William N S, Wynn R M, Newgard C B, Cai H, Xiao X, Chuang D T, Schulze P C, Lynch C, Jain M K, Wang Y: Catabolic Defect of Branched-Chain Amino Acids Promotes Heart Failure. Circulation 2016, 133:2038-49; Wang W, Zhang F, Xia Y, Zhao S, Yan W, Wang H, Lee Y, Li C, Zhang L, Lian K, Gao E, Cheng H, Tao L: Defective branched chain amino acid catabolism contributes to cardiac dysfunction and remodeling following myocardial infarction. Am J Physiol Heart Circ Physiol 2016, 311:H1160-H9; Li T, Zhang Z, Kolwicz S C, Jr., Abell L, Roe N D, Kim M, Zhou B, Cao Y, Ritterhoff J, Gu H, Raftery D, Sun H, Tian R: Defective Branched-Chain Amino Acid Catabolism Disrupts Glucose Metabolism and Sensitizes the Heart to Ischemia-Reperfusion Injury. Cell Metab 2017, 25:374-85.)

Therefore, inhibiting and/or degrading BCKDK in cardiac or peripheral tissue should demonstrate benefit for metabolic disease and cardiac function.

Accordingly, given the positive correlation between activation of BCKDK with the development of heart failure and associated disease/conditions, Formula I compounds, their prodrugs and the salts of such compounds and prodrugs, by virtue of their pharmacologic action, are useful for the prevention, arrestment and/or regression, including reducing the risk of cardiovascular death and hospitalization for congestive heart failure, heart failure with New York Heart Association Class I-IV symptoms, heart failure with reduced left ventricular function (HF-rEF), heart failure with preserved left ventricular function (HF-pEF), heart failure with midrange ejection fraction (HF-mrEF), unstable angina, peripheral arterial disease, pulmonary hypertension, vasculitis or where the mammal has experienced myocardial infarction (secondary prevention ($2^{nd}$ myocardial infarction)).

In addition, reduced BCAA catabolism is associated with diabetes and associated disease/conditions because plasma BCAA are upregulated in patients with increased fasting glucose levels, and a one Standard Deviation increase in BCKA concentrations in plasma increases the likelihood of developing diabetes by over 50%. (Wang T J, Larson M G, Vasan R S, Cheng S, Rhee E P, McCabe E, Lewis G D, Fox C S, Jacques P F, Fernandez C, O'Donnell C J, Carr S A, Mootha V K, Florez J C, Souza A, Melander O, Clish C B, Gerszten R E: Metabolite profiles and the risk of developing diabetes. Nat Med 2011, 17:448-53; Newgard C B, An J, Bain J R, Muehlbauer M J, Stevens R D, Lien L F, Haqq A M, Shah S H, Arlotto M, Slentz C A, Rochon J, Gallup D, Ilkayeva O, Wenner B R, Yancy W S, Jr., Eisenson H, Musante G, Surwit R S, Millington D S, Butler M D, Svetkey L P: A branched-chain amino acid-related metabolic signature that differentiates obese and lean humans and contributes to insulin resistance. Cell Metab 2009, 9:311-26; Menni C, Fauman E, Erte I, Perry J R, Kastenmuller G, Shin S Y, Petersen A K, Hyde C, Psatha M, Ward K J, Yuan W, Milburn M, Palmer C N, Frayling T M, Trimmer J, Bell J T, Gieger C, Mohney R P, Brosnan M J, Suhre K, Soranzo N, Spector T D: Biomarkers for type 2 diabetes and impaired fasting glucose using a nontargeted metabolomics approach. Diabetes 2013, 62:4270-6; White P J, McGarrah R W, Grimsrud P A, Tso S C, Yang W H, Haldeman J M, Grenier-Larouche T, An J, Lapworth A L, Astapova I, Hannou S A, George T, Arlotto M, Olson L B, Lai M, Zhang G F, Ilkayeva O, Herman M A, Wynn R M, Chuang D T, Newgard C B: The BCKDH Kinase and Phosphatase Integrate BCAA and Lipid Metabolism via Regulation of ATP-Citrate Lyase. Cell Metab 2018, 27(6), 1281-1293e7; Zhou M, Shao J, Wu C-Y, Shu L, Dong W, Liu Y, Chen M, Wynn R M, Wang J, Wang J, Gui W-J, Qi X, Lusis A J, Li Z, Wang W, Ning G, Yang X, Chuang D T, Wang Y, Sun H: Targeting BCAA catabolism to treat obesity-associated insulin resistance. Diabetes 2019, 68(9), 1730-1746. Sjögren, RJO, Rizo-Roca D, Chibalin A V, Chorell E, Furrer R, Katayma S, Harada J, Karlsson H K R, Handschin C, Moritz T, Krook A, Naslund E, Zierath J R. Diabetologia, 2021, 64, 2077-2091.) Genetic analyses suggest that loss of function mutations in the PPM1K locus increase BCAA/BCKA levels and are associated with development of type 2 diabetes. (Lotta L A, Scott R A, Sharp S J, Burgess S, Luan J, Tillin T, Schmidt A F, Imamura F, Stewart I D, Perry J R, Marney L, Koulman A, Karoly E D, Forouhi N G, Sjogren R J, Naslund E, Zierath J R, Krook A, Savage D B, Griffin J L, Chaturvedi N, Hingorani A D, Khaw K T, Barroso I, McCarthy M I, O'Rahilly S, Wareham N J, Langenberg C: Genetic Predisposition to an Impaired Metabolism of the Branched-Chain Amino Acids and Risk of Type 2 Diabetes: A Mendelian Randomisation Analysis. PLoS Med 2016, 13:e1002179.)

Treatment of diabetic, obese mice or rats with a BCKDK inhibitor and/or degrader improved fasting glycemia, glycemia in a glucose tolerance test, reduced insulin levels, and improved insulin sensitivity. Overexpression of PPM1K in rats also improved glycemia and reduced insulin levels. (White P J, McGarrah R W, Grimsrud P A, Tso S C, Yang W H, Haldeman J M, Grenier-Larouche T, An J, Lapworth A L, Astapova I, Hannou S A, George T, Arlotto M, Olson L B, Lai M, Zhang G F, Ilkayeva O, Herman M A, Wynn R M, Chuang D T, Newgard C B: The BCKDH Kinase and Phosphatase Integrate BCAA and Lipid Metabolism via Regulation of ATP-Citrate Lyase. Cell Metab 2018.)

Accordingly, given the positive correlation between BCKDK and the development of diabetes and associated disease/conditions, Formula I compounds of this invention, their prodrugs and the salts of such compounds and prodrugs, by virtue of their pharmacologic action, are useful for the prevention, arrestment and/or regression of Type I diabetes, Type II diabetes mellitus, idiopathic Type I diabetes (Type Ib), latent autoimmune diabetes in adults (LADA), early-onset Type 2 diabetes (EOD), youth-onset atypical diabetes (YOAD), maturity onset diabetes of the young (MODY), malnutrition-related diabetes, gestational diabetes, coronary heart disease, ischemic stroke, restenosis after angioplasty, peripheral vascular disease, intermittent claudication, myocardial infarction, dyslipidemia, post-prandial lipemia, conditions of impaired glucose tolerance (IGT), conditions of impaired fasting plasma glucose, metabolic acidosis, ketosis, arthritis, diabetic retinopathy, macular degeneration, cataract, diabetic nephropathy, glomerulosclerosis, chronic renal failure, diabetic neuropathy, metabolic syndrome, syndrome X, hyperglycemia, hyperinsulinemia, hypertriglyceridemia, insulin resistance, impaired glucose metabolism, skin and connective tissue disorders, foot ulcerations and ulcerative colitis, endothelial dysfunction and impaired vascular compliance, and hyper apo B lipoproteinemia.

Administration of the compounds of this invention can be via any method which delivers a compound of this invention systemically and/or locally. These methods include oral routes, parenteral, intraduodenal routes, buccal, intranasal etc. Generally, the compounds of this invention are administered orally, but parenteral administration (e.g., intravenous, intramuscular, subcutaneous or intramedullary) may be utilized, for example, where oral administration is inappropriate for the target or where the patient is unable to ingest the drug.

For administration to human patients, an oral daily dose of the compounds herein may be in the range 1 mg to 5000 mg depending, of course, on the mode of and frequency of administration, the disease state, and the age and condition of the patient, etc. An oral daily dose is in the range of 3 mg to 3000 mg may be used. A further oral daily dose is in the range of 5 mg to 1000 mg. For convenience, the compounds of Formula I can be administered in a unit dosage form. If desired, multiple doses per day of the unit dosage form can be used to increase the total daily dose. The unit dosage form, for example, may be a tablet or capsule containing about 0.1, 0.5, 1, 5, 10, 15, 20, 25, 30, 35, 40, 45, 50, 55, 60, 65, 70, 75, 80, 85, 90, 95, 100, 125, 150, 175, 200, 250, 500, or 1000 mg of the compound. The total daily dose may be administered in single or divided doses and may, at the physician's discretion, fall outside of the typical ranges given herein.

For administration to human patients, an infusion daily dose of the compounds herein may be in the range 1 mg to 2000 mg depending, of course, on the mode of and frequency of administration, the disease state, and the age and condition of the patient, etc. A further infusion daily dose is in the range of 5 mg to 1000 mg. The total daily dose may be administered in single or divided doses and may, at the physician's discretion, fall outside of the typical ranges given herein.

These compounds may also be administered to animals other than humans, for example, for the indications detailed above. The precise dosage administered of each active ingredient will vary depending upon any number of factors, including but not limited to, the type of animal and type of disease state being treated, the age of the animal, and the route(s) of administration.

A dosage of the combination pharmaceutical agents to be used in conjunction with the Formula I compounds is used that is effective for the indication being treated. Such dosages can be determined by standard assays such as those referenced above and provided herein. The combination agents may be administered simultaneously or sequentially in any order.

These dosages are based on an average human subject having a weight of about 60 kg to 70 kg. The physician will readily be able to determine doses for subjects whose weight falls outside this range, such as infants and the elderly.

Dosage regimens may be adjusted to provide the optimum desired response. For example, a single bolus may be administered, several divided doses may be administered over time or the dose may be proportionally reduced or increased as indicated by the exigencies of the therapeutic situation. It is especially advantageous to formulate parenteral compositions in dosage unit form for ease of administration and uniformity of dosage. Dosage unit form, as used herein, refers to physically discrete units suited as unitary dosages for the mammalian subjects to be treated; each unit containing a predetermined quantity of active compound calculated to produce the desired therapeutic effect in association with the required pharmaceutical carrier. The specification for the dosage unit forms of the invention are dictated by and directly dependent on (a) the unique characteristics of the chemotherapeutic agent and the particular therapeutic or prophylactic effect to be achieved, and (b) the limitations inherent in the art of compounding such an active compound for the treatment of sensitivity in individuals.

Thus, the skilled artisan would appreciate, based upon the disclosure provided herein, that the dose and dosing regimen is adjusted in accordance with methods well-known in the therapeutic arts. That is, the maximum tolerable dose can be readily established, and the effective amount providing a detectable therapeutic benefit to a patient may also be determined, as can the temporal requirements for administering each agent to provide a detectable therapeutic benefit to the patient. Accordingly, while certain dose and administration regimens are exemplified herein, these examples in no way limit the dose and administration regimen that may be provided to a patient.

It is to be noted that dosage values may vary with the type and severity of the condition to be alleviated, and may include single or multiple doses. It is to be further understood that for any particular subject, specific dosage regimens should be adjusted over time according to the individual need and the professional judgment of the person administering or supervising the administration of the compositions, and that dosage ranges set forth herein are exemplary only and are not intended to limit the scope or practice of the claimed composition. For example, doses may be adjusted based on pharmacokinetic or pharmacodynamic parameters, which may include clinical effects such as toxic effects and/or laboratory values. Thus, intra-patient dose-escalation may be used as determined by the skilled artisan. Determining appropriate dosages and regiments for administration of the chemotherapeutic agent are well-known in the relevant art and would be understood to be encompassed by the skilled artisan once provided the teachings disclosed herein.

This application further comprises use of a compound of Formula I for use as a medicament (such as a unit dosage tablet or unit dosage capsule). In another embodiment, this application comprises the use of a compound of Formula I for the manufacture of a medicament (such as a unit dosage tablet or unit dosage capsule) to treat one or more of the conditions previously identified in the above sections discussing methods of treatment.

A pharmaceutical composition of the invention may be prepared, packaged, or sold in bulk, as a single unit dose, or as a plurality of single unit doses. As used herein, a "unit dose" is discrete amount of the pharmaceutical composition comprising a predetermined amount of the active ingredient. The amount of the active ingredient is generally equal to the dosage of the active ingredient which would be administered to a subject or a convenient fraction of such a dosage such as, for example, one-half or one-third of such a dosage.

The compounds of the invention or combinations can be administered alone but will generally be administered in an admixture with one or more suitable pharmaceutical excipients, adjuvants, diluents or carriers known in the art and selected with regard to the intended route of administration and standard pharmaceutical practice. The compound of the invention or combination may be formulated to provide immediate-, delayed-, modified-, sustained-, pulsed- or controlled-release dosage forms depending on the desired route of administration and the specificity of release profile, commensurate with therapeutic needs.

The pharmaceutical composition comprises a compound of the invention or a combination in an amount generally in the range of from about 1% to about 75%, 80%, 85%, 90% or even 95% (by weight) of the composition, usually in the range of about 1%, 2% or 3% to about 50%, 60% or 70%, more frequently in the range of about 1%, 2% or 3% to less than 50% such as about 25%, 30% or 35%.

Methods of preparing various pharmaceutical compositions with a specific amount of active compound are known to those skilled in this art. For examples, see Remington: The Practice of Pharmacy, Lippincott Williams and Wilkins, Baltimore Md. 20.sup.th ed. 2000.

Compositions suitable for parenteral injection generally include pharmaceutically acceptable sterile aqueous or non-aqueous solutions, dispersions, suspensions, or emulsions, and sterile powders for reconstitution into sterile injectable solutions or dispersions. Examples of suitable aqueous and nonaqueous carriers or diluents (including solvents and vehicles) include water, ethanol, polyols (propylene glycol, polyethylene glycol, glycerol, and the like), suitable mixtures thereof, triglycerides including vegetable oils such as olive oil, and injectable organic esters such as ethyl oleate. A preferred carrier is Miglyol® brand caprylic/capric acid ester with glycerine or propylene glycol (e.g., Miglyol® 812, Miglyol® 829, Miglyol® 840) available from Condea Vista Co., Cranford, N.J. Proper fluidity can be maintained, for example, by the use of a coating such as lecithin, by the maintenance of the required particle size in the case of dispersions, and by the use of surfactants.

These compositions for parenteral injection may also contain excipients such as preserving, wetting, emulsifying, and dispersing agents. Prevention of microorganism contamination of the compositions can be accomplished with various antibacterial and antifungal agents, for example, parabens, chlorobutanol, phenol, sorbic acid, and the like. It may also be desirable to include isotonic agents, for example, sugars, sodium chloride, and the like. Prolonged absorption of injectable pharmaceutical compositions can be brought about by the use of agents capable of delaying absorption, for example, aluminum monostearate and gelatin.

Solid dosage forms for oral administration include capsules, tablets, chews, lozenges, pills, powders, and multiparticulate preparations (granules). In such solid dosage forms, a compound of Formula I or a combination is admixed with at least one inert excipient, diluent or carrier. Suitable excipients, diluents or carriers include materials such as sodium citrate or dicalcium phosphate and/or (a) one or more fillers or extenders (e.g., microcrystalline cellulose (available as Avicel® from FMC Corp.) starches, lactose, sucrose, mannitol, silicic acid, xylitol, sorbitol, dextrose, calcium hydrogen phosphate, dextrin, alpha-cyclodextrin, beta-cyclodextrin, polyethylene glycol, medium chain fatty acids, titanium oxide, magnesium oxide, aluminum oxide and the like); (b) one or more binders (e.g., carboxymethylcellulose, methylcellulose, hydroxypropylcellulose, hydroxypropylmethylcellulose, gelatin, gum arabic, ethyl cellulose, polyvinyl alcohol, pullulan, pregelatinized starch, agar, tragacanth, alginates, gelatin, polyvinylpyrrolidone, sucrose, acacia and the like); (c) one or more humectants (e.g., glycerol and the like); (d) one or more disintegrating agents (e.g., agar-agar, calcium carbonate, potato or tapioca starch, alginic acid, certain complex silicates, sodium carbonate, sodium lauryl sulphate, sodium starch glycolate (available as Explotab® from Edward Mendell Co.), cross-linked polyvinyl pyrrolidone, croscarmellose sodium A-type (available as Ac-di-sol®), polyacrilin potassium (an ion exchange resin) and the like); (e) one or more solution retarders (e.g., paraffin and the like); (f) one or more absorption accelerators (e.g., quaternary ammonium compounds and the like); (g) one or more wetting agents (e.g., cetyl alcohol, glycerol monostearate and the like); (h) one or more adsorbents (e.g., kaolin, bentonite and the like); and/or (i) one or more lubricants (e.g., talc, calcium stearate, magnesium stearate, stearic acid, polyoxyl stearate, cetanol, talc, hydrogenated caster oil, sucrose esters of fatty acid, dimethylpolysiloxane, microcrystalline wax, yellow beeswax, white beeswax, solid polyethylene glycols, sodium lauryl sulfate and the like). In the case of capsules and tablets, the dosage forms may also comprise buffering agents.

Solid compositions of a similar type may also be used as fillers in soft or hard filled gelatin capsules using such excipients as lactose or milk sugar, as well as high molecular weight polyethylene glycols, and the like.

Solid dosage forms such as tablets, dragees, capsules, and granules may be prepared with coatings and shells, such as enteric coatings and others well known in the art. They may also contain opacifying agents, and can also be of such composition that they release the compound of Formula I and/or the additional pharmaceutical agent in a delayed manner. Examples of embedding compositions that can be used are polymeric substances and waxes. The drug may also be in micro-encapsulated form, if appropriate, with one or more of the above-mentioned excipients.

For tablets, the active agent will typically comprise less than 50% (by weight) of the formulation, for example less than about 10% such as 5% or 2.5% by weight. The predominant portion of the formulation comprises fillers, diluents, disintegrants, lubricants and optionally, flavors. The composition of these excipients is well known in the art. Frequently, the fillers/diluents will comprise mixtures of two or more of the following components: microcrystalline cellulose, mannitol, lactose (all types), starch, and di-calcium phosphate. The filler/diluent mixtures typically comprise less than 98% of the formulation and preferably less than 95%, for example 93.5%. Preferred disintegrants include Ac-di-sol®, Explotab®, starch and sodium lauryl sulphate. When present a disintegrant will usually comprise less than 10% of the formulation or less than 5%, for example about 3%. A preferred lubricant is magnesium stearate. When present a lubricant will usually comprise less than 5% of the formulation or less than 3%, for example about 1%.

Tablets may be manufactured by standard tabletting processes, for example, direct compression or a wet, dry or melt granulation, melt congealing process and extrusion. The tablet cores may be mono or multi-layer(s) and can be coated with appropriate overcoats known in the art.

Liquid dosage forms for oral administration include pharmaceutically acceptable emulsions, solutions, suspensions, syrups, and elixirs. In addition to the compound of Formula I or the combination, the liquid dosage form may contain inert diluents commonly used in the art, such as water or other solvents, solubilizing agents and emulsifiers, as for example, ethyl alcohol, isopropyl alcohol, ethyl carbonate, ethyl acetate, benzyl alcohol, benzyl benzoate, propylene glycol, 1,3-butylene glycol, dimethylformamide, oils (e.g., cottonseed oil, groundnut oil, corn germ oil, olive oil, castor oil, sesame seed oil and the like), Miglyol® (available from CONDEA Vista Co., Cranford, N.J.), glycerol, tetrahydrofurfuryl alcohol, polyethylene glycols and fatty acid esters of sorbitan, or mixtures of these substances, and the like.

Besides such inert diluents, the composition may also include excipients, such as wetting agents, emulsifying and suspending agents, sweetening, flavoring, and perfuming agents.

Oral liquid forms of the compounds of the invention or combinations include solutions, wherein the active compound is fully dissolved. Examples of solvents include all pharmaceutically precedented solvents suitable for oral administration, particularly those in which the compounds of the invention show good solubility, e.g., polyethylene glycol, polypropylene glycol, edible oils and glyceryl- and glyceride-based systems. Glyceryl- and glyceride-based systems may include, for example, the following branded products (and corresponding generic products): Captex® 355 EP (glyceryl tricaprylate/caprate, from Abitec, Columbus Ohio), Crodamol™ GTC/C (medium chain triglyceride, from Croda, Cowick Hall, UK) or Labrafac™ CC (medium chain triglyides, from Gattefosse), Captex® 500P (glyceryl triacetate i.e. triacetin, from Abitec), Capmul® MCM (medium chain mono- and diglycerides, from Abitec), Miglyol® 812 (caprylic/capric triglyceride, from Condea, Cranford N.J.), Migyol® 829 (caprylic/capric/succinic triglyceride, from Condea), Migyol® 840 (propylene glycol dicaprylate/dicaprate, from Condea), Labrafil® M1944CS (oleoyl macrogol-6 glycerides, from Gattefosse), Peceol™ (glyceryl monooleate, from Gattefosse) and Maisine® 35-1 (glyceryl monooleate, from Gattefosse). Of particular interest are the medium chain (about $C_8$ to $C_{10}$) triglyceride oils. These solvents frequently make up the predominant portion of the composition, i.e., greater than about 50%, usually greater than about 80%, for example about 95% or 99%. Adjuvants and additives may also be included with the solvents principally as taste-mask agents, palatability and flavoring agents, antioxidants, stabilizers, texture and viscosity modifiers and solubilizers.

Suspensions, in addition to the compound of Formula I or the combination, may further comprise carriers such as suspending agents, e.g., ethoxylated isostearyl alcohols, polyoxyethylene sorbitol and sorbitan esters, microcrystalline cellulose, aluminum metahydroxide, bentonite, agar-agar, and tragacanth, or mixtures of these substances, and the like.

Compositions for rectal or vaginal administration preferably comprise suppositories, which can be prepared by mixing a compound of Formula I or a combination with suitable non-irritating excipients or carriers, such as cocoa butter, polyethylene glycol or a suppository wax which are solid at ordinary room temperature, but liquid at body temperature, and therefore, melt in the rectum or vaginal cavity thereby releasing the active component(s).

Dosage forms for topical administration of the compounds of Formula I or combinations include ointments, creams, lotions, powders and sprays. The drugs are admixed with a pharmaceutically acceptable excipient, diluent or carrier, and any preservatives, buffers, or propellants that may be required.

Many of the present compounds are poorly soluble in water, e.g., less than about 1 μg/mL. Therefore, liquid compositions in solubilizing, non-aqueous solvents such as the medium chain triglyceride oils discussed above are a preferred dosage form for these compounds.

Solid amorphous dispersions, including dispersions formed by a spray-drying process, are also a preferred dosage form for the poorly soluble compounds of the invention. By "solid amorphous dispersion" is meant a solid material in which at least a portion of the poorly soluble compound is in the amorphous form and dispersed in a water-soluble polymer. By "amorphous" is meant that the poorly soluble compound is not crystalline. By "crystalline" is meant that the compound exhibits long-range order in three dimensions of at least 100 repeat units in each dimension. Thus, the term amorphous is intended to include not only material which has essentially no order, but also material which may have some small degree of order, but the order is in less than three dimensions and/or is only over short distances. Amorphous material may be characterized by techniques known in the art such as powder x-ray diffraction (PXRD) crystallography, solid state NMR, or thermal techniques such as differential scanning calorimetry (DSC).

Preferably, at least a major portion (i.e., at least about 60 wt %) of the poorly soluble compound in the solid amorphous dispersion is amorphous. The compound can exist within the solid amorphous dispersion in relatively pure amorphous domains or regions, as a solid solution of the compound homogeneously distributed throughout the polymer or any combination of these states or those states that lie intermediate between them. Preferably, the solid amorphous dispersion is substantially homogeneous so that the amorphous compound is dispersed as homogeneously as possible throughout the polymer. As used herein, "substantially homogeneous" means that the fraction of the compound that is present in relatively pure amorphous domains or regions within the solid amorphous dispersion is relatively small, on the order of less than 20 wt %, and preferably less than 10 wt % of the total amount of drug.

Water-soluble polymers suitable for use in the solid amorphous dispersions should be inert, in the sense that they do not chemically react with the poorly soluble compound in an adverse manner, are pharmaceutically acceptable, and have at least some solubility in aqueous solution at physiologically relevant pHs (e.g. 1-8). The polymer can be neutral or ionizable, and should have an aqueous-solubility of at least 0.1 mg/mL over at least a portion of the pH range of 1-8.

Water-soluble polymers suitable for use with the compounds of Formula I may be cellulosic or non-cellulosic. The polymers may be neutral or ionizable in aqueous solution. Of these, ionizable and cellulosic polymers are preferred, with ionizable cellulosic polymers being more preferred.

Exemplary water-soluble polymers include hydroxypropyl methyl cellulose acetate succinate (HPMCAS), hydroxypropyl methyl cellulose (HPMC), hydroxypropyl methyl cellulose phthalate (HPMCP), carboxy methyl ethyl cellulose (CMEC), cellulose acetate phthalate (CAP), cellulose acetate trimellitate (CAT), polyvinylpyrrolidone (PVP), hydroxypropyl cellulose (HPC), methyl cellulose (MC), block copolymers of ethylene oxide and propylene oxide (PEO/PPO, also known as poloxamers), and mixtures thereof. Especially preferred polymers include HPMCAS, HPMC, HPMCP, CMEC, CAP, CAT, PVP, poloxamers, and mixtures thereof. Most preferred is HPMCAS. See European Patent Application Publication No. 0 901 786 A2, the disclosure of which is incorporated herein by reference.

The solid amorphous dispersions may be prepared according to any process for forming solid amorphous dispersions that results in at least a major portion (at least 60%) of the poorly soluble compound being in the amorphous state. Such processes include mechanical, thermal and solvent processes. Exemplary mechanical processes include milling and extrusion; melt processes including high temperature fusion, solvent-modified fusion and melt-congeal processes; and solvent processes including non-solvent precipitation, spray coating and spray drying. See, for example, the following U.S. Patents, the pertinent disclosures of which are incorporated herein by reference: U.S. Pat. Nos. 5,456,923 and 5,939,099, which describe forming dispersions by extrusion processes; U.S. Pat. Nos. 5,340,591 and 4,673,564, which describe forming dispersions by milling processes; and U.S. Pat. Nos. 5,707,646 and 4,894,235, which describe forming dispersions by melt congeal processes. In a preferred process, the solid amorphous dispersion is formed by spray drying, as disclosed in European Patent Application Publication No. 0 901 786 A2. In this process, the compound and polymer are dissolved in a solvent, such as acetone or methanol, and the solvent is then rapidly removed from the solution by spray drying to form the solid amorphous dispersion. The solid amorphous dispersions may be prepared to contain up to about 99 wt % of the compound, e.g., 1 wt %, 5 wt %, 10 wt %, 25 wt %, 50 wt %, 75 wt %, 95 wt %, or 98 wt % as desired.

The solid dispersion may be used as the dosage form itself or it may serve as a manufacturing-use-product (MUP) in the preparation of other dosage forms such as capsules, tablets, solutions or suspensions. An example of an aqueous suspension is an aqueous suspension of a 1:1 (w/w) compound/HPMCAS-HF spray-dried dispersion containing 2.5 mg/mL of compound in 2% polysorbate-80. Solid dispersions for use in a tablet or capsule will generally be mixed with other excipients or adjuvants typically found in such dosage forms. For example, an exemplary filler for capsules contains a 2:1 (w/w) compound/HPMCAS-MF spray-dried dispersion (60%), lactose (fast flow) (15%), microcrystalline cellulose (e.g., Avicel.sup.(R0-102) (15.8%), sodium starch (7%), sodium lauryl sulfate (2%) and magnesium stearate (1%).

The HPMCAS polymers are available in low, medium and high grades as Aqoa.sup.(R)-LF, Aqoat.sup.(R)-MF and Aqoat.sup.(R)-HF respectively from Shin-Etsu Chemical Co., LTD, Tokyo, Japan. The higher MF and HF grades are generally preferred.

The following paragraphs describe exemplary formulations, dosages, etc. useful for non-human animals. The administration of the compounds of Formula I and combinations with anti-obesity agents can be effected orally or non-orally.

An amount of a compound of Formula I or combination of a compound of Formula I with another anti-obesity agent is administered such that an effective dose is received. Generally, a daily dose that is administered orally to an animal is between about 0.01 and about 1,000 mg/kg of body weight, e.g., between about 0.01 and about 300 mg/kg or between about 0.01 and about 100 mg/kg or between about 0.01 and about 50 mg/kg of body weight, or between about 0.01 and about 25 mg/kg, or about 0.01 and about 10 mg/kg or about 0.01 and about 5 mg/kg.

Conveniently, a compound of Formula I (or combination) can be carried in the drinking water so that a therapeutic dosage of the compound is ingested with the daily water supply. The compound can be directly metered into drinking water, preferably in the form of a liquid, water-soluble concentrate (such as an aqueous solution of a water-soluble salt).

Conveniently, a compound of Formula I (or combination) can also be added directly to the feed, as such, or in the form of an animal feed supplement, also referred to as a premix or concentrate. A premix or concentrate of the compound in an excipient, diluent or carrier is more commonly employed for the inclusion of the agent in the feed. Suitable excipients, diluents or carriers are liquid or solid, as desired, such as water, various meals such as alfalfa meal, soybean meal, cottonseed oil meal, linseed oil meal, corncob meal and corn meal, molasses, urea, bone meal, and mineral mixes such as are commonly employed in poultry feeds. A particularly effective excipient, diluent or carrier is the respective animal feed itself; that is, a small portion of such feed. The carrier facilitates uniform distribution of the compound in the finished feed with which the premix is blended. Preferably, the compound is thoroughly blended into the premix and, subsequently, the feed. In this respect, the compound may be dispersed or dissolved in a suitable oily vehicle such as soybean oil, corn oil, cottonseed oil, and the like, or in a volatile organic solvent and then blended with the carrier. It will be appreciated that the proportions of compound in the concentrate are capable of wide variation since the amount of the compound in the finished feed may be adjusted by blending the appropriate proportion of premix with the feed to obtain a desired level of compound.

High potency concentrates may be blended by the feed manufacturer with proteinaceous carrier such as soybean oil meal and other meals, as described above, to produce concentrated supplements, which are suitable for direct feeding to animals. In such instances, the animals are permitted to consume the usual diet. Alternatively, such concentrated supplements may be added directly to the feed to produce a nutritionally balanced, finished feed containing a therapeutically effective level of a compound. The mixtures are thoroughly blended by standard procedures, such as in a twin shell blender, to ensure homogeneity.

If the supplement is used as a top dressing for the feed, it likewise helps to ensure uniformity of distribution of the compound across the top of the dressed feed.

Drinking water and feed effective for increasing lean meat deposition and for improving lean meat to fat ratio are generally prepared by mixing a compound of Formula I with a sufficient amount of animal feed to provide from about 0.001 to about 500 ppm of the compound in the feed or water.

The preferred medicated swine, cattle, sheep and goat feed generally contain from about 1 to about 400 grams of a compound of Formula I (or combination) per ton of feed, the optimum amount for these animals usually being about 50 to about 300 grams per ton of feed.

The preferred poultry and domestic pet feeds usually contain about 1 to about 400 grams and preferably about 10 to about 400 grams of a compound (or combination) per ton of feed.

For parenteral administration in animals, the compounds of Formula I (or combination) may be prepared in the form of a paste or a pellet and administered as an implant, usually under the skin of the head or ear of the animal in which increase in lean meat deposition and improvement in lean meat to fat ratio is sought.

Paste Formulations may be prepared by dispersing the drug in a pharmaceutically acceptable oil such as peanut oil, sesame oil, corn oil or the like.

Pellets containing an effective amount of a compound of Formula I, pharmaceutical composition, or combination may be prepared by admixing a compound of Formula I or combination with a diluent such as carbowax, carnuba wax, and the like, and a lubricant, such as magnesium or calcium stearate, may be added to improve the pelleting process.

It is, of course, recognized that more than one pellet may be administered to an animal to achieve the desired dose level which will provide the increase in lean meat deposition and improvement in lean meat to fat ratio desired. Moreover, implants may also be made periodically during the animal treatment period in order to maintain the proper drug level in the animal's body.

Liposomes containing these agents and/or compounds of the invention are prepared by methods known in the art, such as described in U.S. Pat. Nos. 4,485,045 and 4,544,545. Liposomes with enhanced circulation time are disclosed in U.S. Pat. No. 5,013,556. Particularly useful liposomes can be generated by the reverse phase evaporation method with a lipid composition comprising phosphatidylcholine, cholesterol and PEG-derivatized phosphatidylethanolamine (PEG-PE). Liposomes are extruded through filters of defined pore size to yield liposomes with the desired diameter.

These agents and/or the compounds of the invention may also be entrapped in microcapsules prepared, for example, by coacervation techniques or by interfacial polymerization, for example, hydroxymethylcellulose or gelatin-microcapsules and poly-(methylmethacrylate) microcapsules, respectively, in colloidal drug delivery systems (for example, liposomes, albumin microspheres, microemulsions, nanoparticles and nanocapsules) or in macroemulsions. Such techniques are disclosed in Remington, The Science and Practice of Pharmacy, 20th Ed., Mack Publishing (2000).

Sustained-release preparations may be used. Suitable examples of sustained-release preparations include semipermeable matrices of solid hydrophobic polymers containing the compound of the invention, which matrices are in the form of shaped articles, e.g., films, or microcapsules. Examples of sustained-release matrices include polyesters, hydrogels (for example, poly(2-hydroxyethyl-methacrylate), or 'poly(vinylalcohol)), polylactides (U.S. Pat. No. 3,773,919), copolymers of L-glutamic acid and 7 ethyl-L-glutamate, non-degradable ethylene-vinyl acetate, degradable lactic acid-glycolic acid copolymers such as those used in LUPRON DEPOT™ (injectable microspheres composed of lactic acid-glycolic acid copolymer and leuprolide acetate), sucrose acetate isobutyrate, and poly-D-(−)-3-hydroxybutyric acid.

The formulations to be used for intravenous administration must be sterile. This is readily accomplished by, for example, filtration through sterile filtration membranes. Compounds of the invention are generally placed into a container having a sterile access port, for example, an intravenous solution bag or vial having a stopper pierceable by a hypodermic injection needle.

Suitable emulsions may be prepared using commercially available fat emulsions, such as Intralipid®, Liposyn®, Infonutrol™, Lipofundin® and Lipiphysan™. The active ingredient may be either dissolved in a pre-mixed emulsion composition or alternatively it may be dissolved in an oil (e.g., soybean oil, safflower oil, cottonseed oil, sesame oil, corn oil or almond oil) and an emulsion formed upon mixing with a phospholipid (e.g., egg phospholipids, soybean phospholipids or soybean lecithin) and water. It will be appreciated that other ingredients may be added, for example glycerol or glucose, to adjust the tonicity of the emulsion. Suitable emulsions will typically contain up to 20% oil, for example, between 5 and 20%. The fat emulsion can comprise fat droplets between 0.1 and 1.0 µm, particularly 0.1 and 0.5 µm, and have a pH in the range of 5.5 to 8.0.

The emulsion compositions can be those prepared by mixing a compound of the invention with Intralipid™ or the components thereof (soybean oil, egg phospholipids, glycerol and water).

Compositions for inhalation or insufflation include solutions and suspensions in pharmaceutically acceptable, aqueous or organic solvents, or mixtures thereof, and powders. The liquid or solid compositions may contain suitable pharmaceutically acceptable excipients as set out above. In some embodiments, the compositions are administered by the oral or nasal respiratory route for local or systemic effect. Compositions in preferably sterile pharmaceutically acceptable solvents may be nebulised by use of gases. Nebulised solutions may be breathed directly from the nebulising device or the nebulising device may be attached to a face mask, tent or intermittent positive pressure breathing machine. Solution, suspension or powder compositions may be administered, preferably orally or nasally, from devices which deliver the formulation in an appropriate manner.

The compounds herein may be formulated for oral, buccal, intranasal, parenteral (e.g., intravenous, intramuscular or subcutaneous) or rectal administration or in a form suitable for administration by inhalation. The compounds of the invention may also be formulated for sustained delivery.

Methods of preparing various pharmaceutical compositions with a certain amount of active ingredient are known, or will be apparent in light of this disclosure, to those skilled in this art. For examples of methods of preparing pharmaceutical compositions see *Remington's Pharmaceutical Sciences,* 20th Edition (Lippincott Williams & Wilkins, 2000).

Pharmaceutical compositions according to the invention may contain 0.1%-95% of the compound(s) of this invention, preferably 1%-70%. In any event, the composition to be administered will contain a quantity of a compound(s) according to the invention in an amount effective to treat the disease/condition of the subject being treated.

Since this application has an aspect that relates to the treatment of the disease/conditions described herein with a combination of active ingredients which may be administered separately, the invention also relates to combining separate pharmaceutical compositions in kit form. The kit comprises two separate pharmaceutical compositions: a compound of Formula I a prodrug thereof or a salt of such compound or prodrug and a second compound as described above. The kit comprises a means for containing the separate compositions such as a container, a divided bottle or a divided foil packet. Typically the kit comprises directions for the administration of the separate components. The kit form is particularly advantageous when the separate components are preferably administered in different dosage forms (e.g., oral and parenteral), are administered at different dosage intervals, or when titration of the individual components of the combination is desired by the prescribing physician.

An example of such a kit is a so-called blister pack. Blister packs are well known in the packaging industry and are being widely used for the packaging of pharmaceutical unit dosage forms (tablets, capsules, and the like). Blister packs generally consist of a sheet of relatively stiff material covered with a foil of a preferably transparent plastic material. During the packaging process recesses are formed in the plastic foil. The recesses have the size and shape of the tablets or capsules to be packed. Next, the tablets or capsules are placed in the recesses and the sheet of relatively stiff material is sealed against the plastic foil at the face of the foil which is opposite from the direction in which the recesses were formed. As a result, the tablets or capsules are sealed in the recesses between the plastic foil and the sheet. Preferably the strength of the sheet is such that the tablets or capsules can be removed from the blister pack by manually applying pressure on the recesses whereby an opening is formed in the sheet at the place of the recess. The tablet or capsule can then be removed via said opening.

It may be desirable to provide a memory aid on the kit, e.g., in the form of numbers next to the tablets or capsules whereby the numbers correspond with the days of the regimen which the tablets or capsules so specified should be ingested. Another example of such a memory aid is a calendar printed on the card, e.g., as follows "First Week, Monday, Tuesday, etc. . . . Second Week, Monday, Tuesday, . . . " etc. Other variations of memory aids will be readily apparent. A "daily dose" can be a single tablet or capsule or several pills or capsules to be taken on a given day. Also, a daily dose of Formula I compound can consist of one tablet or capsule while a daily dose of the second compound can consist of several tablets or capsules and vice versa. The memory aid should reflect this.

In another specific embodiment of the invention, a dispenser designed to dispense the daily doses one at a time in the order of their intended use is provided. Preferably, the dispenser is equipped with a memory-aid, so as to further facilitate compliance with the regimen. An example of such a memory-aid is a mechanical counter which indicates the number of daily doses that has been dispensed. Another example of such a memory-aid is a battery-powered microchip memory coupled with a liquid crystal readout, or audible reminder signal which, for example, reads out the date that the last daily dose has been taken and/or reminds one when the next dose is to be taken.

Also, as this application has an aspect that relates to the treatment of the disease/conditions described herein with a combination of active ingredients which may be administered jointly, the invention also relates to combining separate pharmaceutical compositions in a single dosage form, such as (but not limited to) a single tablet or capsule, a bilayer or multilayer tablet or capsule, or through the use of segregated components or compartments within a tablet or capsule.

The active ingredient may be delivered as a solution in an aqueous or non-aqueous vehicle, with or without additional solvents, co-solvents, excipients, or complexation agents selected from pharmaceutically acceptable diluents, excipients, vehicles, or carriers.

The active ingredient may be formulated as a solid dispersion or as a self emulsified drug delivery system (SEDDS) with pharmaceutically acceptable excipients.

The active ingredient may be formulated as an immediate release or modified release tablet or capsule. Alternatively, the active ingredient may be delivered as the active ingredient alone within a capsule shell, without additional excipients.

Experimental Procedures

The following illustrate the synthesis of various compounds of the present invention. Additional compounds within the scope of this invention may be prepared using the methods illustrated in these Examples, either alone or in combination with techniques generally known in the art. All starting materials in these Preparations and Examples are either commercially available or can be prepared by methods known in the art or as described herein.

All reactions were carried out using continuous stirring under an atmosphere of nitrogen or argon gas unless otherwise noted. When appropriate, reaction apparatuses were dried under dynamic vacuum using a heat gun, and anhydrous solvents (Sure-Seal™ products from Aldrich Chemical Company, Milwaukee, Wis. or DriSolv™ products from EMD Chemicals, Gibbstown, N.J.) were employed. In some cases, commercial solvents were passed through columns packed with 4 Å molecular sieves, until the following QC standards for water were attained: a) <100 ppm for dichloromethane, toluene, N,N-dimethylformamide, and tetrahydrofuran; b) <180 ppm for methanol, ethanol, 1,4-dioxane, and diisopropylamine. For very sensitive reactions, solvents were further treated with metallic sodium, calcium hydride, or molecular sieves, and distilled just prior to use. Other commercial solvents and reagents were used without further purification. For syntheses referencing procedures in other Examples or Methods, reaction conditions (solvent, reaction time, and/or temperature) may vary. Products were generally dried under vacuum before being carried on to further reactions or submitted for biological testing.

When indicated, reactions were heated by microwave irradiation using Biotage Initiator or Personal Chemistry Emrys Optimizer microwaves. Reaction progress was monitored using thin-layer chromatography (TLC), liquid chromatography-mass spectrometry (LCMS), high-performance liquid chromatography (HPLC), and/or gas chromatography-mass spectrometry (GCMS) analyses. TLC was performed on pre-coated silica gel plates with a fluorescence indicator (254 nm excitation wavelength) and visualized under UV light and/or with $I_2$, $KMnO_4$, $CoCl_2$, phosphomolybdic acid, and/or ceric ammonium molybdate stains. LCMS data were acquired on an Agilent 1100 Series instrument with a Leap Technologies autosampler, Gemini C18 columns, acetonitrile/water gradients, and either trifluoroacetic acid, formic acid, ammonium acetate, or ammonium hydroxide modifiers. The column eluate was analyzed using a Waters ZQ mass spectrometer scanning in both positive and negative ion modes from 100 to 1200 Da. Other similar instruments were also used. HPLC data were generally acquired on an Agilent 1100 Series instrument, using the columns indicated, acetonitrile/water gradients, and either trifluoroacetic acid or ammonium hydroxide modifiers. GCMS data were acquired using a Hewlett Packard 6890 oven with an HP 6890 injector, HP-1 column (12 m×0.2 mm; 0.33 µm), and helium carrier gas. The sample was analyzed on an HP 5973 mass selective detector scanning from 50 to 550 Da using electron ionization. Purifications were performed by medium performance liquid chromatography (MPLC) using Isco CombiFlash Companion, AnaLogix IntelliFlash 280, Biotage SP1, or Biotage Isolera One instruments and pre-packed Isco RediSep or Biotage Snap silica cartridges. Chiral purifications were performed by chiral supercritical fluid chromatography (SFC), generally using Berger or Thar instruments; columns such as ChiralPAK-AD, -AS, -IC, Chiralcel-OD, or -OJ columns; and $CO_2$ mixtures with methanol, ethanol, propan-2-ol, or acetonitrile, alone or modified using trifluoroacetic acid or propan-2-amine. UV detection was used to trigger fraction collection. For syntheses referencing procedures in other Examples or Methods, purifications may vary: in general, solvents and the solvent ratios used for eluents/gradients were chosen to provide appropriate $R_f$s or retention times.

Mass spectrometry data are reported from LCMS analyses. Mass spectrometry (MS) was performed via atmospheric pressure chemical ionization (APCI), electrospray ionization (ESI), electron impact ionization (EI) or electron scatter ionization (ES) sources. Proton nuclear magnetic spectroscopy ($^1$H NMR) chemical shifts are given in parts per million downfield from tetramethylsilane and were recorded on 300, 400, 500, or 600 MHz Varian, Bruker, or Jeol spectrometers. Chemical shifts are expressed in parts per million (ppm, δ) referenced to the deuterated solvent residual peaks (chloroform, 7.26 ppm; $CD_2HOD$, 3.31 ppm; acetonitrile-$d_2$, 1.94 ppm; dimethyl sulfoxide-ds, 2.50 ppm; DHO, 4.79 ppm). The peak shapes are described as follows: s, singlet; d, doublet; t, triplet; q, quartet; quin, quintet; m, multiplet; br s, broad singlet; app, apparent. Analytical SFC data were generally acquired on a Berger analytical instrument as described above. Optical rotation data were acquired on a PerkinElmer model 343 polarimeter using a 1 dm cell. Microanalyses were performed by Quantitative Technologies Inc. and were within 0.4% of the calculated values.

Unless otherwise noted, chemical reactions were performed at room temperature (about 23 degrees Celsius).

Unless noted otherwise, all reactants were obtained commercially and used without further purification, or were prepared using methods known in the literature.

The terms "concentrated", "evaporated", and "concentrated in vacuo" refer to the removal of solvent at reduced pressure on a rotary evaporator with a bath temperature less than 60° C. The abbreviations "min" and "h" stand for "minutes" and "hours," respectively. The term "TLC" refers to thin-layer chromatography, "room temperature or ambient temperature" means a temperature between 18 to 25° C., "GCMS" refers to gas chromatography-mass spectrometry, "LCMS" refers to liquid chromatography-mass spectrometry, "UPLC" refers to ultra-performance liquid chromatography, "HPLC" refers to high-performance liquid chromatography, and "SFC" refers to supercritical fluid chromatography.

Hydrogenation may be performed in a Parr shaker under pressurized hydrogen gas, or in a Thales-nano H-Cube flow hydrogenation apparatus at full hydrogen and a flow rate between 1-2 mL/min at the specified temperature.

HPLC, UPLC, LCMS, GCMS, and SFC retention times were measured using the methods noted in the procedures.

In some examples, chiral separations were carried out to separate enantiomers, diastereomers, or atropisomers (or atropenantiomers) of certain compounds of the invention [in some examples, the separated enantiomers are designated as ENANT-1 and ENANT-2, according to their order of elution; similarly, separated diastereomers are designated as DIAST-1 and DIAST-2, according to their order of elution, and separated atropisomers (or atropenantiomers) are designated as ATROP-1 and ATROP-2, according to their order of elution]. In some examples, the optical rotation of an enantiomer or atropisomer (or atropenantiomer) was measured using a polarimeter. According to its observed rotation data (or its specific rotation data), an enantiomer or atropisomer (or atropenantiomer) with a clockwise rotation was designated as the (+)-enantiomer or (+)-atropisomer [or the (+)-atropenantiomer] and an enantiomer or atropisomer (or atropenantiomer) with a counter-clockwise rotation was designated as the (−)-enantiomer or (−)-atropisomer [or the (−)-atropenantiomer]. Racemic compounds are indicated either by the absence of drawn or described stereochemistry, or by the presence of (+/−) adjacent to the structure; in this latter case, the indicated stereochemistry represents just one of the two enantiomers that make up the racemic mixture.

The compounds and intermediates described below were named using the naming convention provided with ACD/ChemSketch 2019.1.1, File Version C05H41, Build 110712 (Advanced Chemistry Development, Inc., Toronto, Ontario, Canada). The naming convention provided with ACD/ChemSketch 2019.1.1 is well known by those skilled in the art and it is believed that the naming convention provided with ACD/ChemSketch 2019.1.1 generally comports with the IUPAC (International Union for Pure and Applied Chemistry) recommendations on Nomenclature of Organic Chemistry and the CAS Index rules.

Preparation P1

Methyl 3-bromo-6-fluoro-1-benzothiophene-2-carboxylate (P1)

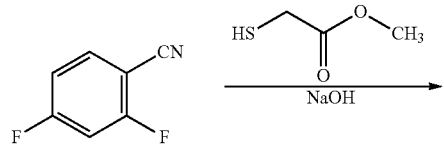

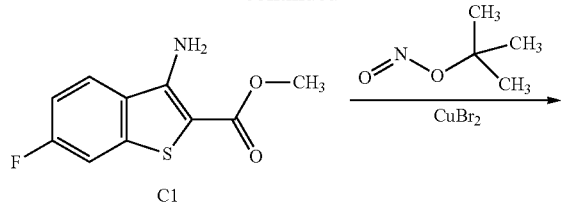

-continued

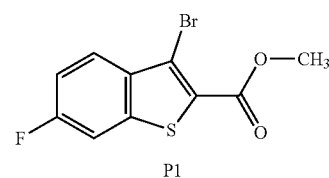

Step 1. Synthesis of methyl 3-amino-6-fluoro-1-benzothiophene-2-carboxylate (C1)

To an ice-cooled solution of 2,4-difluorobenzonitrile (30.0 g, 216 mmol) in N,N-dimethylformamide (150 mL) was added methyl sulfanylacetate (25.2 g, 237 mmol) in a drop-wise manner. After the reaction mixture had been stirred for 30 minutes at 0° C., an aqueous solution of sodium hydroxide (5 M; 64.7 mL, 324 mmol) was added, whereupon stirring was continued for another 2 hours. The resulting suspension was poured into ice water, and the solid was collected via filtration; this material was combined with the products of two similar reactions carried out using 2,4-difluorobenzonitrile (20.0 g and 30.0 g, total 359 mmol) to afford C1 as a white solid. Combined yield: 80.0 g, 355 mmol, 62%. LCMS m/z 226.1 [M+H]$^+$. $^1$H NMR (400 MHz, chloroform-d) δ 7.59 (dd, J=8.9, 4.9 Hz, 1H), 7.41 (dd, J=8.7, 2.3 Hz, 1H), 7.12 (ddd, J=8.8, 8.8, 2.3 Hz, 1H), 5.90 (br s, 2H), 3.89 (s, 3H).

Step 2. Synthesis of methyl 3-bromo-6-fluoro-1-benzothiophene-2-carboxylate (P1)

To a solution of tert-butyl nitrite (23.3 g, 226 mmol) and copper(II) bromide (40.5 g, 181 mmol) in acetonitrile (500 mL) was added C1 (34.0 g, 151 mmol). After the reaction mixture had been stirred at 20° C. for 3 hours, it was combined with a similar reaction carried out using C1 (33.0 g, 146 mmol) and filtered. The filtrate was concentrated in vacuo and subjected to silica gel chromatography (Eluent: petroleum ether) to afford P1 as a white solid. Combined yield: 20 g, 69 mmol, 23%. GCMS m/z 290 (bromine isotope pattern observed) [M$^+$]. $^1$H NMR (400 MHz, chloroform-d) δ 7.96 (dd, J=9.0, 5.0 Hz, 1H), 7.52 (dd, J=8.3, 2.3 Hz, 1H), 7.29-7.22 (m, 1H, assumed; partially obscured by solvent peak), 3.97 (s, 3H).

Preparation P2

Methyl 6-fluoro-3-(4,4,5,5-tetramethyl-1,3,2-dioxaborolan-2-yl)-1-benzothiophene-2-carboxylate

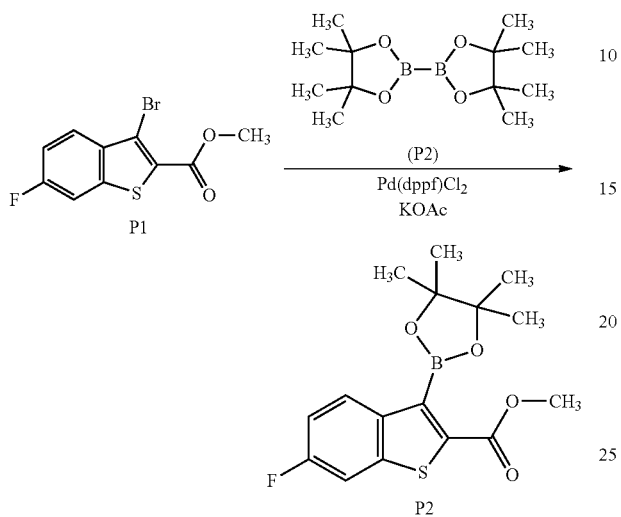

A mixture of P1 (25.0 g, 86.5 mmol), 4,4,4',4',5,5,5',5'-octamethyl-2,2'-bi-1,3,2-dioxaborolane (43.9 g, 173 mmol), potassium acetate (21.2 g, 216 mmol), and [1,1'-bis(diphenylphosphino)ferrocene]dichloropalladium(II) [Pd(dppf)Cl$_2$; 3.16 g, 4.32 mmol] in 1,4-dioxane (450 mL) was degassed three times by alternate application of vacuum and nitrogen, and then heated at 90° C. for 16 hours. The reaction mixture was combined with similar reactions carried out using P1 (1.0 g, 5.0 g, and 10.0 g; total 55.3 mmol) and filtered; the filter cake was washed with petroleum ether (3×50 mL). After the combined filtrates had been concentrated in vacuo, the residue was triturated with petroleum ether (500 mL), providing a black solid that was collected via filtration. Purification of this solid using silica gel chromatography (Gradient: 0% to 20% ethyl acetate in petroleum ether) afforded P2 as a white solid. Combined yield: 20.5 g, 61.0 mmol, 43%. LCMS m/z 337.2 [M+H]$^+$. $^1$H NMR (400 MHz, chloroform-d) δ 7.83 (dd, J=8.9, 5.2 Hz, 1H), 7.52 (dd, J=8.7, 2.4 Hz, 1H), 7.15 (ddd, J=8.9, 8.9, 2.4 Hz, 1H), 3.93 (s, 3H), 1.48 (s, 12H).

Preparation P3

Ethyl 3-bromo-6,7-difluoro-1-benzothiophene-2-carboxylate (P3)

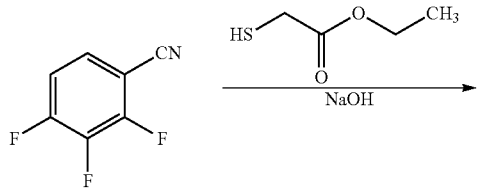

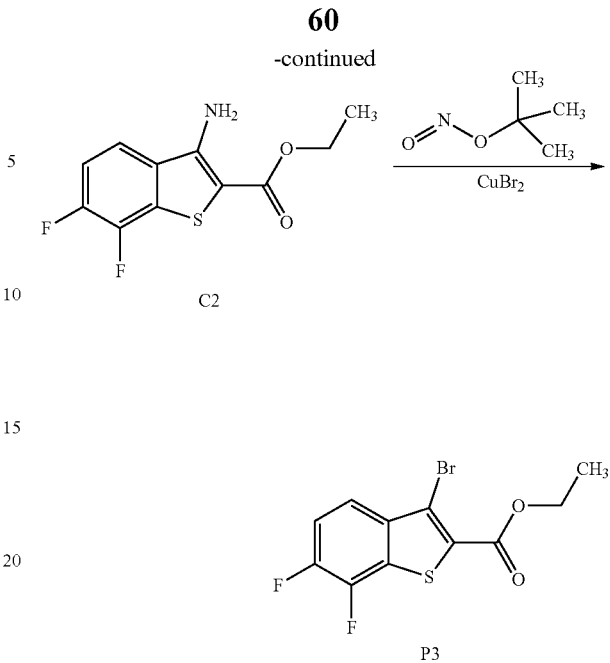

Step 1. Synthesis of ethyl 3-amino-6,7-difluoro-1-benzothiophene-2-carboxylate (C2)

Ethyl sulfanylacetate (0.768 mL, 7.00 mmol) was added in a drop-wise manner to a 0° C. solution of 2,3,4-trifluorobenzonitrile (1.00 g, 6.37 mmol) in N,N-dimethylformamide (6.4 mL). After the reaction mixture had been stirred at 0° C. for 30 minutes, an aqueous solution of sodium hydroxide (5 M; 1.91 mL, 9.55 mmol) was added and stirring was continued for 2 hours. Water (30 mL) was then added, and the resulting precipitate was collected via filtration, washed with water, and dried in a vacuum desiccator. Chromatography on silica gel (Gradient: 0% to 10% ethyl acetate in petroleum ether) afforded C2 as a white solid. Yield: 788 mg, 3.06 mmol, 48%. $^1$H NMR (400 MHz, chloroform-d) δ 7.37 (br dd, J=8.8, 3.9 Hz, 1H), 7.26-7.18 (m, 1H), 5.88 (br s, 2H), 4.36 (q, J=7.1 Hz, 2H), 1.39 (t, J=7.1 Hz, 3H).

Step 2. Synthesis of ethyl 3-bromo-6,7-difluoro-1-benzothiophene-2-carboxylate (P3)

To a 0° C. suspension of copper(II) bromide (417 mg, 1.87 mmol) and tert-butyl nitrite (0.280 mL, 2.35 mmol) in acetonitrile (15.5 mL) was added C2 (400 mg, 1.55 mmol) in a portion-wise manner. The reaction mixture was then stirred at 0° C. for 15 minutes and at room temperature (26° C.) for 1 hour, whereupon it was poured into hydrochloric acid (0.5 M; 200 mL) and extracted with ethyl acetate (100 mL). The organic layer was washed sequentially with water (200 mL) and saturated aqueous sodium chloride solution (200 mL), dried over sodium sulfate, filtered, and concentrated in vacuo. Chromatography on silica gel (Gradient: 0% to 5% ethyl acetate in petroleum ether) provided P3 as a light-yellow solid. Yield: 334 mg, 1.04 mmol, 67%. $^1$H NMR (400 MHz, chloroform-d) δ 7.73 (ddd, J=9.0, 4.0, 1.3 Hz, 1H), 7.37 (ddd, J=10.1, 9.0, 7.0 Hz, 1H), 4.45 (q, J=7.1 Hz, 2H), 1.44 (t, J=7.1 Hz, 3H).

Preparation P4

Ethyl 3-bromo-4,6-difluoro-1-benzothiophene-2-carboxylate (P4)

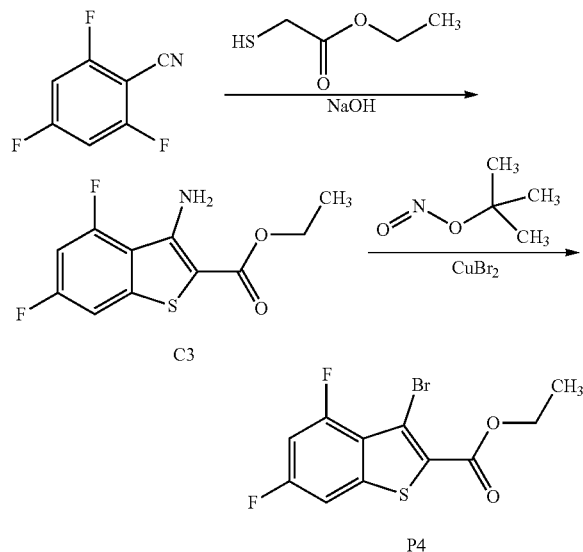

Step 1. Synthesis of ethyl 3-amino-4,6-difluoro-1-benzothiophene-2-carboxylate (C3)

Ethyl sulfanylacetate (0.768 mL, 7.00 mmol) was added in a drop-wise manner to a 0° C. solution of 2,4,6-trifluorobenzonitrile (1.00 g, 6.37 mmol) in N,N-dimethylformamide (6.4 mL). After the reaction mixture had been stirred for 30 minutes at 0° C., an aqueous solution of sodium hydroxide (5 M; 1.91 mL, 9.55 mmol) was added, and stirring was continued for 2 hours. Water (30 mL) was then added, and the resulting precipitate was collected via filtration, washed with water, and dried in a vacuum desiccator; silica gel chromatography (Gradient: 0% to 10% ethyl acetate in petroleum ether) provided C3 as a white solid. Yield: 956 mg, 3.72 mmol, 58%. $^1$H NMR (400 MHz, chloroform-d) δ 7.17 (br dd, J=8.1, 2.1 Hz, 1H), 6.77 (ddd, J=11.3, 9.0, 2.1 Hz, 1H), 6.28 (br s, 2H), 4.34 (q, J=7.1 Hz, 2H), 1.38 (t, J=7.1 Hz, 3H).

Step 2. Synthesis of ethyl 3-bromo-4,6-difluoro-1-benzothiophene-2-carboxylate (P4)

To a 0° C. suspension of copper(II) bromide (996 mg, 4.46 mmol) and tert-butyl nitrite (0.668 mL, 5.62 mmol) in acetonitrile (37 mL) was added C3 (956 mg, 3.72 mmol) in a portion-wise manner. The reaction mixture was stirred at 0° C. for 15 minutes, then at room temperature (26° C.) for 16 hours, whereupon it was poured into hydrochloric acid (0.5 M; 200 mL) and extracted with ethyl acetate (100 mL). The organic layer was sequentially washed with water (200 mL) and saturated aqueous sodium chloride solution (200 mL), dried over sodium sulfate, filtered, and concentrated in vacuo. Chromatography on silica gel (Gradient: 0% to 5% ethyl acetate in petroleum ether) afforded P4 as a white solid. Yield: 674 mg, 2.11 mmol, 57%. H NMR (400 MHz, chloroform-d) δ 7.32 (ddd, J=7.7, 2.2, 1.1 Hz, 1H), 6.93 (ddd, J=11.3, 9.1, 2.2 Hz, 1H), 4.43 (q, J=7.1 Hz, 2H), 1.42 (t, J=7.1 Hz, 3H).

Preparation P5

Ethyl 3-bromo-6-chloro-5-fluoro-1-benzothiophene-2-carboxylate (P5)

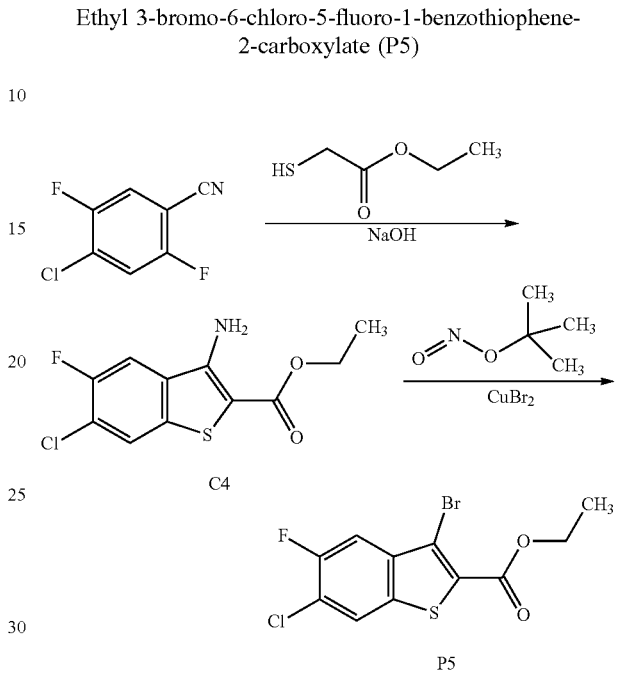

Step 1. Synthesis of ethyl 3-amino-6-chloro-5-fluoro-1-benzothiophene-2-carboxylate (C4)

Ethyl sulfanylacetate (0.284 mL, 2.59 mmol) was added in a drop-wise manner to a 0° C. solution of 4-chloro-2,5-difluorobenzonitrile (450 mg, 2.59 mmol) in N,N-dimethylformamide (2 mL). After the reaction mixture had been stirred for 30 minutes at 0° C., an aqueous solution of sodium hydroxide (5 M; 0.622 mL, 3.11 mmol) was added, and stirring was continued at 20° C. for 1 hour. The resulting suspension was poured into ice water; filtration provided C4 as a solid (500 mg). $^1$H NMR analysis revealed that this material was impure; it was progressed directly to the following step. $^1$H NMR (400 MHz, chloroform-d), presumed products peak only: δ 7.75 (d, J=6.4 Hz, 1H), 7.38 (d, J=8.9 Hz, 1H), 5.79 (br s, 2H), 4.36 (q, J=7.1 Hz, 2H), 1.39 (t, J=7.1 Hz, 3H).

Step 2. Synthesis of ethyl 3-bromo-6-chloro-5-fluoro-1-benzothiophene-2-carboxylate (P5)

To a 0° C. suspension of copper(II) bromide (408 mg, 1.83 mmol) and tert-butyl nitrite (0.263 mL, 2.21 mmol) in acetonitrile (10 mL) was added C4 (from the previous step; 500 mg, <1.83 mmol) in a portion-wise manner. The reaction mixture was stirred at 0° C. for 15 minutes and at room temperature (28° C.) for 3 hours, whereupon it was poured into hydrochloric acid (1 M; 2 mL) and extracted with ethyl acetate (10 mL). The organic layer was washed with water (5 mL) and with saturated aqueous sodium chloride solution (10 mL), dried over sodium sulfate, filtered, and concentrated in vacuo. Chromatography on silica gel (Gradient: 0% to 5% ethyl acetate in petroleum ether) provided P5 as a white solid. Yield: 175 mg, 0.518 mmol, 20% over 2 steps. ¹H NMR (400 MHz, chloroform-d) δ 7.88 (d, J=6.3 Hz, 1H), 7.73 (d, J=9.1 Hz, 1H), 4.44 (q, J=7.1 Hz, 2H), 1.44 (t, J=7.1 Hz, 3H).

Preparation P6

Methyl 6-fluoro-3-iodo-1-benzothiophene-2-carboxylate (P6)

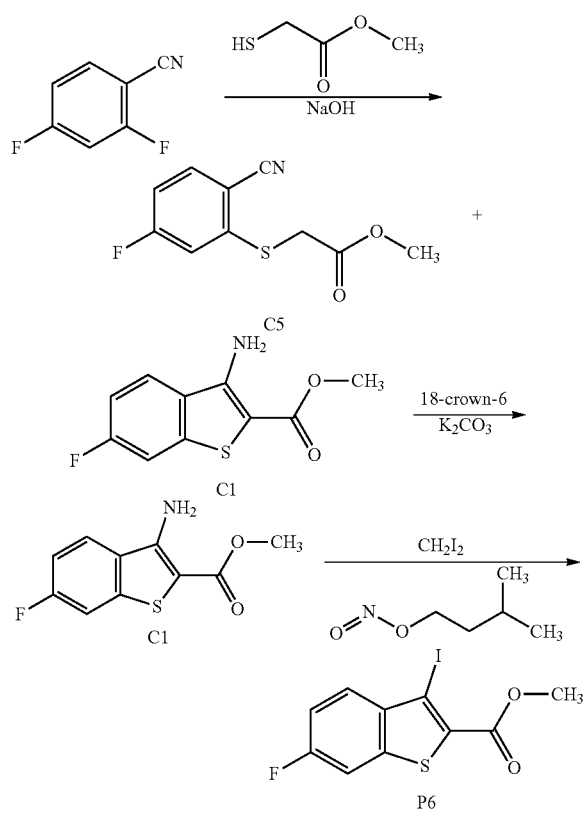

Step 1. Synthesis of methyl [(2-cyano-5-fluorophenyl)sulfanyl]acetate (C5) and methyl 3-amino-6-fluoro-1-benzothiophene-2-carboxylate (C1)

Methyl sulfanylacetate (356 mL, 3.98 mol) was added in a drop-wise manner to a 0° C. solution of 2,4-difluorobenzonitrile (496 g, 3.57 mol) in N,N-dimethylformamide (2.4 L). After the mixture had been stirred for 1 hour at 0° C., an aqueous solution of sodium hydroxide (5 M; 1.07 L, 5.35 mol) was added drop-wise over 2 hours, at a rate that maintained the reaction mixture at 20° C. to 50° C. Stirring was then continued for another 1 hour at 25° C., whereupon the suspension was poured into ice water (6 L) and filtered. The filter cake was washed with water (3×1.5 L) to afford the product, a light-purple solid, as a mixture of C5 and C1; by ¹H NMR analysis, this consisted of an approximately 1:2 ratio of C5 to C1. The bulk of this material was used directly in the following step. Yield: 528 g, 2.34 mol, 66%. ¹H NMR (400 MHz, chloroform-d) δ 7.60 (major component; dd, J=8.9, 5.0 Hz, 1H), 7.54-7.48 (minor component; m, 1H), 7.41 (major component; dd, J=8.7, 2.3 Hz, 1H), 7.18-7.13 (minor component; m, 2H), 7.16-7.08 (major component; m, 1H), 5.89 (major component; br s, 2H), 3.89 (major component; s, 3H), 3.78 (minor component; s, 3H), 3.75 (minor component; s, 2H).

Separation and Characterization of C5 and C1.

A portion of this mixture of C5 and C1 (644 mg, 2.86 mmol) was separated via reversed-phase HPLC (Column: YMC-Actus Triart C18, 50×250 mm, 7 μm; Mobile phase A: water containing 0.05% ammonium hydroxide (v/v); Mobile phase B: acetonitrile; Gradient: 34% to 74% B). Both components were isolated as light-yellow solids.

C5—Yield: 52 mg, 0.23 mmol. LCMS m/z 225.9 [M+H]⁺. ¹H NMR (400 MHz, chloroform-d) δ 7.54-7.48 (m, 1H), 7.18-7.13 (m, 2H), 3.78 (s, 3H), 3.75 (s, 2H). Retention time: 4.38 minutes [Column: Welch Ultisil XB-C18, 3.0×50 mm, 3 μm; Mobile phase A: water containing 0.1% trifluoroacetic acid; Mobile phase B: acetonitrile; Gradient: 1% to 5% B over 1.0 minute, then 5% to 100% B over 5 minutes; Flow rate: 1.2 mL/minute].

C1—Yield: 55 mg, 0.24 mmol. LCMS m/z 226.0 [M+H]⁺. ¹H NMR (400 MHz, chloroform-d) δ 7.59 (dd, J=8.9, 4.9 Hz, 1H), 7.41 (dd, J=8.7, 2.4 Hz, 1H), 7.12 (ddd, J=8.8, 8.8, 2.3 Hz, 1H), 5.89 (br s, 2H), 3.89 (s, 3H). Retention time: 4.70 minutes (Analytical conditions identical to those used for C5).

Step 2. Synthesis of methyl 3-amino-6-fluoro-1-benzothiophene-2-carboxylate (C1)

A mixture of C5 and C1 (from the previous step; 490 g, 2.18 mol), potassium carbonate (601 g, 4.35 mol), and 1,4,7,10,13,16-hexaoxacyclooctadecane (18-crown-6; 28.8 g, 109 mmol) in N,N-dimethylformamide (2 L) was heated to 98° C. and stirred at 98° C. for 16 hours. After the reaction mixture had cooled to 25° C., it was added to ice water (6 L) and the resulting mixture was filtered. The filter cake was washed with water (3×1.5 L) and then suspended in water (2 L), stirred for 12 hours at 25° C., and filtered, affording C1 as a green solid. Yield: 382 g, 1.70 mol, 78%. ¹H NMR (400 MHz, chloroform-d) δ 7.59 (dd, J=8.9, 4.9 Hz, 1H), 7.40 (dd, J=8.7, 2.3 Hz, 1H), 7.11 (ddd, J=8.8, 8.8, 2.3 Hz, 1H), 5.90 (br s, 2H), 3.88 (s, 3H).

Step 3. Synthesis of methyl 6-fluoro-3-iodo-1-benzothiophene-2-carboxylate (P6)

To a solution of C1 (351 g, 1.56 mol) in acetonitrile (2 L) was added diiodomethane (188 mL, 2.33 mol), whereupon the mixture was heated to 70° C. 3-Methylbutyl nitrite (314 mL, 2.34 mol) was added over 1.5 hours, at a rate that maintained the reaction temperature between 70° C. and 80° C. At the end of the addition, the reaction mixture was stirred at 70° C. for an additional 2 hours. Once it had cooled to 25° C., the reaction mixture was concentrated in vacuo and purified using silica gel chromatography (Gradient: 0% to 2.5% ethyl acetate in petroleum ether). The resulting material was stirred with methanol (500 mL) at 25° C. for 1.5 hours and filtered, affording P6 as a light-yellow solid. Yield: 184 g, 0.547 mmol, 35%. LCMS m/z 336.9 [M+H]⁺. ¹H NMR (400 MHz, chloroform-d) δ 7.94 (dd, J=9.0, 5.0

Hz, 1H), 7.52 (dd, J=8.3, 2.3 Hz, 1H), 7.28-7.20 (m, 1H, assumed; partially obscured by solvent peak), 3.97 (s, 3H).

Preparation P7

Ethyl 3-bromo-6-chloro-1-benzothiophene-2-carboxylate (P7)

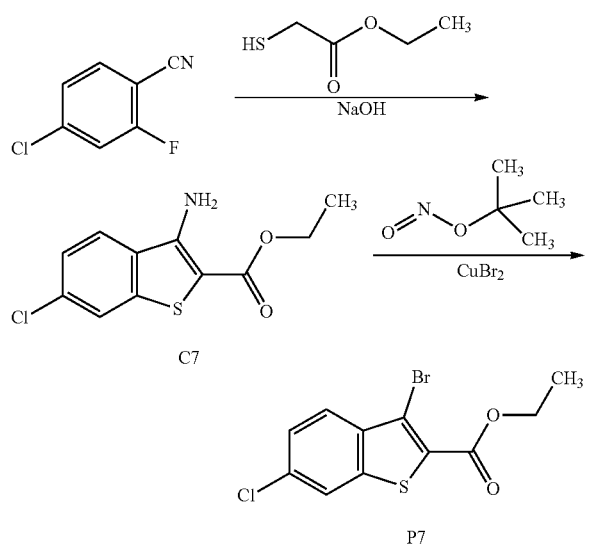

Step 1. Synthesis of ethyl 3-amino-6-chloro-1-benzothiophene-2-carboxylate (C7)

Ethyl sulfanylacetate (3.10 mL, 28.3 mmol) was added in a drop-wise manner to a 0° C. solution of 4-chloro-2-fluorobenzonitrile (4.00 g, 25.7 mmol) in N,N-dimethylformamide (26 mL). After stirring for 30 minutes at 0° C., the reaction mixture was treated with an aqueous solution of sodium hydroxide (5 M; 7.71 mL, 38.6 mmol) and stirring was continued for another 2 hours. Water (50 mL) was then added; the resulting precipitate was collected via filtration and lyophilized to provide C7 as a white solid. Yield: 6.52 g, 25.5 mmol, 99%. $^1$H NMR (400 MHz, chloroform-d) δ 7.71 (d, J=1.9 Hz, 1H), 7.55 (d, J=8.6 Hz, 1H), 7.33 (dd, J=8.6, 1.9 Hz, 1H), 5.87 (br s, 2H), 4.36 (q, J=7.1 Hz, 2H), 1.39 (t, J=7.1 Hz, 3H).

Step 2. Synthesis of ethyl 3-bromo-6-chloro-1-benzothiophene-2-carboxylate (P7)

To a 0° C. suspension of copper(II) bromide (3.69 g, 16.5 mmol) and tert-butyl nitrite (2.48 mL, 20.8 mmol) in acetonitrile (140 mL) was added C7 (3.52 g, 13.8 mmol) in a portion-wise manner. After the reaction mixture had been stirred at 0° C. for 15 minutes, it was allowed to stir at room temperature (26° C.) for 1 hour, whereupon it was poured into hydrochloric acid (0.5 M; 200 mL) and extracted with ethyl acetate (100 mL). The organic layer was washed with water (200 mL) and with saturated aqueous sodium chloride solution (200 mL), dried over sodium sulfate, filtered, and concentrated in vacuo. Purification via silica gel chromatography (Gradient: 0% to 5% ethyl acetate in petroleum ether) provided material that was combined with the product from a similar reaction carried out using C7 (3.00 g, 11.7 mmol), affording P7 as a yellow solid. Combined yield: 5.69 g, 17.8 mmol, 70%. LCMS m/z 320.7 (bromo chloro isotope pattern observed) [M+H]$^+$. $^1$H NMR (400 MHz, chloroform-d) δ 7.90 (d, J=8.7 Hz, 1H), 7.82 (d, J=1.8 Hz, 1H), 7.46 (dd, J=8.7, 1.9 Hz, 1H), 4.44 (q, J=7.1 Hz, 2H), 1.43 (t, J=7.2 Hz, 3H).

Preparation P8

Methyl 6-chloro-3-iodo-1-benzothiophene-2-carboxylate (P8)

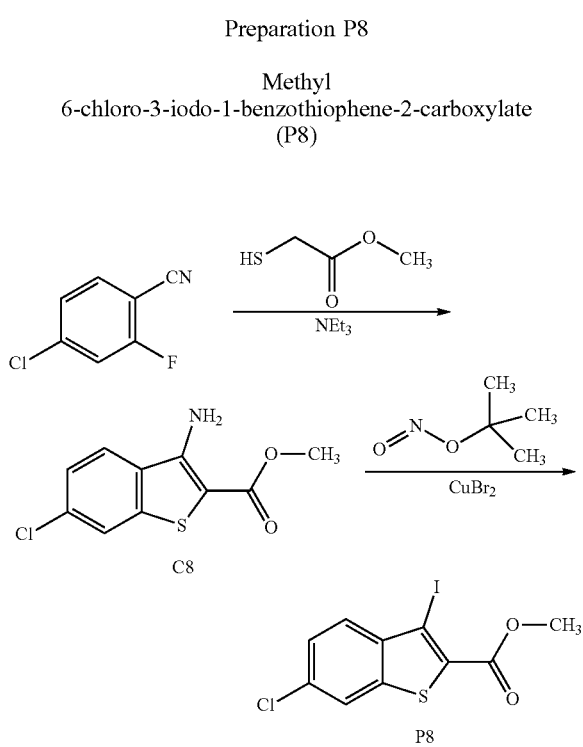

Step 1. Synthesis of methyl 3-amino-6-chloro-1-benzothiophene-2-carboxylate (C8)

A mixture of 4-chloro-2-fluorobenzonitrile (400 mg, 2.57 mmol), methyl sulfanylacetate (0.241 mL, 2.70 mmol), and triethylamine (1.11 mL, 7.96 mmol) in dimethyl sulfoxide (1.2 mL) was irradiated for 20 minutes at 130° C. in a Biotage Initiator+ microwave synthesizer. After the reaction mixture had been cooled to room temperature in a stream of compressed air, it was poured into ice water; the resulting solid was collected via filtration and washed with water to provide C8 as a gray solid, which was used in further chemistry without purification. Yield: 560 mg, 2.32 mmol, 90%. LCMS m/z 242.0 (chlorine isotope pattern observed) [M+H]$^+$. $^1$H NMR (400 MHz, DMSO-d$_6$) δ 8.15 (d, J=8.7 Hz, 1H), 8.02 (d, J=1.9 Hz, 1H), 7.46 (dd, J=8.7, 2.0 Hz, 1H), 7.22 (br s, 2H), 3.79 (s, 3H).

Step 2. Synthesis of methyl 6-chloro-3-iodo-1-benzothiophene-2-carboxylate (P8)

tert-Butyl nitrite (0.372 mL, 3.10 mmol) was added drop-wise to a suspension of C8 (500 mg, 2.07 mmol) and copper(I) iodide (591 mg, 3.10 mmol) in acetonitrile (10 mL). After the reaction mixture had been stirred at 20° C. for 16 hours, the pH was adjusted to approximately 3, and the reaction mixture was extracted with ethyl acetate (3×15 mL). The combined organic layers were washed with saturated aqueous sodium chloride solution (50 mL), concentrated in vacuo, and purified using silica gel chromatography (Gradient: 0% to 10% ethyl acetate in petroleum ether) to afford P8 as a white solid. Yield: 200 mg, 0.567 mmol, 27%. $^1$H NMR (400 MHz, DMSO-$d_6$) δ 8.30 (d, J=1.9 Hz, 1H), 7.91 (d, J=8.8 Hz, 1H), 7.61 (dd, J=8.7, 2.0 Hz, 1H), 3.91 (s, 3H).

Preparation P9

Ethyl 6-fluoro-3-iodo-1-benzofuran-2-carboxylate (P9)

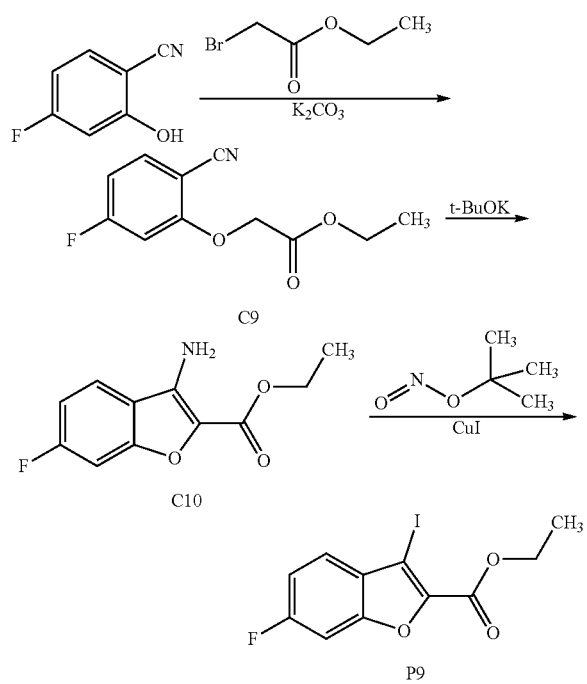

Step 1. Synthesis of ethyl (2-cyano-5-fluorophenoxy)acetate (C9)

To a mixture of 4-fluoro-2-hydroxybenzonitrile (8.50 g, 62.0 mmol) in acetonitrile (200 mL) was added potassium carbonate (17.1 g, 124 mmol), followed by ethyl bromoacetate (12.4 g, 74.3 mmol). After the reaction mixture had been stirred at 15° C. for 3 hours, it was filtered; the filtrate was concentrated in vacuo to provide C9 as a yellow solid. Yield: 14.9 g, assumed quantitative. LCMS m/z 224.1 [M+H]$^+$. $^1$H NMR (400 MHz, chloroform-d) δ 7.59 (dd, J=8.6, 6.2 Hz, 1H), 6.78 (ddd, J=8.6, 7.8, 2.3 Hz, 1H), 6.56 (dd, J=10.1, 2.3 Hz, 1H), 4.75 (s, 2H), 4.27 (q, J=7.1 Hz, 2H), 1.29 (t, J=7.1 Hz, 3H).

Step 2. Synthesis of ethyl 3-amino-6-fluoro-1-benzofuran-2-carboxylate (C10)

A solution of C9 (8.00 g, 35.8 mmol) in tetrahydrofuran (50 mL) was added in a drop-wise manner to a 0° C. solution of potassium tert-butoxide (6.44 g, 57.4 mmol) in tetrahydrofuran (100 mL), and the reaction mixture was stirred at 0° C. for 2 hours. It was then diluted with water and extracted with ethyl acetate (3×150 mL); the combined organic layers were washed with saturated aqueous sodium chloride solution (2×150 mL), dried over sodium sulfate, filtered, and concentrated in vacuo, affording C10 as a yellow solid. Yield: 6.68 g, 29.9 mmol, 84%. LCMS m/z 224.0 [M+H]$^+$. $^1$H NMR (400 MHz, chloroform-d) δ 7.49 (dd, J=8.7, 5.3 Hz, 1H), 7.15 (dd, J=8.9, 2.3 Hz, 1H), 7.01 (ddd, J=8.9, 8.9, 2.2 Hz, 1H), 4.98 (br s, 2H), 4.43 (q, J=7.1 Hz, 2H), 1.43 (t, J=7.1 Hz, 3H).

Step 3. Synthesis of ethyl 6-fluoro-3-iodo-1-benzofuran-2-carboxylate (P9)

To a suspension of copper(I) iodide (2.56 g, 13.4 mmol) and C10 (2.00 g, 8.96 mmol) in acetonitrile (60 mL) was added tert-butyl nitrite (1.61 mL, 13.5 mmol) in a portion-wise manner, whereupon the reaction mixture was stirred at 0° C. for 15 minutes and at room temperature (15° C.) for 16 hours. It was then poured into hydrochloric acid (1 M; 15 mL) and extracted with ethyl acetate (50 mL). The organic layer was washed sequentially with aqueous sodium sulfite solution (3×40 mL) and saturated aqueous sodium chloride solution (2×30 mL), dried over sodium sulfate, filtered, concentrated in vacuo, and purified via chromatography on silica gel (Gradient: 0% to 5% ethyl acetate in petroleum ether), providing P9 as a yellow solid. Yield: 190 mg, 0.569 mmol, 6%. $^1$H NMR (400 MHz, chloroform-d) δ 7.50 (dd, J=8.7, 5.3 Hz, 1H), 7.29 (dd, J=8.5, 2.2 Hz, 1H), 7.15 (ddd, J=9.0, 9.0, 2.2 Hz, 1H), 4.48 (q, J=7.1 Hz, 2H), 1.47 (t, J=7.1 Hz, 3H).

Preparation P10

Ethyl 6-chloro-3-iodo-1-benzofuran-2-carboxylate (P10)

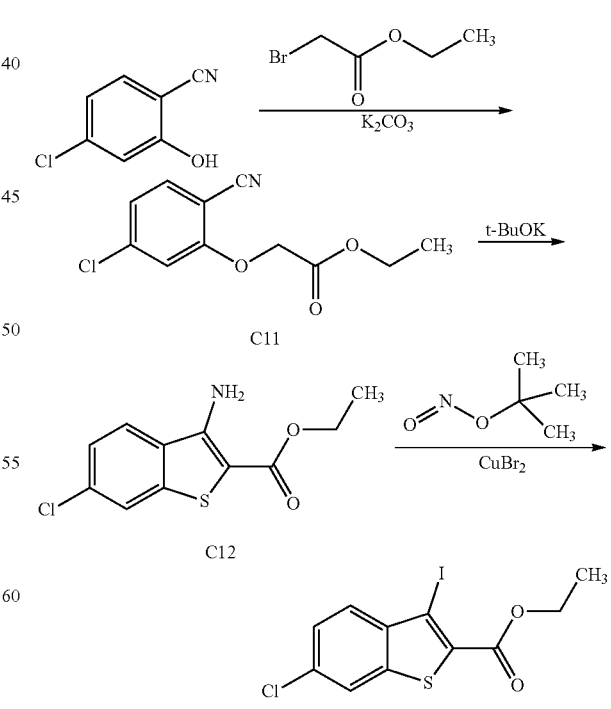

Step 1. Synthesis of ethyl (5-chloro-2-cyanophenoxy)acetate (C11)

To a solution of 4-chloro-2-hydroxybenzonitrile (9.00 g, 58.6 mmol) in acetonitrile (290 mL) was added potassium carbonate (16.2 g, 117 mmol), followed by ethyl bromoacetate (11.7 g, 70.1 mmol), and the reaction mixture was stirred at 15° C. for 16 hours. It was then filtered; the filtrate was concentrated in vacuo to provide C11 as a white solid. Yield: 13.5 g, 56.3 mmol, 96%. $^1$H NMR (400 MHz, chloroform-d) δ 7.53 (d, J=8.3 Hz, 1H), 7.06 (dd, J=8.3, 1.8 Hz, 1H), 6.84 (d, J=1.8 Hz, 1H), 4.76 (s, 2H), 4.29 (q, J=7.1 Hz, 2H), 1.31 (t, J=7.1 Hz, 3H).

Step 2. Synthesis of ethyl 3-amino-6-chloro-1-benzofuran-2-carboxylate (C12)

A solution of C11 (13.5 g, 56.3 mmol) in tetrahydrofuran (25 mL) was added in a drop-wise manner to a 0° C. solution of potassium tert-butoxide (10.1 g, 90.0 mmol) in tetrahydrofuran (200 mL). After the reaction mixture had been stirred at 0° C. for 2 hours, it was diluted with water (50 mL) and extracted with ethyl acetate (3×50 mL). The combined organic layers were washed with saturated aqueous sodium chloride solution (2×50 mL), dried over sodium sulfate, filtered, and concentrated in vacuo, affording C12 as a solid. Yield: 8.70 g, 36.3 mmol, 64%. LCMS m/z 239.9 (chlorine isotope pattern observed) [M+H]$^+$. $^1$H NMR (400 MHz, chloroform-d) δ 7.50-7.44 (m, 2H), 7.24 (dd, J=8.4, 1.8 Hz, 1H), 4.44 (q, J=7.1 Hz, 2H), 1.44 (t, J=7.1 Hz, 3H).

Step 3. Synthesis of ethyl 6-chloro-3-iodo-1-benzofuran-2-carboxylate (P10)

A suspension of C12 (7.40 g, 30.9 mmol) and copper(I) iodide (8.82 g, 46.3 mmol) in acetonitrile (150 mL) was heated to 45° C., whereupon a solution of tert-butyl nitrite (5.55 mL, 46.7 mmol) in acetonitrile (4 mL) was added. After the reaction mixture had been stirred at 45° C. for 2 hours, it was concentrated in vacuo and treated with dilute hydrochloric acid until the pH of the mixture was approximately 3. After extraction with ethyl acetate (3×50 mL), the combined organic layers were washed with saturated aqueous sodium chloride solution (2×50 mL), concentrated under reduced pressure, and purified via chromatography on silica gel (Gradient: 0% to 20% ethyl acetate in petroleum ether), providing P10 as a white solid. Yield: 1.12 g, 3.20 mmol, 10%. LCMS m/z 350.9 [M+H]$^+$. $^1$H NMR (400 MHz, chloroform-d) δ 7.58 (d, J=1.7 Hz, 1H), 7.47 (d, half of AB quartet, J=8.4 Hz, 1H), 7.36 (dd, component of ABX system, J=8.5, 1.7 Hz, 1H), 4.48 (q, J=7.1 Hz, 2H), 1.47 (t, J=7.1 Hz, 3H).

Preparation P11

5,7-Difluoro-2-methyl-3,4-dihydro-2H-1-benzopyran (P11)

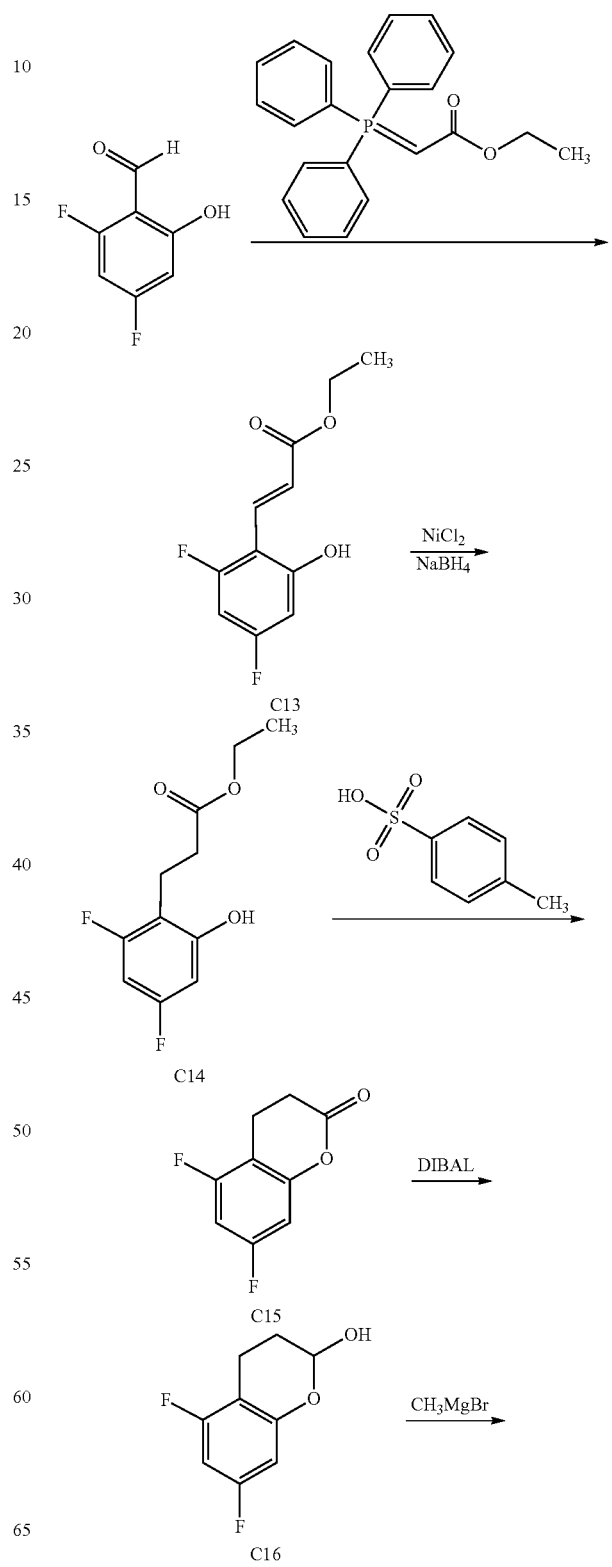

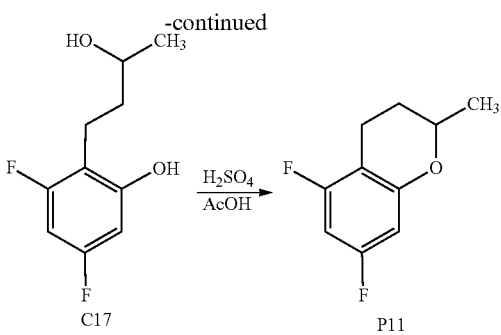

Step 1. Synthesis of ethyl (2E)-3-(2,4-difluoro-6-hydroxyphenyl)prop-2-enoate (C13)

A solution of ethyl (triphenyl-$\lambda^5$-phosphanylidene)acetate (8.48 g, 24.3 mmol) in dichloromethane (50 mL) was added portion-wise to a solution of 2,4-difluoro-6-hydroxybenzaldehyde (50%; 7.00 g, 22 mmol) in dichloromethane (100 mL). After the reaction mixture had been stirred at 25° C. overnight, it was concentrated in vacuo; the residue was purified via silica gel chromatography (Gradient: 0% to 25% ethyl acetate in petroleum ether) to afford C13 as a yellow solid. Yield: 2.71 g, 11.9 mmol, 54%. $^1$H NMR (400 MHz, chloroform-d) δ 9.03 (br s, 1H), 7.96 (d, J=16.4 Hz, 1H), 6.93 (d, J=16.5 Hz, 1H), 6.49 (ddd, J=9.7, 2, 2 Hz, 1H), 6.41 (ddd, J=11.0, 9.0, 2.5 Hz, 1H), 4.33 (q, J=7.1 Hz, 2H), 1.37 (t, J=7.1 Hz, 3H).

Step 2. Synthesis of ethyl 3-(2,4-difluoro-6-hydroxyphenyl)propanoate (C14)

Nickel(II) chloride hexahydrate (3.39 g, 14.3 mmol) was added to a 0° C. solution of C13 (2.71 g, 11.9 mmol) in a mixture of tetrahydrofuran (90 mL) and methanol (16 mL). After the nickel(II) chloride hexahydrate had completely dissolved, sodium borohydride (1.80 g, 47.6 mmol) was slowly added portion-wise, and the reaction mixture was allowed to stir at 0° C. for 1 hour. Water (50 mL) was carefully added, and the resulting mixture was extracted with ethyl acetate (2×80 mL). The combined organic layers were washed with saturated aqueous sodium chloride solution (2×50 mL), dried over sodium sulfate, filtered, and concentrated in vacuo to provide C14 as a yellow oil. Yield: 2.88 g; corrected for residual ethyl acetate: 2.35 g, 10.2 mmol; 86%. $^1$H NMR (400 MHz, chloroform-d) δ 8.42 (br s, 1H), 6.47 (ddd, J=10.1, 2.6, 1.8 Hz, 1H), 6.38 (ddd, J=10.0, 8.9, 2.6 Hz, 1H), 4.17 (q, J=7.2 Hz, 2H), 2.87-2.81 (m, 2H), 2.73-2.67 (m, 2H), 1.25 (t, J=7.2 Hz, 3H).

Step 3. Synthesis of 5,7-difluoro-3,4-dihydro-2H-1-benzopyran-2-one (C15)

To a solution of C14 (from the previous step; 2.88 g containing 2.35 g of C14, 10.2 mmol) in toluene (60 mL) was added p-toluenesulfonic acid (215 mg, 1.25 mmol), whereupon the reaction mixture was stirred at 130° C. for 16 hours. After the mixture had been concentrated in vacuo, it was treated with water (50 mL) and extracted with ethyl acetate (3×60 mL). The combined organic layers were washed with saturated aqueous sodium chloride solution (2×50 mL), dried over sodium sulfate, filtered, and concentrated in vacuo. Purification via silica gel chromatography [Gradient: 0% to 20% ethyl acetate in (5:1 petroleum ether/dichloromethane)] afforded C15 as a yellow solid. Yield: 1.70 g, 9.23 mmol, 90%. $^1$H NMR (400 MHz, chloroform-d) δ 6.68-6.61 (m, 2H), 3.03-2.96 (m, 2H), 2.82-2.76 (m, 2H).

Step 4. Synthesis of 5,7-difluoro-3,4-dihydro-2H-1-benzopyran-2-ol (C16)

A solution of diisobutylaluminum hydride in toluene (DIBAL, 1 M; 7.82 mL, 7.82 mmol) was slowly added to a −78° C. solution of C15 (1.20 g, 6.52 mmol) in dichloromethane (30 mL). The reaction mixture was stirred at −78° C. for 2.5 hours, whereupon it was added to hydrochloric acid (1 M; 20 mL) at 0° C.; the resulting mixture was extracted with dichloromethane (3×20 mL). The combined organic layers were washed with saturated aqueous sodium chloride solution (26 mL), dried over sodium sulfate, filtered, and concentrated in vacuo. Chromatography on silica gel [Gradient: 0% to 20% ethyl acetate in (5:1 petroleum ether/dichloromethane)] provided C16 as a yellow oil. Yield: 700 mg, 3.76 mmol, 58%. $^1$H NMR (400 MHz, chloroform-d) δ 6.44-6.34 (m, 2H), 5.64-5.60 (m, 1H), 3.15 (br d, J=3.5 Hz, 1H), 2.85-2.67 (m, 2H), 2.10-2.00 (m, 1H), 1.99-1.87 (m, 1H).

Step 5. Synthesis of 3,5-difluoro-2-(3-hydroxybutyl)phenol (C17)

A solution of methylmagnesium bromide in diethyl ether (3.0 M; 3.76 mL, 11.3 mmol) was added in a drop-wise manner to a 0° C. solution of C16 (700 mg, 3.76 mmol) in tetrahydrofuran (18 mL). The reaction mixture was stirred at 0° C. for 20 minutes, then stirred at 25° C. for 2.5 hours, whereupon it was poured into hydrochloric acid (1 M; 15 mL) and extracted with ethyl acetate (2×12 mL). The combined organic layers were dried over sodium sulfate, filtered, and concentrated in vacuo to provide C17 as a yellow oil. Yield: 540 mg, 2.67 mmol, 71%. $^1$H NMR (400 MHz, chloroform-d) δ 6.43 (ddd, J=10.2, 2.1, 2.1 Hz, 1H), 6.41-6.34 (m, 1H), 3.78-3.68 (m, 1H), 2.85-2.65 (m, 2H), 1.82-1.63 (m, 2H), 1.25 (d, J=6.2 Hz, 3H).

Step 6. Synthesis of 5,7-difluoro-2-methyl-3,4-dihydro-2H-1-benzopyran (P11)

To a solution of C17 (540 mg, 2.67 mmol) in acetic acid (6 mL) was added sulfuric acid (50%; 6 mL) and the reaction mixture was stirred at 100° C. for 3 hours. It was then diluted with water (10 mL) and extracted with a mixture of petroleum ether and ethyl acetate (5:1 ratio; 3×6 mL). The combined organic layers were washed with saturated aqueous sodium chloride solution (15 mL), dried over sodium sulfate, filtered, and concentrated in vacuo to afford P11 as a brown oil. Yield: 350 mg, 1.90 mmol, 71%. $^1$H NMR (400 MHz, chloroform-d) δ 6.38-6.29 (m, 2H), 4.17-4.07 (m, 1H), 2.83-2.72 (m, 1H), 2.67-2.54 (m, 1H), 2.05-1.96 (m, 1H), 1.72-1.59 (m, 1H), 1.39 (d, J=6.2 Hz, 3H).

Alternate Preparation of P11

5,7-Difluoro-2-methyl-3,4-dihydro-2H-1-benzopyran (P11)

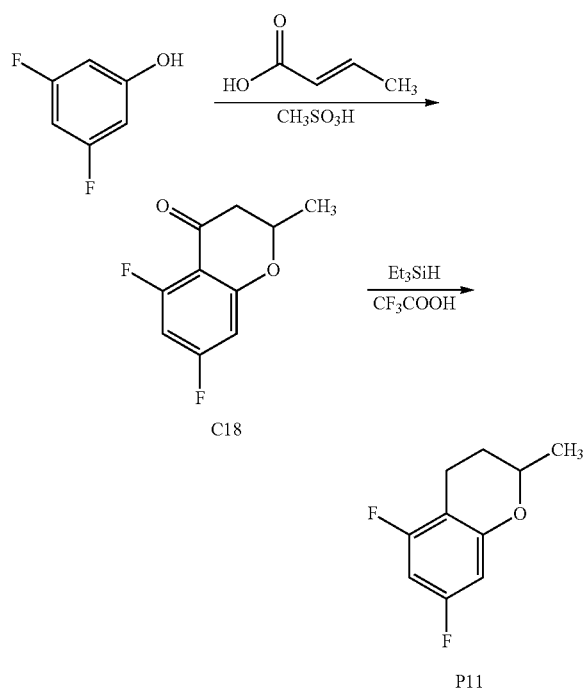

Step 1. Synthesis of 5,7-difluoro-2-methyl-2,3-dihydro-4H-1-benzopyran-4-one (C18)

(2E)-But-2-enoic acid (1.72 g, 20.0 mmol) was added to a solution of 3,5-difluorophenol (2.60 g, 20.0 mmol) in methanesulfonic acid (50 mL). The reaction mixture was stirred at 110° C. for 16 hours, whereupon it was diluted with water (150 mL) and extracted with ethyl acetate (3×60 mL). The combined organic layers were washed sequentially with aqueous sodium bicarbonate solution (2×50 mL) and saturated aqueous sodium chloride solution (60 mL), dried over sodium sulfate, filtered, and concentrated in vacuo. Chromatography on silica gel (0% to 10% ethyl acetate in petroleum ether) afforded C18 as a yellow oil. Yield: 569 mg, 2.87 mmol, 14%. $^1$H NMR (400 MHz, chloroform-d) δ 6.53-6.41 (m, 2H), 4.66-4.54 (m, 1H), 2.69-2.64 (m, 2H), 1.51 (d, J=6.3 Hz, 3H).

Step 2. Synthesis of 5,7-difluoro-2-methyl-3,4-dihydro-2H-1-benzopyran (P11)

To a solution of C18 (569 mg, 2.87 mmol) in trifluoroacetic acid (10 mL) was added triethylsilane (2.29 mL, 14.3 mmol), whereupon the reaction mixture was stirred at 25° C. for 3 days. After adjustment to pH 7 by addition of aqueous sodium bicarbonate solution, the reaction mixture was extracted with ethyl acetate (3×6 mL), and the combined organic layers were washed with saturated aqueous sodium chloride solution, dried over sodium sulfate, filtered, and concentrated in vacuo. Silica gel chromatography (Eluent: petroleum ether) provided P11 as a colorless oil. Yield: 416 mg, 2.26 mmol, 79%. $^1$H NMR (400 MHz, chloroform-d), from a similar, smaller-scale reaction carried out using C18: δ 6.37-6.30 (m, 2H), 4.12 (dqd, J=10.1, 6.3, 2.1 Hz, 1H), 2.82-2.72 (m, 1H), 2.66-2.55 (m, 1H), 2.00 (dddd, J=13.8, 6.3, 3.1, 2.2 Hz, 1H), 1.65 (dddd, J=13.7, 11.3, 10.1, 5.8 Hz, 1H), 1.39 (d, J=6.3 Hz, 3H).

Preparation P12

Methyl 3-bromo-6-chloro-1-benzothiophene-2-carboxylate (P12)

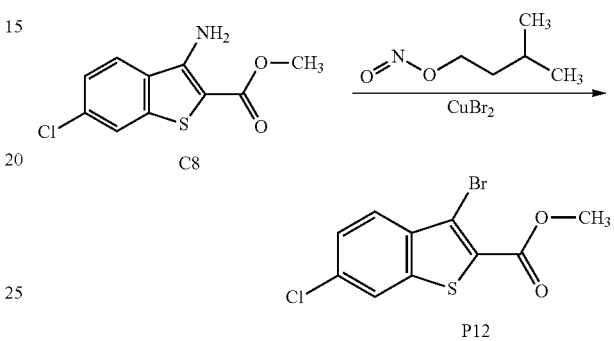

To a 0° C. solution of tert-butyl nitrite (0.385 mL, 3.24 mmol) in acetonitrile (10 mL) was added copper(II) bromide (806 mg, 3.61 mmol), followed by portion-wise addition of C8 (560 mg, 2.32 mmol). The reaction mixture was then allowed to warm to 25° C. and stir at that temperature for 2 hours, whereupon it was treated with hydrochloric acid (1 M; 30 mL) and extracted with ethyl acetate (3×10 mL). The combined organic layers were washed with hydrochloric acid (1 M; 2×10 mL), dried over sodium sulfate, filtered, concentrated in vacuo, and purified via silica gel chromatography (Gradient: 0% to 2% ethyl acetate in petroleum ether) to afford P12 as a white solid. Yield: 350 mg, 1.15 mmol, 50%. LCMS m/z 304.9 (bromo chloro isotope pattern observed) [M+H]$^+$. $^1$H NMR (400 MHz, chloroform-d) δ 7.91 (d, J=8.8 Hz, 1H), 7.83 (d, J=1.9 Hz, 1H), 7.47 (dd, J=8.8, 1.8 Hz, 1H), 3.97 (s, 3H).

Preparation P13

5-Fluoro-6-(4,4,5,5-tetramethyl-1,3,2-dioxaborolan-2-yl)-3,4-dihydro-2H-1-benzopyran (P13)

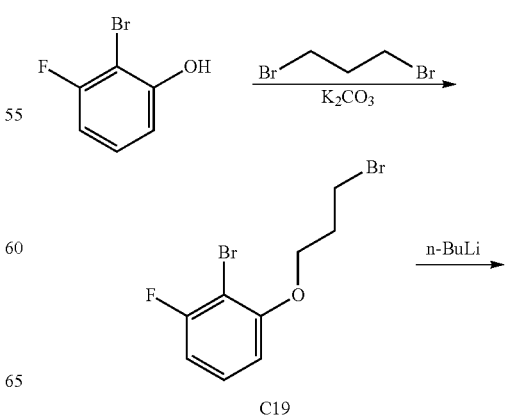

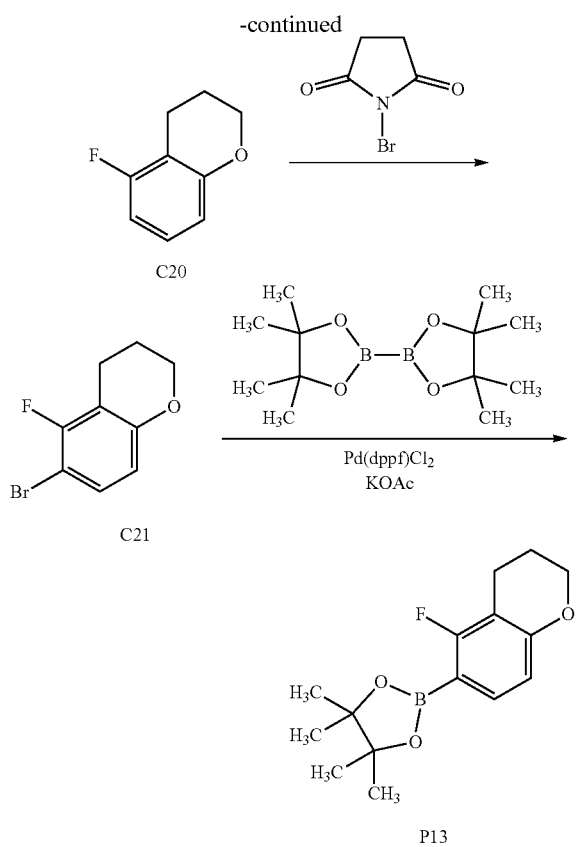

Step 1. Synthesis of 2-bromo-1-(3-bromopropoxy)-3-fluorobenzene (C19)

Potassium carbonate (6.51 g, 47.1 mmol) and 1,3-dibromopropane (7.17 mL, 70.6 mmol) were added to a solution of 2-bromo-3-fluorophenol (4.50 g, 23.6 mmol) in acetonitrile (45 mL), whereupon the reaction mixture was stirred at 80° C. for 16 hours. It was then concentrated in vacuo, diluted with water (50 mL), and extracted with ethyl acetate (2×40 mL); the combined organic layers were washed with saturated aqueous sodium chloride solution, dried over sodium sulfate, filtered, and concentrated under reduced pressure. Chromatography on silica gel (Gradient: 0% to 1% ethyl acetate in petroleum ether) afforded C19 as a colorless oil. Yield: 5.56 g, 17.8 mmol, 75%. $^1$H NMR (400 MHz, chloroform-d) δ 7.23 (ddd, J=8.3, 8.3, 6.4 Hz, 1H), 6.78 (ddd, J=8.3, 8.1, 1.2 Hz, 1H), 6.71 (br d, J=8.4 Hz, 1H), 4.18 (t, J=5.7 Hz, 2H), 3.68 (t, J=6.3 Hz, 2H), 2.42-2.34 (m, 2H).

Step 2. Synthesis of 5-fluoro-3,4-dihydro-2H-1-benzopyran (C20)

To a −78° C. solution of C19 (5.56 g, 17.8 mmol) in tetrahydrofuran (15 mL) was added a solution of n-butyllithium in hexane (2.5 M; 9.27 mL, 23.2 mmol), and the reaction mixture was stirred at −78° C. for 2 hours. It was then warmed to 25° C. and stirred at that temperature for 16 hours, whereupon LCMS analysis indicated conversion to C20: LCMS m/z 153.1 [M+H]$^+$. Water (30 mL) was added, and the resulting mixture was extracted with methyl tert-butyl ether (3×50 mL); the combined organic layers were washed with saturated aqueous sodium chloride solution, dried over sodium sulfate, filtered, and concentrated in vacuo to afford C20 as a yellow oil. Yield: 2.70 g, 17.7 mmol, 99%. $^1$H NMR (400 MHz, chloroform-d) δ 7.06-6.99 (m, 1H), 6.62-6.54 (m, 2H), 4.20-4.15 (m, 2H), 2.74 (t, J=6.6 Hz, 2H), 2.04-1.96 (m, 2H).

Step 3. Synthesis of 6-bromo-5-fluoro-3,4-dihydro-2H-1-benzopyran (C21)

N-Bromosuccinimide (2.34 g, 13.1 mmol) was added to a solution of C20 (2.00 g, 13.1 mmol) in acetonitrile (20 mL). After the mixture had been stirred at 25° C. for 16 hours, it was concentrated under reduced pressure, diluted with water (10 mL), and extracted with methyl tert-butyl ether (3×20 mL). The combined organic layers were washed with saturated aqueous sodium chloride solution, dried over sodium sulfate, filtered, and concentrated in vacuo, whereupon silica gel chromatography (Gradient: 0% to 1% ethyl acetate in petroleum ether) afforded C21 as a colorless oil. Yield: 1.60 g, 6.92 mmol, 53%. $^1$H NMR (400 MHz, chloroform-d) δ 7.21 (br dd, J=8.8, 8.0 Hz, 1H), 6.53 (dd, J=8.8, 1.6 Hz, 1H), 4.19-4.13 (m, 2H), 2.77 (t, J=6.6 Hz, 2H), 2.03-1.95 (m, 2H).

Step 4. Synthesis of 5-fluoro-6-(4,4,5,5-tetramethyl-1,3,2-dioxaborolan-2-yl)-3,4-dihydro-2H-1-benzopyran (P13)

A mixture of C21 (200 mg, 0.866 mmol), potassium acetate (297 mg, 3.03 mmol), 4,4,4',4',5,5,5',5'-octamethyl-2,2'-bi-1,3,2-dioxaborolane (330 mg, 1.30 mmol), and [1,1'-bis(diphenylphosphino)ferrocene]dichloropalladium(II) (63 mg, 86 µmol) in N,N-dimethylformamide (2 mL) was stirred at 100° C. for 16 hours, whereupon the reaction mixture was diluted with ethyl acetate (20 mL) and filtered. The filtrate was washed with water (30 mL) and with saturated aqueous sodium chloride solution, dried over sodium sulfate, filtered, concentrated in vacuo, and purified using chromatography on silica gel (Gradient: 0% to 5% ethyl acetate in petroleum ether) to provide P13 as a white solid. Yield: 120 mg, 0.431 mmol, 50%. LCMS m/z 279.2 [M+H]$^+$. $^1$H NMR (400 MHz, chloroform-d) δ 7.45 (dd, J=8, 8 Hz, 1H), 6.60 (d, J=8.3 Hz, 1H), 4.18 (dd, J=5.8, 4.5 Hz, 2H), 2.73 (t, J=6.6 Hz, 2H), 2.02-1.94 (m, 2H), 1.34 (s, 12H).

Preparation P14

3-Methyl-7-(4,4,5,5-tetramethyl-1,3,2-dioxaborolan-2-yl)-3,4-dihydro-2H-1-benzopyran (P14)

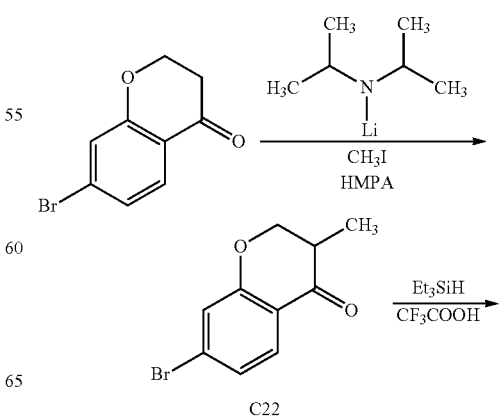

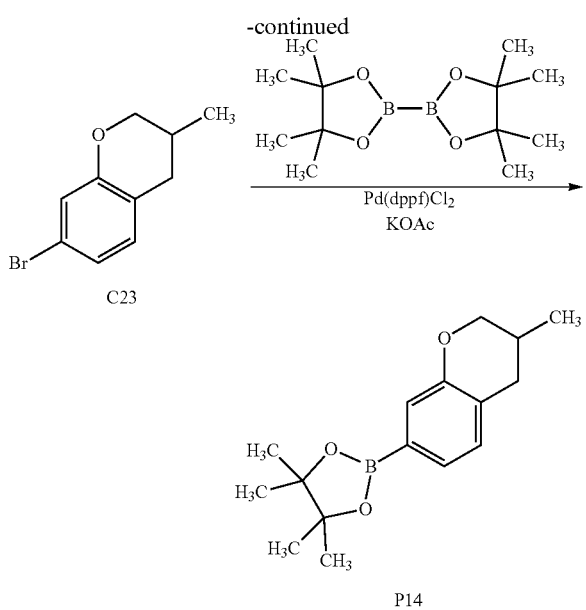

Step 1. Synthesis of 7-bromo-3-methyl-2,3-dihydro-4H-1-benzopyran-4-one (C22)

A solution of lithium diisopropylamide was prepared as follows: To a −78° C. solution of diisopropylamine (4.31 mL, 30.8 mmol) in tetrahydrofuran (50 mL) was added a solution of n-butyllithium (2.4 M; 11.9 mL, 28.6 mmol), whereupon the reaction mixture was stirred at −60° C. for 1 hour.

A solution of 7-bromo-2,3-dihydro-4H-1-benzopyran-4-one (5.00 g, 22.0 mmol) and N,N,N',N',N'',N''-hexamethylphosphoric triamide (HMPA; 19.1 mL, 110 mmol) in tetrahydrofuran (70 mL) was cooled to −78° C. and treated with the lithium diisopropylamide solution prepared above. After the reaction mixture had been stirred at −78° C. for 1 hour, a solution of iodomethane (15.6 g, 110 mmol) in tetrahydrofuran (20 mL) was added in a drop-wise manner. At the end of this addition, the reaction mixture was warmed to 0° C. and stirred at 0° C. for 2 hours. After addition of saturated aqueous ammonium chloride solution (50 mL), the resulting mixture was extracted with ethyl acetate (3×40 mL), and the combined organic layers were washed with saturated aqueous sodium chloride solution and concentrated in vacuo. Purification via silica gel chromatography (Gradient: 0% to 15% ethyl acetate in petroleum ether) afforded C22 as a yellow solid. Yield: 2.50 g, 10.4 mmol, 47%. LCMS m/z 240.9 (bromine isotope pattern observed) [M+H]⁺. $^1$H NMR (400 MHz, chloroform-d) δ 7.75 (d, J=8.3 Hz, 1H), 7.19-7.13 (m, 2H), 4.51 (dd, J=11.4, 5.1 Hz, 1H), 4.15 (dd, J=11.3, 11.1 Hz, 1H), 2.92-2.80 (m, 1H), 1.21 (d, J=7.0 Hz, 3H).

Step 2. Synthesis of 7-bromo-3-methyl-3,4-dihydro-2H-1-benzopyran (C23)

To a solution of C22 (3.50 g, 14.5 mmol) in trifluoroacetic acid (30 mL) was added triethylsilane (25 mL, 160 mmol). The reaction mixture was stirred at 50° C. for 16 hours, whereupon it was concentrated in vacuo and partitioned between ethyl acetate (20 mL) and saturated aqueous sodium bicarbonate solution (100 mL). The organic layer was dried over sodium sulfate, filtered, and concentrated in vacuo; the residue was purified using chromatography on silica gel (Gradient: 0% to 10% ethyl acetate in petroleum ether) to afford C23 as a white solid. Yield: 3.01 g, 13.3 mmol, 92%. $^1$H NMR (400 MHz, chloroform-d) δ 6.98-6.92 (m, 2H), 6.87 (br d, half of AB quartet, J=7.8 Hz, 1H), 4.16 (ddd, J=10.6, 3.4, 2.0 Hz, 1H), 3.67 (dd, J=10.6, 9.4 Hz, 1H), 2.77 (ddd, J=16.2, 5.2, 2.0 Hz, 1H), 2.36 (dd, J=16.2, 9.8 Hz, 1H), 2.19-2.05 (m, 1H), 1.03 (d, J=6.7 Hz, 3H).

Step 3. Synthesis of 3-methyl-7-(4,4,5,5-tetramethyl-1,3,2-dioxaborolan-2-yl)-3,4-dihydro-2H-1-benzopyran (P14)

A mixture of C23 (3.0 g, 13 mmol), potassium acetate (4.54 g, 46.3 mmol), 4,4,4',4',5,5,5',5'-octamethyl-2,2'-bi-1,3,2-dioxaborolane (5.03 g, 19.8 mmol), and [1,1'-bis(diphenylphosphino)ferrocene]dichloropalladium(II) (967 mg, 1.32 mmol) in N,N-dimethylformamide (60 mL) was stirred at 100° C. for 16 hours. Ethyl acetate (150 mL) was then added, and the resulting mixture was filtered. After the filtrate had been washed with water (2×300 mL) and with saturated aqueous sodium chloride solution, it was dried over sodium sulfate, filtered, and concentrated in vacuo. Purification via chromatography on silica gel (Gradient: 0% to 15% ethyl acetate in petroleum ether) provided P14 as a white solid. Yield: 2.70 g, 9.85 mmol, 76%. LCMS m/z 275.1 [M+H]⁺. $^1$H NMR (400 MHz, chloroform-d) δ 7.29-7.23 (m, 2H), 7.03 (br d, J=7.4 Hz, 1H), 4.16 (ddd, J=10.6, 3.4, 2.0 Hz, 1H), 3.67 (dd, J=10.6, 9.4 Hz, 1H), 2.84 (ddd, J=16.4, 5.3, 1.9 Hz, 1H), 2.45 (dd, J=16.5, 9.7 Hz, 1H), 2.20-2.07 (m, 1H), 1.32 (s, 12H), 1.03 (d, J=6.7 Hz, 3H).

Preparation P15

2-Methyl-6-(4,4,5,5-tetramethyl-1,3,2-dioxaborolan-2-yl)-3,4-dihydro-2H-1-benzopyran (P15)

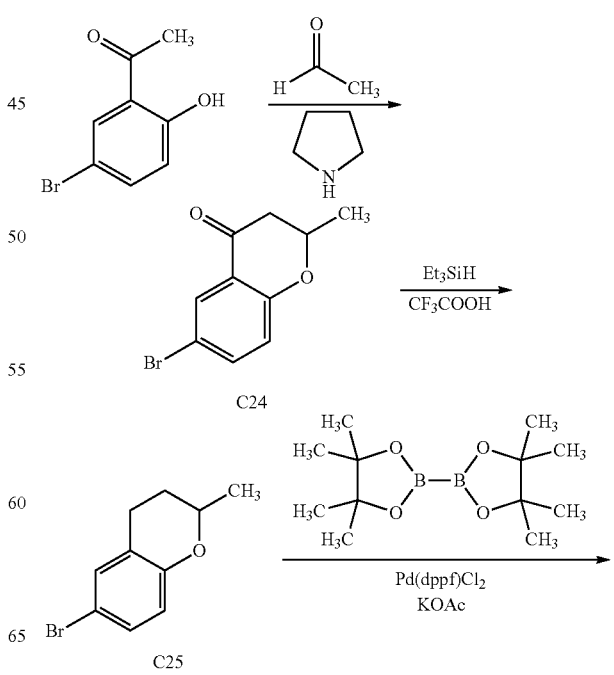

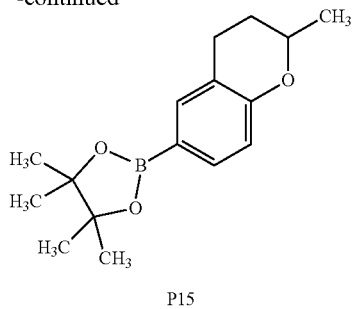

P15

Step 1. Synthesis of 6-bromo-2-methyl-2,3-dihydro-4H-1-benzopyran-4-one (C24)

Pyrrolidine (3.31 g, 46.5 mmol) was added to a solution of 1-(5-bromo-2-hydroxyphenyl)ethan-1-one (10.0 g, 46.5 mmol) in ethanol (200 mL). After the reaction mixture had been stirred at 20° C. for 30 minutes, it was heated to 70° C., whereupon a solution of acetaldehyde (5.0 M in tetrahydrofuran; 46.5 mL, 232 mmol) in ethanol (100 mL) was added in a drop-wise manner over 1.5 hours. At the end of the addition, stirring was continued at 70° C. for 1 hour. LCMS analysis at this point indicated conversion to C24: LCMS m/z 241.1 (bromine isotope pattern observed) [M+H]$^+$. The reaction mixture was concentrated in vacuo and the residue added to water (300 mL); the resulting mixture was extracted with ethyl acetate (3×150 mL) and the combined organic layers were washed sequentially with water and saturated aqueous sodium chloride solution, dried over sodium sulfate, filtered, and concentrated in vacuo. Silica gel chromatography (Gradient: 0% to 5% ethyl acetate in petroleum ether) provided a mixture of solid and oil, which was taken up in hot heptane and cooled to provide C24 as a yellow solid after filtration. Yield: 2.44 g, 10.1 mmol, 22%. $^1$H NMR (400 MHz, chloroform-d) δ 7.98 (d, J=2.4 Hz, 1H), 7.54 (dd, J=8.8, 2.6 Hz, 1H), 6.87 (d, J=8.8 Hz, 1H), 4.64-4.52 (m, 1H), 2.73-2.60 (m, 2H), 1.52 (d, J=6.3 Hz, 3H).

Step 2. Synthesis of 6-bromo-2-methyl-3,4-dihydro-2H-1-benzopyran (C25)

Triethylsilane (25 mL, 160 mmol) was added to a solution of C24 (3.94 g, 16.3 mmol) in trifluoroacetic acid (25 mL). After the reaction mixture had been heated at 50° C. for 16 hours, it was concentrated in vacuo, diluted with ethyl acetate (100 mL), and basified to pH 8 by addition of saturated aqueous sodium bicarbonate solution. The aqueous layer was extracted with ethyl acetate (50 mL) and the combined organic layers were washed with water and with saturated aqueous sodium chloride solution, dried over sodium sulfate, filtered, and concentrated under reduced pressure. Silica gel chromatography (Gradient: 0% to 5% ethyl acetate in petroleum ether) afforded C25 as a pale-yellow solid. Yield: 3.00 g, 13.2 mmol, 81%. $^1$H NMR (400 MHz, chloroform-d) δ 7.18-7.13 (m, 2H), 6.67 (d, J=9.3 Hz, 1H), 4.11 (dqd, J=10.1, 6.2, 2.1 Hz, 1H), 2.83 (br ddd, component of ABXY system, J=16.6, 11.5, 6.1 Hz, 1H), 2.71 (ddd, component of ABXY system, J=16.7, 5.6, 3.1 Hz, 1H), 1.97 (dddd, J=13.6, 6.1, 3.2, 2.2 Hz, 1H), 1.68 (dddd, J=13.6, 11.5, 10.1, 5.6 Hz, 1H), 1.39 (d, J=6.2 Hz, 3H).

Step 3. Synthesis of 2-methyl-6-(4,4,5,5-tetramethyl-1,3,2-dioxaborolan-2-yl)-3,4-dihydro-2H-1-benzopyran (P15)

4,4,4',4',5,5,5',5'-Octamethyl-2,2'-bi-1,3,2-dioxaborolane (5.03 g, 19.8 mmol), potassium acetate (4.55 g, 46.4 mmol), and [1,1'-bis(diphenylphosphino)ferrocene]dichloropalladium(II) (964 mg, 1.32 mmol) were added to a solution of C25 (3.00 g, 13.2 mmol) in N,N-dimethylformamide (40 mL). The reaction vessel was then evacuated and charged with nitrogen; this evacuation cycle was repeated twice, whereupon the reaction mixture was heated at 90° C. for 16 hours. After water (100 mL) and ethyl acetate (100 mL) had been added, the resulting mixture was filtered, and the aqueous layer was extracted with ethyl acetate (2×50 mL). The combined organic layers were washed sequentially with water and saturated aqueous sodium chloride solution, dried over sodium sulfate, filtered, and concentrated in vacuo. Silica gel chromatography (Gradient: 5% to 10% ethyl acetate in petroleum ether) provided P15 as a pale-yellow solid. Yield: 2.56 g, 9.34 mmol, 71%. LCMS m/z 275.2 [M+H]$^+$. $^1$H NMR (400 MHz, chloroform-d) δ 7.57-7.50 (m, 2H), 6.78 (d, J=8.6 Hz, 1H), 4.16 (dqd, J=10.1, 6.3, 2.2 Hz, 1H), 2.84 (br ddd, component of ABXY system, J=16.4, 11.3, 5.9 Hz, 1H), 2.75 (ddd, component of ABXY system, J=16.4, 5.5, 3.2 Hz, 1H), 1.99 (dddd, J=13.6, 5.8, 3.3, 2.2 Hz, 1H), 1.71 (dddd, J=13.6, 11.4, 10.0, 5.7 Hz, 1H), 1.39 (d, J=6.3 Hz, 3H), 1.33 (s, 12H).

Preparation P16

4-Methyl-6-(4,4,5,5-tetramethyl-1,3,2-dioxaborolan-2-yl)-3,4-dihydro-2H-1-benzopyran (P16)

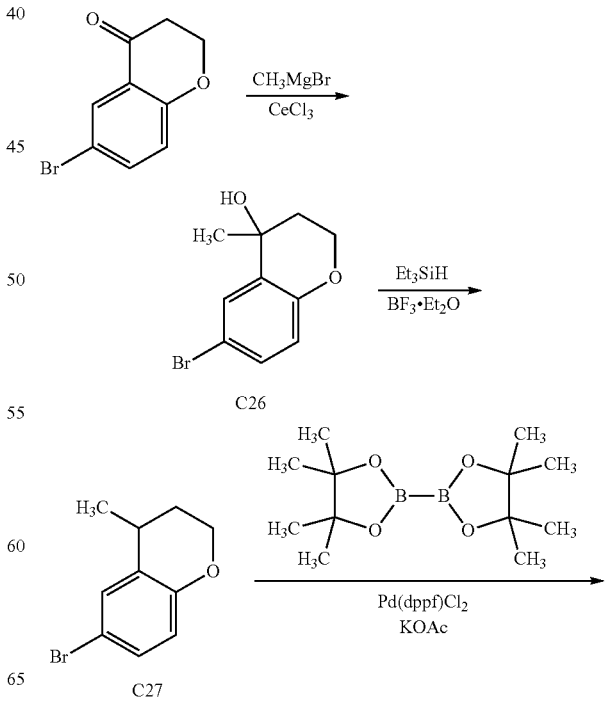

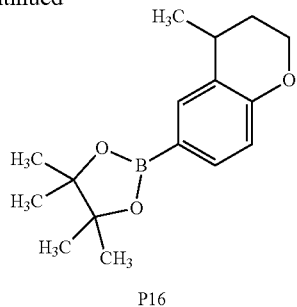

P16

Step 1. Synthesis of 6-bromo-4-methyl-3,4-dihydro-2H-1-benzopyran-4-ol (C26)

Cerium(III) chloride (2.17 g, 8.80 mmol) was added to a solution of 6-bromo-2,3-dihydro-4H-1-benzopyran-4-one (4.00 g, 17.6 mmol) in tetrahydrofuran (50 mL), whereupon the mixture was cooled to −50° C. and treated in a drop-wise manner with a solution of methylmagnesium chloride in diethyl ether (3.0 M; 17.6 mL, 52.8 mmol). After completion of the addition, the reaction mixture was allowed to warm to 25° C. over 16 hours, and then stirred at 25° C. for two days. Saturated aqueous ammonium chloride solution (80 mL) was added; the resulting mixture was extracted with ethyl acetate (2×60 mL) and the combined organic layers were washed with saturated aqueous sodium chloride solution (50 mL), dried over sodium sulfate, filtered, and concentrated in vacuo. Purification via chromatography on silica gel (Gradient: 0% to 20% ethyl acetate in petroleum ether) afforded C26 as a white solid. Yield: 2.60 g, 10.7 mmol, 61%. $^1$H NMR (400 MHz, chloroform-d) δ 7.58 (d, J=2.5 Hz, 1H), 7.25 (dd, J=8.7, 2.4 Hz, 1H), 6.71 (d, J=8.7 Hz, 1H), 4.32-4.17 (m, 2H), 2.08-2.03 (m, 2H), 1.85 (br s, 1H), 1.61 (s, 3H).

Step 2. Synthesis of 6-bromo-4-methyl-3,4-dihydro-2H-1-benzopyran (C27)

Boron trifluoride diethyl etherate (98%, 2.14 g, 14.8 mmol) was added in a drop-wise manner to a 0° C. solution of C26 (1.20 g, 4.94 mmol) and triethylsilane (2.87 g, 24.7 mmol) in dichloromethane (10 mL). After the reaction mixture had been stirred at 0° C. for 30 minutes, it was treated with saturated aqueous sodium bicarbonate solution; the aqueous layer was extracted with dichloromethane (3×30 mL), and the combined organic layers were washed with saturated aqueous sodium chloride solution (20 mL), dried over sodium sulfate, filtered, and concentrated in vacuo. Silica gel chromatography (Gradient: 0% to 1% ethyl acetate in petroleum ether) afforded C27 as a clear, colorless liquid. Yield: 801 mg, 3.53 mmol, 71%. GCMS m/z 226 (bromine isotope pattern observed) [M+H]$^+$. $^1$H NMR (400 MHz, chloroform-d) δ 7.25 (dd, J=2.4, 1.0 Hz, 1H), 7.16 (ddd, J=8.7, 2.4, 0.7 Hz, 1H), 6.67 (d, J=8.6 Hz, 1H), 4.24-4.10 (m, 2H), 2.98-2.86 (m, 1H), 2.11-2.00 (m, 1H), 1.76-1.65 (m, 1H), 1.32 (d, J=7.0 Hz, 3H).

Step 3. Synthesis of 4-methyl-6-(4,4,5,5-tetramethyl-1,3,2-dioxaborolan-2-yl)-3,4-dihydro-2H-1-benzopyran (P16)

A mixture of C27 (300 mg, 1.32 mmol), 4,4,4',4',5,5,5',5'-octamethyl-2,2'-bi-1,3,2-dioxaborolane (839 mg, 3.30 mmol), and potassium acetate (259 mg, 2.64 mmol) in 1,4-dioxane (12 mL) was degassed with nitrogen for 1 minute, whereupon [1,1'-bis(diphenylphosphino)ferrocene]dichloropalladium(II) (96.7 mg, 0.132 mmol) was added and the reaction mixture was heated at 100° C. for 16 hours. It was then filtered, and the filtrate was concentrated in vacuo, diluted with water (40 mL), and extracted with ethyl acetate (2×30 mL). The combined organic layers were washed with saturated aqueous sodium chloride solution (40 mL), dried over sodium sulfate, filtered, and concentrated under reduced pressure; chromatography on silica gel (Eluent: petroleum ether) provided P16 as a clear yellow liquid. Yield: 350 mg.

Preparation P17

8-Fluoro-3-methyl-7-(4,4,5,5-tetramethyl-1,3,2-dioxaborolan-2-yl)-3,4-dihydro-2H-1-benzopyran (P17)

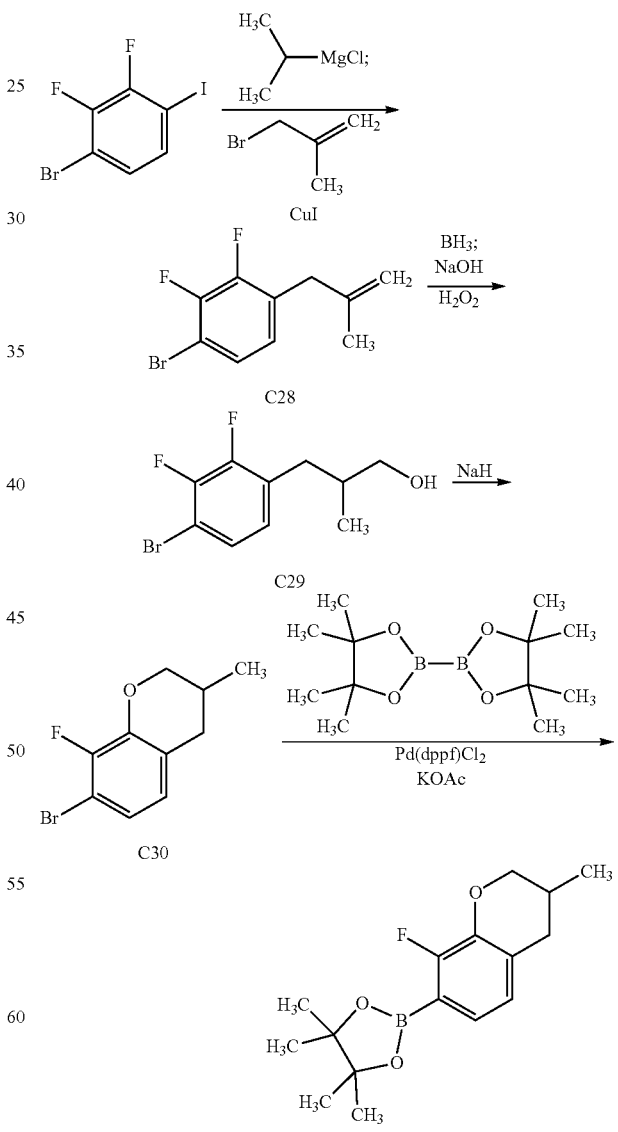

P17

Step 1. Synthesis of 1-bromo-2,3-difluoro-4-(2-methylprop-2-en-1-yl)benzene (C28)

A solution of (propan-2-yl)magnesium chloride (2 M; 4.08 mL, 8.16 mmol) was added in a drop-wise manner to a −20° C. solution of 1-bromo-2,3-difluoro-4-iodobenzene (2.00 g, 6.27 mmol) in tetrahydrofuran (10 mL). After the reaction mixture had been stirred for 10 minutes, it was warmed to 0° C. and stirred for an additional 50 minutes, whereupon copper(I) iodide (299 mg, 1.57 mmol) was added, and stirring was continued at 0° C. for 10 minutes. 3-Bromo-2-methylprop-1-ene (931 mg, 6.90 mmol) was then added; the reaction mixture was warmed to 25° C. and stirred for 16 hours. It was then treated with saturated aqueous ammonium chloride solution (30 mL), diluted with petroleum ether (8 mL), and extracted with ethyl acetate (3×10 mL). The combined organic layers were washed with saturated aqueous sodium chloride solution (20 mL), dried over sodium sulfate, filtered, and concentrated in vacuo to afford C28 as a yellow oil. Yield: 1.48 g, 5.99 mmol, 96%. $^1$H NMR (400 MHz, chloroform-d) δ 7.23 (ddd, J=8.3, 6.1, 2.1 Hz, 1H), 6.89-6.83 (m, 1H), 4.85 (br s, 1H), 4.69 (br s, 1H), 3.33 (s, 2H), 1.71 (s, 3H).

Step 2. Synthesis of 3-(4-bromo-2,3-difluorophenyl)-2-methylpropan-1-ol (C29)

To a 0° C. solution of C28 (1.48 g, 5.99 mmol) in tetrahydrofuran (10 mL) was added a solution of borane in tetrahydrofuran (1 M; 8.39 mL, 8.39 mmol), in a drop-wise manner. After the reaction mixture had been stirred for 30 minutes, it was warmed to room temperature, stirred for 2 hours, and cooled back to 0° C. An aqueous solution of sodium hydroxide (3 M; 9.98 mL, 29.9 mmol) was added, followed by hydrogen peroxide (30% in water; 3.06 mL, 30.0 mmol), and stirring was continued for 30 minutes, whereupon the reaction mixture was heated to 60° C. and stirred at that temperature for an additional 1.5 hours. After it had cooled to room temperature, the reaction mixture was diluted with water (10 mL) and extracted with ethyl acetate (3×10 mL); the combined organic layers were washed with saturated aqueous sodium chloride solution (3×20 mL), dried over sodium sulfate, filtered, and concentrated in vacuo. Purification via silica gel chromatography (Gradient: 0% to 30% ethyl acetate in petroleum ether) afforded C29 as a colorless oil. Yield: 800 mg, 3.02 mmol, 50%. $^1$H NMR (400 MHz, chloroform-d) δ 7.22 (ddd, J=8.2, 6.1, 2.0 Hz, 1H), 6.85 (ddd, J=8.3, 6.9, 2.0 Hz, 1H), 3.51 (dd, J=5.5, 5.5 Hz, 2H), 2.81 (ddd, J=13.5, 6.1, 1.6 Hz, 1H), 2.48 (ddd, J=13.6, 8.2, 1.6 Hz, 1H), 2.01-1.90 (m, 1H), 1.48-1.36 (m, 1H), 0.92 (d, J=6.8 Hz, 3H).

Step 3. Synthesis of 7-bromo-8-fluoro-3-methyl-3,4-dihydro-2H-1-benzopyran (C30)

Sodium hydride (60% dispersion in mineral oil; 315 mg, 7.88 mmol) was added to a 0° C. solution of C29 (950 mg, 3.58 mmol) in a mixture of toluene (16 mL) and N,N-dimethylformamide (4 mL), whereupon the reaction mixture was stirred for 16 hours at 25° C. Saturated aqueous ammonium chloride solution (10 mL) was added, and the resulting mixture was diluted with water (15 mL) and petroleum ether (9 mL) and extracted with petroleum ether (3×9 mL). The combined organic layers were washed with saturated aqueous sodium chloride solution, dried over sodium sulfate, filtered, and concentrated in vacuo, providing crude C30 as a yellow solution (2.7 mL). A portion of this solution was progressed directly to the following step.

The product of a similar reaction carried out using C29 was subjected to silica gel chromatography (Eluent: petroleum ether) to provide a purified sample of C30: $^1$H NMR (400 MHz, chloroform-d) δ 6.96 (dd, J=8.4, 6.2 Hz, 1H), 6.69 (br d, J=8.3 Hz, 1H), 4.28 (ddd, J=10.7, 3.5, 1.9 Hz, 1H), 3.74 (dd, J=10.6, 9.4 Hz, 1H), 2.81 (ddd, J=16.4, 5.1, 1.9 Hz, 1H), 2.40 (dd, J=16.3, 9.7 Hz, 1H), 2.23-2.10 (m, 1H), 1.06 (d, J=6.8 Hz, 3H).

Step 4. Synthesis of 8-fluoro-3-methyl-7-(4,4,5,5-tetramethyl-1,3,2-dioxaborolan-2-yl)-3,4-dihydro-2H-1-benzopyran (P17)

To a mixture of C30 (a portion of the solution from the previous step; 1.8 mL, 52.39 mmol) and 4,4,4',4',5,5,5',5'-octamethyl-2,2'-bi-1,3,2-dioxaborolane (361 mg, 1.42 mmol) in toluene (10 mL) was added potassium acetate (232 mg, 2.36 mmol) and [1,1'-bis(diphenylphosphino)ferrocene]dichloropalladium(II) (86.6 mg, 0.118 mmol). The reaction vessel was then evacuated and charged with nitrogen; this evacuation cycle was repeated twice, whereupon the reaction mixture was stirred at 100° C. for 16 hours. It was then filtered, and the filtrate was concentrated in vacuo and purified using chromatography on silica gel (Eluent: petroleum ether), affording P17 as a yellow oil. Yield: 189 mg, 0.647 mmol, 27% over 2 steps. $^1$H NMR (400 MHz, chloroform-d) δ 7.12 (dd, J=7.6, 5.2 Hz, 1H), 6.79 (br d, J=7.6 Hz, 1H), 4.25 (ddd, J=10.5, 3.5, 2.0 Hz, 1H), 3.71 (dd, J=10.6, 9.5 Hz, 1H), 2.85 (br dd, component of ABX system, J=16.6, 5.0 Hz, 1H), 2.45 (dd, component of ABX system, J=16.7, 9.7 Hz, 1H), 2.24-2.09 (m, 1H), 1.34 (s, 12H), 1.04 (d, J=6.8 Hz, 3H).

Preparation P18

2-(3-Ethyl-2,4,5-trifluorophenyl)-4,4,5,5-tetramethyl-1,3,2-dioxaborolane (P18)

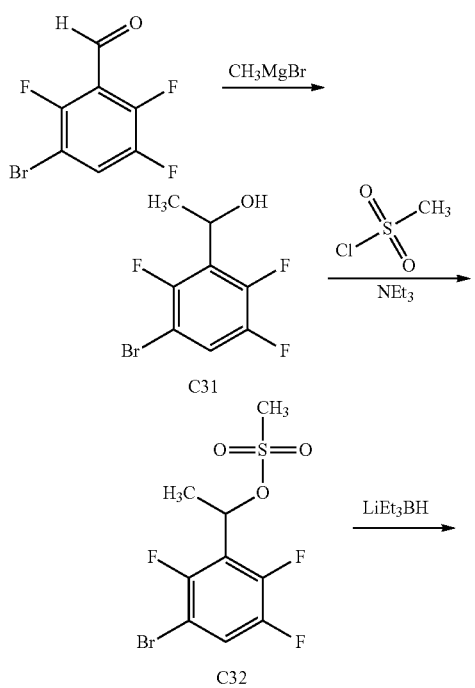

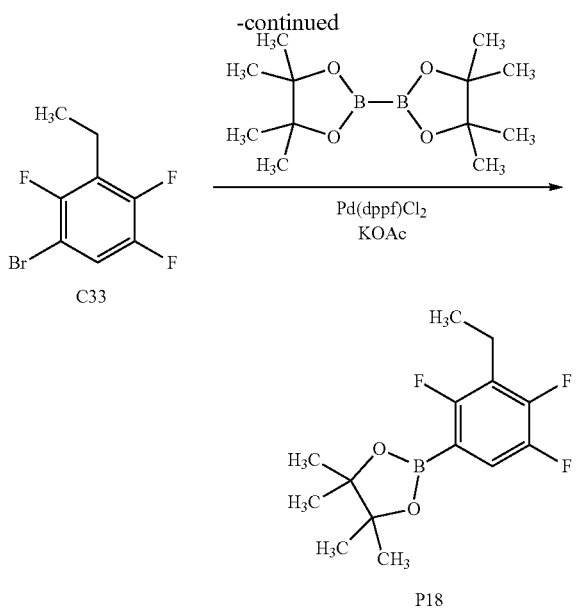

Step 1. Synthesis of 1-(3-bromo-2,5,6-trifluorophenyl)ethan-1-ol (C31)

A solution of methylmagnesium bromide (3 M; 4.58 mL, 13.7 mmol) was added in a drop-wise manner to a −78° C. solution of 3-bromo-2,5,6-trifluorobenzaldehyde (2.19 g, 9.16 mmol) in tetrahydrofuran (30 mL). The reaction mixture was stirred at −78° C. for 30 minutes, then at 0° C. for 1.5 hours, whereupon it was poured into aqueous ammonium chloride solution (100 mL) and extracted with ethyl acetate (50 mL). The combined organic layers were washed with saturated aqueous sodium chloride solution (100 mL), dried over sodium sulfate, filtered, and concentrated in vacuo; silica gel chromatography (Gradient: 0% to 7% ethyl acetate in petroleum ether) provided C31, which was combined with the product of a similar reaction carried out using 3-bromo-2,5,6-trifluorobenzaldehyde (500 mg, 2.09 mmol) to afford C31 as a colorless oil. Combined yield: 2.40 g, 9.41 mmol, 84%. $^1$H NMR (400 MHz, chloroform-d) δ 7.34 (ddd, J=8.6, 8.5, 6.4 Hz, 1H), 5.32-5.21 (m, 1H), 2.27 (br d, J=8.3 Hz, 1H), 1.64 (d, J=6.8 Hz, 3H).

Step 2. Synthesis of 1-(3-bromo-2,5,6-trifluorophenyl)ethyl methanesulfonate (C32)

A solution of methanesulfonyl chloride (0.824 mL, 10.6 mmol) in dichloromethane (12 mL) was added in a drop-wise manner to an ice-cooled solution of C31 (1.90 g, 7.45 mmol) and triethylamine (2.07 mL, 14.9 mmol) in dichloromethane (25 mL). After the reaction mixture had been stirred at 0° C. for 30 minutes, it was partitioned between dichloromethane (50 mL) and water (100 mL). The organic layer was dried over sodium sulfate, filtered, concentrated in vacuo, and purified using chromatography on silica gel (Gradient: 0% to 16% ethyl acetate in petroleum ether), affording C32 as a colorless oil. Yield: 2.40 g, 7.20 mmol, 97%. $^1$H NMR (400 MHz, chloroform-d) δ 7.44 (ddd, J=8.9, 8.1, 6.3 Hz, 1H), 6.08 (q, J=6.8 Hz, 1H), 2.98 (s, 3H), 1.81 (d, J=6.8 Hz, 3H).

Step 3. Synthesis of 1-bromo-3-ethyl-2,4,5-trifluorobenzene (C33)

To an ice-cooled solution of C32 (2.40 g, 7.20 mmol) in tetrahydrofuran (24 mL) was added a solution of lithium triethylborohydride (1 M; 14.4 mL, 14.4 mmol) in a dropwise manner. The reaction mixture was stirred at 0° C. for 30 minutes, then treated drop-wise with water (50 mL) at 0° C. and diluted with petroleum ether (20 mL). The organic layer was dried over sodium sulfate, filtered, and concentrated under reduced pressure at 20° C. Silica gel chromatography (Eluent: petroleum ether) afforded C33 as a colorless oil. Yield: 1.31 g, 5.48 mmol, 76%. $^1$H NMR (400 MHz, chloroform-d) δ 7.24 (ddd, J=9, 8, 6.5 Hz, 1H), 2.75 (qt, J=7.6, 1.4 Hz, 2H), 1.22 (t, J=7.6 Hz, 3H).

Step 4. Synthesis of 2-(3-ethyl-2,4,5-trifluorophenyl)-4,4,5,5-tetramethyl-1,3,2-dioxaborolane (P18)

A mixture of C33 (400 mg, 1.67 mmol), 4,4,4',4',5,5,5',5'-octamethyl-2,2'-bi-1,3,2-dioxaborolane (850 mg, 3.35 mmol), potassium acetate (328 mg, 3.34 mmol), and [1,1'-bis(diphenylphosphino)ferrocene]dichloropalladium(II) (122 mg, 0.167 mmol) in 1,4-dioxane (8.4 mL) was degassed with nitrogen for 2 minutes, then heated at 95° C. for 16 hours. Concentration in vacuo provided a residue, which was purified using chromatography on silica gel (Gradient: 0% to 5% ethyl acetate in petroleum ether) to afford P18 as a yellow oil. Yield: 330 mg, 1.15 mmol, 69%. $^1$H NMR (400 MHz, chloroform-d) δ 7.34 (ddd, J=9.7, 9.7, 5.2 Hz, 1H), 2.70 (qt, J=7.5, 1.6 Hz, 2H), 1.35 (s, 12H), 1.20 (t, J=7.6 Hz, 3H).

Preparation P19

3-Chloro-1,5-difluoro-2-iodo-4-methoxybenzene (P19)

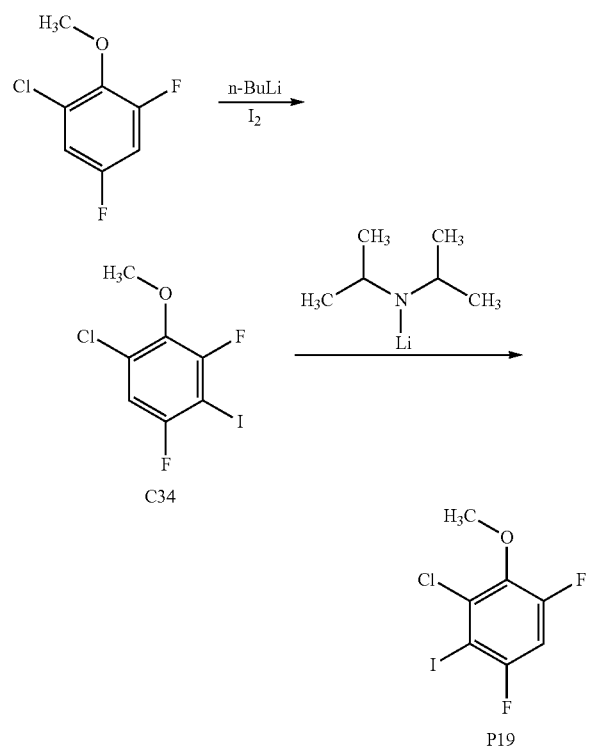

Step 1. Synthesis of 1-chloro-3,5-difluoro-4-iodo-2-methoxybenzene (C34)

A solution of n-butyllithium (2.5 M; 2.67 mL, 6.68 mmol) was added in a drop-wise manner to a −65° C. solution of 1-chloro-3,5-difluoro-2-methoxybenzene (1.09 g, 6.10 mmol) in tetrahydrofuran (33 mL). After the reaction mixture had been stirred at −65° C. for 1 hour, iodine (1.56 g, 6.15 mmol) was added, and the reaction mixture was allowed to warm to room temperature and stir at 20° C. for 2 hours. Aqueous ammonium chloride solution (10 mL) was added, and the resulting mixture was extracted with petroleum ether (3×10 mL); the combined organic layers were washed with saturated aqueous sodium chloride solution (20 mL), dried over sodium sulfate, filtered, and concentrated in vacuo to provide C34 as a brown oil. Yield: 1.68 g, 5.52 mmol, 90%. $^1$H NMR (400 MHz, chloroform-d) δ 6.99 (dd, J=7.3, 2.3 Hz, 1H), 3.92 (d, J=1.0 Hz, 3H).

Step 2. Synthesis of 3-chloro-1,5-difluoro-2-iodo-4-methoxybenzene (P19)

To a −65° C. solution of C34 (1.68 g, 5.52 mmol) in tetrahydrofuran (30 mL) was added a solution of lithium diisopropylamide (2 M; 3.59 mL, 7.18 mmol), and the reaction mixture was stirred at 20° C. for 2 hours. After the reaction had been quenched by addition of aqueous ammonium chloride solution (5 mL), the resulting mixture was extracted with petroleum ether (3×3 mL). The combined organic layers were washed with saturated aqueous sodium chloride solution (6 mL), dried over sodium sulfate, filtered, and concentrated in vacuo to afford P19 as a yellow oil. Yield: 1.23 g, 4.04 mmol, 73%. $^1$H NMR (400 MHz, chloroform-d) δ 6.91 (dd, J=10.4, 7.6 Hz, 1H), 3.92 (d, J=1.0 Hz, 3H).

Preparation P20

3-Fluoro-6-iodo-2-methoxybenzonitrile (P20)

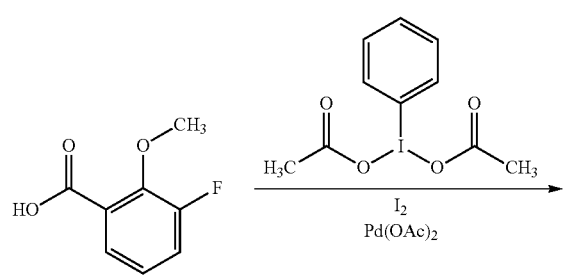

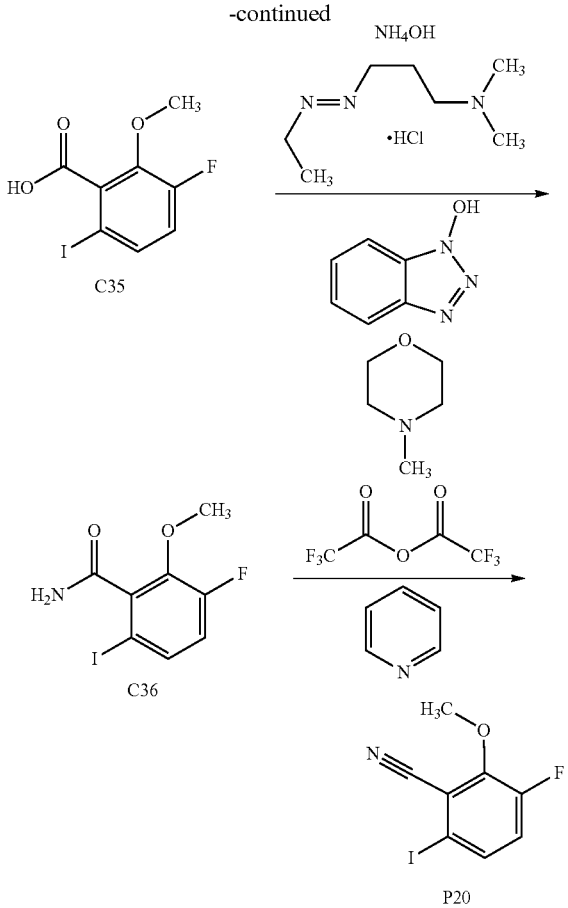

Step 1. Synthesis of 3-fluoro-6-iodo-2-methoxybenzoic acid (C35)

Palladium(II) acetate (66.0 mg, 0.294 mmol) was added to a mixture of 3-fluoro-2-methoxybenzoic acid (1.00 g, 5.88 mmol), (diacetoxyiodo)benzene (1.89 g, 5.87 mmol), and iodine (1.49 g, 5.87 mmol) in N,N-dimethylformamide (30 mL), whereupon the reaction mixture was stirred at 120° C. for 16 hours. It was then diluted with aqueous sodium sulfate solution (40 mL) and the resulting mixture was adjusted to a pH of approximately 4. After extraction with ethyl acetate (3×25 mL), the combined organic layers were washed with saturated aqueous sodium chloride solution, dried over sodium sulfate, filtered, and concentrated in vacuo. Silica gel chromatography (Gradient: 0% to 50% ethyl acetate in petroleum ether) provided C35 as a colorless gum (1.20 g); this material contained impurities by $^1$H NMR analysis. A portion of this lot was used in the following step. $^1$H NMR (400 MHz, chloroform-d), product peaks only: δ 7.49 (dd, J=8.7, 4.3 Hz, 1H), 6.92 (dd, J=11.2, 8.7 Hz, 1H), 3.99 (d, J=2.0 Hz, 3H).

Step 2. Synthesis of 3-fluoro-6-iodo-2-methoxybenzamide (C36)

A mixture of C35 (from the previous step; 200 mg, <0.676 mmol), 1H-benzotriazol-1-ol (274 mg, 2.03 mmol), and 1-[3-(dimethylamino)propyl]-3-ethylcarbodiimide hydrochloride (298 mg, 1.55 mmol) in tetrahydrofuran (3.5 mL) was stirred at 15° C. for 1 hour, whereupon 4-methylmorpholine (226 mg, 2.23 mmol) and aqueous ammonium hydroxide solution (1.5 mL) were added; stirring was continued at 15° C. for 16 hours. The reaction mixture was then diluted with water (4 mL) and extracted with ethyl acetate (3×5 mL). The combined organic layers were washed with saturated aqueous sodium chloride solution (5 mL), dried over sodium sulfate, filtered, concentrated in vacuo, and purified via chromatography on silica gel (Gradient: 0% to 20% ethyl acetate in petroleum ether), affording C36 as a white solid. Yield: 86 mg, 0.29 mmol, 30% over 2 steps. $^1$H NMR (400 MHz, DMSO-$d_6$) δ 7.89 (br s, 1H), 7.63 (br s, 1H), 7.55 (dd, J=8.7, 4.5 Hz, 1H), 7.10 (dd, J=11.5, 8.7 Hz, 1H), 3.83 (d, J=1.3 Hz, 3H).

Step 3. Synthesis of 3-fluoro-6-iodo-2-methoxybenzonitrile (P20)

Trifluoroacetic anhydride (306 mg, 1.46 mmol) was added to a 15° C. mixture of C36 (86.0 mg, 0.29 mmol) and pyridine (0.236 mL, 2.92 mmol) in dichloromethane (2.0 mL). After the reaction mixture had been stirred at 15° C. for 16 hours, it was concentrated under reduced pressure, diluted with water (5 mL), and extracted with ethyl acetate (3×2 mL). The combined organic layers were washed with saturated aqueous sodium chloride solution (3 mL), dried over sodium sulfate, filtered, and concentrated in vacuo. Silica gel chromatography (Gradient: 0% to 20% ethyl acetate in petroleum ether) provided P20 as a colorless gum. Yield: 79 mg, 0.285 mmol, 98%. $^1$H NMR (400 MHz, DMSO-$d_6$) δ 7.70 (dd, J=8.7, 4.4 Hz, 1H), 7.45 (dd, J=12.1, 8.7 Hz, 1H), 4.06 (d, J=2.8 Hz, 3H).

Example 1

3-(5,7-Difluoro-3,4-dihydro-2H-1-benzopyran-6-yl)-6-fluoro-1-benzothiophene-2-carboxylic acid (1)

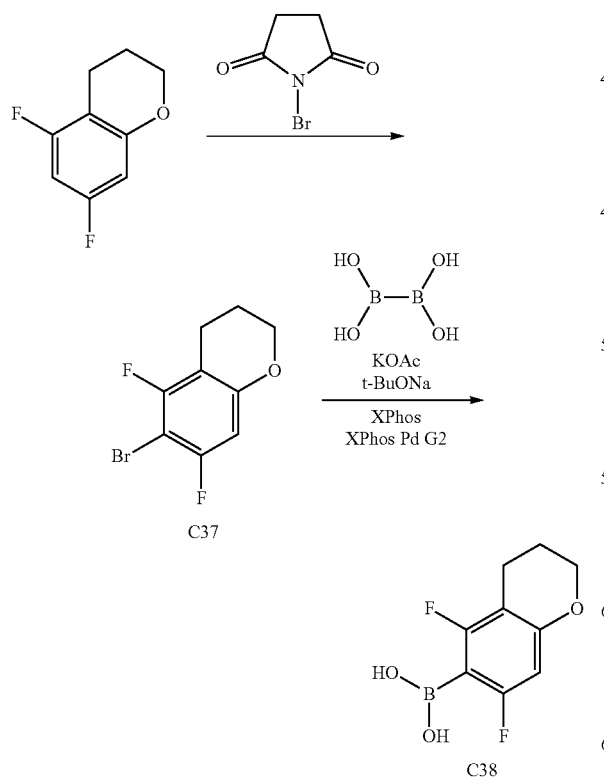

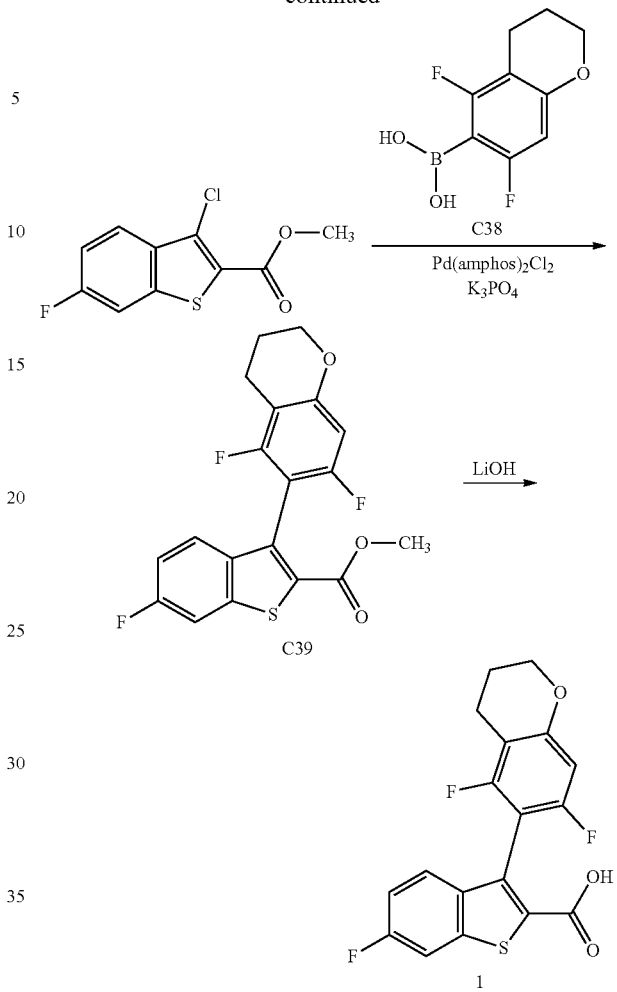

Step 1. Synthesis of 6-bromo-5,7-difluoro-3,4-dihydro-2H-1-benzopyran (C37)

N-Bromosuccinimide (819 mg, 4.60 mmol) was added to a 0° C. mixture of 5,7-difluoro-3,4-dihydro-2H-1-benzopyran (783 mg, 4.60 mmol) in acetonitrile (20 mL). After the reaction mixture had been stirred at 25° C. for 16 hours, it was diluted with water and extracted with ethyl acetate (3×20 mL). The combined organic layers were washed with saturated aqueous sodium chloride solution, dried over sodium sulfate, filtered, and concentrated in vacuo; purification using silica gel chromatography (Eluent: petroleum ether) provided C37 as a white solid. Yield: 855 mg, 3.43 mmol, 75%. $^1$H NMR (400 MHz, chloroform-d) δ 6.46 (dd, J=9.8, 2.1 Hz, 1H), 4.20-4.15 (m, 2H), 2.75-2.69 (m, 2H), 2.02-1.94 (m, 2H).

Step 2. Synthesis of (5,7-difluoro-3,4-dihydro-2H-1-benzopyran-6-yl)boronic acid (C38)

A reaction flask containing C37 (920 mg, 3.69 mmol), potassium acetate (906 mg, 9.23 mmol), sodium tert-butoxide (4 mg, 40 µmol), chloro(2-dicyclohexylphosphino-2',4',6'-triisopropyl-1,1'-biphenyl)[2-(2'-amino-1,1'-biphenyl)]palladium(II) (XPhos Pd G2; 29 mg, 37 µmol), and 2-dicyclohexylphosphino-2',4',6'-triisopropylbiphenyl (XPhos; 53 mg, 0.11 mmol) was purged with nitrogen. Methanol (20 mL), ethane-1,2-diol (2 mL) and tetrahydroxydiborane (364 mg, 4.06 mmol) were added, and nitrogen was bubbled through the reaction mixture for 10 minutes, whereupon it was heated to 50° C. (internal temperature) for 6 hours. The reaction mixture was then concentrated in vacuo, diluted with water (20 mL), and extracted with ethyl acetate (3×20 mL). The combined organic layers were washed with saturated aqueous sodium chloride solution (30 mL), dried over sodium sulfate, filtered, and concentrated in vacuo. After chromatography on silica gel (Gradient: 0% to 50% ethyl acetate in petroleum ether), C38 was obtained as a yellow solid. By $^1$H NMR analysis, this material contained impurities. Yield: 243 mg, <1.14 mmol, <31%. $^1$H NMR (400 MHz, DMSO-d$_6$), characteristic peaks: δ 6.40 (dd, J=9.9, 1.5 Hz, 1H), 4.18-4.10 (m, 2H), 2.62-2.56 (m, 2H), 1.94-1.85 (m, 2H).

Step 3. Synthesis of methyl 3-(5,7-difluoro-3,4-dihydro-2H-1-benzopyran-6-yl)-6-fluoro-1-benzothiophene-2-carboxylate (C39)

To a solution of methyl 3-chloro-6-fluoro-1-benzothiophene-2-carboxylate (114 mg, 0.466 mmol) in 1,4-dioxane (1.5 mL) were added C38 (100 mg, 0.47 mmol), tripotassium phosphate (198 mg, 0.933 mmol), bis[di-tert-butyl(4-dimethylaminophenyl)phosphine]dichloropalladium(II) [Pd (amphos)$_2$Cl$_2$; 33 mg, 47 µmol], and water (0.25 mL). After nitrogen had been bubbled through the reaction mixture for 2 minutes, it was stirred at 110° C. for 16 hours, whereupon LCMS analysis indicated the presence of C39: LCMS m/z 379.3 [M+H]$^+$. The reaction mixture was diluted with water (10 mL) and extracted with ethyl acetate (2×15 mL). The combined organic layers were washed with saturated aqueous sodium chloride solution, dried over sodium sulfate, filtered, concentrated in vacuo, and subjected to silica gel chromatography (Gradient: 0% to 10% ethyl acetate in petroleum ether), affording C39 as a white solid. Yield: 10 mg, 26 µmol, 6%. $^1$H NMR (400 MHz, methanol-d$_4$) δ 7.75 (dd, J=8.8, 2.3 Hz, 1H), 7.48 (br dd, J=9.2, 5.2 Hz, 1H), 7.23 (ddd, J=9.0, 9.0, 2.4 Hz, 1H), 6.54 (dd, J=10.8, 1.9 Hz, 1H), 4.27 (dd, J=5.9, 4.5 Hz, 2H), 3.80 (s, 3H), 2.75 (br dd, J=6.5, 6.5 Hz, 2H), 2.09-2.00 (m, 2H).

Step 4. Synthesis of 3-(5,7-difluoro-3,4-dihydro-2H-1-benzopyran-6-yl)-6-fluoro-1-benzothiophene-2-carboxylic acid (1)

A solution of lithium hydroxide (3.8 mg, 0.16 mmol) in water (1.0 mL) was added to a solution of C39 (10 mg, 26 µmol) in a mixture of methanol (1.0 mL) and tetrahydrofuran (1.0 mL). The reaction mixture was stirred at 60° C. for 16 hours, whereupon it was diluted with water (20 mL), concentrated in vacuo to remove methanol and tetrahydrofuran, and washed with dichloromethane (3×25 mL). The aqueous layer was adjusted to a pH of 4 by addition of 1 M hydrochloric acid and then extracted with ethyl acetate (3×15 mL). The combined ethyl acetate layers were dried over sodium sulfate, filtered, and concentrated in vacuo to afford 3-(5,7-difluoro-3,4-dihydro-2H-1-benzopyran-6-yl)-6-fluoro-1-benzothiophene-2-carboxylic acid (1) as a yellow solid. Yield: 2.6 mg, 7.1 µmol, 27%. LCMS m/z 365.1 [M+H]$^+$. $^1$H NMR (400 MHz, methanol-d$_4$) δ 7.72 (dd, J=8.8, 2.4 Hz, 1H), 7.44 (br dd, J=9.0, 5.1 Hz, 1H), 7.20 (ddd, J=9.0, 9.0, 2.4 Hz, 1H), 6.51 (dd, J=10.7, 1.9 Hz, 1H), 4.28-4.22 (m, 2H), 2.75 (br dd, J=6.5, 6.5 Hz, 2H), 2.08-2.00 (m, 2H).

Example 2

6-Fluoro-3-(2,4,6-trifluoro-3-methoxyphenyl)-1-benzothiophene-2-carboxylic acid (2)

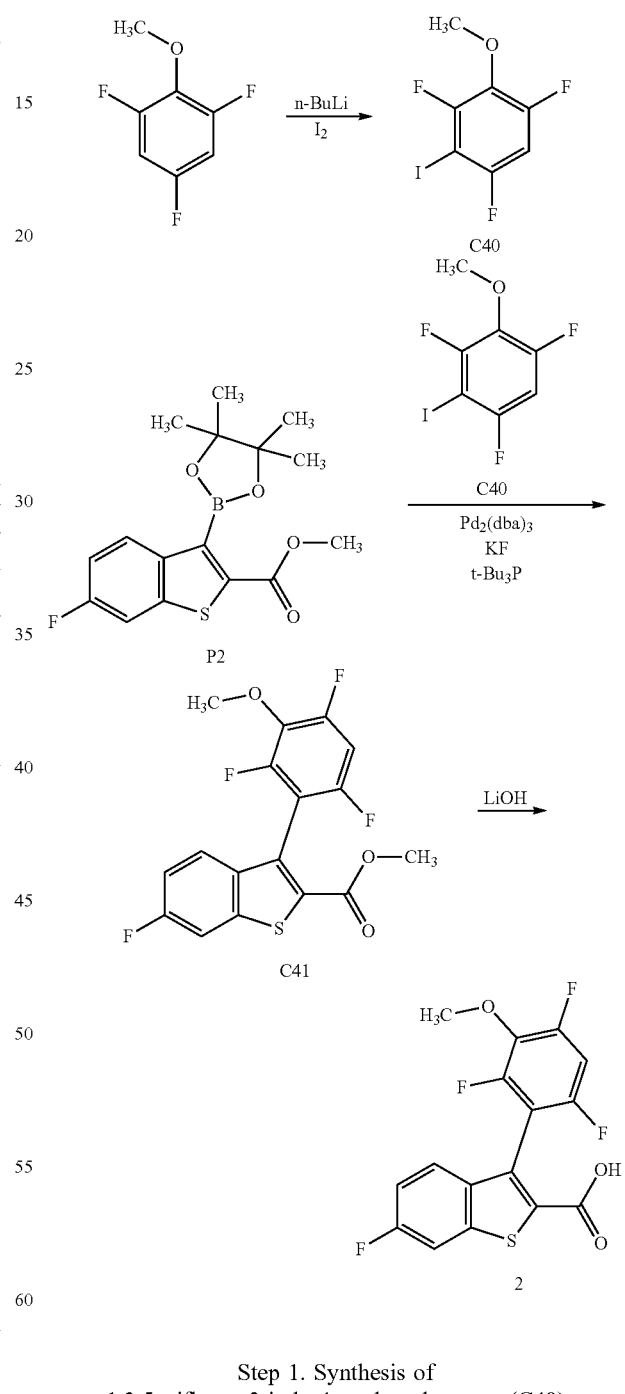

Step 1. Synthesis of 1,3,5-trifluoro-2-iodo-4-methoxybenzene (C40)

A solution of n-butyllithium in hexane (2.5 M; 9.50 mL, 23.8 mmol) was added in a drop-wise manner to a −70° C.

to −75° C. solution of 1,3,5-trifluoro-2-methoxybenzene (3.5 g, 22 mmol) in tetrahydrofuran (40 mL). After the reaction mixture had been stirred for 75 minutes at −75° C., it was treated drop-wise with a solution of iodine (9.97 g, 39.3 mmol) in tetrahydrofuran (22 mL). The reaction mixture was stirred for an additional 20 minutes, whereupon it was allowed to warm to room temperature, diluted with diethyl ether, and washed with saturated aqueous sodium thiosulfate solution. The aqueous layer was extracted once with diethyl ether, and the combined organic layers were washed with saturated aqueous sodium chloride solution, dried over sodium sulfate, filtered, and concentrated in vacuo at a bath temperature of 35° C.; C40 was obtained as a yellow oil. Yield: 6.15 g, 21.4 mmol, 97%. GCMS m/z 288.1 [M⁺]. ¹H NMR (400 MHz, methanol-d₄) δ 7.03 (ddd, J=10.7, 8.0, 2.4 Hz, 1H), 3.92 (br s, 3H).

Step 2. Synthesis of methyl 6-fluoro-3-(2,4,6-trifluoro-3-methoxyphenyl)-1-benzothiophene-2-carboxylate (C41)

A suspension of C40 (100 mg, 0.347 mmol), P2 (117 mg, 0.348 mmol), potassium fluoride (40.3 mg, 0.694 mmol), and tris(dibenzylideneacetone)dipalladium(0) [Pd₂(dba)₃; 15.9 mg, 17.4 µmol], in a mixture of 1,4-dioxane (3 mL) and water (0.3 mL), was degassed with nitrogen for 1 minute, whereupon tri-tert-butylphosphine (7.02 mg, 34.7 µmol) was added. After the reaction mixture had been stirred at 75° C. for 16 hours, it was concentrated in vacuo and purified via chromatography on silica gel (Gradient: 0% to 5% ethyl acetate in petroleum ether), affording C41 as a colorless gum. Yield: 40.0 mg, 0.108 mmol, 31%. ¹H NMR (400 MHz, chloroform-d) δ 7.58 (dd, J=8.5, 2.4 Hz, 1H), 7.44 (br dd, J=9.1, 5.1 Hz, 1H), 7.17 (ddd, J=8.9, 8.8, 2.3 Hz, 1H), 6.86 (ddd, J=11.0, 9.1, 2.3 Hz, 1H), 4.00 (br s, 3H), 3.84 (s, 3H).

Step 3. Synthesis of 6-fluoro-3-(2,4,6-trifluoro-3-methoxyphenyl)-1-benzothiophene-2-carboxylic acid (2)

Lithium hydroxide (25.9 mg, 1.08 mmol) was added to a solution of C41 (40.0 mg, 0.108 mmol) in a mixture of tetrahydrofuran (2 mL), methanol (1 mL), and water (1 mL). The reaction mixture was stirred at 25° C. for 2 hours, whereupon it was acidified to a pH of approximately 3 by addition of hydrochloric acid. After the resulting mixture had been extracted with ethyl acetate (3×3 mL), the combined organic layers were concentrated in vacuo and purified via reversed-phase HPLC (Column: Phenomenex Gemini C18, 50×250 mm, 10 µm; Mobile phase A: water containing 0.225% formic acid; Mobile phase B: acetonitrile; Gradient: 48% to 68% B; Flow rate: 25 mL/minute), affording 6-fluoro-3-(2,4,6-trifluoro-3-methoxyphenyl)-1-benzothiophene-2-carboxylic acid (2) as a white solid. Yield: 10.4 mg, 29.2 µmol, 27%. LCMS m/z 354.9 [M−H]⁻. ¹H NMR (400 MHz, chloroform-d) δ 7.60 (dd, J=8.4, 2.3 Hz, 1H), 7.45 (br dd, J=9.0, 5.0 Hz, 1H), 7.18 (ddd, J=8.8, 8.8, 2.4 Hz, 1H), 6.86 (ddd, J=10.8, 9.0, 2.2 Hz, 1H), 4.00 (s, 3H).

Example 3

3-(5,7-Difluoro-2-methyl-3,4-dihydro-2H-1-benzopyran-6-yl)-6-fluoro-1-benzothiophene-2-carboxylic acid (3)

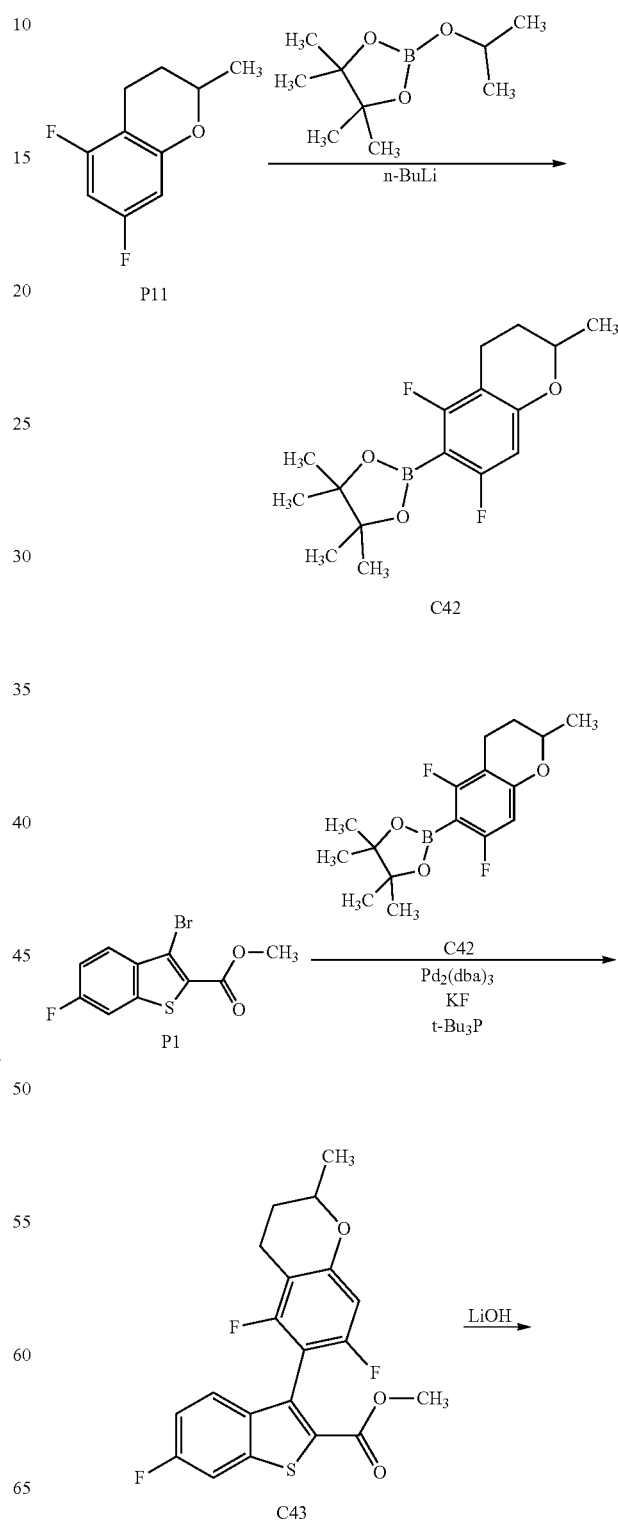

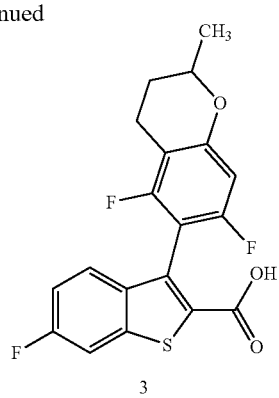

3

Step 1. Synthesis of 5,7-difluoro-2-methyl-6-(4,4,5,5-tetramethyl-1,3,2-dioxaborolan-2-yl)-3,4-dihydro-2H-1-benzopyran (C42)

A solution of n-butyllithium in hexane (2.5 M; 1.63 mL, 4.08 mmol) was added in a drop-wise manner to a −65° C. solution of P11 (300 mg, 1.63 mmol) in tetrahydrofuran (8 mL). After the reaction mixture had been stirred at −65° C. for 1 hour, 4,4,5,5-tetramethyl-2-(propan-2-yloxy)-1,3,2-dioxaborolane (909 mg, 4.89 mmol) was added and the reaction mixture was warmed to 25° C. and stirred at that temperature for 1 hour. Aqueous ammonium chloride solution (15 mL) was added, and the resulting mixture was extracted with ethyl acetate (3×20 mL); the combined organic layers were washed with saturated aqueous sodium chloride solution (30 mL), dried over sodium sulfate, filtered, and concentrated in vacuo. Silica gel chromatography (0% to 10% ethyl acetate in petroleum ether) provided C42 as a yellow oil. Yield: 350 mg, 1.13 mmol, 69%. $^1$H NMR (400 MHz, chloroform-d) δ 6.31 (dd, J=10.6, 1.7 Hz, 1H), 4.18-4.10 (m, 1H), 2.82-2.71 (m, 1H), 2.65-2.51 (m, 1H), 2.03-1.95 (m, 1H), 1.70-1.58 (m, 1H), 1.38 (d, J=6.4 Hz, 3H), 1.36 (s, 12H).

Step 2. Synthesis of methyl 3-(5,7-difluoro-2-methyl-3,4-dihydro-2H-1-benzopyran-6-yl)-6-fluoro-1-benzothiophene-2-carboxylate (C43)

A suspension of P1 (110 mg, 0.380 mmol), potassium fluoride (72.9 mg, 1.25 mmol), and C42 (165 mg, 0.532 mmol) in a mixture of tetrahydrofuran (2.0 mL) and water (0.2 mL) was degassed with nitrogen for 2 minutes, whereupon tris(dibenzylideneacetone)dipalladium(0) (6.97 mg, 7.61 µmol) and tri-tert-butylphosphine (80 mg, 0.4 mmol) were added. After the reaction mixture had been stirred at 60° C. for 18 hours, it was filtered. The filtrate was concentrated in vacuo and purified via silica gel chromatography (Gradient: 0% to 10% ethyl acetate in petroleum ether), affording C43 as a colorless gum. Examination of the $^1$H NMR spectrum suggested that this material exists as a mixture of rotamers. Yield: 110 mg, 0.280 mmol, 74%. $^1$H NMR (400 MHz, chloroform-d) δ 7.55 (dd, J=8.5, 2.3 Hz, 1H), 7.51-7.45 (m, 1H), 7.17-7.10 (m, 1H), 6.55-6.49 (m, 1H), 4.25-4.17 (m, 1H), [3.84 (s) and 3.83 (s), total 3H], 2.90-2.78 (m, 1H), 2.77-2.64 (m, 1H), 2.11-2.01 (m, 1H), 1.80-1.65 (m, 1H), 1.44 (d, J=6.3 Hz, 3H).

Step 3. Synthesis of 3-(5,7-difluoro-2-methyl-3,4-dihydro-2H-1-benzopyran-6-yl)-6-fluoro-1-benzothiophene-2-carboxylic acid (3)

To a solution of C43 (110 mg, 0.280 mmol) in a mixture of tetrahydrofuran (1 mL), methanol (1 mL), and water (0.2 mL) was added lithium hydroxide monohydrate (82.3 mg, 1.96 mmol). After the reaction mixture had been stirred at 25° C. for 16 hours, it was adjusted to a pH of approximately 4, and extracted with ethyl acetate (3×4 mL). The combined organic layers were washed with saturated aqueous sodium chloride solution (8 mL), dried over sodium sulfate, filtered, concentrated in vacuo, and purified by preparative thin-layer chromatography (Eluent: 1:1 petroleum ether/ethyl acetate) to afford 3-(5,7-difluoro-2-methyl-3,4-dihydro-2H-1-benzopyran-6-yl)-6-fluoro-1-benzothiophene-2-carboxylic acid (3) as a white solid. Yield: 100 mg, 0.26 mmol, 93%. LCMS m/z 379.0 [M+H]$^+$. $^1$H NMR (400 MHz, methanol-d$_4$) δ 7.60 (dd, J=8.9, 2.4 Hz, 1H), 7.36-7.29 (m, 1H), 7.10 (ddd, J=9.0, 9.0, 2.4 Hz, 1H), 6.45 (dd, J=10.7, 1.8 Hz, 1H), 4.25-4.13 (m, 1H), 2.90-2.76 (m, 1H), 2.76-2.61 (m, 1H), 2.13-2.03 (m, 1H), 1.74-1.61 (m, 1H), 1.41 (br d, J=6.3 Hz, 3H).

Example 4

6,7-Difluoro-3-phenyl-1-benzothiophene-2-carboxylic acid (4)

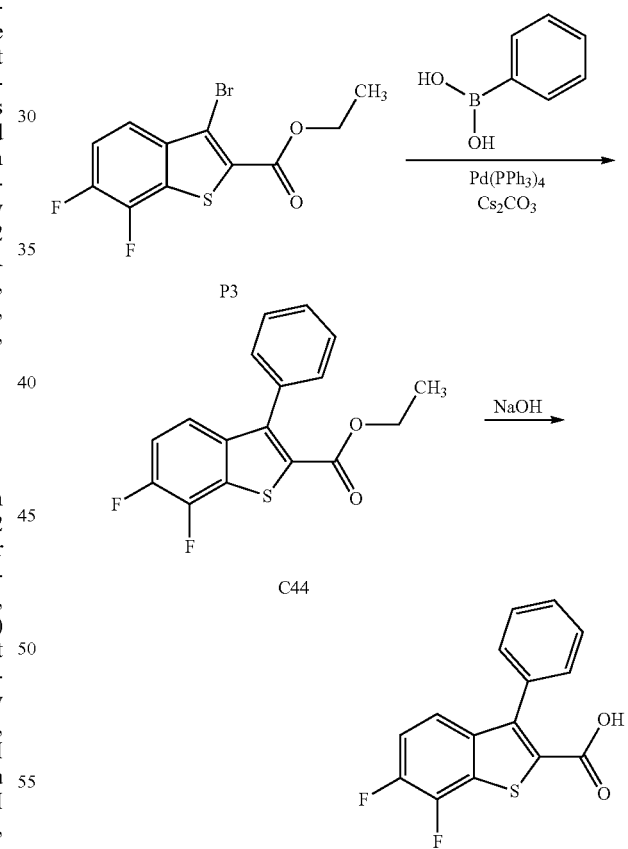

Step 1. Synthesis of ethyl 6,7-difluoro-3-phenyl-1-benzothiophene-2-carboxylate (C44)

To a suspension of phenylboronic acid (190 mg, 1.56 mmol) and P3 (334 mg, 1.04 mmol) in a mixture of 1,4-dioxane (8 mL) and water (2 mL) were added cesium carbonate (1.02 g, 3.13 mmol) and tetrakis(triphenylphosphine)palladium(0) (120 mg, 0.104 mmol). The reaction was stirred at 90° C. for 16 hours, whereupon it was concentrated in vacuo and purified via silica gel chromatography (Eluent: petroleum ether) to provide C44 as a white solid. Yield: 67.7 mg, 0.213 mmol, 20%. $^1$H NMR (400 MHz, chloroform-d), characteristic peaks: δ 7.29-7.24 (m, 1H, assumed; partially obscured by solvent peak), 7.20 (ddd, J=9.8, 9.2, 6.8 Hz, 1H), 4.24 (q, J=7.1 Hz, 2H), 1.21 (t, J=7.1 Hz, 3H).

Step 2. Synthesis of 6,7-difluoro-3-phenyl-1-benzothiophene-2-carboxylic acid (4)

To a suspension of C44 (67.7 mg, 0.213 mmol) in a mixture of methanol (1 mL) and tetrahydrofuran (1 mL) was added a solution of sodium hydroxide (42.5 mg, 1.06 mmol) in water (0.5 mL). After the reaction mixture had been stirred at room temperature (26° C.) for 16 hours, it was concentrated in vacuo, and the residue was acidified to a pH of approximately 6 by addition of 1 M hydrochloric acid. Filtration of the resulting suspension provided a solid, which was purified using reversed-phase HPLC (Column: Phenomenex Gemini NX-C18, 30×75 mm, 3 μm; Mobile phase A: water containing 0.05% ammonium hydroxide (v/v); Mobile phase B: acetonitrile; Gradient: 0% to 32% B; Flow rate: 25 mL/minute) to afford 6,7-difluoro-3-phenyl-1-benzothiophene-2-carboxylic acid (4) as a white solid. Yield: 15.3 mg, 52.7 μmol, 25%. LCMS m/z 291.0 [M+H]$^+$. $^1$H NMR (400 MHz, DMSO-d$_6$) δ 7.57-7.43 (m, 4H), 7.43-7.38 (m, 2H), 7.24 (br dd, J=9, 4 Hz, 1H).

Example 5

Ammonium 4,6-difluoro-3-phenyl-1-benzothiophene-2-carboxylate (5)

Step 1. Synthesis of ethyl 4,6-difluoro-3-phenyl-1-benzothiophene-2-carboxylate (C45)

Cesium carbonate (1.22 g, 3.74 mmol) and tetrakis(triphenylphosphine)palladium(0) (144 mg, 0.125 mmol) were added to a suspension of P4 (400 mg, 1.25 mmol) and phenylboronic acid (228 mg, 1.87 mmol) in a mixture of 1,4-dioxane (8.0 mL) and water (2.0 mL). After the reaction mixture had been stirred at 90° C. for 16 hours, LCMS analysis indicated the presence of C45: LCMS m/z 318.9 [M+H]$^+$. Solvents were removed in vacuo, and the residue was purified via silica gel chromatography (Eluent: petroleum ether), providing C45 as a white solid. Yield: 282 mg, 0.886 mmol, 71%.

Step 2. Synthesis of ammonium 4,6-difluoro-3-phenyl-1-benzothiophene-2-carboxylate (5)

To a suspension of C45 (282 mg, 0.886 mmol) in a mixture of methanol (4 mL) and tetrahydrofuran (4 mL) was added a solution of sodium hydroxide (177 mg, 4.42 mmol) in water (2 mL), and the reaction mixture was stirred at room temperature (26° C.) for 16 hours. It was then concentrated in vacuo, and the residue was acidified to a pH of approximately 6 by addition of 1 M hydrochloric acid. Filtration provided a solid, which was purified by reversed-phase HPLC (Column: Phenomenex Gemini NX-C18, 30×75 mm, 3 μm; Mobile phase A: water containing 0.05% ammonium hydroxide (v/v); Mobile phase B: acetonitrile; Gradient: 0% to 31% B; Flow rate: 25 mL/minute) to afford ammonium 4,6-difluoro-3-phenyl-1-benzothiophene-2-carboxylate (5) as a white solid. Yield: 91.4 mg, 0.315 mmol, 36%. LCMS m/z 288.9 [M−H]$^-$. $^1$H NMR (400 MHz, DMSO-d$_6$) δ 7.67 (dd, J=8.7, 2.3 Hz, 1H), 7.35-7.23 (m, 5H), 7.05 (ddd, J=11.9, 9.6, 2.3 Hz, 1H), 6.74 (br s, approximately 4H).

Example 6

6-Chloro-5-fluoro-3-phenyl-1-benzothiophene-2-carboxylic acid (6)

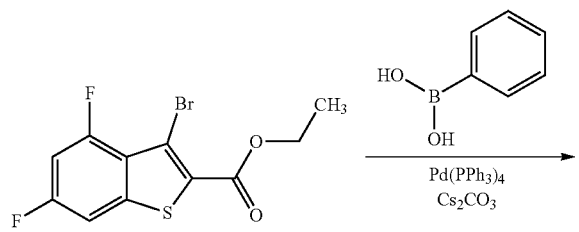

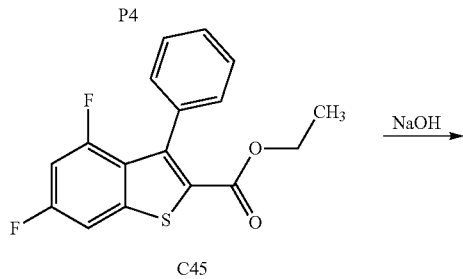

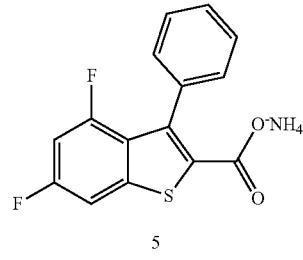

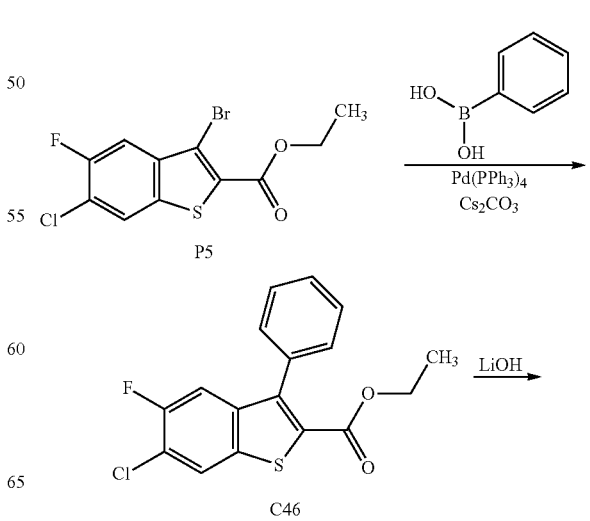

-continued

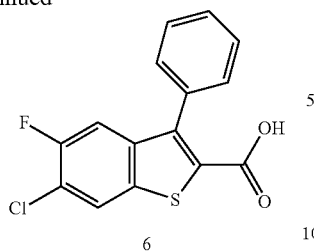

6

Step 1. Synthesis of ethyl 6-chloro-5-fluoro-3-phenyl-1-benzothiophene-2-carboxylate (C46)

A suspension of P5 (150 mg, 0.444 mmol), phenylboronic acid (54.2 mg, 0.444 mmol), and cesium carbonate (434 mg, 1.33 mmol) in a mixture of 1,4-dioxane (5 mL) and water (0.5 mL) was degassed with nitrogen for 1 minute, whereupon tetrakis(triphenylphosphine)palladium(0) (103 mg, 89.1 µmol) was added. After the reaction mixture had been stirred at 80° C. for 16 hours, it was filtered; the filtrate was concentrated in vacuo and purified via chromatography on silica gel (Gradient: 0% to 1% ethyl acetate in petroleum ether), providing C46 as a colorless gum. Yield: 110 mg, 0.329 mmol, 74%. $^1$H NMR (400 MHz, chloroform-d) δ 7.91 (d, J=6.4 Hz, 1H), 7.53-7.44 (m, 3H), 7.38-7.33 (m, 2H), 7.27 (d, J=9.4 Hz, 1H, assumed; partially obscured by solvent peak), 4.23 (q, J=7.1 Hz, 2H), 1.19 (t, J=7.1 Hz, 3H).

Step 2. Synthesis of 6-chloro-5-fluoro-3-phenyl-1-benzothiophene-2-carboxylic acid (6)

A suspension of C46 (110 mg, 0.329 mmol) in a mixture of methanol (1 mL), water (1 mL), and tetrahydrofuran (1 mL) was treated with lithium hydroxide monohydrate (138 mg, 3.29 mmol). After the reaction mixture had been stirred at 25° C. for 16 hours, hydrochloric acid (1 M; 2 mL) was used to adjust the pH to approximately 3, whereupon the mixture was extracted with ethyl acetate (3×10 mL). The combined organic layers were washed with saturated aqueous sodium chloride solution, dried over sodium sulfate, filtered, and concentrated in vacuo. Reversed-phase HPLC (Column: Welch Xtimate C18, 30×100 mm, 3 µm; Mobile phase A: water containing 0.225% formic acid; Mobile phase B: acetonitrile; Gradient: 45% to 85% B; Flow rate: 30 mL/minute) afforded 6-chloro-5-fluoro-3-phenyl-1-benzothiophene-2-carboxylic acid (6) as a white solid. Yield: 31.6 mg, 0.103 mmol, 31%. LCMS m/z 261.1 (chlorine isotope pattern observed) [M−CO$_2$H]$^−$. $^1$H NMR (400 MHz, methanol-d$_4$) δ 8.14 (d, J=6.6 Hz, 1H), 7.54-7.44 (m, 3H), 7.40-7.35 (m, 2H), 7.22 (d, J=9.8 Hz, 1H).

Example 7

3-(4,5-Dichloro-2-fluorophenyl)-6-fluoro-1-benzothiophene-2-carboxylic acid (7)

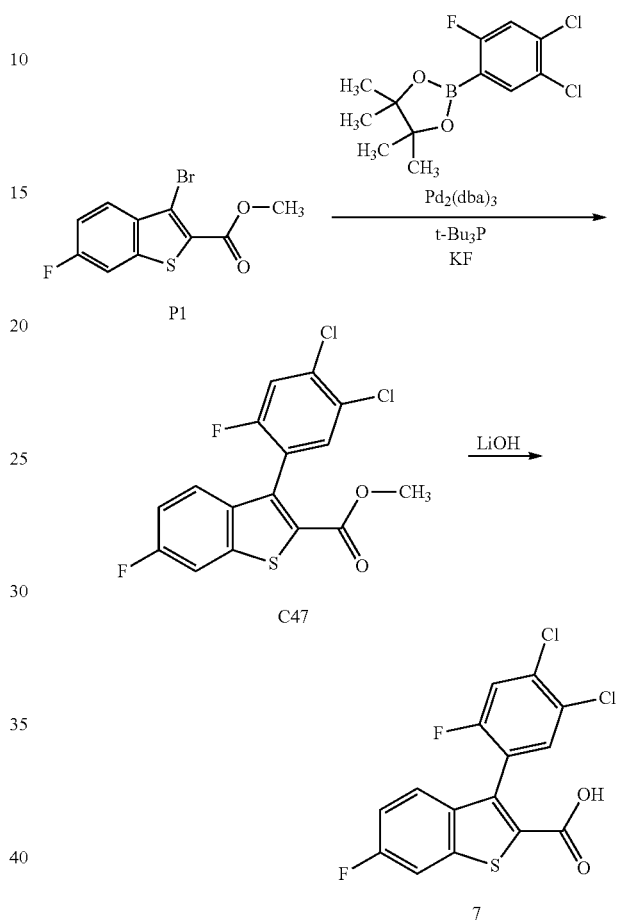

Step 1. Synthesis of methyl 3-(4,5-dichloro-2-fluorophenyl)-6-fluoro-1-benzothiophene-2-carboxylate (C47)

A reaction vessel containing a suspension of P1 (175 mg, 0.605 mmol), 2-(4,5-dichloro-2-fluorophenyl)-4,4,5,5-tetramethyl-1,3,2-dioxaborolane (211 mg, 0.725 mmol), potassium fluoride (105 mg, 1.81 mmol), a solution of tri-tert-butylphosphine in toluene (1 M; 60.5 µL, 60.5 µmol), and tris(dibenzylideneacetone)dipalladium(0) (55.4 mg, 60.5 µmol) in a mixture of tetrahydrofuran (5 mL) and water (1 mL) was evacuated and charged with nitrogen. This evacuation cycle was repeated twice, whereupon the reaction mixture was heated at 60° C. overnight. It was then filtered; the filtrate was concentrated in vacuo and subjected to chromatography on silica gel (Gradient: 0% to 30% ethyl acetate in heptane), affording C47 as a yellow oil. Yield: 214 mg, 0.573 mmol, 95%. $^1$H NMR (400 MHz, methanol-d$_4$) δ 7.77 (dd, J=8.8, 2.4 Hz, 1H), 7.61-7.53 (m, 2H), 7.50 (br dd, J=9.0, 5.1 Hz, 1H), 7.25 (ddd, J=9.0, 9.0, 2.4 Hz, 1H), 3.80 (s, 3H).

Step 2. Synthesis of 3-(4,5-dichloro-2-fluorophenyl)-6-fluoro-1-benzothiophene-2-carboxylic acid (7)

A mixture of C47 (214 mg, 0.573 mmol), an aqueous solution of lithium hydroxide (1.0 M; 1.15 mL, 1.15 mmol), and tetrahydrofuran (2.9 mL) was heated overnight at 80° C. The reaction mixture was then partitioned between ethyl acetate and 1 M hydrochloric acid; the organic layer was washed with saturated aqueous sodium chloride solution, dried over sodium sulfate, filtered, and concentrated in vacuo. After the residue had been triturated with heptane containing a small amount of diethyl ether, it was purified via silica gel chromatography (Gradient: 0% to 20% methanol in dichloromethane). The resulting material was triturated with heptane to provide 3-(4,5-dichloro-2-fluorophenyl)-6-fluoro-1-benzothiophene-2-carboxylic acid (7) as a white solid. Yield: 94.8 mg, 0.264 mmol, 46%. LCMS m/z 358.8 (dichloro isotope pattern observed) [M+H]$^+$. $^1$H NMR (400 MHz, methanol-d$_4$) δ 7.77 (dd, J=8.8, 2.4 Hz, 1H), 7.58 (d, J=6.8 Hz, 1H), 7.54 (d, J=8.9 Hz, 1H), 7.49 (br dd, J=9.0, 5.0 Hz, 1H), 7.25 (ddd, J=9.0, 9.0, 2.4 Hz, 1H).

Example 8

3-(3,5-Difluoro-2-methylpyridin-4-yl)-6-fluoro-1-benzothiophene-2-carboxylic acid (8)

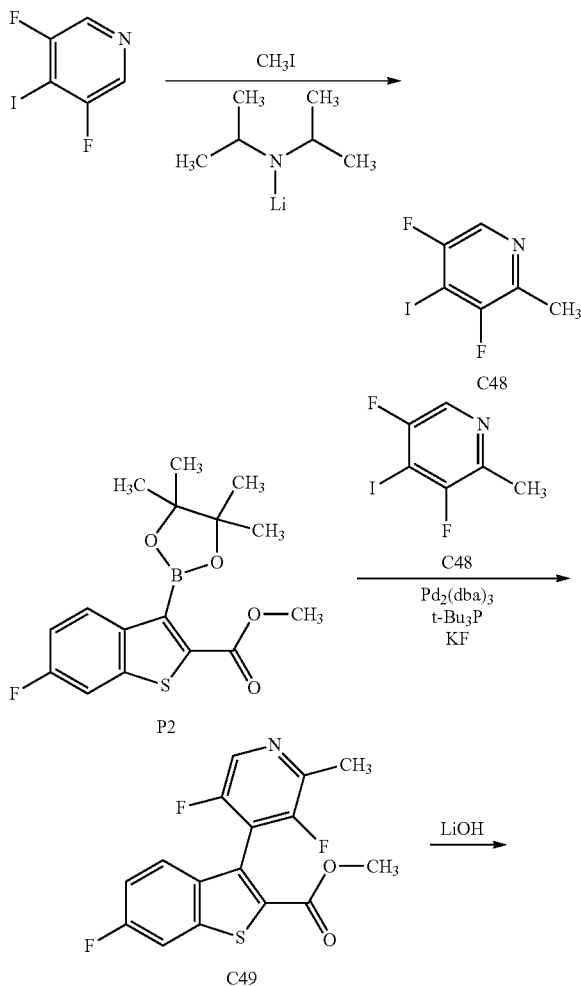

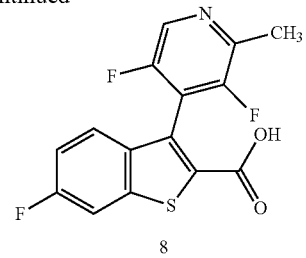

Step 1. Synthesis of 3,5-difluoro-4-iodo-2-methylpyridine (C48)

A solution of lithium diisopropylamide (2 M; 2.28 mL, 4.56 mmol) was added to a −78° C. solution of 3,5-difluoro-4-iodopyridine (1.00 g, 4.15 mmol) in tetrahydrofuran (15 mL). After the reaction mixture had been stirred at −78° C. for 1 hour, a solution of iodomethane (648 mg, 4.56 mmol) in tetrahydrofuran (20 mL) was added. Stirring was continued at −78° C. for 1 hour, followed by 16 hours at 25° C., whereupon the reaction mixture was poured into aqueous ammonium chloride solution (15 mL) and extracted with ethyl acetate (2×20 mL). The combined organic layers were washed with saturated aqueous sodium chloride solution (15 mL), dried over sodium sulfate, filtered, concentrated in vacuo, and purified via silica gel chromatography (Gradient: 0% to 10% ethyl acetate in petroleum ether), affording C48 as a white solid (140 mg). By $^1$H NMR, this material was largely the starting material, but contained C48 (ratio of approximately 4:1, starting material/C48). $^1$H NMR (400 MHz, chloroform-d), product peaks only: δ 8.13 (s, 1H), 2.29 (dd, J=1.7, 1.7 Hz, 3H).

Step 2. Synthesis of methyl 3-(3,5-difluoro-2-methylpyridin-4-yl)-6-fluoro-1-benzothiophene-2-carboxylate (C49)

To a suspension of C48 (from the previous step; 140 mg), P2 (185 mg, 0.550 mmol), and potassium fluoride (95.7 mg, 1.65 mmol) in a mixture of tetrahydrofuran (10 mL) and water (1.0 mL) was added tris(dibenzylideneacetone)dipalladium(0) (25.1 mg, 27.4 μmol), followed by a solution of tri-tert-butylphosphine in toluene (1 M; 54.9 μL, 54.9 μmol). The reaction mixture was heated at 60° C. for 16 hours, whereupon it was poured into water (20 mL) and extracted with ethyl acetate (2×20 mL). The combined organic layers were washed with saturated aqueous sodium chloride solution (30 mL), dried over sodium sulfate, filtered, and concentrated in vacuo. Preparative thin-layer chromatography (Eluent: 15:1 petroleum ether/ethyl acetate) provided C49 as a yellow solid. Yield: 40.0 mg, 0.119 mmol, 3% over 2 steps. LCMS m/z 337.9 [M+H]$^+$.

Step 3. Synthesis of 3-(3,5-difluoro-2-methylpyridin-4-yl)-6-fluoro-1-benzothiophene-2-carboxylic acid (8)

Lithium hydroxide (28.4 mg, 1.19 mmol) was added to a suspension of C49 (40.0 mg, 0.119 mmol) in a mixture of tetrahydrofuran (3.0 mL), methanol (1.5 mL), and water (1.5 mL). The reaction mixture was stirred at 25° C. for 16 hours, whereupon it was concentrated under reduced pressure, diluted with water (30 mL), and acidified to a pH of approximately 5 by addition of 1 M hydrochloric acid. The resulting mixture was extracted with ethyl acetate (2×15 mL), and the combined organic layers were concentrated in vacuo and purified via reversed-phase HPLC (Column: YMC-Actus Triart C18, 30×150 mm, 5 µm; Mobile phase A: water containing 0.05% ammonium hydroxide (v/v); Mobile phase B: acetonitrile; Gradient: 20% to 40% B; Flow rate: 35 mL/minute) to provide 3-(3,5-difluoro-2-methylpyridin-4-yl)-6-fluoro-1-benzothiophene-2-carboxylic acid (8) as a white solid. Yield: 2.78 mg, 8.60 µmol, 7%. LCMS m/z 324.0 [M+H]$^+$. $^1$H NMR (400 MHz, methanol-d$_4$) δ 8.34 (s, 1H), 7.66 (dd, J=8.9, 2.4 Hz, 1H), 7.42 (dd, J=8.9, 5.2 Hz, 1H), 7.12 (ddd, J=9.0, 9.0, 2.4 Hz, 1H), 2.34 (dd, J=1.6, 1.6 Hz, 3H).

Example 9

6-Fluoro-3-(2,4,5-trifluoro-3-methoxyphenyl)-1-benzothiophene-2-carboxylic acid (9)

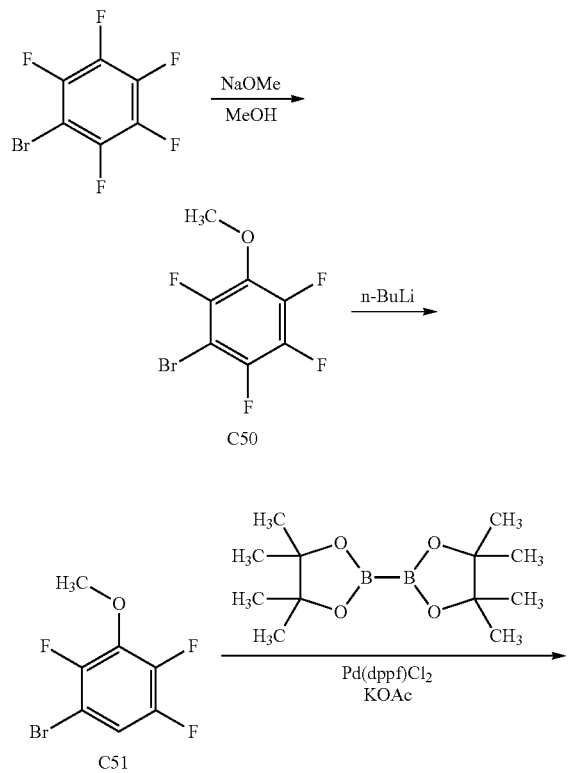

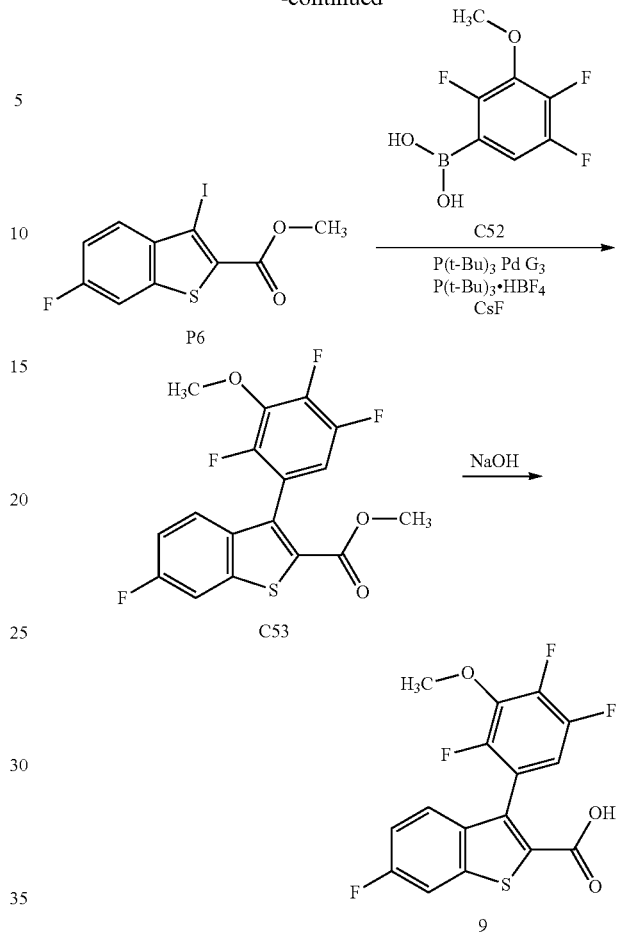

Step 1. Synthesis of 1,2-dibromo-3,4,6-trifluoro-5-methoxybenzene (C50)

1,2-Dibromo-3,4,5,6-tetrafluorobenzene (25.0 g, 81.2 mmol) was added to a mixture of sodium methoxide in methanol (25% by weight; 37.1 mL, 162 mmol) and methanol (125 mL). After the reaction had been stirred at room temperature overnight, it was diluted with water and extracted three times with dichloromethane. The combined organic layers were washed with saturated aqueous sodium chloride solution, dried over sodium sulfate, filtered, and concentrated in vacuo to provide C50 as a light-yellow oil. This material was assumed to represent a quantitative conversion and was progressed directly to the following step. $^1$H NMR (400 MHz, methanol-d$_4$) δ 4.06 (t, J=1.3 Hz, 3H).

Step 2. Synthesis of 1-bromo-2,4,5-trifluoro-3-methoxybenzene (C51)

A solution of n-butyllithium in hexane (2.5 M; 32.5 mL, 81.2 mmol) was added to a −78° C. solution of C50 (26 g, 81 mmol) in diethyl ether (813 mL), and the reaction mixture was stirred at −78° C. for 5 hours. It was then diluted with water and extracted three times with diethyl ether; the combined organic layers were washed with saturated aqueous sodium chloride solution, dried over sodium sulfate, and filtered through a pre-packed hydrogenator filter cartridge

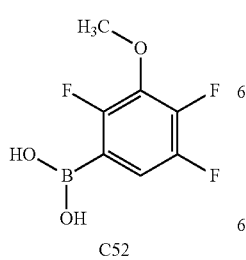

containing silica gel. The filtrate was concentrated in vacuo, using a 30° C. bath, to afford C51 as a clear yellow oil (20 g, assumed quantitative). This material was progressed to the following step. $^1$H NMR (400 MHz, methanol-d$_4$) δ 7.36 (ddd, J=9.7, 7.8, 6.1 Hz, 1H), 4.04 (t, J=1.2 Hz, 3H).

Step 3. Synthesis of (2,4,5-trifluoro-3-methoxyphenyl)boronic acid (C52)

A reaction vessel containing C51 (from the previous step; 20 g, 581 mmol), 4,4,4',4',5,5,5',5'-octamethyl-2,2'-bi-1,3,2-dioxaborolane (52.7 g, 208 mmol), potassium acetate (16.3 g, 166 mmol), and [1,1'-bis(diphenylphosphino)ferrocene] dichloropalladium(II) (6.07 g, 8.30 mmol) in 1,4-dioxane (830 mL) was evacuated and charged with nitrogen. This evacuation cycle was repeated twice, whereupon the reaction mixture was heated at 100° C. overnight. It was then filtered through a cartridge filled with diatomaceous earth, and the cartridge was rinsed with ethyl acetate. The combined filtrates were concentrated in vacuo to near-dryness and then treated with 1 M hydrochloric acid. After the resulting mixture had been stirred for approximately 10 minutes, it was extracted three times with dichloromethane. The combined extracts were washed with saturated aqueous sodium chloride solution, dried over sodium sulfate, filtered, and concentrated under reduced pressure, providing C52 as a black oil (17.1 g). This material was used directly in the following step. LCMS m/z 205.1 [M−H]$^−$.

Step 4. Synthesis of methyl 6-fluoro-3-(2,4,5-trifluoro-3-methoxyphenyl)-1-benzothiophene-2-carboxylate (C53)

A reaction vessel containing a suspension of P6 (20.0 g, 59.5 mmol), C52 (from Step 3; 17.1 g, 581 mmol), methanesulfonyl[(tri-tert-butylphosphine)-2-(2-aminobiphenyl)]palladium(II) [P(t-Bu)$_3$Pd G3; 3.40 g, 5.94 mmol], aqueous cesium fluoride solution (1 M; 89.3 mL, 89.3 mmol), and tri-tert-butylphosphonium tetrafluoroborate (17.3 g, 59.6 mmol) in tetrahydrofuran was evacuated and charged with nitrogen. This evacuation cycle was repeated twice, whereupon the reaction mixture was heated at 70° C. overnight. It was then poured into ethyl acetate and washed with water; the aqueous layer was extracted twice with ethyl acetate, and the combined organic layers were washed with saturated aqueous sodium chloride solution, dried over sodium sulfate, and filtered through a cartridge packed with diatomaceous earth. The filtrate was concentrated in vacuo and purified twice via silica gel chromatography (Gradient: 0% to 10% ethyl acetate in heptane), providing C53 as a light-brown oil. Yield: 17.3 g, 46.7 mmol, 78%. LCMS m/z 339.1 [M−OCH$_3$]$^+$. $^1$H NMR (400 MHz, chloroform-d) δ 7.58 (dd, J=8.4, 2.3 Hz, 1H), 7.46 (br dd, J=8.9, 5.1 Hz, 1H), 7.16 (ddd, J=8.9, 8.9, 2.3 Hz, 1H), 6.86 (ddd, J=9.9, 8.1, 6.0 Hz, 1H), 4.09 (t, J=1.2 Hz, 3H), 3.84 (s, 3H).

Step 5. Synthesis of 6-fluoro-3-(2,4,5-trifluoro-3-methoxyphenyl)-1-benzothiophene-2-carboxylic acid (9)

An aqueous solution of sodium hydroxide (50% by weight; 12.9 mL, 244 mmol) was added to a solution of C53 (43.4 g, 117 mmol) in a mixture of ethanol (360 mL) and 2-methyltetrahydrofuran (239 mL), whereupon the reaction mixture was heated at 55° C. for 1 hour. It was then cooled to room temperature, diluted with ethyl acetate, and added to a 1:1 mixture of 1 M hydrochloric acid and saturated aqueous sodium chloride solution. After the aqueous layer had been extracted with ethyl acetate, the combined organic layers were washed with saturated aqueous sodium chloride solution, dried over sodium sulfate, filtered, and concentrated in vacuo. The resulting material, containing a small amount of residual solvent from the concentration, was triturated with heptane and then purified via supercritical fluid chromatography {Column: Chiral Technologies Chiralpak AD-H, 50.0×250 mm, 5 μm; Mobile phase: 85:15 carbon dioxide/[methanol containing 0.2% (7 M ammonia in methanol)]; Flow rate: 225 mL/minute; Back pressure: 175 bar} to provide the ammonium salt of 9 as a white solid. Yield: 32.7 g, 87.6 mmol, 75%. Retention time 2.22 minutes [Analytical conditions. Column: Chiral Technologies Chiralpak AD-H, 4.6×250 mm, 5 μm; Mobile phase A: carbon dioxide; Mobile phase B: methanol containing 0.2% (7 M ammonia in methanol); Gradient: 5% B for 1.00 minute, then 5% to 100% B over 7.50 minutes; Flow rate: 3.0 mL/minute; Back pressure: 120 bar].

This material was combined with the product of a similar reaction carried out using C53 (22.4 g, 60.5 mmol), dissolved in ethyl acetate, and added to a 1:1 mixture of 1 M hydrochloric acid and saturated aqueous sodium chloride solution. The aqueous layer was extracted with ethyl acetate, and the combined organic layers were washed with saturated aqueous sodium chloride solution, dried over sodium sulfate, filtered, and concentrated under reduced pressure. The residue, containing a small amount of residual ethyl acetate from the concentration, was triturated with heptane to afford 6-fluoro-3-(2,4,5-trifluoro-3-methoxyphenyl)-1-benzothiophene-2-carboxylic acid (9) as a white solid. Combined yield: 44.67 g, 125.4 mmol, 71%. LCMS m/z 311.0 [M−CO$_2$H]$^−$. $^1$H NMR (400 MHz, DMSO-d$_6$) δ 13.59 (br s, 1H), 8.07 (dd, J=9.2, 2.4 Hz, 1H), 7.56 (br dd, J=9.0, 5.1 Hz, 1H), 7.44-7.32 (m, 2H), 4.02 (br s, 3H).

Preparation of Crystalline Form 1, Anhydrous 6-Fluoro-3-(2,4,5-trifluoro-3-methoxyphenyl)-1-benzothiophene-2-carboxylic acid (Example 9)

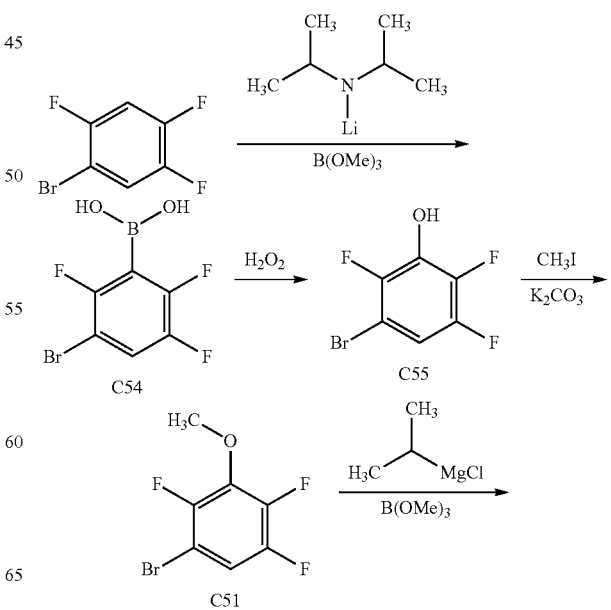

-continued

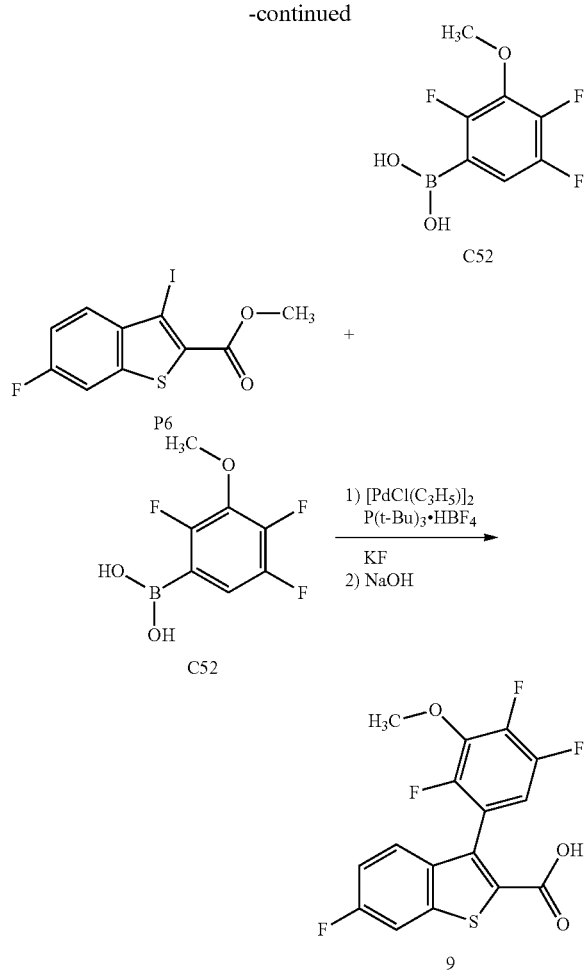

Step 1. Synthesis of (3-bromo-2,5,6-trifluorophenyl)boronic acid (C54)

A solution of 1-bromo-2,4,5-trifluorobenzene (29.5 kg, 140 mol) in methyl tert-butyl ether (65.5 kg) was cooled to −60° C. to −55° C., whereupon it was treated drop-wise with lithium diisopropylamide (2.0 M solution in a mixture of tetrahydrofuran and hexane; 57.1 kg, 147 mol), while the reaction mixture was maintained at −60° C. to −55° C. After stirring had been carried out for 2 hours at −55° C., trimethyl borate (18.9 kg, 182 mol) was added drop-wise at −60° C. to −55° C., and the reaction mixture was stirred at −60° C. to −55° C. for 2 hours. It was then quenched at 0° C. with hydrochloric acid (1 M; 700 kg, 707 mol), and extracted with methyl tert-butyl ether (2×218 kg). The organic layers were combined and concentrated in vacuo below 30° C. to 177 kg, whereupon heptane (383 kg) was added. A second round of concentration in the same manner, this time to approximately 380 kg, was followed by addition of heptane (383 kg); the resulting mixture was stirred at 20° C. for 1 hour. Collection of the solids via filtration, followed by washing of the filter cake with heptane (30 to 60 kg), provided C54 as a solid. Yield: 24 kg, 94 mol, 67%. Data from a similar reaction carried out using 1-bromo-2,4,5-trifluorobenzene: $^1$H NMR (400 MHz, chloroform-d) δ 7.53 (ddd, J=8.7, 8.7, 6.8 Hz, 1H).

Step 2. Synthesis of 3-bromo-2,5,6-trifluorophenol (C55)

An aqueous solution of hydrogen peroxide (30%, 15.2 kg, 134 mol) was added drop-wise to a 30° C. to 40° C. solution of C54 (22.8 kg, 89.5 mol) in dichloromethane (159 kg). After the reaction mixture had been stirred at 35° C. to 40° C. for 16 hours, it was cooled to −10° C. and treated drop-wise with a 10% aqueous solution of sodium bisulfite (98 kg, 392 mmol) at a rate that maintained the temperature of the mixture between −15° C. and −10° C. The resulting mixture was extracted with dichloromethane (2×336 kg); the combined organic layers were concentrated in vacuo at 30° C. to provide a solution of C55 in dichloromethane (70 kg, which assayed as 30.3% C55 by weight). This material was used in the following reaction. Data from a similar reaction carried out using C54: LCMS m/z 224.9 (bromine isotope pattern observed) [M−H]$^+$. $^1$H NMR (400 MHz, chloroform-d) δ 6.96 (ddd, J=9.3, 7.7, 6.1 Hz, 1H).

Step 3. Synthesis of 1-bromo-2,4,5-trifluoro-3-methoxybenzene (C51)

A solution of C55 (from the previous step; 589.5 mol) in acetone (94.8 kg) was treated with potassium carbonate (38.7 kg, 280 mmol) and cooled to −10° C. to 0° C., whereupon iodomethane (19.9 kg, 140 mol) was added drop-wise at −10° C. to 0° C. The reaction mixture was allowed to stir at 25° C. to 30° C. for 16 hours, then filtered. The filter cake was rinsed with heptane (55 kg), and the combined filtrates were switched into heptane via repeated dilution with heptane followed by removal of solvent under reduced pressure, to a final weight of approximately 100 kg. This heptane solution was washed with water (64 kg) and with aqueous sodium sulfate solution (5%, 64 kg), filtered through silica gel (11 kg), and concentrated in vacuo below 30° C., affording C51 as a solution in heptane (35.2 kg, which assayed as 51.4% C51 by weight). Yield: 18 kg, 75 mol, 84% over 2 steps. Data from a similar reaction carried out using C55: GCMS m/z 240.0 (bromine isotope pattern observed) [M$^+$]. $^1$H NMR (400 MHz, methanol-d$_4$) δ 7.37 (ddd, J=9.7, 7.9, 6.1 Hz, 1H), 4.04 (t, J=1.2 Hz, 3H).

Step 4. Synthesis of (2,4,5-trifluoro-3-methoxyphenyl)boronic acid (C52)

A solution of (propan-2-yl)magnesium chloride (2 M; 45 L, 90 mol) was added drop-wise to a −70° C. to −65° C. solution of C51 (18.1 kg, 75.1 mol) in tetrahydrofuran (161 kg). After the reaction mixture had been stirred at −70° C. to −65° C. for 2 to 3 hours, trimethyl borate (10.1 kg, 97.2 mol) was added drop-wise, at a rate that maintained the internal reaction temperature between −70° C. and −65° C. The reaction mixture was stirred at −50° C. to −40° C. for 1 to 2 hours, whereupon it was quenched with hydrochloric acid (1 M; 375 kg, 379 mol) at 0° C. to 5° C. The resulting mixture was extracted with methyl tert-butyl ether (161 kg); the combined organic layers were washed sequentially with water (90 kg) and aqueous sodium sulfate solution (10%, 90 kg), and concentrated in vacuo. The solvent was switched with tetrahydrofuran (180 to 360 kg), and the resulting mixture was filtered. The filtrate was concentrated in vacuo below 30° C. to a volume of 55 L, then treated with heptane (90 kg) and concentrated in the same manner to 55 L. Heptane (90 kg) was again added, and the mixture was stirred at 15° C. to 25° C. for 1 to 2 hours, at which point the solid was collected via filtration and slurried with heptane (36 kg). Isolation of the resulting solid via filtration afforded C52 as a solid. Yield: 10.2 kg, 49.5 mol, 66%. LCMS m/z 205.1 [M−H]−. $^1$H NMR (400 MHz, chloroform-d) δ 7.36-7.27 (br ddd, J=9, 9, 5.4 Hz, 1H), 5.07-5.02 (m, 2H), 4.03 (app br t, J=1 Hz, 3H).

Step 5. Synthesis of 6-fluoro-3-(2,4,5-trifluoro-3-methoxyphenyl)-1-benzothiophene-2-carboxylic acid (9)

A mixture of P6 (1.00 g, 2.98 mmol), C52 (735 mg, 3.57 mmol), and potassium fluoride (520 mg, 8.95 mmol) in tetrahydrofuran (11 mL) and water (5 mL) was sparged with nitrogen for 2 minutes, whereupon tri-tert-butylphosphonium tetrafluoroborate (99%, 34.0 mg, 0.116 mmol) and allylpalladium(II) chloride dimer (10.7 mg, 29.2 μmol) were added. Sparging was continued for 1 minute, and then the reaction mixture was placed in a heating block at 50° C., with 700 rpm magnetic stirring. After the reaction mixture had been stirred at 50° C. for 1 hour, the organic layer was washed with a solution of sodium chloride in water (23.5% by mass; 3 mL, 14 mmol). It was then treated with a solution of sodium bisulfite (99%, 600 mg, 5.7 mmol) in water (2.4 mL) and stirred at 60° C. for 1 hour; the organic layer was washed with a solution of sodium chloride in water (23.5% by mass; 3 mL, 14 mmol) by stirring at 60° C. for 2 minutes. SiliCycle SiliaMetS® Thiol (Si-Thiol; 300 mg) was added to the organic layer, and the resulting mixture was stirred at 60° C. for 1 hour, whereupon it was cooled to 20° C. and filtered through a pad of diatomaceous earth. The filter cake was washed with tetrahydrofuran (6 mL), and the combined filtrates were concentrated in vacuo. The resulting material was dissolved in tetrahydrofuran (2 mL) and methanol (2 mL), and treated with an aqueous solution of sodium hydroxide (3.0 M; 1.5 mL, 4.5 mmol). The reaction mixture was heated in a 50° C. heating block with 700 rpm magnetic stirring for 1 hour, then cooled to 20° C., acidified via addition of hydrochloric acid (3.0 M, 2.0 mL, 6.0 mmol), and extracted with methyl tert-butyl ether (5 mL, then 3 mL); the combined organic layers were concentrated under reduced pressure, treated with propan-2-ol (7 mL), and concentrated again. The resulting oil was dissolved in propan-2-ol (4 mL), and water (4 mL) was slowly added, affording a slurry, which was stirred at 20° C. and 500 rpm for 17 hours. After the mixture had been cooled in an ice bath and stirred for 10 minutes, it was filtered. The filter cake was washed with an ice-cold mixture of propan-2-ol (1 mL) and water (1 mL) and vacuum-dried at 50° C. to provide 9 as an off-white solid as Form 1. Yield: 0.912 g, 99.3% by mass (determined by quantitative NMR), 2.54 mmol, 85%. $^1$H NMR (400 MHz, DMSO-d$_6$) δ 13.58 (br s, 1H), 8.06 (dd, J=9.1, 2.4 Hz, 1H), 7.56 (dd, J=9.0, 5.2 Hz, 1H), 7.44-7.31 (m, 2H), 4.02 (s, 3H). This material was analyzed for powder X-ray diffraction as described herein.

Amorphous Form 3 of 6-fluoro-3-(2,4,5-trifluoro-3-methoxyphenyl)-1-benzothiophene-2-carboxylic acid was prepared by heating Form 1 anhydrous 6-fluoro-3-(2,4,5-trifluoro-3-methoxyphenyl)-1-benzothiophene-2-carboxylic acid to 205° C. and holding isothermally for approximately 2 minutes before cooling to ambient temperature to obtain a glass. This material was analyzed for powder X-ray diffraction as described herein.

Example 10

6-Chloro-3-(2,4,5-trifluoro-3-methylphenyl)-1-benzothiophene-2-carboxylic acid (10)

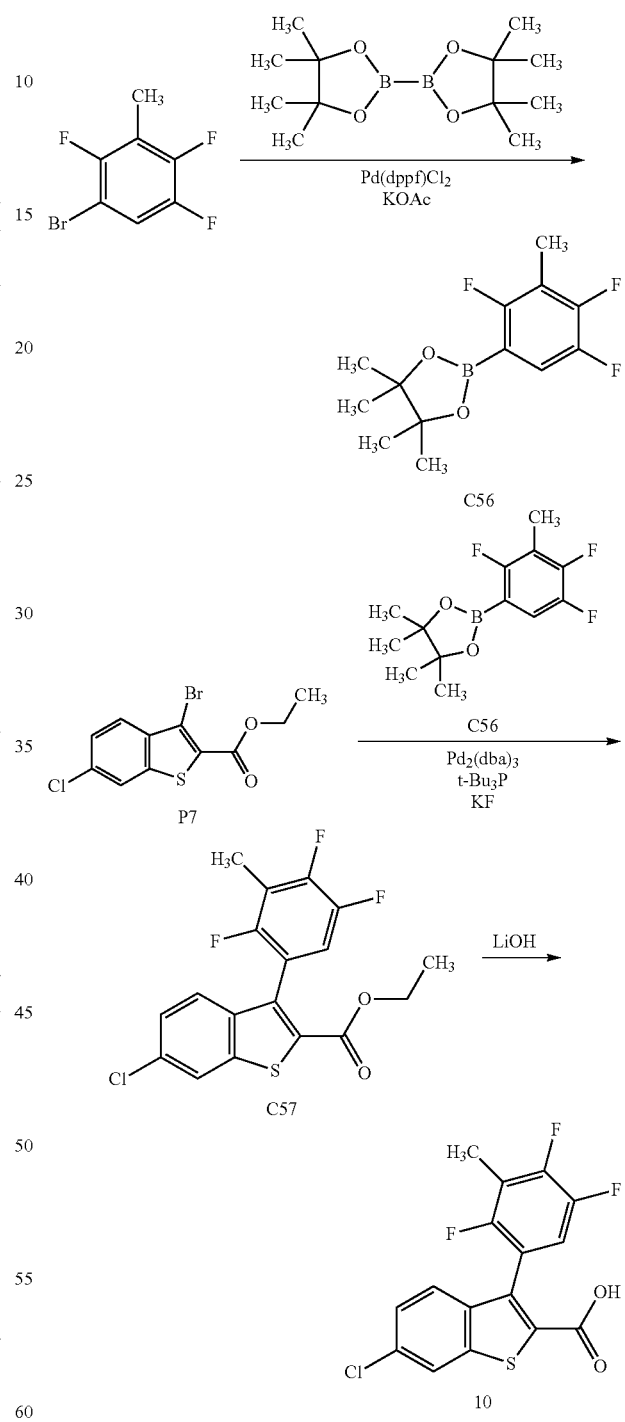

Step 1. Synthesis of 4,4,5,5-tetramethyl-2-(2,4,5-trifluoro-3-methylphenyl)-1,3,2-dioxaborolane (C56)

A mixture of 1-bromo-2,4,5-trifluoro-3-methylbenzene (250 mg, 1.11 mmol), 4,4,4',4',5,5,5',5'-octamethyl-2,2'-bi- 1,3,2-dioxaborolane (564 mg, 2.22 mmol), potassium acetate (218 mg, 2.22 mmol), and [1,1'-bis(diphenylphosphino)ferrocene]dichloropalladium(II) (81.3 mg, 0.111 mmol) in 1,4-dioxane (5.6 mL) was degassed with nitrogen for 2 minutes, whereupon it was heated at 100° C. for 16 hours. The reaction mixture was concentrated in vacuo, diluted with ethyl acetate (20 mL), filtered, and concentrated in vacuo. Chromatography on silica gel (Gradient: 0% to 6% ethyl acetate in petroleum ether) afforded C56 as a light-yellow oil. Yield: 167 mg, 0.614 mmol, 55%. $^1$H NMR (400 MHz, chloroform-d) δ 7.33 (ddd, J=9.7, 9.7, 5.2 Hz, 1H), 2.20 (dd, J=1.9, 1.9 Hz, 3H), 1.35 (s, 12H).

Step 2. Synthesis of ethyl 6-chloro-3-(2,4,5-trifluoro-3-methylphenyl)-1-benzothiophene-2-carboxylate (C57)

A suspension of P7 (200 mg, 0.626 mmol), C56 (167 mg, 0.614 mmol), potassium fluoride (109 mg, 1.88 mmol), and tris(dibenzylideneacetone)dipalladium(0) (57.3 mg, 62.6 μmol) in a mixture of tetrahydrofuran (6 mL) and water (1.5 mL) was degassed with nitrogen for 1 minute, whereupon a solution of tri-tert-butylphosphine in toluene (1 M; 62.6 μL, 62.6 μmol) was added. After the reaction mixture had been heated at 60° C. for 16 hours, it was concentrated in vacuo and purified using silica gel chromatography (Eluent: petroleum ether) to provide C57 as a yellow oil. Yield: 221 mg, 0.574 mmol, 92%. LCMS m/z 385.0 (chlorine isotope pattern observed) [M+H]$^+$.

Step 3. Synthesis of 6-chloro-3-(2,4,5-trifluoro-3-methylphenyl)-1-benzothiophene-2-carboxylic acid (10)

Lithium hydroxide monohydrate (241 mg, 5.74 mmol), was added to a solution of C57 (221 mg, 0.574 mmol) in a mixture of tetrahydrofuran (4 mL), methanol (2 mL), and water (2 mL), and the reaction mixture was stirred at 22° C. for 16 hours. It was then concentrated in vacuo, diluted with water (20 mL), and acidified to a pH of approximately 5 by addition of hydrochloric acid; filtration provided a solid, which was subjected to reversed-phase HPLC (Column: YMC-Actus Triart C18, 50×250 mm, 7 μm; Mobile phase A: water containing 0.05% ammonium hydroxide (v/v); Mobile phase B: acetonitrile; Gradient: 43% to 83% B; Flow rate: 60 mL/minute) to afford 6-chloro-3-(2,4,5-trifluoro-3-methylphenyl)-1-benzothiophene-2-carboxylic acid (10) as a white solid. Yield: 109 mg, 0.306 mmol, 53%. LCMS m/z 310.8 [M−COOH]$^-$. $^1$H NMR (400 MHz, DMSO-d$_6$) δ 8.32 (d, J=1.7 Hz, 1H), 7.57-7.48 (m, 1H), 7.49 (dd, component of ABX system, J=8.7, 1.8 Hz, 1H), 7.46 (d, half of AB quartet, J=8.8 Hz, 1H), 2.27 (br s, 3H).

Example 11

5,6-Difluoro-3-phenyl-1-benzothiophene-2-carboxylic acid (11)

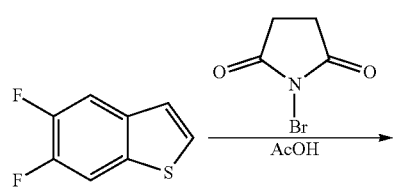

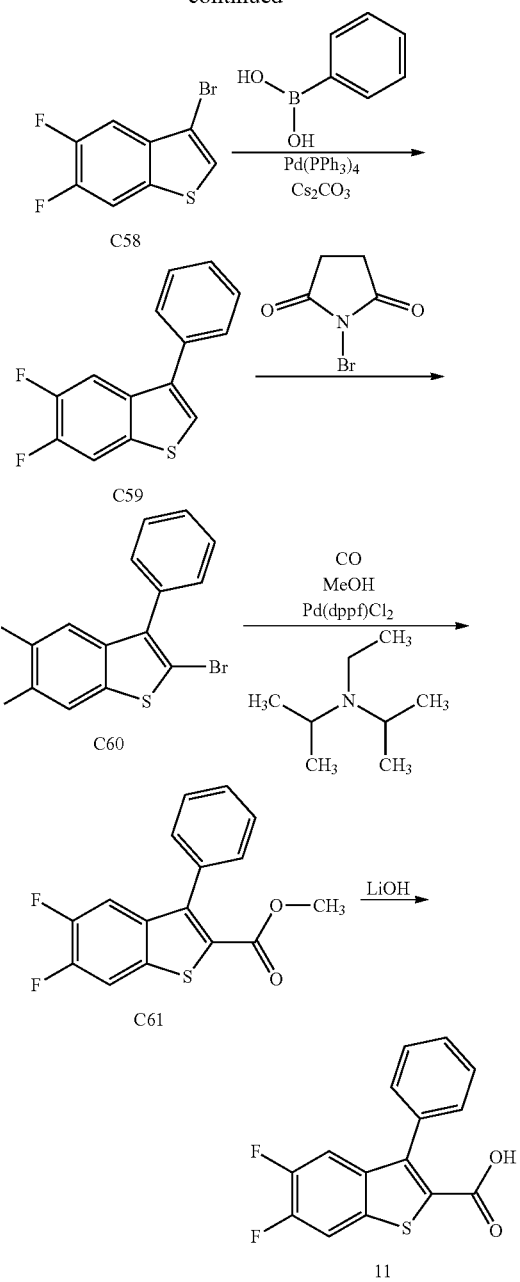

Step 1. Synthesis of 3-bromo-5,6-difluoro-1-benzothiophene (C58)

A solution of 5,6-difluoro-1-benzothiophene (see R. Acharya et al.; WO 2016100184 A1, Jun. 23, 2016; 1.60 g, 9.40 mmol) in acetic acid (47 mL) was treated in a portionwise manner with N-bromosuccinimide (2.01 g, 11.3 mmol). The reaction mixture was stirred at 80° C. for 16 hours, whereupon it was diluted with water and extracted with petroleum ether (3×30 mL); the combined organic layers were washed with saturated aqueous sodium chloride solution (50 mL), dried over sodium sulfate, filtered, and concentrated in vacuo. Silica gel chromatography (Eluent: petroleum ether) provided C58 as a white solid. Yield: 1.26 g, 5.06 mmol, 54%. $^1$H NMR (400 MHz, chloroform-d) δ 7.64 (dd, J=9.5, 6.9 Hz, 1H), 7.60 (dd, J=10.3, 7.4 Hz, 1H), 7.46 (s, 1H).

Step 2. Synthesis of 5,6-difluoro-3-phenyl-1-benzothiophene (C59)

To a suspension of C58 (640 mg, 2.57 mmol) and phenylboronic acid (313 mg, 2.57 mmol) in a mixture of 1,4-dioxane (20 mL) and water (2 mL) were added cesium carbonate (2.51 g, 7.70 mmol) and tetrakis(triphenylphosphine)palladium(0) (297 mg, 0.257 mmol). After the reaction mixture had been stirred at 85° C. for 16 hours, it was filtered. The filtrate was concentrated in vacuo and purified via silica gel chromatography (Eluent: petroleum ether) to provide C59 as a gum. Yield: 561 mg, 2.28 mmol, 89%. $^1$H NMR (400 MHz, chloroform-d) δ 7.70-7.62 (m, 2H), 7.56-7.47 (m, 4H), 7.46-7.40 (m, 2H).

Step 3. Synthesis of 2-bromo-5,6-difluoro-3-phenyl-1-benzothiophene (C60)

A solution of N-bromosuccinimide (425 mg, 2.39 mmol) in ethanol (1 mL) was added in a portion-wise manner to a solution of C59 (560 mg, 2.27 mmol) in a mixture of dichloromethane (20 mL) and ethanol (0.5 mL). The reaction mixture was stirred at 25° C. for 16 hours, then at 35° C. for 3 hours, whereupon it was diluted with water and extracted with dichloromethane (3×20 mL). The combined organic layers were washed with saturated aqueous sodium chloride solution (2×15 mL), dried over sodium sulfate, filtered, and concentrated in vacuo. Silica gel chromatography (Eluent: petroleum ether) afforded C60 as a colorless oil. Yield: 260 mg, 0.800 mmol, 35%. $^1$H NMR (400 MHz, chloroform-d) δ 7.59-7.41 (m, 6H), 7.32 (dd, J=10.8, 7.5 Hz, 1H).

Step 4. Synthesis of methyl 5,6-difluoro-3-phenyl-1-benzothiophene-2-carboxylate (C61)

To a solution of C60 (260 mg, 0.800 mmol) and N,N-diisopropylethylamine (0.221 mL, 1.27 mmol) in methanol (5 mL) was added [1,1'-bis(diphenylphosphino)ferrocene]dichloropalladium(II), dichloromethane complex (65.3 mg, 80.0 μmol), whereupon the atmosphere was replaced by carbon monoxide. The reaction mixture was stirred at 70° C. for 16 hours, at which time analysis via thin-layer chromatography indicated that the starting material had not been consumed. The reaction mixture was filtered and the filtrate was concentrated in vacuo to provide material that was then subjected a second reaction: the residue was diluted with methanol (15 mL), treated with N,N-diisopropylethylamine (0.221 mL, 1.27 mmol) and [1,1'-bis(diphenylphosphino)ferrocene]dichloropalladium(II), dichloromethane complex (65.3 mg, 80.0 μmol), and placed under an atmosphere of carbon monoxide. This reaction mixture was stirred at 80° C. for 3 hours and filtered; the filtrate was concentrated under reduced pressure and subjected to silica gel chromatography (Eluent: petroleum ether), providing C61 as a colorless gum. Yield: 52.0 mg, 0.171 mmol, 21%. $^1$H NMR (400 MHz, chloroform-d) δ 7.65 (dd, J=9.5, 7.0 Hz, 1H), 7.54-7.46 (m, 3H), 7.39-7.34 (m, 2H), 7.29 (dd, J=10.7, 7.6 Hz, 1H), 3.78 (s, 3H).

Step 5. Synthesis of 5,6-difluoro-3-phenyl-1-benzothiophene-2-carboxylic acid (11)

To a solution of C61 (52.0 mg, 0.171 mmol) in a mixture of methanol (1 mL), tetrahydrofuran (1 mL), and water (0.5 mL) was added lithium hydroxide monohydrate (71.7 mg, 1.71 mmol), whereupon the reaction mixture was stirred at 20° C. for 4 hours. Water was added, and the resulting mixture was washed with petroleum ether (2×8 mL); the aqueous layer was then adjusted to a pH of approximately 3 by addition of hydrochloric acid (1 mL). This aqueous mixture was extracted with ethyl acetate (3×8 mL), and the combined ethyl acetate layers were dried over sodium sulfate, filtered, and concentrated in vacuo. Purification via reversed-phase HPLC (Column: Boston Prime C18, 30×150 mm, 5 μm; Mobile phase A: water containing 0.05% ammonium hydroxide (v/v); Mobile phase B: acetonitrile; Gradient: 13% to 43% B; Flow rate: 30 mL/minute) afforded 5,6-difluoro-3-phenyl-1-benzothiophene-2-carboxylic acid (11) as a white solid. Yield: 26.5 mg, 91.3 μmol, 53%. LCMS m/z 291.1 [M+H]$^+$. $^1$H NMR (400 MHz, methanol-d$_4$) δ 7.86 (dd, J=10.2, 7.2 Hz, 1H), 7.51-7.36 (m, 5H), 7.24 (dd, J=11.2, 7.6 Hz, 1H).

Example 12

Ammonium 6-chloro-3-(2,4,5-trifluoro-3-methoxyphenyl)-1-benzothiophene-2-carboxylate (12)

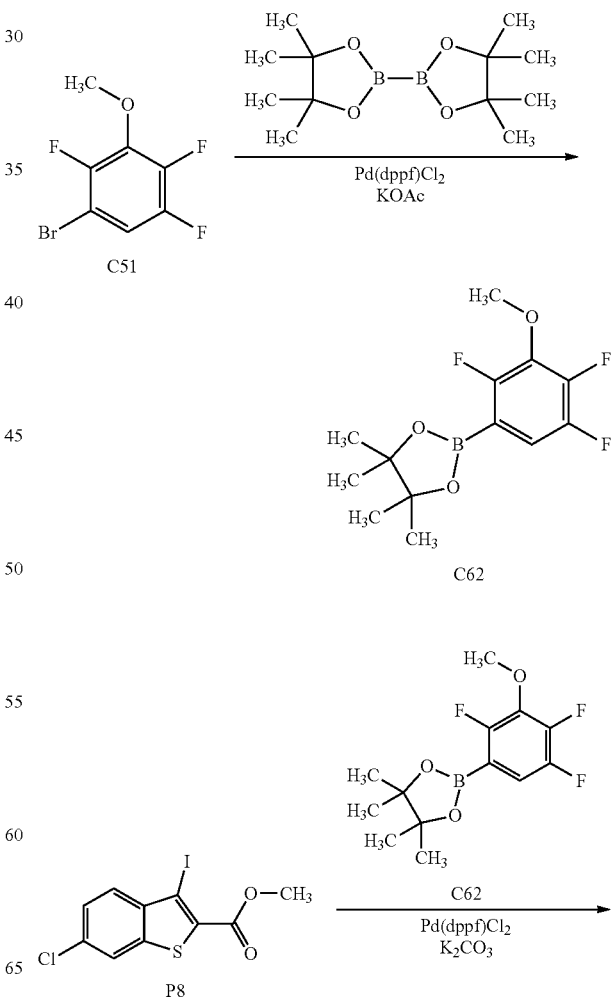

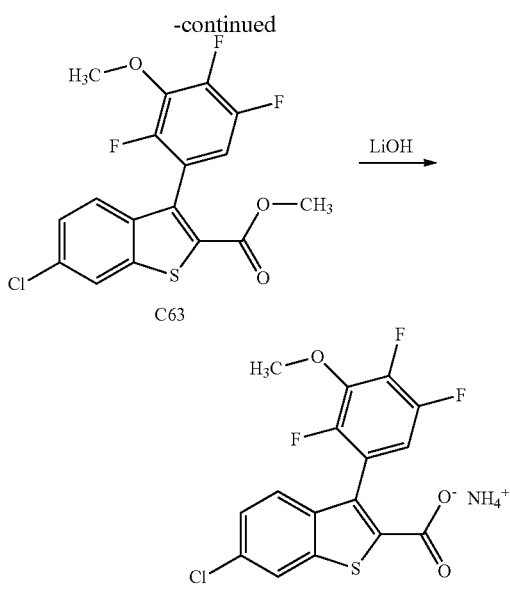

Step 1. Synthesis of 4,4,5,5-tetramethyl-2-(2,4,5-trifluoro-3-methoxyphenyl)-1,3,2-dioxaborolane (C62)

A mixture of C51 (400.0 mg, 1.66 mmol), 4,4,4',4',5,5,5',5'-octamethyl-2,2'-bi-1,3,2-dioxaborolane (1.05 g, 4.13 mmol), and potassium acetate (326 mg, 3.32 mmol) in 1,4-dioxane (12 mL) was degassed with nitrogen for 1 minute, whereupon [1,1'-bis(diphenylphosphino)ferrocene]dichloropalladium(II) (121 mg, 0.165 mmol) was added and the reaction mixture was heated at 100° C. for 16 hours. After filtration, the filtrate was concentrated in vacuo and purified using chromatography on silica gel (Gradient: 0% to 8% ethyl acetate in petroleum ether) to afford C62 as a gum. Yield: 500 mg, assumed quantitative. $^1$H NMR (400 MHz, chloroform-d) δ 7.22 (ddd, J=9.8, 8.8, 4.6 Hz, 1H), 4.03 (t, J=1.1 Hz, 3H), 1.37 (s, 12H).

Step 2. Synthesis of methyl 6-chloro-3-(2,4,5-trifluoro-3-methoxyphenyl)-1-benzothiophene-2-carboxylate (C63)

A suspension of C62 (200 mg, 0.694 mmol), P8 (200 mg, 0.567 mmol), and potassium carbonate (235 mg, 1.70 mmol) in 1,4-dioxane (2 mL) was degassed with nitrogen for 1 minute, whereupon [1,1'-bis(diphenylphosphino)ferrocene]dichloropalladium(II) (41.5 mg, 56.7 μmol) was added. The reaction mixture was stirred at 80° C. for 16 hours and then filtered; the filtrate was concentrated in vacuo and purified via chromatography on silica gel (Gradient: 0% to 5% ethyl acetate in petroleum ether), affording C63 as a colorless gum. Yield: 160 mg, 0.414 mmol, 73%. $^1$H NMR (400 MHz, chloroform-d) δ 7.89 (br d, J=1.9 Hz, 1H), 7.42 (br d, half of AB quartet, J=8.7 Hz, 1H), 7.37 (dd, component of ABX system, J=8.7, 1.8 Hz, 1H), 6.85 (ddd, J=9.9, 8.1, 6.0 Hz, 1H), 4.09 (t, J=1.2 Hz, 3H), 3.84 (s, 3H).

Step 3. Synthesis of ammonium 6-chloro-3-(2,4,5-trifluoro-3-methoxyphenyl)-1-benzothiophene-2-carboxylate (12)

To a solution of C63 (160 mg, 0.414 mmol) in a mixture of methanol (2.0 mL) and tetrahydrofuran (2.0 mL) was added a solution of lithium hydroxide monohydrate (174 mg, 4.15 mmol) in water (1.0 mL). After the reaction mixture had been stirred at room temperature for 16 hours, it was diluted with water (5 mL) and adjusted to a pH of 4. The resulting mixture was extracted with ethyl acetate (3×5 mL); the combined organic layers were washed with saturated aqueous sodium chloride solution, dried over sodium sulfate, filtered, concentrated in vacuo, and purified via reversed-phase HPLC (Column: YMC-Actus Triart C18, 30×150 mm, 7 μm; Mobile phase A: water containing 0.05% ammonium hydroxide (v/v); Mobile phase B: acetonitrile; Gradient: 3% to 43% B; Flow rate: 25 mL/minute). Ammonium 6-chloro-3-(2,4,5-trifluoro-3-methoxyphenyl)-1-benzothiophene-2-carboxylate (12) was isolated as a white solid. Yield: 71.4 mg, 0.183 mmol, 44%. LCMS m/z 370.8 (chlorine isotope pattern observed) [M−H]$^-$. $^1$H NMR (400 MHz, DMSO-d$_6$) δ 8.12 (br s, 1H), 7.37 (dd, component of ABX system, J=8.7, 1.8 Hz, 1H), 7.34 (d, half of AB quartet, J=8.8 Hz, 1H), 7.25 (br s, approximately 3H), 7.22 (ddd, J=10.8, 8.5, 6.1 Hz, 1H), 4.00 (br s, 3H).

Example 13

6-Chloro-3-(2,4-difluoro-3-methoxyphenyl)-1-benzothiophene-2-carboxylic acid (13)

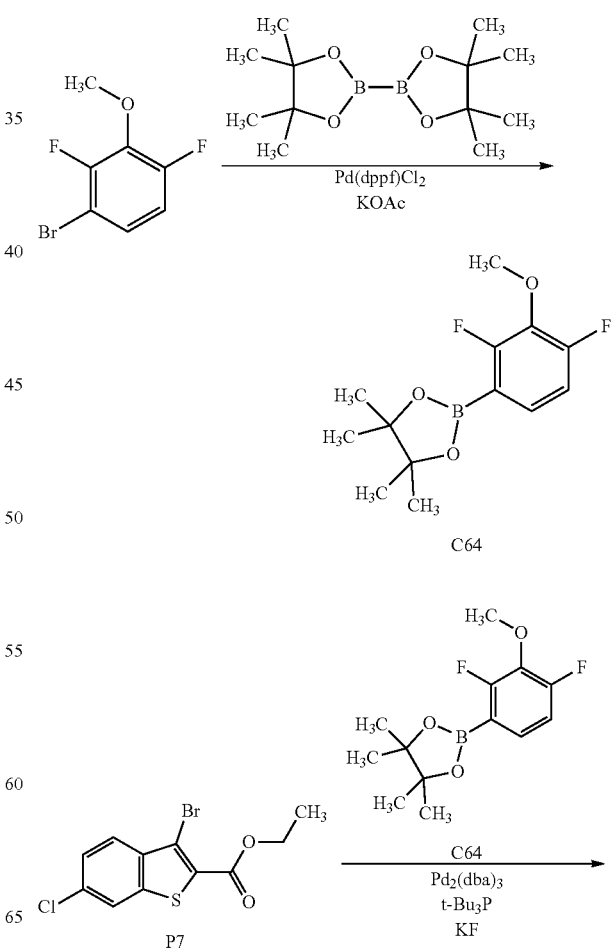

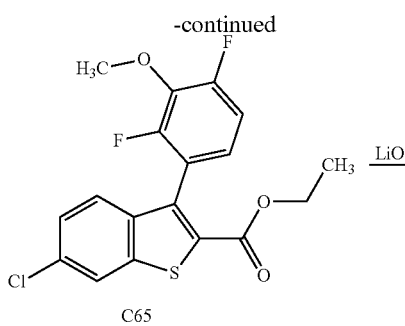

Step 3. Synthesis of 6-chloro-3-(2,4-difluoro-3-methoxyphenyl)-1-benzothiophene-2-carboxylic acid (13)

A solution of lithium hydroxide monohydrate (263 mg, 6.27 mmol) in water (1 mL) was added to a solution of C65 (240 mg, 0.627 mmol) in a mixture of methanol (2.5 mL) and tetrahydrofuran (2.5 mL). After the reaction mixture had been stirred at 25° C. for 2.5 hours, it was adjusted to a pH of approximately 3, then extracted with ethyl acetate (3×20 mL). The combined organic layers were washed with saturated aqueous sodium chloride solution (2×15 mL), dried over sodium sulfate, filtered, and concentrated in vacuo. The residue was treated with acetonitrile and water, and then lyophilized, to provide 6-chloro-3-(2,4-difluoro-3-methoxyphenyl)-1-benzothiophene-2-carboxylic acid (13) as a green solid. Yield: 160 mg, 0.451 mmol, 72%. LCMS m/z 372.0 (chlorine isotope pattern observed) [M+NH$_4^+$]. $^1$H NMR (400 MHz, methanol-d$_4$) δ 8.05 (br d, J=1.6 Hz, 1H), 7.44 (br d, half of AB quartet, J=8.7 Hz, 1H), 7.41 (dd, component of ABX system, J=8.8, 1.8 Hz, 1H), 7.12 (ddd, component of ABXY system, J=10.4, 8.7, 1.6 Hz, 1H), 7.05 (ddd, component of ABXY system, J=8.7, 7.2, 5.8 Hz, 1H), 4.00 (br s, 3H).

Step 1. Synthesis of 2-(2,4-difluoro-3-methoxyphenyl)-4,4,5,5-tetramethyl-1,3,2-dioxaborolane (C64)

A mixture of 1-bromo-2,4-difluoro-3-methoxybenzene (330 mg, 1.48 mmol), 4,4,4',4',5,5,5',5'-octamethyl-2,2'-bi(1,3,2-dioxaborolane) (752 mg, 2.96 mmol), and potassium acetate (290 mg, 2.95 mmol) in 1,4-dioxane (7 mL) was degassed with nitrogen for 1 minute, whereupon [1,1'-bis(diphenylphosphino)ferrocene]dichloropalladium(II) (108 mg, 0.148 mmol) was added and the reaction mixture was heated at 95° C. for 16 hours. It was then filtered; the filtrate was concentrated in vacuo and purified via silica gel chromatography (Eluent: petroleum ether), providing C64 as a yellow gum. Yield: 370 mg, 1.37 mmol, 93%. $^1$H NMR (400 MHz, chloroform-d) δ 7.37 (ddd, J=8.5, 6.3, 6.3 Hz, 1H), 6.88 (ddd, J=10.1, 8.5, 1.6 Hz, 1H), 3.97 (s, 3H), 1.35 (s, 12H).

Step 2. Synthesis of ethyl 6-chloro-3-(2,4-difluoro-3-methoxyphenyl)-1-benzothiophene-2-carboxylate (C65)

A suspension of C64 (370 mg, 1.37 mmol), P7 (390 mg, 1.22 mmol), and potassium fluoride (193 mg, 3.32 mmol) in a mixture of tetrahydrofuran (10 mL) and water (1 mL) was treated with tris(dibenzylideneacetone)dipalladium(0) (50.8 mg, 55.5 μmol), followed by a solution of tri-tert-butylphosphine in toluene (1 M; 0.111 mL, 0.111 mmol). After the reaction mixture had been heated at 65° C. for 16 hours, it was filtered, concentrated in vacuo, and purified via silica gel chromatography (Gradient: 0% to 2% ethyl acetate in petroleum ether), to afford C65 as a gum. Yield: 240 mg, 0.627 mmol, 51%. $^1$H NMR (400 MHz, chloroform-d) δ 7.88 (d, J=1.8 Hz, 1H), 7.41 (br d, component of AB quartet, J=8.7 Hz, 1H), 7.34 (dd, component of ABX system, J=8.7, 1.9 Hz, 1H), 7.03 (ddd, component of ABXY system, J=10.1, 8.7, 1.6 Hz, 1H), 6.95 (ddd, component of ABXY system, J=8.7, 7.1, 5.9 Hz, 1H), 4.32-4.21 (m, 2H), 4.05 (br s, 3H), 1.25 (t, J=7.1 Hz, 3H).

Examples 14, 15, and 16

3-(6-Chloro-2,4-difluoro-3-methoxyphenyl)-6-fluoro-1-benzothiophene-2-carboxylic acid (14), 3-(6-Chloro-2,4-difluoro-3-methoxyphenyl)-6-fluoro-1-benzothiophene-2-carboxylic acid, ATROP-1 (15), and 3-(6-Chloro-2,4-difluoro-3-methoxyphenyl)-6-fluoro-1-benzothiophene-2-carboxylic acid, ATROP-2 (16)

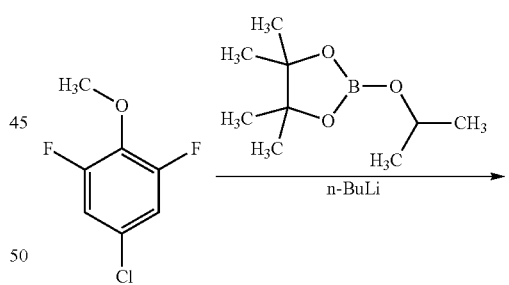

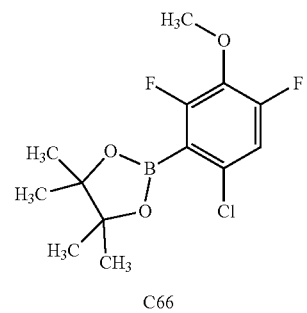

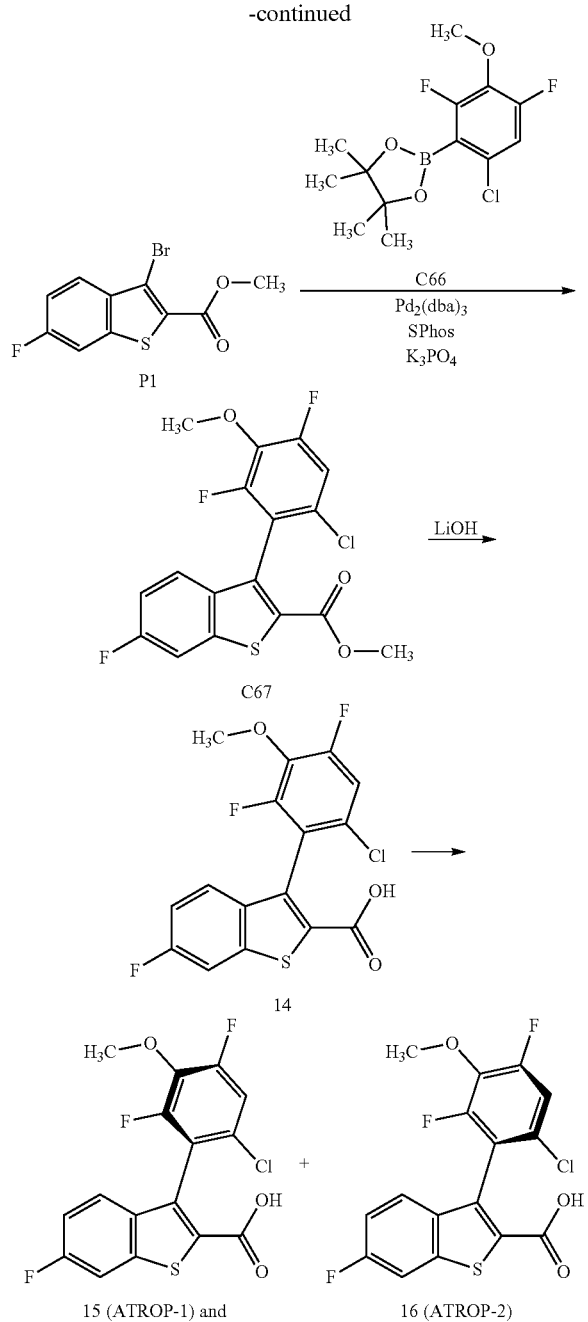

Step 1. Synthesis of 2-(6-chloro-2,4-difluoro-3-methoxyphenyl)-4,4,5,5-tetramethyl-1,3,2-dioxaborolane (C66)

A solution of n-butyllithium (2.5 M; 10.1 mL, 25.2 mmol) was added in a drop-wise manner to a −65° C. solution of 5-chloro-1,3-difluoro-2-methoxybenzene (1.80 g, 10.1 mmol) in tetrahydrofuran (50.4 mL). After the reaction mixture had been stirred at −65° C. for 1 hour, it was treated with 4,4,5,5-tetramethyl-2-(propan-2-yloxy)-1,3,2-dioxaborolane (5.63 g, 30.3 mmol) and allowed to warm to 0° C. over 1 hour. Aqueous ammonium chloride solution (100 mL) was added and the resulting mixture was extracted with ethyl acetate (3×50 mL); these organic layers were combined with those from a similar reaction carried out using 5-chloro-1,3-difluoro-2-methoxybenzene (1.00 g, 5.60 mmol), washed with saturated aqueous sodium chloride solution (50 mL), dried over sodium sulfate, filtered, and concentrated in vacuo. Silica gel chromatography (Gradient: 0% to 10% ethyl acetate in petroleum ether) provided C66 as a colorless oil. Combined yield: 3.10 g, 10.2 mmol, 65%. $^1$H NMR (400 MHz, chloroform-d) δ 6.92 (dd, J=10.3, 2.0 Hz, 1H), 3.94 (t, J=1.0 Hz, 3H), 1.39 (s, 12H).

Step 2. Synthesis of methyl 3-(6-chloro-2,4-difluoro-3-methoxyphenyl)-6-fluoro-1-benzothiophene-2-carboxylate (C67)

To a mixture of P1 (1.80 g, 6.23 mmol), C66 (3.03 g, 9.95 mmol), and tripotassium phosphate (3.96 g, 18.7 mmol) in toluene (30 mL) were added tris(dibenzylideneacetone)dipalladium(0), chloroform complex (322 mg, 0.311 mmol) and 2-dicyclohexylphosphino-2′,6′-dimethoxybiphenyl (SPhos; 383 mg, 0.933 mmol), whereupon the reaction mixture was stirred at 100° C. for 2 hours. It was then concentrated in vacuo and purified via chromatography on silica gel (Gradient: 0% to 10% ethyl acetate in petroleum ether), affording C67 as a colorless oil (1.80 g). $^1$H NMR analysis indicated that the product contained aliphatic impurities; it was progressed directly to the following step. $^1$H NMR (400 MHz, chloroform-d), product peaks only: δ 7.59 (dd, J=8.4, 2.3 Hz, 1H), 7.36 (dd, J=9.0, 5.0 Hz, 1H), 7.19-7.12 (m, 2H), 4.03 (br s, 3H), 3.83 (s, 3H).

Step 3. Synthesis of 3-(6-chloro-2,4-difluoro-3-methoxyphenyl)-6-fluoro-1-benzothiophene-2-carboxylic acid (14)

To a solution of C67 (from the previous step; 1.80 g, <4.65 mmol) in a mixture of water (4 mL), tetrahydrofuran (6 mL), and methanol (8 mL) was added lithium hydroxide monohydrate (976 mg, 23.3 mmol). The reaction mixture was stirred at 20° C. for 16 hours, whereupon LCMS analysis indicated conversion to 14: LCMS m/z 370.9 [M−H]$^-$. After the reaction mixture had been concentrated in vacuo, it was diluted with water (50 mL), acidified to a pH of approximately 4 by addition of 1 M hydrochloric acid, and extracted with ethyl acetate (3×40 mL). The combined organic layers were concentrated under reduced pressure and purified via reversed-phase HPLC (Column: YMC-Actus Triart C18, 50×250 mm, 7 μm; Mobile phase A: water containing 0.05% ammonium hydroxide (v/v); Mobile phase B: acetonitrile; Gradient: 7% to 47% B; Flow rate: 60 mL/minute). The fractions containing 14 were combined, concentrated in vacuo to remove acetonitrile, and subsequently acidified to a pH of approximately 4 by addition of 1 M hydrochloric acid. The resulting mixture was extracted with ethyl acetate (2×40 mL), and the combined organic layers were dried over sodium sulfate, filtered, and concentrated under reduced pressure to afford 3-(6-chloro-2,4-difluoro-3-methoxyphenyl)-6-fluoro-1-benzothiophene-2-carboxylic acid (14) as a white solid. Yield: 1.01 g, 2.71 mmol, 43% over 2 steps. LCMS m/z 373.2 [M+H]$^+$. $^1$H NMR (400 MHz, methanol-d$_4$) 7.78 (dd, J=8.8, 2.4 Hz, 1H), 7.38 (dd, J=8.9, 5.1 Hz, 1H), 7.31 (dd, J=10.7, 2.1 Hz, 1H), 7.23 (ddd, J=9.0, 8.9, 2.4 Hz, 1H), 4.00 (t, J=0.9 Hz, 3H).

Step 4. Isolation of 3-(6-chloro-2,4-difluoro-3-methoxyphenyl)-6-fluoro-1-benzothiophene-2-carboxylic acid, ATROP-1 (15) and 3-(6-chloro-2,4-difluoro-3-methoxyphenyl)-6-fluoro-1-benzothiophene-2-carboxylic acid, ATROP-2 (16)

The product 14 from the previous step (1.00 g, 2.68 mmol) was separated into its component atropisomers using supercritical fluid chromatography (Column: Chiral Technologies Chiralpak AD-H, 30×250 mm, 5 μm; Mobile phase: 4:1 carbon dioxide/methanol; Back pressure: 100 bar; Flow rate: 80 mL/minute). The first-eluting atropisomer, an off-white solid, was designated as 3-(6-chloro-2,4-difluoro-3-methoxyphenyl)-6-fluoro-1-benzothiophene-2-carboxylic acid, ATROP-1 (15), and the second-eluting atropisomer, a white solid, was designated as 3-(6-chloro-2,4-difluoro-3-methoxyphenyl)-6-fluoro-1-benzothiophene-2-carboxylic acid, ATROP-2 (16).

15—Yield: 0.45 g, 1.2 mmol, 45% for the separation. LCMS m/z 373.2 (chlorine isotope pattern observed) [M+H]$^+$. $^1$H NMR (400 MHz, DMSO-d$_6$) δ 13.66 (br s, 1H), 8.08 (dd, J=9.1, 2.4 Hz, 1H), 7.65 (dd, J=11.0, 2.0 Hz, 1H), 7.46 (dd, component of ABX system, J=9.0, 5.2 Hz, 1H), 7.35 (ddd, component of ABXY system, J=9.0, 9.0, 2.4 Hz, 1H), 3.97 (s, 3H). Retention time: 1.16 minutes (Analytical conditions. Column: Chiral Technologies Chiralpak AD-H, 4.6×100 mm, 3 μm; Mobile phase A: carbon dioxide; Mobile phase B: methanol; Gradient: 5% B for 0.25 minutes, then 5% to 70% B over 2.25 minutes; Back pressure: 100 bar; Flow rate: 2.5 mL/minute).

16—Yield: 0.49 g, 1.3 mmol, 49% for the separation. LCMS m/z 373.3 (chlorine isotope pattern observed) [M+H]$^+$. $^1$H NMR (400 MHz, DMSO-d$_6$) δ 13.66 (br s, 1H), 8.08 (dd, J=9.2, 2.4 Hz, 1H), 7.65 (dd, J=11.0, 2.0 Hz, 1H), 7.46 (dd, component of ABX system, J=8.9, 5.2 Hz, 1H), 7.35 (ddd, component of ABXY system, J=9.0, 9.0, 2.5 Hz, 1H), 3.97 (s, 3H). Retention time: 1.34 minutes (Analytical conditions identical to those used for 15).

Example 17

6-Fluoro-3-(2,4,5-trifluoro-3-methoxyphenyl)-1-benzofuran-2-carboxylic acid (17)

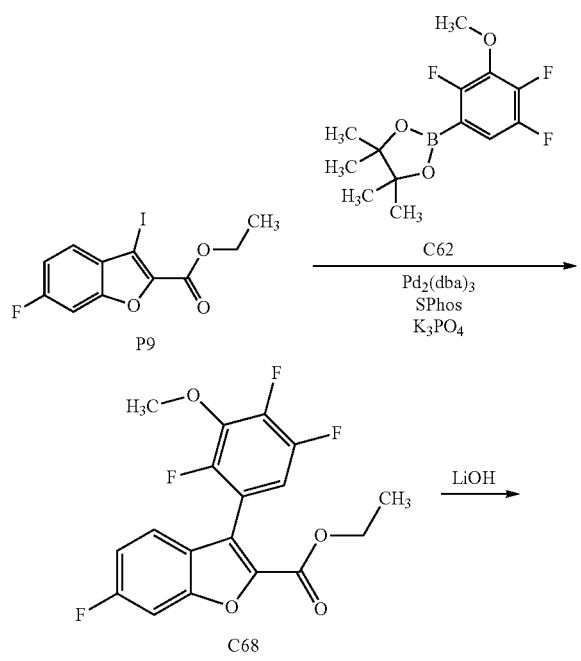

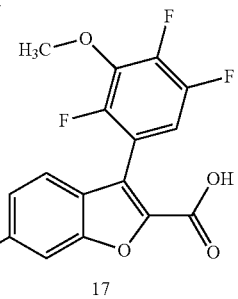

Step 1. Synthesis of ethyl 6-fluoro-3-(2,4,5-trifluoro-3-methoxyphenyl)-1-benzofuran-2-carboxylate (C68)

To a mixture of C62 (194 mg, 0.673 mmol), P9 (150 mg, 0.449 mmol), and tripotassium phosphate (286 mg, 1.35 mmol) in toluene (3.0 mL) were added tris(dibenzylideneacetone)dipalladium(0) (20.6 mg, 22.5 μmol) and 2-dicyclohexylphosphino-2',6'-dimethoxybiphenyl (SPhos; 27.6 mg, 67.2 μmol). The reaction mixture was stirred at 100° C. for 2 hours, whereupon it was filtered. The filtrate was concentrated in vacuo and subjected to silica gel chromatography (Gradient: 0% to 8% ethyl acetate in petroleum ether), affording C68 as an orange solid. Yield: 134 mg, 0.364 mmol, 81%. LCMS m/z 369.0 [M+H]$^+$. $^1$H NMR (400 MHz, chloroform-d) δ 7.43 (br dd, J=8.8, 5.4 Hz, 1H), 7.35 (dd, J=8.5, 2.3 Hz, 1H), 7.12 (ddd, J=9.0, 9.0, 2.3 Hz, 1H), 7.00 (ddd, J=10.0, 8.1, 6.0 Hz, 1H), 4.36 (q, J=7.1 Hz, 2H), 4.10 (t, J=1.2 Hz, 3H), 1.31 (t, J=7.1 Hz, 3H).

Step 2. Synthesis of 6-fluoro-3-(2,4,5-trifluoro-3-methoxyphenyl)-1-benzofuran-2-carboxylic acid (17)

A solution of lithium hydroxide monohydrate (148 mg, 3.53 mmol) in water (1 mL) was added to a solution of C68 (130 mg, 0.353 mmol) in a mixture of methanol (2 mL) and tetrahydrofuran (2 mL). After the reaction mixture had been stirred at room temperature for 4 hours, it was diluted with water (5 mL) and washed with petroleum ether (2×8 mL). The aqueous layer was acidified to a pH of 4 by addition of hydrochloric acid (1 M; 3 mL) and extracted with ethyl acetate (3×8 mL); the combined ethyl acetate layers were washed with saturated aqueous sodium chloride solution, dried over sodium sulfate, filtered, and concentrated in vacuo. Reversed-phase HPLC (Column: Boston Prime C18, 30×150 mm, 5 μm; Mobile phase A: water containing 0.05% ammonium hydroxide (v/v); Mobile phase B: acetonitrile; Gradient: 8% to 38% B; Flow rate: 30 mL/minute) provided 6-fluoro-3-(2,4,5-trifluoro-3-methoxyphenyl)-1-benzofuran-2-carboxylic acid (17) as a white solid. Yield: 48.4 mg, 0.142 mol, 40%. LCMS m/z 338.9 [M−H]$^-$. $^1$H NMR (400 MHz, methanol-d$_4$) δ 7.45-7.37 (m, 2H), 7.19-7.07 (m, 2H), 4.05 (br s, 3H).

Example 18

6-Chloro-3-(2,4,5-trifluoro-3-methoxyphenyl)-1-benzofuran-2-carboxylic acid (18)

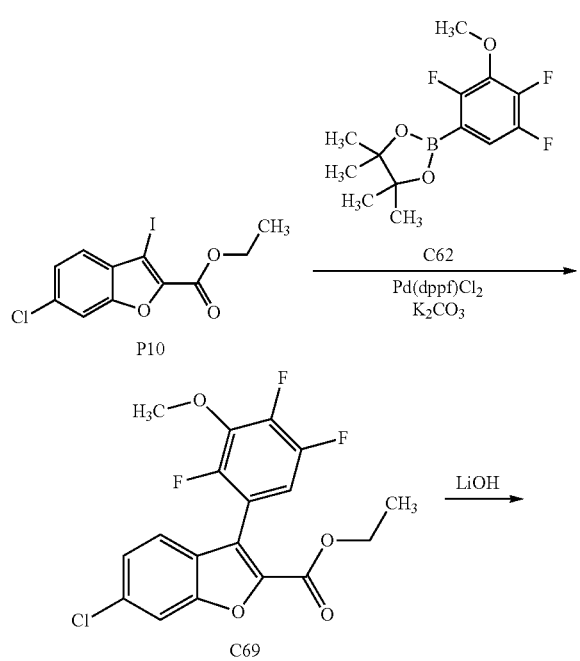

Step 1. Synthesis of ethyl 6-chloro-3-(2,4,5-trifluoro-3-methoxyphenyl)-1-benzofuran-2-carboxylate (C69)

A suspension of P10 (73.0 mg, 0.208 mmol), C62 (50 mg, 0.17 mmol), and potassium carbonate (72.0 mg, 0.521 mmol) in 1,4-dioxane (1 mL) was degassed with nitrogen for 1 minute, whereupon [1,1'-bis(diphenylphosphino)ferrocene]dichloropalladium(II) (12.7 mg, 17.4 µmol) was added. After the reaction mixture had been stirred at 80° C. for 16 hours, it was filtered; the filtrate was concentrated in vacuo and purified using silica gel chromatography (Gradient: 0% to 7% ethyl acetate in petroleum ether) to provide C69 as a colorless gum. Yield: 39.6 mg, 0.103 mmol, 61%. $^1$H NMR (400 MHz, chloroform-d) δ 7.65 (d, J=1.7 Hz, 1H), 7.40 (br d, half of AB quartet, J=8.7 Hz, 1H), 7.33 (dd, component of ABX system, J=8.5, 1.7 Hz, 1H), 6.99 (ddd, J=10.0, 8.1, 6.0 Hz, 1H), 4.36 (q, J=7.1 Hz, 2H), 4.10 (t, J=1.2 Hz, 3H), 1.31 (t, J=7.1 Hz, 3H).

Step 2. Synthesis of 6-chloro-3-(2,4,5-trifluoro-3-methoxyphenyl)-1-benzofuran-2-carboxylic acid (18)

A solution of C69 (84.0 mg, 0.218 mmol) in a mixture of methanol (1 mL) and tetrahydrofuran (1 mL) was treated with a solution of lithium hydroxide monohydrate (91.6 mg, 2.18 mmol) in water (0.5 mL). The reaction mixture was stirred at room temperature for 1.5 hours, whereupon it was diluted with water (5 mL) and washed with petroleum ether (4 mL). The aqueous layer was acidified to pH 4 by addition of hydrochloric acid (1 M; 3 mL) and extracted with ethyl acetate (3×5 mL); the combined ethyl acetate layers were washed with saturated aqueous sodium chloride solution, dried over sodium sulfate, filtered, and concentrated in vacuo. Reversed-phase HPLC (Column: YMC-Actus Triart C18, 30×150 mm, 7 µm; Mobile phase A: water containing 0.05% ammonium hydroxide (v/v); Mobile phase B: acetonitrile; Gradient: 25% to 50% B; Flow rate: 25 mL/minute) was followed by supercritical fluid chromatography [Column: Chiral Technologies Chiralpak AD, 30×250 mm, 10 µm; Mobile phase: 3:1 carbon dioxide/(propan-2-ol containing 0.1% ammonium hydroxide); Flow rate: 70 mL/minute] to afford 6-chloro-3-(2,4,5-trifluoro-3-methoxyphenyl)-1-benzofuran-2-carboxylic acid (18) as a white solid. Yield: 9.71 mg, 27.2 µmol, 12%. LCMS m/z 356.9 [M+H]$^+$. $^1$H NMR (400 MHz, methanol-d$_4$) δ 7.72 (d, J=1.8 Hz, 1H), 7.45 (br d, half of AB quartet, J=8.5 Hz, 1H), 7.35 (dd, component of ABX system, J=8.5, 1.8 Hz, 1H), 7.17 (ddd, J=10.6, 8.3, 6.0 Hz, 1H), 4.06 (br s, 3H).

Example 19

6-Fluoro-3-(2,3,4-trifluorophenyl)-1-benzothiophene-2-carboxylic acid (19)

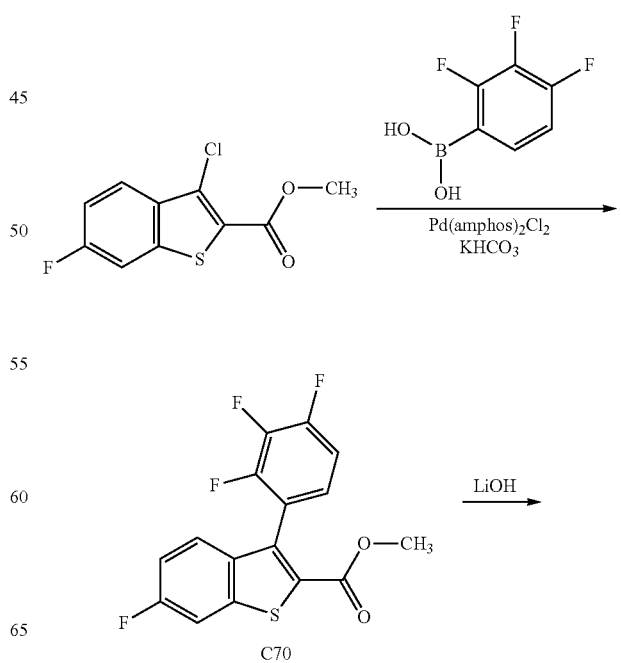

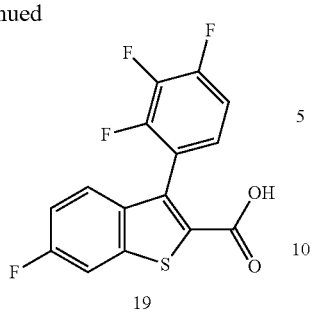

Step 1. Synthesis of methyl 6-fluoro-3-(2,3,4-trifluorophenyl)-1-benzothiophene-2-carboxylate (C70)

To a mixture of methyl 3-chloro-6-fluoro-1-benzothiophene-2-carboxylate (70 mg, 0.29 mmol) in toluene (3 mL) were added (2,3,4-trifluorophenyl)boronic acid (55 mg, 0.31 mmol), potassium bicarbonate (85.8 mg, 0.857 mmol), bis[di-tert-butyl(4-dimethylaminophenyl)phosphine]dichloropalladium(II) [Pd(amphos)$_2$Cl$_2$; 10 mg, 14 μmol), and water (0.5 mL). The reaction vessel was evacuated and charged with nitrogen; this evacuation cycle was repeated twice, whereupon the reaction mixture was heated at 120° C. for 16 hours. It was then diluted with water (10 mL) and extracted with ethyl acetate (2×10 mL). The combined organic layers were washed sequentially with water and saturated aqueous sodium chloride solution, dried over sodium sulfate, filtered, and concentrated in vacuo. Chromatography on silica gel (Gradient: 0% to 5% ethyl acetate in petroleum ether) provided C70 as a gum. Yield: 70 mg, 0.21 mmol, 72%. LCMS m/z 341.0 [M+H]$^+$. $^1$H NMR (400 MHz, chloroform-d) δ 7.59 (dd, J=8.4, 2.3 Hz, 1H), 7.44 (dd, J=9.0, 5.1 Hz, 1H), 7.16 (ddd, J=8.8, 8.8, 2.4 Hz, 1H), 7.15-7.02 (m, 2H), 3.83 (s, 3H).

Step 2. Synthesis of 6-fluoro-3-(2,3,4-trifluorophenyl)-1-benzothiophene-2-carboxylic acid (19)

A solution of lithium hydroxide (24.7 mg, 1.03 mmol) in water (1 mL) was added to a solution of C70 (70 mg, 0.21 mmol) in a mixture of methanol (5 mL) and tetrahydrofuran (1 mL). After the reaction mixture had been stirred at 25° C. for 16 hours, it was concentrated in vacuo, diluted with water (10 mL), and washed with dichloromethane (2×10 mL). The aqueous layer was adjusted to pH 2, whereupon it was extracted with ethyl acetate (3×50 mL). The combined ethyl acetate layers were washed with water and with saturated aqueous sodium chloride solution, dried over sodium sulfate, filtered, and concentrated under reduced pressure to afford 6-fluoro-3-(2,3,4-trifluorophenyl)-1-benzothiophene-2-carboxylic acid (19) as a solid. Yield: 11.5 mg, 35.2 μmol, 17%. LCMS m/z 327.0 [M+H]$^+$. $^1$H NMR (400 MHz, DMSO-d$_6$) δ 8.01 (br d, J=9.1 Hz, 1H), 7.52-7.37 (m, 2H), 7.37-7.23 (m, 2H).

Example 20

6-Chloro-3-(4-chloro-3-fluorophenyl)-1-benzothiophene-2-carboxylic acid (20)

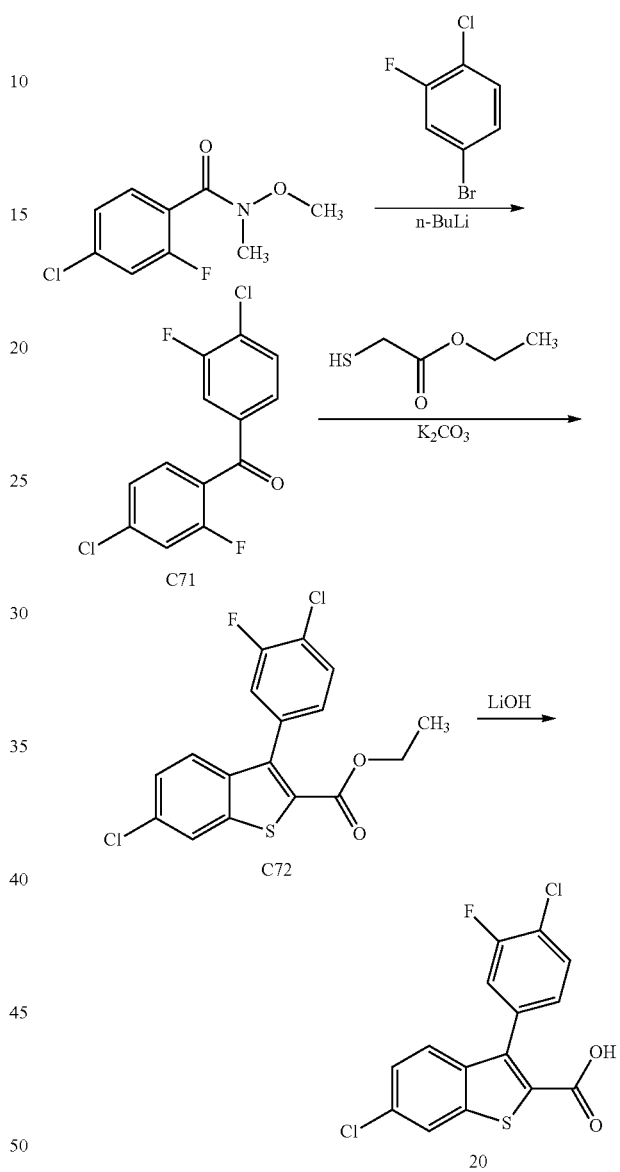

Step 1. Synthesis of (4-chloro-2-fluorophenyl)(4-chloro-3-fluorophenyl)methanone (C71)

A solution of n-butyllithium in hexane (2.4 M; 0.44 mL, 1.1 mmol) was added in a drop-wise manner to a −78° C. solution of 4-bromo-1-chloro-2-fluorobenzene (200 mg, 0.955 mmol) in tetrahydrofuran (3 mL). After the reaction mixture had been stirred at −78° C. for 30 minutes, a solution of 4-chloro-2-fluoro-N-methoxy-N-methylbenzamide (208 mg, 0.956 mmol) in tetrahydrofuran (2 mL) was added drop-wise. Stirring was continued at −78° C. for 1 hour, whereupon the reaction mixture was warmed to 20° C. and stirred at 20° C. for 2 hours. Hydrochloric acid (1 M; 3 mL, 3 mmol) and water (10 mL) were then added, and the resulting aqueous layer was extracted with ethyl acetate (2×15 mL). The combined organic layers were dried over sodium sulfate, filtered, and concentrated in vacuo; chromatography on silica gel (Gradient: 0% to 10% ethyl acetate in petroleum ether) provided C71 as a white solid. Yield: 120 mg, 0.418 mmol, 44%. LCMS m/z 287.1 [M+H]+.

Step 2. Synthesis of ethyl 6-chloro-3-(4-chloro-3-fluorophenyl)-1-benzothiophene-2-carboxylate (C72)

To a solution of C71 (120 mg, 0.418 mmol) in N,N-dimethylformamide (2 mL) were added ethyl sulfanylacetate (75 mg, 0.62 mmol) and potassium carbonate (173 mg, 1.25 mmol). The reaction mixture was heated at 100° C. for 16 hours, whereupon it was diluted with water and extracted with ethyl acetate (3×10 mL). The combined organic layers were washed with water and with saturated aqueous sodium chloride solution, dried over sodium sulfate, filtered, and concentrated in vacuo; silica gel chromatography (Gradient: 0% to 10% ethyl acetate in petroleum ether) followed by preparative thin-layer chromatography (Eluent: 20:1 petroleum ether/ethyl acetate) afforded C72 as a white solid. This material was progressed directly to the following step. Yield: 15 mg, 41 µmol, 10%. LCMS m/z 369.0 (dichloro isotope pattern observed) [M+H]+. 1H NMR (400 MHz, chloroform-d) δ 7.89 (d, J=1.9 Hz, 1H), 7.55-7.49 (m, 1H), 7.40 (d, half of AB quartet, J=8.7 Hz, 1H), 7.34 (dd, component of ABX system, J=8.7, 1.8 Hz, 1H), 7.25-7.18 (m, 2H), 4.34-4.17 (m, 2H), 1.21 (t, J=7.1 Hz, 3H).

Step 3. Synthesis of 6-chloro-3-(4-chloro-3-fluorophenyl)-1-benzothiophene-2-carboxylic acid (20)

A solution of lithium hydroxide (10 mg, 0.42 mmol) in water (1.0 mL) was added to a solution of C72 (15 mg, 41 µmol) in a mixture of tetrahydrofuran (1.0 mL) and methanol (1.0 mL), and the reaction mixture was stirred at 20° C. for 16 hours. After volatiles had been removed via concentration in vacuo, the residue was purified using reversed-phase HPLC (Column: Nouryon Kromasil® C18, 21.2×100 mm, 5 µm; Mobile phase A: water containing 0.1% formic acid; Mobile phase B: acetonitrile; Gradient: 60% to 70% B) to provide 6-chloro-3-(4-chloro-3-fluorophenyl)-1-benzothiophene-2-carboxylic acid (20) as a white solid. Yield: 3.2 mg, 9.4 µmol, 23%. LCMS m/z 294.9 (dichloro isotope pattern observed) [M–COOH]−. 1H NMR (400 MHz, DMSO-d6) δ 8.30 (br s, 1H), 7.74-7.66 (m, 1H), 7.52-7.32 (m, 4H).

Example 21

3-(2,6-Difluoro-4-methoxyphenyl)-6-fluoro-1-benzothiophene-2-carboxylic acid (21)

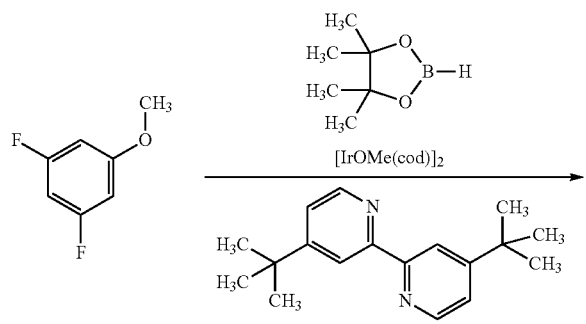

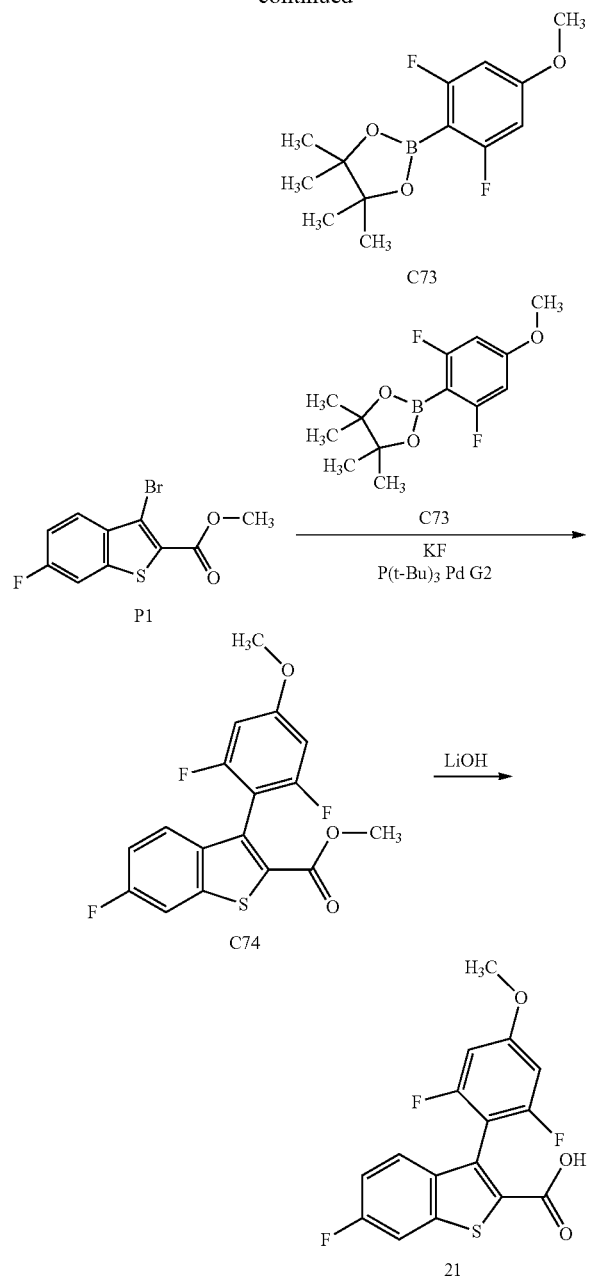

Step 1. Synthesis of 2-(2,6-difluoro-4-methoxyphenyl)-4,4,5,5-tetramethyl-1,3,2-dioxaborolane (C73)

This 3-step sequence was carried out in library format. A solution of 1,3-difluoro-5-methoxybenzene (29 mg, 0.20 mmol) in tetrahydrofuran (2 mL) was treated with (1,5-cyclooctadiene)(methoxy)iridium(I) dimer {[IrOMe(cod)]2; 6.6 mg, 10 µmol} and 4,4'-di-tert-butyl-2,2'-bipyridine (1.34 mg, 4.99 µmol), followed by 4,4,5,5-tetramethyl-1,3,2-dioxaborolane (approximately 290 mg, 2 mmol), whereupon the reaction vial was capped and the reaction mixture was stirred at 80° C. for 16 hours. Removal of solvent using a Speedvac concentrator provided C73, which was taken directly to the following step.

Step 2. Synthesis of methyl 3-(2,6-difluoro-4-methoxyphenyl)-6-fluoro-1-benzothiophene-2-carboxylate (C74)

A solution of P1 in 1,4-dioxane (0.1 M; 1.0 mL, 0.1 mmol) was added to C73 (from the previous step; 50.20 mmol). Water (0.2 mL) and potassium fluoride (174 mg, 2.99 mmol) were then added, followed by chloro[(tri-tert-butylphosphine)-2-(2-aminobiphenyl)] palladium(II) [P(t-Bu)$_3$Pd G2; 2.6 mg, 5.1 μmol). The reaction vial was capped and the vial was shaken at 80° C. for 16 hours, whereupon volatiles were removed using a Speedvac concentrator. The residue was diluted with water (1 mL) and extracted with ethyl acetate (3×1 mL); the combined organic layers were evaporated using a Speedvac concentrator to afford C74, which was taken directly to the following step.

Step 3. Synthesis of 3-(2,6-difluoro-4-methoxyphenyl)-6-fluoro-1-benzothiophene-2-carboxylic acid (21)

Tetrahydrofuran (1 mL) and aqueous lithium hydroxide solution (1 M; 1.0 mL, 1.0 mmol) were added to C74 (from the previous step; 50.20 mmol), followed by methanol (0.4 mL), whereupon the reaction vial was capped and the vial was shaken at 30° C. for 2 hours. After evaporation using a Speedvac concentrator, the residue was purified via reversed-phase HPLC (Column: Boston Prime C18, 30×150 mm, 5 μm; Mobile phase A: water containing ammonium hydroxide (pH 10); Mobile phase B: acetonitrile; Gradient: 12% to 52% B; Flow rate: 30 mL/minute) to afford 3-(2,6-difluoro-4-methoxyphenyl)-6-fluoro-1-benzothiophene-2-carboxylic acid (21). Yield: 8.4 mg, 25 μmol, 25% over 2 steps. LCMS m/z 339 [M+H]$^+$. Retention time: 3.16 minutes (Analytical conditions. Column: Waters XBridge C18, 2.1× 50 mm, 5 μm; Mobile phase A: water containing 0.0375% trifluoroacetic acid; Mobile phase B: acetonitrile containing 0.01875% trifluoroacetic acid; Gradient: 10% B for 0.50 minutes; 10% to 100% B over 3.5 minutes; Flow rate: 0.8 mL/minute.

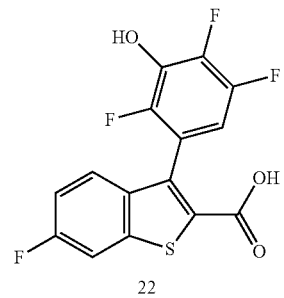

22

A solution of boron tribromide in dichloromethane (1 M; 4.21 mL, 4.21 mmol) was slowly added to a 0° C. solution of 9 (0.500 g, 1.40 mmol) in dichloromethane (30 mL). The reaction mixture was then allowed to warm to room temperature and stir at that temperature for 16 hours, whereupon it was cooled to 0° C. and a solution of boron tribromide in dichloromethane (1 M, 2.81 mmol, 2.81 mL) was again added. The reaction mixture was allowed to warm to room temperature; after it had been stirred at room temperature for an additional 16 hours, it was poured into a mixture of chilled water (200 mL) and dichloromethane (100 mL). The resulting solids were collected via filtration and washed with dichloromethane (3×15 mL), then dissolved in a mixture of dichloromethane and methanol (9:1, 20 mL), dried over sodium sulfate, filtered, and concentrated under reduced pressure. The residue was dissolved in a mixture of dichloromethane and methanol (9:1, 10 mL) and subjected to silica gel chromatography [Gradient: 5% to 15% (5% acetic acid in methanol) in dichloromethane], providing 6-fluoro-3-(2,4,5-trifluoro-3-hydroxyphenyl)-1-benzothiophene-2-carboxylic acid (22) as a white solid. Yield: 217 mg, 0.634 mmol, 45%. LCMS m/z 343.0 [M+H]$^+$. $^1$H NMR (400 MHz, methanol-d$_4$) δ 7.75 (dd, J=8.8, 2.4 Hz, 1H), 7.49 (dd, J=9.0, 5.1 Hz, 1H), 7.23 (ddd, J=9.0, 9.0, 2.4 Hz, 1H), 6.73 (ddd, J=10.5, 8.1, 6.0 Hz, 1H).

Example 22

6-Fluoro-3-(2,4,5-trifluoro-3-hydroxyphenyl)-1-benzothiophene-2-carboxylic acid (22)

Example 23

6-Fluoro-3-(2,4,5-trifluorophenyl)-1-benzothiophene-2-carboxylic acid (23)

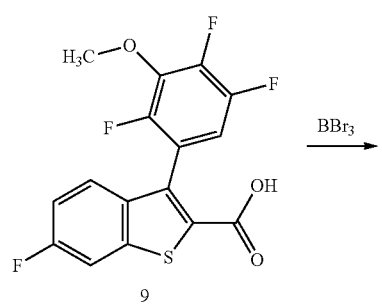

9

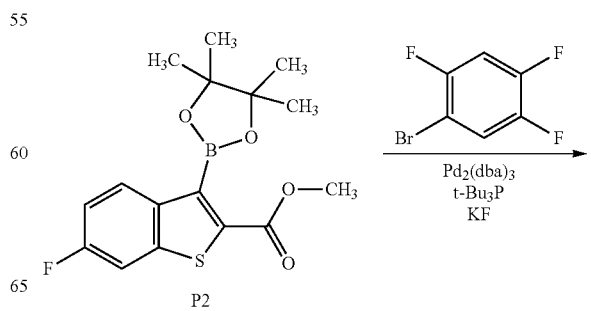

P2

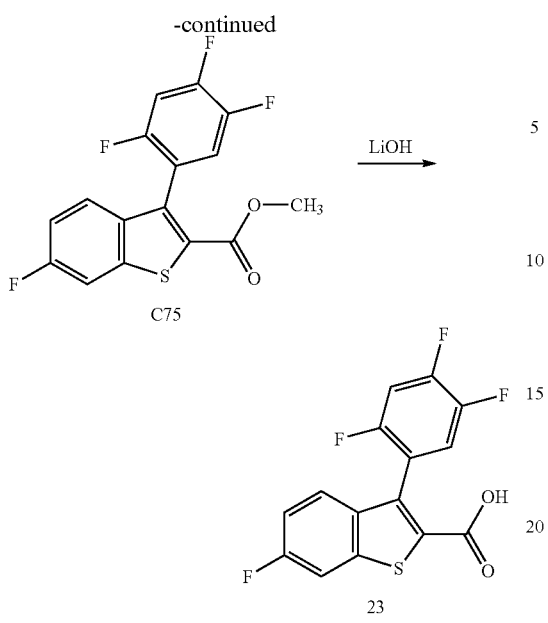

Step 1. Synthesis of methyl 6-fluoro-3-(2,4,5-trifluorophenyl)-1-benzothiophene-2-carboxylate (C75)

To a suspension of P2 (200 mg, 0.595 mmol), 1-bromo-2,4,5-trifluorobenzene (151 mg, 0.716 mmol), and potassium fluoride (104 mg, 1.79 mmol) in a mixture of tetrahydrofuran (10 mL) and water (1 mL) was added tris(dibenzylideneacetone)dipalladium(0) (27.2 mg, 29.7 µmol), followed by a solution of tri-tert-butylphosphine in toluene (1 M; 59.5 µL, 59.5 µmol). The reaction mixture was heated at 60° C. for 16 hours, whereupon it was diluted with water (20 mL) and extracted with ethyl acetate (2×15 mL). The combined organic layers were washed with saturated aqueous sodium chloride solution (40 mL), dried over sodium sulfate, filtered, concentrated in vacuo, and purified via chromatography on silica gel (Gradient: 0% to 6% ethyl acetate in petroleum ether) to afford C75 as a yellow solid. Yield: 180 mg, 0.529 mmol, 89%. $^1$H NMR (400 MHz, chloroform-d) δ 7.58 (dd, J=8.4, 2.4 Hz, 1H), 7.46 (dd, J=9.0, 5.0 Hz, 1H), 7.23–7.13 (m, 2H), 7.09 (ddd, J=10.1, 8.7, 6.6 Hz, 1H), 3.83 (s, 3H).

Step 2. Synthesis of 6-fluoro-3-(2,4,5-trifluorophenyl)-1-benzothiophene-2-carboxylic acid (23)

A mixture of C75 (180 mg, 0.529 mmol) in a mixture of tetrahydrofuran (2 mL), methanol (2 mL), and water (1 mL) was treated with lithium hydroxide (127 mg, 5.30 mmol). After the reaction mixture had been stirred at 25° C. for 16 hours, it was concentrated under reduced pressure; the residue was diluted with water (30 mL) and adjusted to a pH of approximately 5 by addition of 1 M hydrochloric acid. The resulting suspension was filtered, and the collected solid was purified via reversed-phase HPLC (Column: Phenomenex Gemini NX-C18, 30×75 mm, 3 µm; Mobile phase A: water containing 0.05% ammonium hydroxide (v/v); Mobile phase B: acetonitrile; Gradient: 13% to 53% B; Flow rate: 25 mL/minute), affording 6-fluoro-3-(2,4,5-trifluorophenyl)-1-benzothiophene-2-carboxylic acid (23) as a white solid. Yield: 84.8 mg, 0.260 mmol, 49%. LCMS m/z 280.9 [M–COOH]$^-$. $^1$H NMR (400 MHz, methanol-d$_4$) δ 7.65 (dd, J=8.9, 2.4 Hz, 1H), 7.39 (ddd, J=9.0, 5.1, 1.2 Hz, 1H), 7.31 (ddd, J=10.8, 8.9, 6.5 Hz, 1H), 7.23 (ddd, J=10.8, 9.0, 6.8 Hz, 1H), 7.14 (ddd, J=9.0, 9.0, 2.4 Hz, 1H).

Example 24

3-(3-Chloro-2,4,5-trifluorophenyl)-6-fluoro-1-benzothiophene-2-carboxylic acid (24)

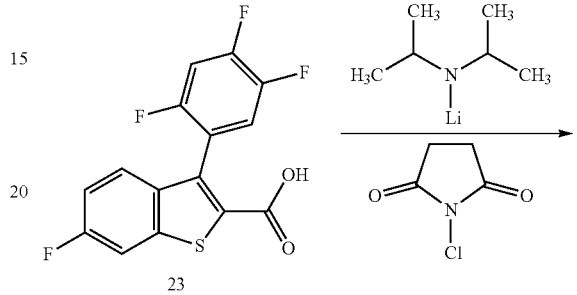

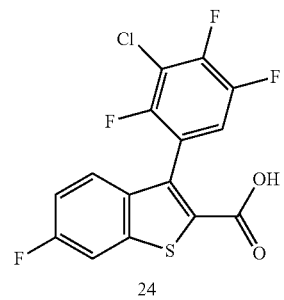

To a −65° C. solution of 23 (164 mg, 0.503 mmol) in tetrahydrofuran (3 mL) was added lithium diisopropylamide (2 M; 0.528 mL, 1.06 mmol). After the reaction mixture had been stirred at −60° C. for 1 hour, a solution of N-chlorosuccinimide (67.1 mg, 0.503 mmol) in tetrahydrofuran (2 mL) was slowly added at −60° C. The reaction mixture was then stirred at room temperature for 16 hours, whereupon it was treated with aqueous ammonium chloride solution (10 mL), diluted with water (10 mL), and extracted with ethyl acetate (3×8 mL). The combined organic layers were washed with saturated aqueous sodium chloride solution (2×15 mL), dried over sodium sulfate, filtered, and concentrated in vacuo. Reversed-phase HPLC (Column: Phenomenex Gemini NX-C18, 30×150 mm, 5 µm; Mobile phase A: water containing 0.225% formic acid (v/v); Mobile phase B: acetonitrile; Gradient: 47% to 87% B; Flow rate: 25 mL/minute) provided 3-(3-chloro-2,4,5-trifluorophenyl)-6-fluoro-1-benzothiophene-2-carboxylic acid (24) as a yellow solid. Also isolated was starting material 23 (29.4 mg) as a white solid. Yield: 16.1 mg, 44.6 µmol, 9% (11% based on recovered starting material). LCMS m/z 358.8 (chlorine isotope pattern observed) [M–H]$^-$. $^1$H NMR (400 MHz, methanol-d$_4$) δ 7.79 (dd, J=8.8, 2.4 Hz, 1H), 7.51 (dd, J=9.0, 5.0 Hz, 1H), 7.40 (ddd, J=10.3, 8.4, 6.3 Hz, 1H), 7.26 (ddd, J=9.0, 8.9, 2.4 Hz, 1H).

Example 25

6-Fluoro-3-(3-methoxyphenyl)-1-benzothiophene-2-carboxylic acid (25)

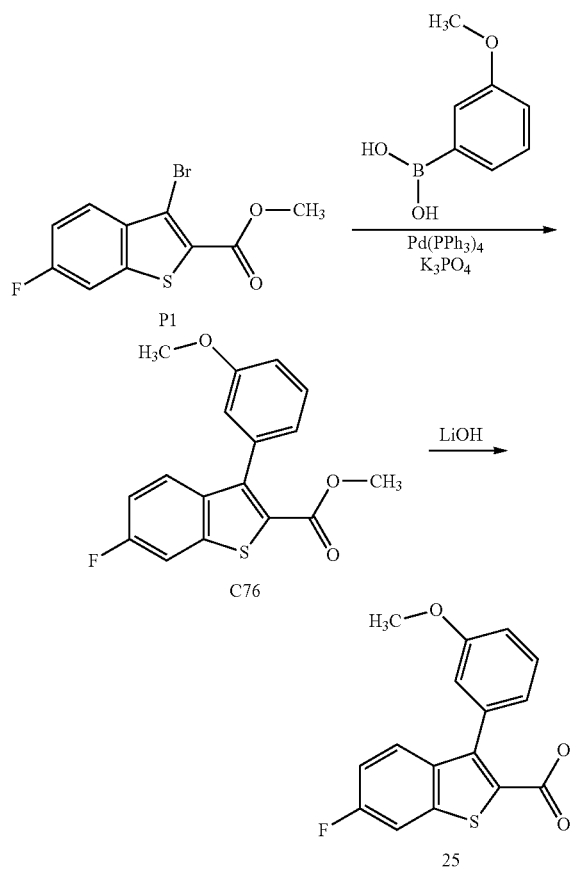

Step 1. Synthesis of methyl 6-fluoro-3-(3-methoxyphenyl)-1-benzothiophene-2-carboxylate (C76)

A solution of P1 (0.210 g, 0.726 mmol), (3-methoxyphenyl)boronic acid (0.221 g, 1.45 mmol), and tripotassium phosphate (0.309 g, 1.46 mmol) in a mixture of N,N-dimethylformamide (6.0 mL) and water (3.0 mL) was purged with nitrogen for 10 minutes. Tetrakis(triphenylphosphine)palladium(0) (84.0 mg, 72.7 μmol) was then added in one portion, the reaction vial was sealed, and the reaction mixture was irradiated for 25 minutes at 125° C. in a Biotage Initiator+ microwave synthesizer, whereupon LCMS analysis indicated conversion to C76: LCMS m/z 285.2 $[M-OCH_3]^+$. After the reaction mixture had been diluted with ethyl acetate (10 mL), it was filtered through a small plug of diatomaceous earth; the filtrate was concentrated to dryness under reduced pressure. The residue was dissolved in dichloromethane (10 mL), adsorbed onto silica gel, and purified via silica gel chromatography (Gradient: 0% to 30% ethyl acetate in heptane), affording C76 as a white solid. Yield: 120 mg, 0.379 mmol, 52%. LCMS m/z 285.2 $[M-OCH_3]^+$. $^1$H NMR (400 MHz, chloroform-d) δ 7.55 (dd, J=8.5, 2.3 Hz, 1H), 7.51 (dd, J=8.9, 5.2 Hz, 1H), 7.40 (dd, J=7.9, 7.9 Hz, 1H), 7.10 (ddd, J=8.9, 8.9, 2.4 Hz, 1H), 7.00 (ddd, J=8.3, 2.6, 0.7 Hz, 1H), 6.96 (br ddd, J=7.5, 1, 1 Hz, 1H), 6.92 (dd, J=2.3, 1.6 Hz, 1H), 3.84 (s, 3H), 3.79 (s, 3H).

Step 2. Synthesis of 6-fluoro-3-(3-methoxyphenyl)-1-benzothiophene-2-carboxylic acid (25)

Lithium hydroxide (0.148 g, 6.18 mmol) was added to a solution of C76 (115 mg, 0.364 mmol) in a mixture of tetrahydrofuran (4.0 mL), methanol (4.0 mL), and water (2.0 mL), and the reaction mixture was heated at 65° C. for 3 hours. It was then partitioned between hydrochloric acid (1 M; 10 mL) and ethyl acetate (20 mL), and the aqueous layer was extracted with ethyl acetate (2×20 mL). After the combined organic layers had been dried over sodium sulfate, filtered, and concentrated in vacuo, the resulting material was triturated with dichloromethane (10 mL) and rinsed with dichloromethane (2×10 mL) to provide 6-fluoro-3-(3-methoxyphenyl)-1-benzothiophene-2-carboxylic acid (25) as an off-white solid. Yield: 64.7 mg, 0.214 mmol, 59%. LCMS m/z 300.9 $[M-H]^-$. $^1$H NMR (400 MHz, DMSO-$d_6$) δ 13.24 (br s, 1H), 8.00 (dd, J=9.1, 1.9 Hz, 1H), 7.44 (dd, J=9.0, 5.3 Hz, 1H), 7.40 (dd, J=8.3, 8.0 Hz, 1H), 7.30 (ddd, J=9.0, 9.0, 2.3 Hz, 1H), 7.06-6.99 (m, 1H), 6.97-6.91 (m, 2H), 3.78 (s, 3H).

Examples 26-159 were produced using the method of synthesis noted in Table 1, including the non-commercial starting materials.

TABLE 1

Method of synthesis, structure, and physicochemical data for Examples 26-159.

| Example Number | Method of synthesis; Non-commercial starting materials[1] | Structure | $^1$H NMR (400 MHz, methanol-$d_4$) δ; Mass spectrum, observed ion m/z $[M + H]^+$ or HPLC retention time; Mass spectrum m/z $[M + H]^+$ (unless otherwise indicated) |
|---|---|---|---|
| 26 | Example 1[2] | | 3.02 minutes[3]; 303 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-$d_4$) δ; Mass spectrum, observed ion m/z [M + H]$^+$ or HPLC retention time; Mass spectrum m/z [M + H]$^+$ (unless otherwise indicated) |
|---|---|---|---|
| 27 | Example 5[4] | | $^1$H NMR (400 MHz, DMSO-$d_6$) δ 8.05 (dd, J = 9.2, 2.4 Hz, 1H), 7.40 (dd, component of ABX system, J = 9.0, 5.3 Hz, 1H), 7.32 (ddd, J = 9.0, 9.0, 2.3 Hz, 1H), 7.29-7.22 (m, 2H), 6.97-6.91 (m, 1H), 3.90 (s, 3H); 321.0 |
| 28 | Example 5[5] | | $^1$H NMR (400 MHz, DMSO-$d_6$) δ 7.96 (dd, J = 9.1, 2.5 Hz, 1H), 7.48 (dd, J = 9.0, 5.3 Hz, 1H), 7.28 (ddd, J = 9.0, 9.0, 2.5 Hz, 1H), 7.11-7.05 (m, 2H), 6.81 (d, J = 9.0 Hz, 1H), 4.23-4.17 (m, 2H), 2.78 (t, J = 6.4 Hz, 2H), 2.02-1.92 (m, 2H); 329.1 |
| 29 | Example 5[5] | | $^1$H NMR (400 MHz, DMSO-$d_6$) δ 13.45 (br s, 1H), 8.03 (dd, J = 9.1, 2.5 Hz, 1H), 7.70 (dd, J = 8.1, 8.0 Hz, 1H), 7.55 (dd, J = 10.2, 1.9 Hz, 1H), 7.48 (dd, J = 9.0, 5.2 Hz, 1H), 7.35-7.25 (m, 2H); 325.0 (chlorine isotope pattern observed) |
| 30 | Example 19 | | $^1$H NMR (400 MHz, chloroform-d) δ 7.89 (br d, J = 1.9 Hz, 1H), 7.43 (br d, half of AB quartet, J = 8.7 Hz, 1H), 7.33 (dd, component of ABX system, J = 8.7, 1.9 Hz, 1H), 7.19 (ddd, J = 8.1, 7.8, 1.3 Hz, 1H), 7.09 (ddd, J = 8.1, 8.1, 1.5 Hz, 1H), 6.88 (ddd, J = 7.6, 5.9, 1.6 Hz, 1H), 3.96 (s, 3H); 337.0 (chlorine isotope pattern observed) |
| 31 | Example 1 | | $^1$H NMR (400 MHz, DMSO-$d_6$) δ 13.27 (br s, 1H), 8.22 (br d, J = 1.8 Hz, 1H), 7.47 (br d, half of AB quartet, J = 8.7 Hz, 1H), 7.43 (dd, component of ABX system, J = 8.7, 1.8 Hz, 1H), 7.11-7.06 (m, 2H), 6.82 (d, J = 9.0 Hz, 1H), 4.23-4.17 (m, 2H), 2.79 (t, J = 6.4 Hz, 2H), 2.02-1.92 (m, 2H); LCMS m/z 343.0 (chlorine isotope pattern observed) [M − H]$^−$ |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-$d_4$) δ; Mass spectrum, observed ion m/z [M + H]$^+$ or HPLC retention time; Mass spectrum m/z [M + H]$^+$ (unless otherwise indicated) |
|---|---|---|---|
| 32 | Example 1; P13 | | $^1$H NMR (400 MHz, DMSO-$d_6$) δ 7.96 (dd, J = 9.2, 2.4 Hz, 1H), 7.39 (dd, component of ABX system, J = 9.0, 5.2 Hz, 1H), 7.27 (ddd, component of ABXY system, J = 9.0, 9.0, 2.3 Hz, 1H), 7.09 (dd, J = 8.4, 8.4 Hz, 1H), 6.71 (d, J = 8.5 Hz, 1H), 4.24-4.18 (m, 2H), 2.76-2.68 (m, 2H), 2.02-1.92 (m, 2H); 347.0 |
| 33 | Example 19 | | $^1$H NMR (400 MHz, DMSO-$d_6$) δ 13.76 (br s, 1H), 8.33 (br s, 1H), 7.53-7.42 (m, 3H), 7.38-7.30 (m, 1H); 342.9 (chlorine isotope pattern observed) |
| 34 | Example 19 | | 2.09 minutes[6]; LCMS m/z 351 [M − H]$^−$ |
| 35 | Example 19 | | 3.16 minutes[3]; 339 |
| 36 | Example 19 | | 3.27 minutes[3]; 355 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-$d_4$) δ; Mass spectrum, observed ion m/z [M + H]$^+$ or HPLC retention time; Mass spectrum m/z [M + H]$^+$ (unless otherwise indicated) |
|---|---|---|---|
| 37 | Example 19 | | 3.06 minutes[7]; 327 |
| 38 | Example 19 | | 2.88 minutes[7]; 339 |
| 39 | Example 19 | | 3.48 minutes[3]; 367 |
| 40 | Example 1; P14 | | Characteristic peaks: $^1$H NMR (400 MHz, DMSO-$d_6$) δ 13.10 (br s, 1H), 7.98 (dd, J = 9.0, 2.4 Hz, 1H), 7.45 (dd, J = 9.0, 5.3 Hz, 1H), 7.28 (ddd, J = 9.0, 9.0, 2.5 Hz, 1H), 7.14 (d, J = 7.7 Hz, 1H), 6.82 (dd, J = 7.7, 1.8 Hz, 1H), 6.75 (d, J = 1.7 Hz, 1H), 4.19 (ddd, J = 10.6, 3.5, 1.9 Hz, 1H), 3.71 (dd, J = 10, 10 Hz, 1H), 2.88 (br dd, J = 16.4, 4.5 Hz, 1H), 2.19-2.05 (m, 1H), 1.03 (d, J = 6.7 Hz, 3H); 343.1 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-$d_4$) δ; Mass spectrum, observed ion m/z [M + H]+ or HPLC retention time; Mass spectrum m/z [M + H]+ (unless otherwise indicated) |
|---|---|---|---|
| 41 | Example 1[8]; P12, P15 | 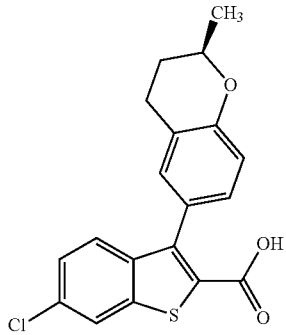 [SMILES: C[C@@H]1CCc2cc(-c3c(C(=O)O)sc4cc(Cl)ccc34)ccc2O1] or ENANT-1 | $^1$H NMR (400 MHz, DMSO-$d_6$) δ 13.21 (br s, 1H), 8.23 (br d, J = 1.8 Hz, 1H), 7.47 (d, half of AB quartet, J = 8.8 Hz, 1H), 7.44 (dd, component of ABX system, J = 8.8, 1.9 Hz, 1H), 7.12-7.05 (m, 2H), 6.81 (d, J = 8.2 Hz, 1H), 4.21 (dqd, J = 12.5, 6.2, 2.0 Hz, 1H), 2.87 (ddd, component of ABXY system, J = 16.5, 11.5, 5.9 Hz, 1H), 2.74 (ddd, component of ABXY system, J = 16.7, 5.4, 2.9 Hz, 1H), 2.03 (dddd, J = 13.5, 5.7, 2.6, 2.6 Hz, 1H), 1.65 (dddd, J = 13.1, 11.1, 11.1, 5.4 Hz, 1H), 1.37 (d, J = 6.2 Hz, 3H); LCMS m/z 381.1 (chlorine isotope pattern observed) [M + Na+] |
| 42 | Example 1[8]; P12, P15 | 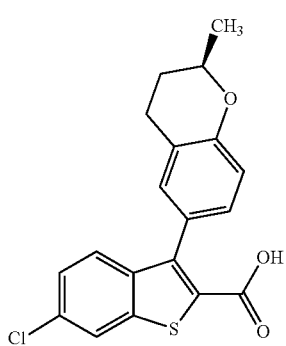 [SMILES: C[C@@H]1CCc2cc(-c3c(C(=O)O)sc4cc(Cl)ccc34)ccc2O1] or | $^1$H NMR (400 MHz, DMSO-$d_6$) δ 13.25 (br s, 1H), 8.23 (br d, J = 1.8 Hz, 1H), 7.47 (d, half of AB quartet, J = 8.8 Hz, 1H), 7.44 (dd, component of ABX system, J = 8.8, 1.9 Hz, 1H), 7.12-7.05 (m, 2H), 6.81 (d, J = 8.2 Hz, 1H), 4.27-4.16 (m, 1H), 2.87 (ddd, component of ABXY system, J = 16.5, 11.6, 6.0 Hz, 1H), 2.74 (ddd, component of ABXY system, J = 16.7, 5.4, 2.9 Hz, 1H), 2.03 (dddd, J = 13.4, 5.6, 2.6, 2.6 Hz, 1H), 1.65 (dddd, J = 13.4, 11.1, 11.1, 5.3 Hz, 1H), 1.37 (d, J = 6.2 Hz, 3H); LCMS m/z 381.1 (chlorine isotope pattern observed) [M + Na+] |

TABLE 1-continued

Method of synthesis, structure, and physicochemical data for Examples 26-159.

| Example Number | Method of synthesis; Non-commercial starting materials[1] | Structure | ¹H NMR (400 MHz, methanol-d₄) δ; Mass spectrum, observed ion m/z [M + H]⁺ or HPLC retention time; Mass spectrum m/z [M + H]⁺ (unless otherwise indicated) |
|---|---|---|---|
|  |  | ENANT-2 |  |
| 43 | Example 1[9]; P15 | ENANT-1 (or) | ¹H NMR (400 MHz, DMSO-d₆) δ 13.17 (br s, 1H), 7.99 (dd, J = 9.1, 2.5 Hz, 1H), 7.49 (dd, J = 9.0, 5.3 Hz, 1H), 7.29 (ddd, J = 9.0, 9.0, 2.5 Hz, 1H), 7.13-7.05 (m, 2H), 6.82 (d, J = 8.1 Hz, 1H), 4.21 (dqd, J = 12.4, 6.1, 2.0 Hz, 1H), 2.87 (ddd, component of ABXY system, J = 16.5, 11.6, 5.9 Hz, 1H), 2.74 (ddd, component of ABXY system, J = 16.7, 5.4, 2.9 Hz, 1H), 2.08-1.98 (m, 1H), 1.72-1.58 (m, 1H), 1.37 (d, J = 6.2 Hz, 3H); 343.1 |
| 44 | Example 1[9]; P15 |  | ¹H NMR (400 MHz, DMSO-d₆) δ 13.10 (br s, 1H), 7.99 (dd, J = 9.1, 2.5 Hz, 1H), 7.50 (dd, J = 9.0, 5.3 Hz, 1H), 7.30 (ddd, J = 9.0, 9.0, 2.5 Hz, 1H), 7.13-7.05 (m, 2H), 6.82 (d, J = 8.2 Hz, 1H), 4.27-4.16 (m, 1H), 2.87 (ddd, component of ABXY system, J = 16.5, 11.6, 5.8 Hz, 1H), 2.74 (ddd, component of ABXY system, J = 16.7, 5.4, 2.9 Hz, 1H), 2.08-1.98 (m, 1H), 1.65 (dddd, J = 13.4, 11.5, 10.1, 5.4 Hz, 1H), 1.37 (d, J = 6.2 Hz, 3H); LCMS m/z 365.1 [M + Na⁺] |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-$d_4$) δ; Mass spectrum, observed ion m/z [M + H]$^+$ or HPLC retention time; Mass spectrum m/z [M + H]$^+$ (unless otherwise indicated) |
|---|---|---|---|
| | | or 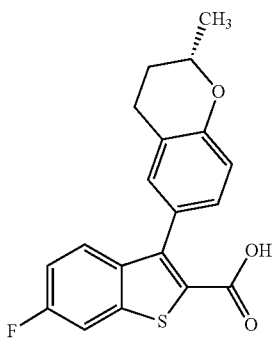<br>ENANT-2 | |
| 45 | Example 19[10]; P15 | 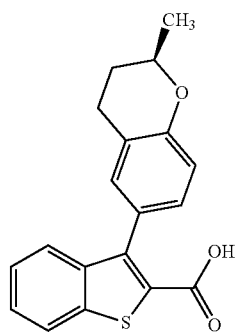 [SMILES: C[C@@H]1CCc2cc(-c3c(C(=O)O)sc4ccccc34)ccc2O1]<br>or<br>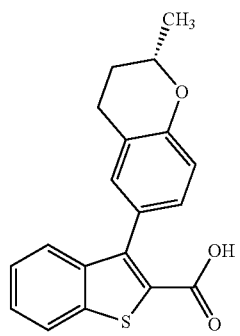<br>ENANT-1 | $^1$H NMR (400 MHz, DMSO-$d_6$) δ 13.14 (br s, 1H), 8.05 (d, J = 8.1 Hz, 1H), 7.56-7.47 (m, 2H), 7.44-7.38 (m, 1H), 7.12-7.06 (m, 2H), 6.82 (d, J = 8.1 Hz, 1H), 4.21 (dqd, J = 12.4, 6.1, 2.0 Hz, 1H), 2.88 (ddd, component of ABXY system, J = 16.5, 11.7, 5.9 Hz, 1H), 2.74 (ddd, component of ABXY system, J = 16.7, 5.5, 3.0 Hz, 1H), 2.07-1.98 (m, 1H), 1.73-1.59 (m, 1H), 1.37 (d, J = 6.2 Hz, 3H); LCMS m/z 347.1 [M + Na$^+$] |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-$d_4$) δ; Mass spectrum, observed ion m/z [M + H]$^+$ or HPLC retention time; Mass spectrum m/z [M + H]$^+$ (unless otherwise indicated) |
|---|---|---|---|
| 46 | Example 19[10]; P15 | 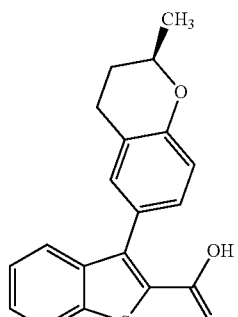<br>or<br>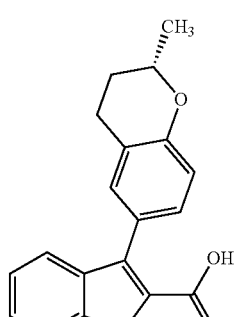<br>ENANT-2 | $^1$H NMR (400 MHz, DMSO-$d_6$) δ 13.13 (br s, 1H), 8.05 (d, J = 8.1 Hz, 1H), 7.56-7.46 (m, 2H), 7.44-7.38 (m, 1H), 7.12-7.05 (m, 2H), 6.82 (d, J = 8.1 Hz, 1H), 4.21 (dqd, J = 12.4, 6.1, 2.0 Hz, 1H), 2.88 (ddd, component of ABXY system, J = 16.5, 11.6, 5.8 Hz, 1H), 2.74 (ddd, component of ABXY system, J = 16.7, 5.4, 2.9 Hz, 1H), 2.08-1.98 (m, 1H), 1.73-1.59 (m, 1H), 1.37 (d, J = 6.2 Hz, 3H); LCMS m/z 347.1 [M + Na$^+$] |
| 47 | Example 7; P1 | 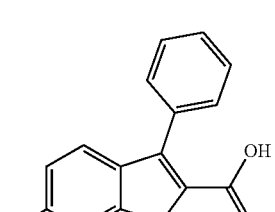 | $^1$H NMR (400 MHz, chloroform-d) δ 7.57 (dd, J = 8.5, 2.3 Hz, 1H), 7.53-7.45 (m, 4H), 7.41-7.37 (m, 2H), 7.11 (ddd, J = 8.9, 8.9, 2.4 Hz, 1H); 273.1 |
| 48 | Example 1[11]; P1 | 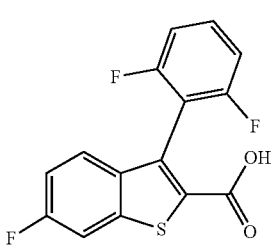 | 7.64 (dd, J = 8.9, 2.4 Hz, 1H), 7.42 (tt, J = 8.4, 6.4 Hz, 1H), 7.29 (br dd, J = 9.0, 5.1 Hz, 1H), 7.11 (ddd, J = 9.0, 9.0, 2.4 Hz, 1H), 7.07-7.00 (m, 2H); 309.0 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-d$_4$) δ; Mass spectrum, observed ion m/z [M + H]$^+$ or HPLC retention time; Mass spectrum m/z [M + H]$^+$ (unless otherwise indicated) |
|---|---|---|---|
| 49 | Example 2; P2 | | $^1$H NMR (400 MHz, DMSO-d$_6$) δ 7.82 (dd, J = 9.3, 2.4 Hz, 1H), 7.59 (br d, J = 8.0 Hz, 1H), 7.28 (br dd, J = 9.0, 5.2 Hz, 1H), 7.22-7.12 (m, 2H), 4.04 (d, J = 2.2 Hz, 3H); LCMS m/z 368.0 [M + Na$^+$] |
| 50 | Example 18; P2 | | 7.68 (dd, J = 8.9, 2.4 Hz, 1H), 7.41 (br dd, J = 9.0, 5.1 Hz, 1H), 7.16 (ddd, J = 9.0, 9.0, 2.4 Hz, 1H), 7.11-7.00 (m, 2H), 4.22 (q, J = 7.1 Hz, 2H), 1.38 (t, J = 7.1 Hz, 3H); LCMS m/z 350.9 [M − H]$^-$ |
| 51 | Example 2; P2 | | $^1$H NMR (400 MHz, chloroform-d) δ 7.57 (br d, J = 8.5 Hz, 1H), 7.46 (br dd, J = 9.0, 5.1 Hz, 1H), 7.29-7.24 (m, 1H, assumed; largely obscured by solvent peak), 7.14 (br ddd, J = 9, 9, 2, 1H), 6.97 (dd, J = 7.5, 7.5 Hz, 1H), 4.21 (q, J = 7.0 Hz, 2H), 1.41 (t, J = 7.0 Hz, 3H); LCMS m/z 366.9 (chlorine isotope pattern observed) [M − H]$^-$ |
| 52 | Example 2; P2 | | $^1$H NMR (400 MHz, chloroform-d) δ 7.60 (dd, J = 8.5, 2.3 Hz, 1H), 7.45 (br dd, J = 9.0, 5.0 Hz, 1H), 7.19 (ddd, J = 8.9, 8.9, 2.4 Hz, 1H), 7.11 (dd, J = 8.6, 2.2 Hz, 1H), 3.96 (s, 3H); LCMS m/z 370.9 (chlorine isotope pattern observed) [M − H]$^-$ |
| 53 | Example 18[12]; P2 | | 7.73 (dd, J = 8.8, 2.4 Hz, 1H), 7.46 (br dd, J = 9.1, 5.0 Hz, 1H), 7.41-7.32 (m, 1H), 7.21 (ddd, J = 9.0, 9.0, 2.5 Hz, 1H), 4.69-4.59 (m, 2H), 3.40 (s, 3H); LCMS m/z 368.9 [M − H]$^-$ |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-d$_4$) δ; Mass spectrum, observed ion m/z [M + H]$^+$ or HPLC retention time; Mass spectrum m/z [M + H]$^+$ (unless otherwise indicated) |
|---|---|---|---|
| 54 | Example 2; P2 | | 7.67 (dd, J = 8.9, 2.4 Hz, 1H), 7.51 (dd, J = 9.0, 5.2 Hz, 1H), 7.23-7.11 (m, 4H), 3.94 (s, 3H); LCMS m/z 318.9 [M − H]$^−$ |
| 55 | Example 2; P2 | | 7.77 (dd, J = 8.8, 2.4 Hz, 1H), 7.42 (br dd, J = 9.0, 5.1 Hz, 1H), 7.27-7.18 (m, 2H), 7.03 (ddd, J = 9.0, 9.0, 2.0 Hz, 1H), 3.92 (s, 3H); 339.1 |
| 56 | Example 18[13]; P1 | | $^1$H NMR (400 MHz, DMSO-d$_6$) δ 7.99 (dd, J = 9.1, 2.5 Hz, 1H), 7.45 (dd, J = 9.0, 5.3 Hz, 1H), 7.29 (ddd, J = 9.0, 9.0, 2.5 Hz, 1H), 7.16 (d, J = 7.7 Hz, 1H), 6.80 (dd, J = 7.7, 1.7 Hz, 1H), 6.71 (d, J = 1.7 Hz, 1H), 4.24-4.13 (m, 1H), 2.90 (ddd, component of ABXY system, J = 17.2, 11.4, 6.0 Hz, 1H), 2.83-2.73 (m, 1H), 2.08-1.99 (m, 1H), 1.74-1.60 (m, 1H), 1.35 (d, J = 6.3 Hz, 3H); 343.0 |
| 57 | Example 56[14] | | $^1$H NMR (400 MHz, chloroform-d) δ 7.56-7.47 (m, 2H), 7.12 (d, J = 7.6 Hz, 1H), 7.07 (ddd, J = 8.9, 8.9, 2.4 Hz, 1H), 6.86-6.79 (m, 2H), 4.24-4.14 (m, 1H), 2.93 (ddd, component of ABXY system, J = 17.4, 11.6, 6.1 Hz, 1H), 2.85-2.76 (m, 1H), 2.07-1.98 (m, 1H), 1.85-1.72 (m, 1H), 1.40 (d, J = 6.3 Hz, 3H); 343.0 | or

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-$d_4$) δ; Mass spectrum, observed ion m/z [M + H]$^+$ or HPLC retention time; Mass spectrum m/z [M + H]$^+$ (unless otherwise indicated) |
|---|---|---|---|
| | | ENANT-1 | |
| 58 | Example 56[14] | (structure) or ENANT-2 | $^1$H NMR (400 MHz, chloroform-d) δ 7.56-7.47 (m, 2H), 7.12 (d, J = 7.6 Hz, 1H), 7.07 (ddd, J = 8.9, 8.9, 2.4 Hz, 1H), 6.86-6.79 (m, 2H), 4.25-4.14 (m, 1H), 2.93 (ddd, component of ABXY system, J = 17.3, 11.6, 6.0 Hz, 1H), 2.86-2.76 (m, 1H), 2.08-1.98 (m, 1H), 1.86-1.72 (m, 1H), 1.40 (d, J = 6.2 Hz, 3H); 343.0 |
| 59 | Example 2; P2 | (structure) | $^1$H NMR (400 MHz, chloroform-d) δ 7.57 (dd, J = 8.5, 2.3 Hz, 1H), 7.41 (dd, J = 8.9, 5.0 Hz, 1H), 7.16 (ddd, J = 8.9, 8.9, 2.3 Hz, 1H), 7.08 (d, J = 7.1 Hz, 2H); LCMS m/z 340.9 (chlorine isotope pattern observed) [M − H]$^-$ |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-d$_4$) δ; Mass spectrum, observed ion m/z [M + H]$^+$ or HPLC retention time; Mass spectrum m/z [M + H]$^+$ (unless otherwise indicated) |
|---|---|---|---|
| 60 | Example 2; P2 | | $^1$H NMR (400 MHz, chloroform-d) δ 7.60 (dd, J = 8.4, 2.3 Hz, 1H), 7.44 (dd, J = 9.0, 5.0 Hz, 1H), 7.18 (ddd, J = 8.8, 8.8, 2.3 Hz, 1H), 6.83 (dd, J = 8.8, 7.2 Hz, 2H); LCMS m/z 324.9 [M − H]$^−$ |
| 61 | Example 2[15]; P2 | | 8.02 (d, J = 1.0 Hz, 1H), 7.81 (dd, J = 8.8, 2.4 Hz, 1H), 7.48 (br dd, J = 8.9, 5.1 Hz, 1H), 7.26 (ddd, J = 9.0, 9.0, 2.4 Hz, 1H), 4.06 (s, 3H); 340.0 |
| 62 | Example 2; P2 | | 7.75 (dd, J = 8.8, 2.4 Hz, 1H), 7.47 (dd, J = 9.0, 5.1 Hz, 1H), 7.22 (ddd, J = 9.0, 9.0, 2.4 Hz, 1H), 7.11 (ddd, component of ABXY system, J = 10.4, 8.7, 1.6 Hz, 1H), 7.04 (ddd, component of ABXY system, J = 8.7, 7.2, 5.9 Hz, 1H), 4.00 (s, 3H); LCMS m/z 361.0 [M + Na$^+$] |
| 63 | Example 7; P12 | | $^1$H NMR (400 MHz, chloroform-d) δ 7.90 (s, 1H), 7.44-7.35 (m, 2H), 6.89-6.81 (m, 1H), 3.99 (s, 3H); LCMS m/z 370.9 (chlorine isotope pattern observed) [M − H]$^−$ |
| 64 | Example 1; P1 | | 3.27 minutes[3]; 325 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-d$_4$) δ; Mass spectrum, observed ion m/z [M + H]$^+$ or HPLC retention time; Mass spectrum m/z [M + H]$^+$ (unless otherwise indicated) |
|---|---|---|---|
| 65 | Example 1; P1 | | 3.30 minutes[3]; 343 |
| 66 | Example 18[16]; P1 | | $^1$H NMR (400 MHz, chloroform-d) δ 7.56 (dd, J = 8.6, 2.3 Hz, 1H), 7.50 (dd, J = 9.1, 5.2 Hz, 1H), 7.11 (ddd, J = 8.8, 8.8, 2.4 Hz, 1H), 6.93 (br d, half of AB quartet, J = 7.9 Hz, 1H), 6.79-6.73 (m, 1H), 4.37-4.29 (m, 2H), 2.94-2.86 (m, 2H), 2.17-2.06 (m, 2H); 347.0 |
| 67 | Example 18[17]; P1 | | 7.70 (dd, J = 8.8, 2.4 Hz, 1H), 7.48 (ddd, J = 8.6, 5.3, 2.9 Hz, 1H), 7.18 (ddd, J = 9.0, 9.0, 2.5 Hz, 1H), 7.02 (d, J = 8.1 Hz, 1H), 6.59 (d, J = 11.0 Hz, 1H), 4.27-4.16 (m, 1H), 2.96-2.72 (m, 2H), 2.12-2.02 (m, 1H), 1.80-1.65 (m, 1H), 1.41 (d, J = 6.3 Hz, 3H); 361.1 |
| 68 | Example 67[18] | | 7.71 (dd, J = 8.8, 2.4 Hz, 1H), 7.52-7.46 (m, 1H), 7.19 (ddd, J = 9, 9, 2.4 Hz, 1H), 7.02 (d, J = 8.1 Hz, 1H), 6.59 (d, J = 11.0 Hz, 1H), 4.27-4.17 (m, 1H), 2.95-2.73 (m, 2H), 2.12-2.03 (m, 1H), 1.79-1.66 (m, 1H), 1.42 (d, J = 6.2 Hz, 3H); 361.2 | or

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-d$_4$) δ; Mass spectrum, observed ion m/z [M + H]$^+$ or HPLC retention time; Mass spectrum m/z [M + H]$^+$ (unless otherwise indicated) |
|---|---|---|---|
| 69 | Example 67[18] | ENANT-1 or ENANT-2 | 7.70 (dd, J = 8.8, 2.4 Hz, 1H), 7.49 (ddd, J = 8.6, 5.2, 3.0 Hz, 1H), 7.19 (ddd, J = 9, 9, 2.4 Hz, 1H), 7.02 (d, J = 8.2 Hz, 1H), 6.59 (d, J = 11.0 Hz, 1H), 4.27-4.17 (m, 1H), 2.95-2.72 (m, 2H), 2.12-2.02 (m, 1H), 1.80-1.66 (m, 1H), 1.42 (d, J = 6.3 Hz, 3H); 361.2 |
| 70 | Example 2; P2 | | 7.96 (d, J = 5.1 Hz, 1H), 7.67 (dd, J = 8.9, 2.4 Hz, 1H), 7.37 (br dd, J = 8.9, 5.1 Hz, 1H), 7.15 (ddd, J = 9.0, 9.0, 2.4 Hz, 1H), 6.94 (dd, J = 5, 4.5 Hz, 1H), 4.04 (s, 3H); 322.0 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-$d_4$) δ; Mass spectrum, observed ion m/z [M + H]$^+$ or HPLC retention time; Mass spectrum m/z [M + H]$^+$ (unless otherwise indicated) |
|---|---|---|---|
| 71 | Example 18[19]; P2 | | 7.70 (dd, J = 8.8, 2.4 Hz, 1H), 7.53 (dd, J = 9.0, 5.2 Hz, 1H), 7.19 (ddd, J = 9.0, 9.0, 2.4 Hz, 1H), 6.93 (dd, J = 11.5, 2.1 Hz, 1H), 6.88 (br s, 1H), 4.27 (dqd, J = 10.1, 6.2, 2.2 Hz, 1H), 2.96 (ddd, component of ABXY system, J = 16.6, 11.4, 6.0 Hz, 1H), 2.84 (ddd, component of ABXY system, J = 16.8, 5.4, 3.1 Hz, 1H), 2.15-2.06 (m, 1H), 1.83-1.71 (m, 1H), 1.46 (d, J = 6.3 Hz, 3H); 361.0 |
| 72 | Example 71[20] | or<br><br>ENANT-1 | 7.69 (dd, J = 8.9, 2.5 Hz, 1H), 7.53 (dd, J = 9.0, 5.1 Hz, 1H), 7.18 (ddd, J = 9.0, 9.0, 2.4 Hz, 1H), 6.94 (br d, J = 11.7 Hz, 1H), 6.88 (br s, 1H), 4.32-4.20 (m, 1H), 3.01-2.90 (m, 1H), 2.89-2.79 (m, 1H), 2.16-2.05 (m, 1H), 1.84-1.70 (m, 1H), 1.46 (d, J = 6.2 Hz, 3H); 361.0 |
| 73 | Example 71[20] | or | 7.68 (dd, J = 8.9, 2.4 Hz, 1H), 7.53 (dd, J = 9.0, 5.2 Hz, 1H), 7.17 (ddd, J = 9.0, 9.0, 2.4 Hz, 1H), 6.94 (br d, J = 11.5 Hz, 1H), 6.88 (br s, 1H), 4.31-4.21 (m, 1H), 2.95 (ddd, component of ABXY system, J = 16.7, 11.4, 6.0 Hz, 1H), 2.89-2.80 (m, 1H), 2.15-2.06 (m, 1H), 1.83-1.70 (m, 1H), 1.46 (d, J = 6.2 Hz, 3H); 361.0 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-d$_4$) δ; Mass spectrum, observed ion m/z [M + H]$^+$ or HPLC retention time; Mass spectrum m/z [M + H]$^+$ (unless otherwise indicated) |
|---|---|---|---|
| | | 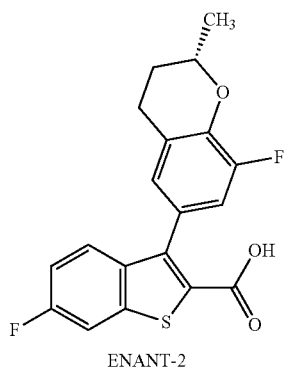 [SMILES: C[C@H]1CCc2cc(-c3c(C(=O)O)sc4cc(F)ccc34)cc(F)c2O1]<br>ENANT-2 | |
| 74 | Example 1[2]; P12 | 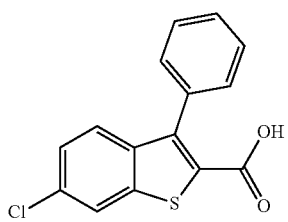 [SMILES: O=C(O)c1sc2cc(Cl)ccc2c1-c1ccccc1] | 8.01 (d, J = 1.9 Hz, 1H), 7.52-7.40 (m, 4H), 7.40-7.34 (m, 3H); 289.0 |
| 75 | Example 2[21]; P2 | 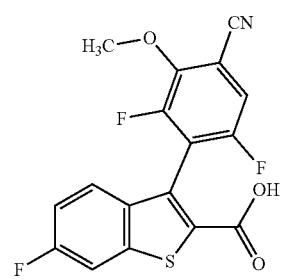 [SMILES: COc1c(C#N)cc(F)c(-c2c(C(=O)O)sc3cc(F)ccc23)c1F] | $^1$H NMR (400 MHz, chloroform-d) δ 7.59 (dd, J = 8.4, 2.3 Hz, 1H), 7.39 (br dd, J = 9.1,4.9 Hz, 1H), 7.27-7.15 (m, 2H, assumed; partially obscured by solvent peak), 4.10 (d, J = 2.1 Hz, 3H); LCMS m/z 361.9 [M − H]$^-$ |
| 76 | Example 18[22]; P1 | 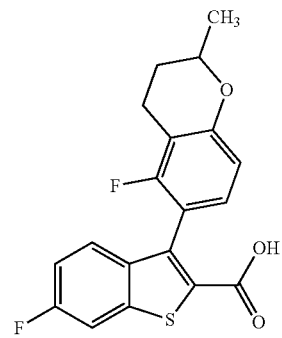 [SMILES: CC1CCc2c(ccc(-c3c(C(=O)O)sc4cc(F)ccc34)c2F)O1] | 7.71 (dd, J = 8.8, 2.4 Hz, 1H), 7.52-7.44 (m, 1H), 7.19 (ddd, J = 9.0, 9.0, 2.4 Hz, 1H), 7.04 (dd, J = 8.3, 8.3 Hz, 1H), 6.70 (d, J = 8.5 Hz, 1H), 4.25-4.14 (m, 1H), 2.88 (br d, half of AB quartet, J = 17.2 Hz, 1H), 2.75 (ddd, component of ABXY system, J = 17.0, 11.4, 5.7 Hz, 1H), 2.15-2.05 (m, 1H), 1.77-1.63 (m, 1H), 1.43 (d, J = 6.2 Hz, 3H); 361.0 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-$d_4$) δ; Mass spectrum, observed ion m/z [M + H]+ or HPLC retention time; Mass spectrum m/z [M + H]+ (unless otherwise indicated) |
|---|---|---|---|
| 77 | Example 76[23] | 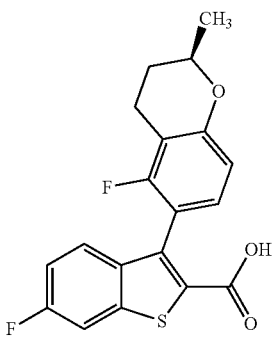<br>or<br>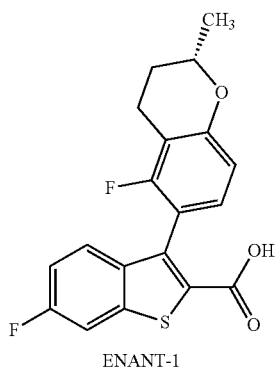 [SMILES: C[C@H]1CCc2c(ccc(-c3c(C(=O)O)sc4cc(F)ccc34)c2F)O1]<br>ENANT-1 | $^1$H NMR (400 MHz, chloroform-d)[24] δ 7.55 (dd, J = 8.5, 2.3 Hz, 1H), 7.51 (br dd, J = 9.1, 5.2 Hz, 1H), 7.12 (ddd, J = 8.9, 8.9, 2.4 Hz, 1H), 7.05 (br dd, J = 8.3, 8.3 Hz, 1H), 6.73 (br d, J = 8.5 Hz, 1H), 4.28-4.15 (m, 1H), 2.96-2.83 (m, 1H), 2.82-2.66 (m, 1H), 2.13-2.02 (m, 1H), 1.85-1.66 (m, 1H), [1.46 (d, J = 6.2 Hz) and 1.46 (d, J = 6.2 Hz), total 3H]; 361.2 |
| 78 | Example 76[23] | 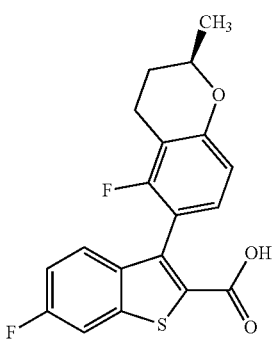<br>or | $^1$H NMR (400 MHz, chloroform-d)[24] δ 7.55 (dd, J = 8.5, 2.4 Hz, 1H), 7.51 (br dd, J = 9.0, 5.1 Hz, 1H), 7.12 (ddd, J = 8.9, 8.9, 2.3 Hz, 1H), 7.04 (br dd, J = 8.4, 8.2 Hz, 1H), 6.72 (br d, J = 8.5 Hz, 1H), 4.28-4.15 (m, 1H), 2.96-2.83 (m, 1H), 2.82-2.65 (m, 1H), 2.12-2.02 (m, 1H), 1.84-1.66 (m, 1H), [1.46 (d, J = 6.3 Hz) and 1.46 (d, J = 6.3 Hz), total 3H]; 361.0 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-d$_4$) δ; Mass spectrum, observed ion m/z [M + H]$^+$ or HPLC retention time; Mass spectrum m/z [M + H]$^+$ (unless otherwise indicated) |
|---|---|---|---|
| | | ENANT-2 | |
| 79 | Example 18; P1 | | 7.75 (dd, J = 8.8, 2.4 Hz, 1H), 7.47 (br dd, J = 9.0, 5.1 Hz, 1H), 7.34 (dd, J = 8.4, 1.8 Hz, 1H), 7.22 (ddd, J = 9.0, 9.0, 2.4 Hz, 1H), 7.06 (dd, J = 8.4, 6.9 Hz, 1H), 3.96 (s, 3H); LCMS m/z 372.0 (chlorine isotope pattern observed) [M + NH$_4^+$] |
| 80 | Example 7; P12, C42 | | 7.89 (br s, 1H), 7.30 (br s, 2H), 6.45 (dd, J = 10.7, 1.8 Hz, 1H), 4.25-4.13 (m, 1H), 2.90-2.61 (m, 2H), 2.14-2.02 (m, 1H), 1.76-1.60 (m, 1H), 1.41 (br d, J = 6.3 Hz, 3H); 395.0 (chlorine isotope pattern observed) |
| 81 | Example 18; P16, P1 | | $^1$H NMR (400 MHz, DMSO-d$_6$) δ 7.81 (dd, J = 9.2, 2.5 Hz, 1H), 7.41 (dd, J = 8.9, 5.3 Hz, 1H), 7.22-7.14 (m, 2H), 7.19 (br s, approximately 2H, presumed to be partial ammonium salt), 7.08 (dd, J = 8.3, 2.2 Hz, 1H), 6.76 (d, J = 8.3 Hz, 1H), 4.25-4.12 (m, 2H), 3.01-2.90 (m, 1H), 2.12-2.01 (m, 1H), 1.74-1.63 (m, 1H), 1.28 (d, J = 6.9 Hz, 3H); 343.0 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-d$_4$) δ; Mass spectrum, observed ion m/z [M + H]$^+$ or HPLC retention time; Mass spectrum m/z [M + H]$^+$ (unless otherwise indicated) |
|---|---|---|---|
| 82 | Example 81[25] | 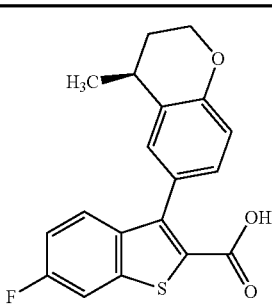<br>or<br>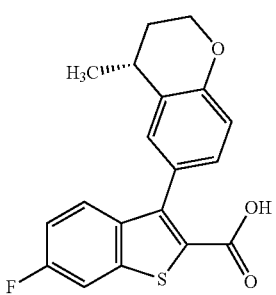<br>ENANT-1 | $^1$H NMR (400 MHz, DMSO-d$_6$) δ 7.98 (dd, J = 9.1, 2.4 Hz, 1H), 7.50 (dd, J = 9.0, 5.3 Hz, 1H), 7.30 (ddd, J = 9.0, 9.0, 2.5 Hz, 1H), 7.23 (d, J = 2.1 Hz, 1H), 7.10 (dd, J = 8.3, 2.2 Hz, 1H), 6.82 (d, J = 8.4 Hz, 1H), 4.27-4.14 (m, 2H), 3.03-2.91 (m, 1H), 2.13-2.01 (m, 1H), 1.75-1.64 (m, 1H), 1.29 (d, J = 7.0 Hz, 3H); 343.0 |
| 83 | Example 81[25] | 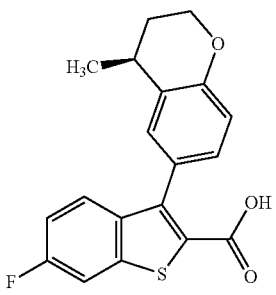<br>or<br>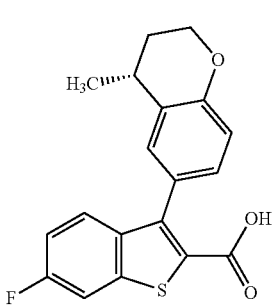<br>ENANT-2 | $^1$H NMR (400 MHz, DMSO-d$_6$) δ 7.98 (dd, J = 9.2, 2.5 Hz, 1H), 7.50 (dd, J = 9.0, 5.3 Hz, 1H), 7.30 (ddd, J = 9.0, 9.0, 2.5 Hz, 1H), 7.23 (d, J = 2.1 Hz, 1H), 7.10 (dd, J = 8.4, 2.2 Hz, 1H), 6.82 (d, J = 8.4 Hz, 1H), 4.27-4.14 (m, 2H), 3.03-2.91 (m, 1H), 2.13-2.01 (m, 1H), 1.75-1.64 (m, 1H), 1.29 (d, J = 6.9 Hz, 3H); 343.0 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-$d_4$) δ; Mass spectrum, observed ion m/z [M + H]+ or HPLC retention time; Mass spectrum m/z [M + H]+ (unless otherwise indicated) |
|---|---|---|---|
| 84 | Example 18[26,27]; P1 | 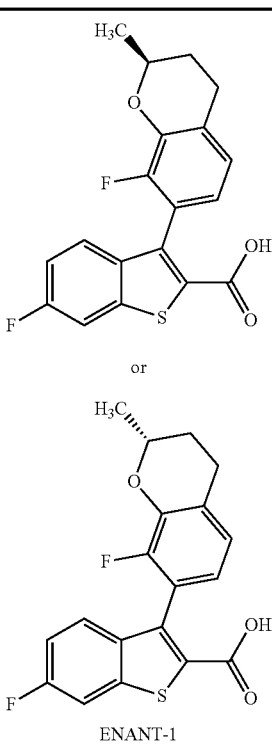 or ENANT-1 | $^1$H NMR (400 MHz, chloroform-d)[24] δ 7.55 (br d, J = 8.5 Hz, 1H), 7.52-7.46 (m, 1H), 7.10 (br dd, J = 8.9, 8.9 Hz, 1H), 6.92 (d, J = 7.8 Hz, 1H), 6.77-6.70 (m, 1H), 4.34-4.19 (m, 1H), 3.04-2.78 (m, 2H), 2.14-2.02 (m, 1H), 1.92-1.74 (m, 1H), [1.48 (d, J = 6.2 Hz) and 1.47 (d, J = 6.2 Hz), total 3H]; 361.0 |
| 85 | Example 18[26,27]; P1 | 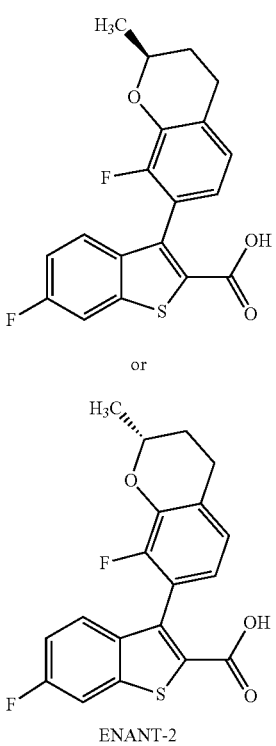 or ENANT-2 | $^1$H NMR (400 MHz, chloroform-d)[24] δ 7.50-7.41 (m, 2H), 7.07 (dd, J = 8.7, 8.7 Hz, 1H), 6.88-6.80 (m, 1H), 6.74-6.65 (m, 1H), 4.27-4.12 (m, 1H), 2.96-2.71 (m, 2H), 2.07-1.94 (m, 1H), 1.84-1.68 (m, 1H), 1.47-1.37 (m, 3H); 361.0 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-$d_4$) δ; Mass spectrum, observed ion m/z [M + H]$^+$ or HPLC retention time; Mass spectrum m/z [M + H]$^+$ (unless otherwise indicated) |
|---|---|---|---|
| 86 | Example 18[28]; P1 | | 7.74 (d, J = 8.8 Hz, 1H), 7.44 (dd, J = 9.0, 5.1 Hz, 1H), 7.27-7.14 (m, 2H), 7.05 (dd, J = 8.8, 8.7 Hz, 1H), 2.76 (q, J = 7.6 Hz, 2H), 1.24 (t, J = 7.6 Hz, 3H); 336.9 |
| 87 | Example 18[29,30]; P2 | | 3.36 minutes[3]; 343 |
| 88 | Example 2; P2 | | $^1$H NMR (400 MHz, chloroform-d) δ 7.59 (dd, J = 8.4, 2.3 Hz, 1H), 7.45 (dd, J = 8.9, 5.0 Hz, 1H), 7.16 (ddd, J = 8.8, 8.8, 2.4 Hz, 1H), 7.00 (ddd, J = 9, 9, 6.7 Hz, 1H), 2.31 (t, J = 2.1 Hz, 3H); 341.1 |
| 89 | Example 18[29]; P2 | | 1.73 minutes[31]: LCMS m/z 337 [M − H]$^−$ |
| 90 | Example 18[29]; P2 | | 3.12 minutes[3]; 339 |

TABLE 1-continued

Method of synthesis, structure, and physicochemical data for Examples 26-159.

| Example Number | Method of synthesis; Non-commercial starting materials[1] | Structure | ¹H NMR (400 MHz, methanol-d₄) δ; Mass spectrum, observed ion m/z [M + H]⁺ or HPLC retention time; Mass spectrum m/z [M + H]⁺ (unless otherwise indicated) |
|---|---|---|---|
| 91 | Example 18[29,32]; P2 | | 3.36 minutes[3]; 343 |
| 92 | Example 18; P1 | | 7.74 (dd, J = 8.8, 2.4 Hz, 1H), 7.47 (dd, J = 9.0, 5.1 Hz, 1H), 7.21 (ddd, J = 9.0, 9.0, 2.4 Hz, 1H), 7.13 (dd, J = 9.0, 9.0 Hz, 1H), 7.01 (ddd, J = 9.0, 3.9, 3.2 Hz, 1H), 6.86 (dd, J = 5.7, 3.1 Hz, 1H), 4.04 (q, J = 7.0 Hz, 2H), 1.38 (t, J = 7.0 Hz, 3H); 335.1 |
| 93 | Example 1; P1 | | 3.22 minutes[3]; 353 |
| 94 | Example 1; P1 | | 3.41 minutes[3]; 385 |
| 95 | Example 2; P2 | | ¹H NMR (400 MHz, chloroform-d) δ 7.58 (dd, J = 8.4, 2.4 Hz, 1H), 7.46 (dd, J = 9.0, 5.1 Hz, 1H), 7.20-7.09 (m, 2H), 6.92 (t, J = 9.4 Hz, 1H), 2.31 (br s, 3H); 323.1 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-$d_4$) δ; Mass spectrum, observed ion m/z [M + H]$^+$ or HPLC retention time; Mass spectrum m/z [M + H]$^+$ (unless otherwise indicated) |
|---|---|---|---|
| 96 | Example 21; P1 | | 2.83 minutes[7]; 367 |
| 97 | Example 2; P2 | | 7.79 (dd, J = 8.8, 2.4 Hz, 1H), 7.64 (ddd, J = 9.0, 8.4, 5.6 Hz, 1H), 7.44 (br dd, J = 8.9, 5.0 Hz, 1H), 7.25 (ddd, J = 9.0, 9.0, 2.4 Hz, 1H), 7.16 (ddd, J = 8.8, 8.7, 1.8 Hz, 1H); LCMS m/z 340.8 (chlorine isotope pattern observed) [M − H]$^-$ |
| 98 | Example 18[29]; P2 | | 3.09 minutes[3]; 315 |
| 99 | Example 18[29]; P2 | | 3.50 minutes[3]; 331 |
| 100 | Example 18[29]; P2 | | 3.12 minutes[3]; 315 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-$d_4$) δ; Mass spectrum, observed ion m/z [M + H]$^+$ or HPLC retention time; Mass spectrum m/z [M + H]$^+$ (unless otherwise indicated) |
|---|---|---|---|
| 101 | Example 18[29]; P2 | 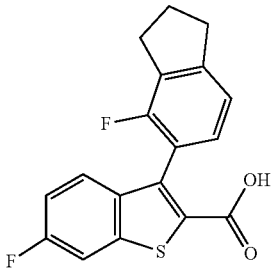 [SMILES: O=C(O)c1sc2cc(F)ccc2c1-c1ccc2c(c1F)CCC2] | 3.42 minutes[3]; 331 |
| 102 | Example 2[33]; P2 | 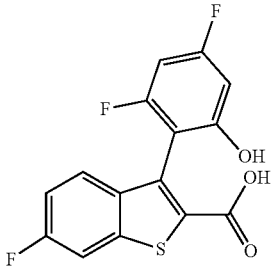 [SMILES: O=C(O)c1sc2cc(F)ccc2c1-c1c(O)cc(F)cc1F] | 7.65 (dd, J = 8.9, 2.5 Hz, 1H), 7.34 (br dd, J = 9.0, 5.1 Hz, 1H), 7.12 (ddd, J = 9.0, 9.0, 2.4 Hz, 1H), 6.60-6.49 (m, 2H); 324.9 |
| 103 | Example 18; P1 | 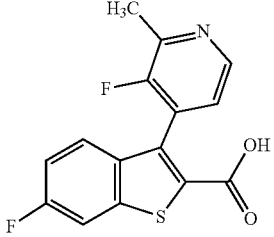 [SMILES: Cc1nccc(-c2c(C(=O)O)sc3cc(F)ccc23)c1F] | 8.30 (d, J = 5.0 Hz, 1H), 7.67 (br d, J = 8.7 Hz, 1H), 7.36 (br dd, J = 9.0, 5.1 Hz, 1H), 7.30 (dd, J = 5.0, 5.0 Hz, 1H), 7.15 (br dd, J = 9, 9 Hz, 1H), 2.56 (br d, J = 3 Hz, 3H); 306.0 |
| 104 | Example 7; P17, P1 | 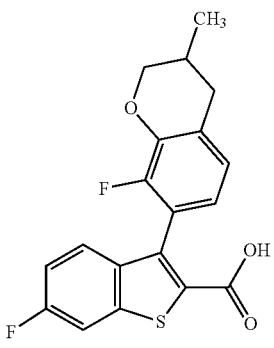 [SMILES: CC1COc2c(ccc(-c3c(C(=O)O)sc4cc(F)ccc34)c2F)C1] | 7.72 (dd, J = 8.9, 2.4 Hz, 1H), 7.50-7.41 (m, 1H), 7.23-7.14 (m, 1H), 6.95 (d, J = 7.9 Hz, 1H), 6.78-6.71 (m, 1H), 4.29 (br d, J = 10.4 Hz, 1H), 3.83-3.72 (m, 1H), 3.01-2.90 (m, 1H), 2.61-2.49 (m, 1H), 2.28-2.13 (m, 1H), 1.11 (d, J = 6.7 Hz, 3H); 361.0 |
| 105 | Example 21; P1 | 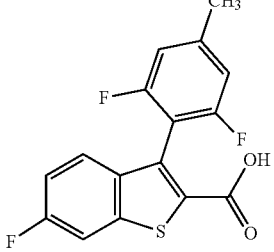 | 3.24 minutes[3]; 323 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-$d_4$) δ; Mass spectrum, observed ion m/z [M + H]$^+$ or HPLC retention time; Mass spectrum m/z [M + H]$^+$ (unless otherwise indicated) |
|---|---|---|---|
| 106 | Example 7; P1 | | 7.75 (dd, J = 8.8, 2.4 Hz, 1H), 7.46 (dd, J = 9.0, 5.1 Hz, 1H), 7.35-7.26 (m, 2H), 7.22 (ddd, J = 9.0, 9.0, 2.4 Hz, 1H), 2.40 (s, 3H); LCMS m/z 336.9 (chlorine isotope pattern observed) [M − H]$^-$ |
| 107 | Example 2; P2 | | $^1$H NMR (400 MHz, DMSO-$d_6$) δ 8.55 (s, 2H), 7.86 (dd, J = 9.2, 2.4 Hz, 1H), 7.24 (br dd, component of ABX system, J = 8.9, 5.2 Hz, 1H), 7.18 (ddd, component of ABXY system, J = 9.0, 8.9, 2.4 Hz, 1H), 6.41 (br s, 4H); 309.9 |
| 108 | Example 7; P1 | | 7.77 (dd, J = 8.8, 2.4 Hz, 1H), 7.53 (dd, J = 8.2, 7.2 Hz, 1H), 7.48 (dd, J = 9.0, 5.1 Hz, 1H), 7.30 (dd, J = 9.3, 9.2 Hz, 1H), 7.24 (ddd, J = 9.0, 9.0, 2.4 Hz, 1H); LCMS m/z 341.1 (chlorine isotope pattern observed) [M − H]$^-$ |
| 109 | Example 7; P1 | | 7.78 (dd, J = 8.8, 2.4 Hz, 1H), 7.53 (dd, J = 9.0, 5.0 Hz, 1H), 7.30-7.20 (m, 2H); LCMS m/z 343.0 [M − H]$^-$ |
| 110 | Example 8; P2 | | 8.36 (s, 1H), 7.67 (dd, J = 9.0, 2.4 Hz, 1H), 7.43 (dd, J = 8.9, 5.2 Hz, 1H), 7.13 (ddd, J = 9.0, 9.0, 2.4 Hz, 1H), 2.84 (q, J = 7.6 Hz, 2H), 1.29 (t, J = 7.6 Hz, 3H); 338.0 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-$d_4$) δ; Mass spectrum, observed ion m/z [M + H]$^+$ or HPLC retention time; Mass spectrum m/z [M + H]$^+$ (unless otherwise indicated) |
|---|---|---|---|
| 111 | Example 7; P1 | 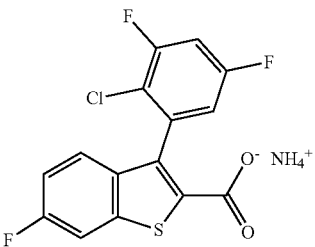 [SMILES: O=C([O-])c1sc2cc(F)ccc2c1-c1cc(F)cc(F)c1Cl ; [NH4+]] | $^1$H NMR (400 MHz, methanol-$d_4$)[34] δ 7.78 (dd, J = 8.8, 2.4 Hz, 1H), 7.35 (dd, component of ABX system, J = 9.0, 5.1 Hz, 1H), 7.28 (ddd, J = 8.9, 8.9, 2.9 Hz, 1H), 7.22 (ddd, component of ABXY system, J = 9.0, 9.0, 2.4 Hz, 1H), 7.04 (ddd, J = 8.5, 2.8, 1.8 Hz, 1H); LCMS m/z 340.9 (chlorine isotope pattern observed) [M − H]$^-$ |
| 112 | Example 8; P2 | 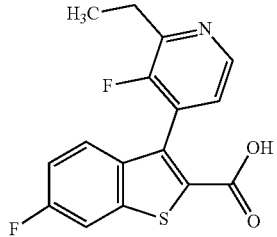 [SMILES: CCc1nccc(-c2c(C(=O)O)sc3cc(F)ccc23)c1F] | 8.40 (d, J = 5.0 Hz, 1H), 7.78 (dd, J = 8.9, 2.4 Hz, 1H), 7.53-7.45 (m, 2H), 7.22 (ddd, J = 9.0, 9.0, 2.4 Hz, 1H), 2.82 (q, J = 7.6 Hz, 2H), 1.32 (t, J = 7.6 Hz, 3H); 320.1 |
| 113 | Example 7; P1 | 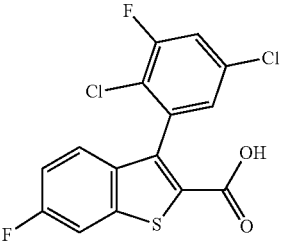 [SMILES: O=C(O)c1sc2cc(F)ccc2c1-c1cc(Cl)cc(F)c1Cl] | 3.41 minutes[35]; 359.1 (dichloro isotope pattern observed) |
| 114 | Example 7; P1 | 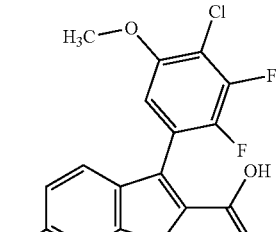 | 3.34 minutes[35]; 373.2 (chlorine isotope pattern observed) |
| 115 | Example 18[36]; P2 | 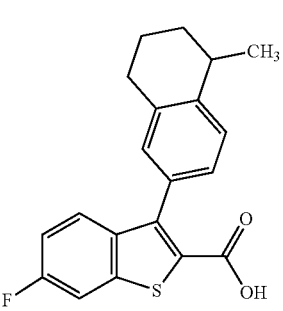 [SMILES: CC1CCCc2cc(-c3c(C(=O)O)sc4cc(F)ccc34)ccc21] | 3.20 minutes[7]; 341 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-d$_4$) δ; Mass spectrum, observed ion m/z [M + H]$^+$ or HPLC retention time; Mass spectrum m/z [M + H]$^+$ (unless otherwise indicated) |
|---|---|---|---|
| 116 | Example 2[37]; P2 | | $^1$H NMR (400 MHz, DMSO-d$_6$) δ 8.03 (dd, J = 9.2, 2.4 Hz, 1H), 7.53 (dd, J = 9.0, 5.2 Hz, 1H), 7.38-7.29 (m, 2H), 7.17 (br s, partial H, assumed to be a partial ammonium salt), 4.07 (br s, 3H); LCMS m/z 354.9 [M − H]$^−$ |
| 117 | Example 2; P2 | | $^1$H NMR (400 MHz, DMSO-d$_6$) δ 8.05 (dd, J = 9.2, 2.4 Hz, 1H), 7.43 (dd, component of ABX system, J = 9.0, 5.2 Hz, 1H), 7.36-7.28 (m, 2H), 7.19 (br dd, J = 9.0, 8.6 Hz, 1H), 2.21 (br s, 3H); 323.1 |
| 118 | Example 18[29]; P2 | | 3.46 minutes[3]; 331 |
| 119 | Example 18[29]; P2 | | 1.91 minutes[6]; LCMS m/z 335 [M − H]$^−$ |
| 120 | Example 18[29]; P2 | | 3.32 minutes[3]; 323 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-d$_4$) δ; Mass spectrum, observed ion m/z [M + H]$^+$ or HPLC retention time; Mass spectrum m/z [M + H]$^+$ (unless otherwise indicated) |
|---|---|---|---|
| 121 | Example 18[29]; P2 | 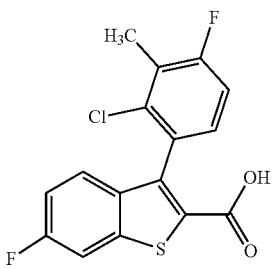 [SMILES: Cc1c(F)ccc(-c2c(C(=O)O)sc3cc(F)ccc23)c1Cl] | 3.38 minutes[3]; 339 |
| 122 | Example 18[29]; P2 | 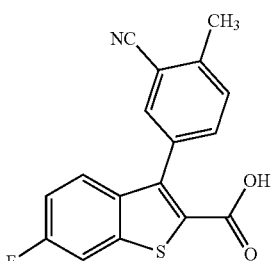 | 3.12 minutes[3]; 312 |
| 123 | Example 18[29]; P2 | 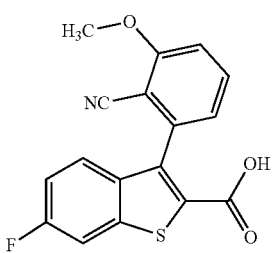 [SMILES: COc1cccc(-c2c(C(=O)O)sc3cc(F)ccc23)c1C#N] | 2.77 minutes[3]; 328 |
| 124 | Example 18[29]; P2 | 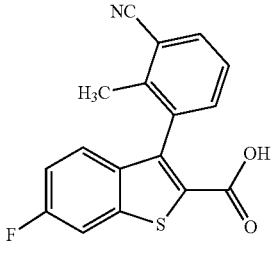 [SMILES: Cc1c(C#N)cccc1-c1c(C(=O)O)sc2cc(F)ccc12] | 3.09 minutes[3]; 312 |
| 125 | Example 18[29]; P2 | 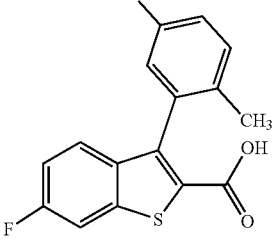 | 3.08 minutes[3]; 312 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-d$_4$) δ; Mass spectrum, observed ion m/z [M + H]$^+$ or HPLC retention time; Mass spectrum m/z [M + H]$^+$ (unless otherwise indicated) |
|---|---|---|---|
| 126 | Example 18[29]; P2 | | 3.28 minutes[3]; 317 |
| 127 | Example 18[29]; P2 | | 2.84 minutes[7]; 339 |
| 128 | Example 7; P7 | | 7.94 (d, J = 1.8 Hz, 1H), 7.44 (tt, J = 8.4, 6.4 Hz, 1H), 7.32 (dd, component of ABX system, J = 8.6, 1.9 Hz, 1H), 7.27 (d, half of AB quartet, J = 8.7 Hz, 1H), 7.10-7.00 (m, 2H); 325.0 (chlorine isotope pattern observed) |
| 129 | Example 7; P7 | | 7.92 (d, J = 1.9 Hz, 1H), 7.32 (dd, component of ABX system, J = 8.7, 1.9 Hz, 1H), 7.26 (d, half of AB quartet, J = 8.7 Hz, 1H), 7.13 (ddd, J = 9.2, 9.2, 5.1 Hz, 1H), 6.96 (ddd, J = 8.9, 8.9, 2.0 Hz, 1H), 3.90 (s, 3H); LCMS m/z 352.9 (chlorine isotope pattern observed) [M − H]$^-$ |
| 130 | Example 7[38]; P7 | | $^1$H NMR (400 MHz, DMSO-d$_6$) δ 8.31 (d, J = 1.8 Hz, 1H), 7.50 (dd, component of ABX system, J = 8.7, 1.9 Hz, 1H), 7.45 (d, half of AB quartet, J = 8.7 Hz, 1H), 7.27 (ddd, J = 10.3, 8.5, 1.5 Hz, 1H), 7.17 (ddd, J = 8.6, 7.5, 6.0 Hz, 1H), 4.19 (q, J = 7.0 Hz, 2H), 1.31 (t, J = 7.0 Hz, 3H); LCMS m/z 366.9 (chlorine isotope pattern observed) [M − H]$^-$ |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-d$_4$) δ; Mass spectrum, observed ion m/z [M + H]$^+$ or HPLC retention time; Mass spectrum m/z [M + H]$^+$ (unless otherwise indicated) |
|---|---|---|---|
| 131 | Example 7; P7 | 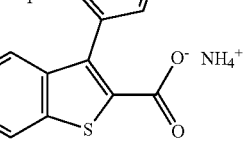 | $^1$H NMR (400 MHz, DMSO-d$_6$) δ 8.07 (d, J = 1.9 Hz, 1H), 7.41 (d, J = 9.2 Hz, 1H), 7.35-7.30 (m, 2H), 7.33 (br s, approximately 3-4H), 7.24 (d, half of AB quartet, J = 8.6 Hz, 1H), 2.32 (s, 3H); LCMS m/z 308.9 (dichloro isotope pattern observed) [M − COOH]$^−$ |
| 132 | Example 7; P7 | 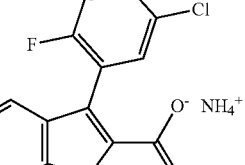 | $^1$H NMR (400 MHz, DMSO-d$_6$) δ 8.08 (d, J = 1.9 Hz, 1H), 7.62-7.54 (m, 2H), 7.35 (dd, component of ABX system, J = 8.7, 2.0 Hz, 1H), 7.31 (br s, 4H), 7.27 (br d, half of AB quartet, J = 8.7 Hz, 1H); LCMS m/z 312.8 (dichloro isotope pattern observed) [M − COOH]$^−$ |
| 133 | Example 7; P7 | 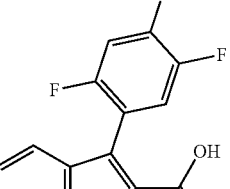 | $^1$H NMR (400 MHz, DMSO-d$_6$) δ 8.32 (br s, 1H), 7.78-7.66 (m, 2H), 7.53-7.45 (m, 2H); LCMS m/z 296.8 (chlorine isotope pattern observed) [M − COOH]$^−$ |
| 134 | Example 7; P18, P7 | 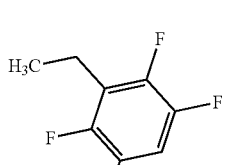 | $^1$H NMR (400 MHz, DMSO-d$_6$) δ 8.32 (br s, 1H), 7.60-7.45 (m, 3H), 2.73 (q, J = 7.6 Hz, 2H), 1.19 (t, J = 7.5 Hz, 3H); LCMS m/z 368.9 (chlorine isotope pattern observed) [M − H]$^−$ |
| 135 | Example 8[39]; P2 | 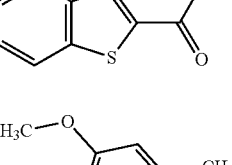 | $^1$H NMR (400 MHz, DMSO-d$_6$) δ 8.06 (dd, J = 9.2, 2.4 Hz, 1H), 7.40 (dd, component of ABX system, J = 9.0, 5.3 Hz, 1H), 7.37-7.29 (m, 2H), 2.23 (s, 6H); 337.0 |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-d$_4$) δ; Mass spectrum, observed ion m/z [M + H]$^+$ or HPLC retention time; Mass spectrum m/z [M + H]$^+$ (unless otherwise indicated) |
|---|---|---|---|
| 136 | Example 7[40]; P1 | | $^1$H NMR (400 MHz, DMSO-d$_6$) δ 8.13 (d, J = 1.9 Hz, 1H), 7.36 (dd, component of ABX system, J = 8.6, 1.9 Hz, 1H), 7.34-7.29 (m, 2H), 7.22 (br s, approximately 2-3H), 2.33 (d, J = 2.3 Hz, 3H); LCMS m/z 326.9 (dichloro isotope pattern observed) [M − COOH]$^-$ |
| 137 | Example 18[41]; P12 | | 7.96 (br s, 1H), 7.39-7.32 (m, 2H), 7.23 (dd, J = 8.4, 8.3 Hz, 1H), 6.98 (dd, J = 9.7, 9.7 Hz, 1H), 2.29 (br s, 3H); 339.1 (chlorine isotope pattern observed) |
| 138 | Example 7; P12 | | $^1$H NMR (400 MHz, DMSO-d$_6$) δ 8.10 (br s, 1H), 7.38-7.32 (m, 2H), 7.29 (d, half of AB quartet, J = 8.7 Hz, 1H), 7.08 (dd, J = 7.7, 7.7 Hz, 1H), 3.89 (s, 3H); LCMS m/z 368.9 (dichloro isotope pattern observed) [M − H]$^-$ |
| 139 | Example 7; P18, P1 | | $^1$H NMR (400 MHz, DMSO-d$_6$) δ 7.98 (dd, J = 9.2, 2.4 Hz, 1H), 7.50-7.39 (m, 2H), 7.29 (ddd, J = 9.0, 9.0, 2.5 Hz, 1H), 7.16 (br s, 1H; assumed to be partial ammonium salt), 2.72 (q, J = 7.5 Hz, 2H), 1.19 (t, J = 7.5 Hz, 3H); LCMS m/z 352.9 [M − H]$^-$ |
| 140 | Example 2; P2 | | $^1$H NMR (400 MHz, chloroform-d) δ 7.62 (dd, J = 8.4, 2.3 Hz, 1H), 7.44 (br dd, J = 9.0, 5.0 Hz, 1H), 7.29-7.17 (m, 2H, assumed; partially obscured by solvent peak); LCMS m/z 342.9 [M − H]$^-$ |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-d$_4$) δ; Mass spectrum, observed ion m/z [M + H]$^+$ or HPLC retention time; Mass spectrum m/z [M + H]$^+$ (unless otherwise indicated) |
|---|---|---|---|
| 141 | Example 7; P12 | | $^1$H NMR (400 MHz, DMSO-d$_6$) δ 8.31 (d, J = 1.9 Hz, 1H), 7.48 (dd, component of ABX system, J = 8.7, 2.0 Hz, 1H), 7.40 (d, half of AB quartet, J = 8.7 Hz, 1H), 7.36-7.28 (m, 1H), 7.19 (dd, J = 8.8, 8.7 Hz, 1H), 2.21 (br s, 3H); 339.1 (chlorine isotope pattern observed) |
| 142 | Example 7; P12 | | 7.94 (dd, J = 1.2, 1.1 Hz, 1H), 7.54 (d, J = 6.9 Hz, 1H), 7.46 (d, J = 8.9 Hz, 1H), 7.35 (br s, 2H); LCMS m/z 328.8 (trichloro isotope pattern observed) [M − COOH]$^-$ |
| 143 | Example 18[28]; P12 | | $^1$H NMR (400 MHz, chloroform-d) δ 7.90 (d, J = 1.9 Hz, 1H), 7.42 (d, half of AB quartet, J = 8.7 Hz, 1H), 7.35 (dd, component of ABX system, J = 8.7, 1.9 Hz, 1H), 7.17-7.08 (m, 1H), 6.97 (br dd, J = 8.8, 8.5 Hz, 1H), 2.75 (q, J = 7.5 Hz, 2H), 1.22 (t, J = 7.5 Hz, 3H); 353.1 (chlorine isotope pattern observed) |
| 144 | Example 2[42]; P2 | | $^1$H NMR (400 MHz, chloroform-d) δ 7.58 (dd, J = 8.4, 2 Hz, 1H), 7.46 (dd, J = 8.7, 5.1 Hz, 1H), 7.15 (ddd, J = 8.8, 8.8, 2 Hz, 1H), 6.78 (t, J = 7.9 Hz, 1H), 3.94 (s, 6H); LCMS m/z 366.9 [M − COOH]$^-$ |
| 145 | Example 18[43]; P12 | | 8.07 (d, J = 1.9 Hz, 1H), 7.42 (dd, component of ABX system, J = 8.7, 1.9 Hz, 1H), 7.31 (d, half of AB quartet, J = 8.7 Hz, 1H), 7.28 (ddd, J = 8.9, 8.9, 2.9 Hz, 1H), 7.04 (ddd, J = 8.5, 2.9, 1.7 Hz, 1H); LCMS m/z 312.8 (dichloro isotope pattern observed) [M − COOH]$^-$ |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-d$_4$) δ; Mass spectrum, observed ion m/z [M + H]$^+$ or HPLC retention time; Mass spectrum m/z [M + H]$^+$ (unless otherwise indicated) |
|---|---|---|---|
| 146 | Example 7; P7 | | 8.00 (br s, 1H), 7.37 (br s, 2H), 7.32 (br d, J = 8.3 Hz, 1H), 7.18 (dd, J = 8.0, 7.8 Hz, 1H), 2.37 (d, J = 2.3 Hz, 3H); LCMS m/z 308.8 (dichloro isotope pattern observed) [M − COOH]$^−$ |
| 147 | Example 2[44]; P2 | | $^1$H NMR (400 MHz, DMSO-d$_6$) δ 13.44 (br s, 1H), 8.05 (dd, J = 9.1, 2.5 Hz, 1H), 7.44 (dd, component of ABX system, J = 9.0, 5.2 Hz, 1H), 7.37-7.25 (m, 2H), 7.14 (dd, J = 10, 9 Hz, 1H), 1.91 (tt, J = 8.6, 5.5 Hz, 1H), 1.03-0.88 (m, 4H); 349.0 |
| 148 | Example 2; P2 | | $^1$H NMR (400 MHz, chloroform-d) δ 7.61 (dd, J = 8.5, 2.3 Hz, 1H), 7.35 (dd, J = 9.0, 5.1 Hz, 1H), 7.20-7.12 (m, 2H), 6.93 (ddd, J = 8.7, 8.7, 2.4 Hz, 1H); LCMS m/z 340.9 (chlorine isotope pattern observed) [M − H]$^−$ |
| 149 | Example 7; P7 | | $^1$H NMR (400 MHz, DMSO-d$_6$) δ 8.12 (br s, 1H), 7.48-7.38 (m, 1H), 7.37 (br s, 2H), 7.34 (br s, approximately 4H); LCMS m/z 314.9 (chlorine isotope pattern observed) [M − COOH]$^−$ |
| 150 | Example 2[45]; P2 | | 7.66 (br d, J = 9.0 Hz, 1H), 7.32-7.06 (m, 4H), 3.91 (s, 3H); LCMS m/z 352.9 (chlorine isotope pattern observed) [M − H]$^−$ |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-$d_4$) δ; Mass spectrum, observed ion m/z [M + H]$^+$ or HPLC retention time; Mass spectrum m/z [M + H]$^+$ (unless otherwise indicated) |
|---|---|---|---|
| 151 | Examples 14, 15, and 16; P1 | | 7.65 (br d, J = 8.7 Hz, 1H), 7.43 (s, 1H), 7.27 (d, J = 8.6 Hz, 1H), 7.22 (dd, J = 8.6, 5.1 Hz, 1H), 7.16-7.07 (m, 1H); LCMS m/z 356.8 (dichloro isotope pattern observed) [M − H]$^-$ |
| 152 | Example 8; P2 | | 7.76 (dd, J = 8.8, 2.4 Hz, 1H), 7.46 (dd, J = 9.0, 5.1 Hz, 1H), 7.34 (dd, J = 7.7, 7.7 Hz, 1H), 7.23 (ddd, J = 9.0, 9.0, 2.4 Hz, 1H), 2.30 (t, J = 2.1 Hz, 3H); LCMS m/z 354.8 (chlorine isotope pattern observed) [M − H]$^-$ |
| 153 | Example 2[46]; P2 | | $^1$H NMR (400 MHz, DMSO-$d_6$) δ 7.93 (dd, J = 9.2, 2.3 Hz, 1H), 7.83 (dd, J = 8.4, 2.8 Hz, 1H), 7.43 (dd, J = 9.2, 2.8 Hz, 1H), 7.27 (br s, approximately 3-4H), 7.21 (ddd, component of ABXY system, J = 8.9, 8.9, 2.4 Hz, 1H), 7.16 (dd, component of ABX system, J = 8.9, 5.5 Hz, 1H), 2.10 (s, 3H); LCMS m/z 327.9 [M − H]$^-$ |
| 154 | Examples 14, 15, and 16; P19, P2 | | $^1$H NMR (400 MHz, chloroform-d) δ 7.60 (dd, J = 8.4, 2.3 Hz, 1H), 7.35 (dd, J = 8.9, 5.0 Hz, 1H), 7.16 (ddd, J = 8.8, 8.8, 2.3 Hz, 1H), 6.98 (dd, J = 10.5, 8.7 Hz, 1H), 4.00 (br s, 3H); LCMS m/z 370.9 (chlorine isotope pattern observed) [M − H]$^-$ |
| 155 | Example 18; P2 | | 7.68 (dd, J = 8.9, 2.4 Hz, 1H), 7.45-7.37 (m, 2H), 7.30 (dd, J = 9.3, 6.1 Hz, 1H), 7.17 (ddd, J = 9.0, 9.0, 2.4 Hz, 1H); LCMS m/z 296.8 (chlorine isotope pattern observed) [M − COOH]$^-$ |

TABLE 1-continued

Method of synthesis, structure, and physicochemical data for Examples 26-159.

| Example Number | Method of synthesis; Non-commercial starting materials[1] | Structure | $^1$H NMR (400 MHz, methanol-$d_4$) δ; Mass spectrum, observed ion m/z [M + H]$^+$ or HPLC retention time; Mass spectrum m/z [M + H]$^+$ (unless otherwise indicated) |
|---|---|---|---|
| 156 | Example 7; P1 | | $^1$H NMR (400 MHz, chloroform-d) δ 7.59 (dd, J = 8.5, 2.3 Hz, 1H), 7.34 (dd, J = 9.0, 5.1 Hz, 1H), 7.17-7.06 (m, 2H), 7.02 (dd, component of ABX system, J = 9.2, 4.7 Hz, 1H), 3.96 (s, 3H); 355.2 (chlorine isotope pattern observed) |
| 157 | Example 1[47]; C62 | | 7.94 (br d, J = 8.0 Hz, 1H), 7.51-7.37 (m, 3H), 7.01 (ddd, J = 10.5, 8.3, 6.1 Hz, 1H), 4.05 (br s, 3H); 339.0 |
| 158 | Example 2; P2 | | 7.71 (dd, J = 8.8, 2.4 Hz, 1H), 7.61-7.52 (m, 1H), 7.40 (dd, J = 9.0, 5.0 Hz, 1H), 7.24-7.15 (m, 2H), 7.11 (t, $J_{HF}$ = 52.9 Hz, 1H); LCMS m/z 376.2 [M + NH$_4^+$] |
| 159 | Example 2; P20, P2 | | 7.78 (dd, J = 8.8, 2.4 Hz, 1H), 7.59 (dd, J = 11.8, 8.5 Hz, 1H), 7.41 (dd, J = 9.0, 5.1 Hz, 1H), 7.23 (ddd, J = 9.0, 9.0, 2.4 Hz, 1H), 7.15 (dd, J = 8.5, 4.3 Hz, 1H), 4.17 (d, J = 2.6 Hz, 3H); LCMS m/z 363.3 [M + NH$_4^+$] |

1. For the methods below, unspecified boron-containing starting materials were either commercially available boronic acids or boronate esters.

2. In this case, the palladium-catalyzed coupling was carried out using potassium carbonate as the base, rather than potassium phosphate.

3. Conditions for analytical HPLC. Column: Waters XBridge C18, 2.1×50 mm, 5 μm; Mobile phase A: water containing 0.0375% trifluoroacetic acid; Mobile phase B: acetonitrile containing 0.01875% trifluoroacetic acid; Gradient: 10% B for 0.50 minutes; 10% to 100% B over 3.5 minutes; Flow rate: 0.8 mL/minute.

4. In this case, the palladium-catalyzed coupling was carried out in aqueous N,N-dimethylformamide, using potassium phosphate as base, under microwave irradiation at 125° C.

5. Potassium phosphate was used in place of cesium carbonate.

6. Conditions for analytical HPLC. Column: Waters XBridge C18, 2.1×50 mm, 5 μm; Mobile phase A: water containing 0.05% ammonium hydroxide; Mobile phase B: acetonitrile; Gradient: 5% B for 0.50 minutes, then 5% to 100% B over 2.9 minutes, then 100% B for 0.8 minutes; Flow rate: 0.8 mL/minute.

7. Conditions for analytical HPLC. Column: Waters XBridge C18, 2.1×50 mm, 5 μm; Mobile phase A: water containing 0.0375% trifluoroacetic acid; Mobile phase B: acetonitrile containing 0.01875% trifluoroacetic acid; Gradient: 25% B for 0.50 minutes, then 25% to 100% B over 3.0 minutes; Flow rate: 0.8 mL/minute.

8. The product was separated into its component enantiomers using reversed-phase HPLC (Column: Chiral Technologies Chiralpak AD, 50×250 mm, 10 μm; Mobile phase: 50:50:0.1 (v/v/v) hexane/propan-2-ol/formic acid; Flow rate: 60 g/minute). The first-eluting enantiomer was designated as Example 41, and the second-eluting enantiomer as Example 42. On analytical reversed-phase HPLC (Column: Chiral Technologies Chiralpak AD-3, 4.6×150 mm, 3 μm; Mobile phase: 50:50:0.1 (v/v/v) hexane/propan-2-ol/formic acid; Flow rate: 0.5 mL/minute), Example 41 exhibited a retention time of 11.32 minutes. Example 42 had a retention time of 13.79 minutes under the same conditions.

9. The product was separated into its component enantiomers using reversed-phase HPLC (Column: Chiral Technologies Chiralpak IC, 50×250 mm, 10 μm; Mobile phase: 80:20:0.1 (v/v/v) hexane/propan-2-ol/formic acid; Flow rate: 60 mL/minute). The first-eluting enantiomer was designated as Example 43, and the second-eluting enantiomer as Example 44. On analytical reversed-phase HPLC (Column: Chiral Technologies Chiralpak AD-H, 4.6×150 mm, 5 μm; Mobile phase: 80:20:0.1 (v/v/v) hexane/propan-2-ol/formic acid; Flow rate: 1.0 mL/minute), Example 43 exhibited a retention time of 5.67 minutes. Example 44 had a retention time of 6.89 minutes under the same conditions.

10. The product was separated into its component enantiomers using reversed-phase HPLC (Column: Chiral Technologies Chiralpak AD, 50×250 mm, 10 μm; Mobile phase: 80:20:0.1 (v/v/v) hexane/propan-2-ol/formic acid; Flow rate: 60 mL/minute). The first-eluting enantiomer was designated as Example 45, and the second-eluting enantiomer as Example 46. On analytical reversed-phase HPLC (Column: Chiral Technologies Chiralpak AD-H, 4.6×150 mm, 5 μm; Mobile phase: 80:20:0.1 (v/v/v) hexane/propan-2-ol/formic acid; Flow rate: 1.0 mL/minute), Example 45 exhibited a retention time of 5.42 minutes. Example 46 had a retention time of 6.57 minutes under the same conditions.

11. In this case, (2-dicyclohexylphosphino-2',4',6'-triisopropyl-1,1'-biphenyl)[2-(2'-amino-1,1'-biphenyl)]palladium(II) methanesulfonate (XPhos Pd G3) was used in place of bis[di-tert-butyl(4-dimethylaminophenyl)phosphine]dichloropalladium(II) [Pd(amphos)$_2$Cl$_2$].

12. The requisite 1-bromo-2,4,5-trifluoro-3-(methoxymethyl)benzene may be prepared by methylation of (3-bromo-2,5,6-trifluorophenyl)methanol; see H. T. Do, J. Med. Chem. 2019, 62, 2690-2707, Supporting Information.

13. 2-Methyl-7-(4,4,5,5-tetramethyl-1,3,2-dioxaborolan-2-yl)-3,4-dihydro-2H-1-benzopyran was prepared using the method described in Preparation P15, but beginning with 1-(4-bromo-2-hydroxyphenyl)ethan-1-one.

14. Example 56 was separated into its component enantiomers using supercritical fluid chromatography [Column: Chiral Technologies Chiralpak AD, 30×250 mm, 10 μm; Mobile phase: 65:35 carbon dioxide/(methanol containing 0.1% ammonium hydroxide); Flow rate: 70 mL/minute]. The first-eluting enantiomer was designated as Example 57, and the second-eluting enantiomer as Example 58. On analytical supercritical fluid chromatography (Column: Chiral Technologies Chiralpak AD-3, 4.6×150 mm, 3 μm; Mobile phase A: carbon dioxide; Mobile phase B: ethanol containing 0.05% diethylamine; Gradient: 5% to 40% B over 5.5 minutes, then 40% B for 3 minutes; Flow rate: 2.5 mL/minute; Back pressure: 100 bar), Example 57 exhibited a retention time of 5.69 minutes. Example 58 had a retention time of 6.12 minutes under the same conditions.

15. Reaction of 2,3,5-trifluoro-4-iodopyridine with sodium methoxide in methanol afforded the requisite 3,5-difluoro-4-iodo-2-methoxypyridine.

16. 7-Bromo-8-fluoro-2,3-dihydro-4H-1-benzopyran-4-one was converted to 8-fluoro-7-(4,4,5,5-tetramethyl-1,3,2-dioxaborolan-2-yl)-3,4-dihydro-2H-1-benzopyran using the method described in Preparation P14 for conversion of C22 to C23.

17. Conversion of 5-bromo-4-fluoro-2-hydroxybenzaldehyde to 6-bromo-7-fluoro-2-methyl-3,4-dihydro-2H-1-benzopyran was carried out using the method described in Preparation P11. Reaction with 4,4,4',4',5,5,5',5'-octamethyl-2,2'-bi-1,3,2-dioxaborolane, as described for synthesis of C56 in Example 10, then afforded 7-fluoro-2-methyl-6-(4,4,5,5-tetramethyl-1,3,2-dioxaborolan-2-yl)-3,4-dihydro-2H-1-benzopyran.

18. Example 67 was separated into its component enantiomers using supercritical fluid chromatography [Column: Chiral Technologies Chiralpak IG, 30×250 mm, 10 μm; Mobile phase: 3:1 carbon dioxide/(propan-2-ol containing 0.1% ammonium hydroxide); Flow rate: 70 mL/minute]. The first-eluting enantiomer was designated as Example 68, and the second-eluting enantiomer as Example 69. On analytical supercritical fluid chromatography [Column: Chiral Technologies Chiralpak IG-3, 4.6×100 mm, 3 μm; Mobile phase A: carbon dioxide; Mobile phase B: propan-2-ol containing 0.05% diethylamine; Gradient: 5% to 40% B over 4.0 minutes, then 40% B for 2.5 minutes; Flow rate: 2.8 mL/minute; Back pressure: 1500 psi], Example 68 exhibited a retention time of 4.63 minutes. Example 69 had a retention time of 4.83 minutes under the same conditions.

19. Conversion of 5-bromo-3-fluoro-2-hydroxybenzaldehyde to 6-bromo-8-fluoro-2-methyl-3,4-dihydro-2H-1-benzopyran was carried out using the method described in Preparation P11.

20. Example 71 was separated into its component enantiomers using reversed-phase HPLC (Column: Phenomenex Gemini NX-C18, 30×75 mm, 3 μm; Mobile phase A: water containing 0.225% formic acid; Mobile phase B: acetonitrile; Gradient: 40% to 80% B; Flow rate: 25 mL/minute). The first-eluting enantiomer was designated as Example 72, and the second-eluting enantiomer as Example 73. On analytical supercritical fluid (Column: Chiral Technologies Chiralcel OJ-H, 4.6×150 mm, 5 μm; Mobile phase A: carbon dioxide; Mobile phase B: methanol containing 0.05% diethylamine; Gradient: 5% to 40% B over 5.5 minutes; Flow rate: 2.5 mL/minute; Back pressure: 100 bar), Example 72 exhibited a retention time of 3.62 minutes. Example 73 had a retention time of 3.99 minutes under the same conditions.

21. Treatment of 3,5-difluoro-2-methoxybenzonitrile with lithium diisopropylamide at −78° C., followed by reaction with iodine, afforded the requisite 3,5-difluoro-4-iodo-2-methoxybenzonitrile.

22. Conversion of 3-bromo-2-fluoro-6-hydroxybenzaldehyde to 6-bromo-5-fluoro-2-methyl-3,4-dihydro-2H-1-benzopyran was carried out using the method described in Preparation P11. Reaction with 4,4,4',4',5,5,5',5'-octamethyl-2,2'-bi-1,3,2-dioxaborolane, as described for synthesis of C56 in Example 10, then afforded 5-fluoro-2-methyl-6-(4,4,5,5-tetramethyl-1,3,2-dioxaborolan-2-yl)-3,4-dihydro-2H-1-benzopyran.

23. Example 76 was separated into its component enantiomers using supercritical fluid chromatography [Column: Chiral Technologies Chiralpak IG, 30×250 mm, 10 μm; Mobile phase: 3:2 carbon dioxide/(propan-2-ol containing 0.1% ammonium hydroxide); Flow rate: 70 mL/minute]. The first-eluting enantiomer was designated as Example 77, and the second-eluting enantiomer as Example 78. On analytical supercritical fluid chromatography [Column: Chiral Technologies Chiralpak IG-3, 4.6×100 mm, 3 µm; Mobile phase A: carbon dioxide; Mobile phase B: propan-2-ol containing 0.05% diethylamine; Gradient: 5% to 40% B over 4.0 minutes, then 40% B for 2.5 minutes; Flow rate: 2.8 mL/minute; Back pressure: 1500 psi], Example 77 exhibited a retention time of 5.07 minutes. Example 78 had a retention time of 5.68 minutes under the same conditions.

24. $^1$H NMR analysis indicated that this material comprised a mixture of rotamers.

25. Example 81 was separated into its component enantiomers using supercritical fluid chromatography [Column: Chiral Technologies Chiralpak AD, 30×250 mm, 10 µm; Mobile phase: 55:45 carbon dioxide/(propan-2-ol containing 0.1% ammonium hydroxide); Flow rate: 80 mL/minute]. The first-eluting enantiomer was designated as Example 82, and the second-eluting enantiomer as Example 83. On analytical supercritical fluid chromatography (Column: Chiral Technologies Chiralpak AD-3, 4.6×50 mm, 3 µm; Mobile phase A: carbon dioxide; Mobile phase B: propan-2-ol containing 0.05% diethylamine; Gradient: 5% to 40% B over 2.0 minutes, then 40% B for 1.2 minutes; Flow rate: 4 mL/minute; Back pressure: 1500 psi), Example 82 exhibited a retention time of 2.00 minutes. Example 83 had a retention time of 2.63 minutes under the same conditions.

26. Conversion of 4-bromo-3-fluoro-2-hydroxybenzaldehyde to 7-bromo-8-fluoro-2-methyl-3,4-dihydro-2H-1-benzopyran was carried out using the method described in Preparation P11. Reaction with 4,4,4',4',5,5,5',5'-octamethyl-2,2'-bi-1,3,2-dioxaborolane, as described for synthesis of C56 in Example 10, then afforded 8-fluoro-2-methyl-7-(4,4,5,5-tetramethyl-1,3,2-dioxaborolan-2-yl)-3,4-dihydro-2H-1-benzopyran.

27. The product was separated into its component enantiomers using supercritical fluid chromatography [Column: Chiral Technologies Chiralpak AD, 30×250 mm, 10 µm; Mobile phase: 65:35 carbon dioxide/(ethanol containing 0.1% ammonium hydroxide); Flow rate: 70 mL/minute]. The first-eluting enantiomer was designated as Example 84, and the second-eluting enantiomer as Example 85. On analytical supercritical fluid chromatography [Column: Chiral Technologies Chiralpak IG-3, 4.6×100 mm, 3 µm; Mobile phase A: 3:2 carbon dioxide/(ethanol containing 0.05% diethylamine); Flow rate: 3.2 mL/minute; Back pressure: 1500 psi], Example 84 exhibited a retention time of 1.44 minutes. Example 85 had a retention time of 1.68 minutes under the same conditions.

28. Reaction of 3-bromo-2,6-difluorobenzaldehyde with methylmagnesium bromide, followed by reduction of the resulting alcohol with boron trifluoride diethyl etherate, afforded 1-bromo-3-ethyl-2,4-difluorobenzene. This material was converted to the requisite 2-(3-ethyl-2,4-difluorophenyl)-4,4,5,5-tetramethyl-1,3,2-dioxaborolane using the method described for preparation of C56 in Example 10.

29. The palladium catalyst in this case was [1,1'-bis(di-tert-butylphosphino)ferrocene]dichloropalladium(II) [Pd(dtbpf)Cl$_2$], rather than [1,1'-bis(diphenylphosphino)ferrocene]dichloropalladium(II) [Pd(dppf)Cl$_2$].

30. 6-Bromo-7-methyl-2,3-dihydro-4H-1-benzopyran-4-one was converted to the requisite 6-bromo-7-methyl-3,4-dihydro-2H-1-benzopyran by reaction with triethylsilane and trifluoroacetic acid.

31. Conditions for analytical HPLC. Column: Waters XBridge C18, 2.1×50 mm, 5 µm; Mobile phase A: water containing 0.05% ammonium hydroxide; Mobile phase B: acetonitrile; Gradient: 15% B for 0.50 minutes, then 15% to 100% B over 2.9 minutes, then 100% B for 0.5 minutes; Flow rate: 0.8 mL/minute.

32. 7-Bromo-6-methyl-2,3-dihydro-4H-1-benzopyran-4-one was converted to the requisite 7-bromo-6-methyl-3,4-dihydro-2H-1-benzopyran by reaction with triethylsilane and trifluoroacetic acid.

33. 2-Bromo-1,5-difluoro-3-methoxybenzene was used in the palladium coupling; after ester hydrolysis, the methyl ether was cleaved by treatment with boron tribromide to afford Example 102.

34. The $^1$H NMR spectrum was recorded using the neutral form of the product, after silica gel chromatographic purification (Gradient: 0% to 20% methanol in dichloromethane) and subsequent trituration with heptane. The sample of Example 111 that was tested for biological activity was obtained from a reversed-phase HPLC purification of this sample that employed aqueous ammonium hydroxide solution as an additive, and was presumed to be the ammonium salt.

35. Conditions for analytical HPLC. Column: Waters Atlantis dC18, 4.6×50 mm, 5 µm; Mobile phase A: water containing 0.05% trifluoroacetic acid (v/v); Mobile phase B: acetonitrile containing 0.05% trifluoroacetic acid (v/v); Gradient: 5.0% to 95% B, linear over 4.0 minutes, then 95% B for 1.0 minute; Flow rate: 2 mL/minute.

36. Reaction of 5-methyl-5,6,7,8-tetrahydronaphthalen-2-ol with trifluoromethanesulfonyl chloride and triethylamine provided 5-methyl-5,6,7,8-tetrahydronaphthalen-2-yl trifluoromethanesulfonate.

37. The bromophenyl intermediate incorporated into Example 116 resulted from a side product in a small-scale synthesis of Example 9; separation at the final step provided Example 116 as well as Example 9. Separation of the component regioisomers was carried out using supercritical fluid chromatography [Column: Chiral Technologies Chiralpak IG, 50×250 mm, 10 µm; Mobile phase: 4:1 carbon dioxide/(ethanol containing 0.1% ammonium hydroxide); Flow rate: 60 mL/minute]. The first-eluting isomer was identified as Example 9, and the second-eluting isomer was designated as Example 116.

38. Reaction of 1-bromo-3-ethoxy-2,4-difluorobenzene with 4,4,4',4',5,5,5',5'-octamethyl-2,2'-bi-1,3,2-dioxaborolane, as described for synthesis of C56 in Example 10, provided the requisite 2-(3-ethoxy-2,4-difluorophenyl)-4,4,5,5-tetramethyl-1,3,2-dioxaborolane.

39. Reaction of 1-bromo-2,4-difluoro-5-methylbenzene with 2,4,6-trimethyl-1,3,5,2,4,6-trioxatriborinane, [1,1'-bis(di-tert-butylphosphino)ferrocene]dichloropalladium(II) [Pd(dtbpf)Cl$_2$], and cesium carbonate provided 1,5-difluoro-2,4-dimethylbenzene; subjection of this material to lithium diisopropylamide at −55° C., followed by addition of iodine, afforded 2,4-difluoro-3-iodo-1,5-dimethylbenzene.

40. Bromination of 2-chloro-3,6-difluorobenzaldehyde with N-bromosuccinimide in sulfuric acid afforded 3-bromo-6-chloro-2,5-difluorobenzaldehyde, which was reduced with sodium borohydride to provide (3-bromo-6-chloro-2,5-difluorophenyl)methanol. Conversion of this material to the requisite 2-(4-chloro-2,5-difluoro-3-methylphenyl)-4,4,5,5-tetramethyl-1,3,2-dioxaborolane was carried out using the method described in Preparation P18.

41. Reaction of 1-bromo-2,4-difluoro-5-methylbenzene with 4,4,4',4',5,5,5',5'-octamethyl-2,2'-bi-1,3,2-dioxaborolane, as described for synthesis of C56 in Example 10, provided the requisite 2-(2,4-difluoro-5-methylphenyl)-4,4,5,5-tetramethyl-1,3,2-dioxaborolane.

42. Treatment of 1,5-difluoro-2,4-dimethoxybenzene with lithium diisopropylamide at −75° C., followed by reaction with iodine, afforded the requisite 2,4-difluoro-3-iodo-1,5-dimethoxybenzene.

43. Reaction of 1-bromo-2-chloro-3,5-difluorobenzene with 4,4,4',4',5,5,5',5'-octamethyl-2,2'-bi-1,3,2-dioxaborolane, as described for synthesis of C56 in Example 10, provided the requisite 2-(2-chloro-3,5-difluorophenyl)-4,4,5,5-tetramethyl-1,3,2-dioxaborolane.

44. Treatment of 3-bromo-2,4-difluoroaniline with cyclopropylboronic acid, [1,1'-bis(di-tert-butylphosphino)ferrocene]dichloropalladium(II) [Pd(dtbpf)Cl$_2$], and cesium carbonate provided 3-cyclopropyl-2,4-difluoroaniline. Conversion of this material to the requisite 1-bromo-3-cyclopropyl-2,4-difluorobenzene was carried out using tert-butyl nitrite and copper(II) bromide.

45. 4-Chloro-2-fluoro-1-methoxybenzene was treated with n-butyllithium at −65° C., followed by iodine, to afford 1-chloro-3-fluoro-2-iodo-4-methoxybenzene.

46. Treatment of 1,3-dibromo-5-fluoro-2-methylbenzene with copper(I) cyanide and copper(I) iodide at 140° C. provided 3-bromo-5-fluoro-2-methylbenzonitrile.

47. In this case, the coupling was carried out using [1,2-bis(diphenylphosphino)ethane]dichloronickel(II) and potassium phosphate in toluene.

The following protocols may of course be varied by those skilled in the art.

Protein Generation

BCKDK protein was generated using a pET vector containing from N- to C-terminus: 6×His, MBP, a TEV protease site (ENLYFQG), a biotin acceptor peptide (GLNDIFEAQKIEWHE), and human BCKDK (residues 31-412 of the protein pre-processing, NP 005872.2). Protein was co-expressed with GroEL-GroES in BL21(DE3) E. coli in LB media, and protein production was induced with 0.5 mM IPTG and 0.5 mg/mL L-arabinose at an OD$_{600}$ of 1 and grown for 16 h at 26° C. Bacteria were lysed using a Microfluidizer in 100 mM potassium phosphate pH 7.5, 500 mM NaCl, 0.1 mM EDTA, 1% Tween-20, 0.25% Triton X-100, 10% glycerol, 1 mM DTT, and protease inhibitors. MBP-tagged protein was purified by affinity chromatography using amylose resin, and MBP was removed from BCKDK by TEV protease incubation followed by gel filtration chromatography in 50 mM HEPES pH 7.5, 500 mM NaCl, 300 mM L-Arginine, 2 mM MgCl$_2$, 1 mM DTT, and 10% glycerol.

A pET vector containing E. coli LplA was expressed in BL21(DE3) E. coli in LB media, and protein production was induced with 0.75 mM IPTG at an OD$_{600}$ of 1 and grown for 16 h at 30° C. Bacteria were lysed using a Microfluidizer in 50 mM sodium phosphate buffer pH 7.5, 350 mM NaCl, 1.5 mM MgCl$_2$, and 1 mM DTT. LplA protein was precipitated from clarified lysate with 1 M ammonium sulfate and further purified by gel filtration chromatography in 50 mM sodium phosphate pH 7.5, 350 mM NaCl, 1.5 mM MgCl$_2$, 1 mM DTT, and 10% glycerol.

The human BCKDHE1α-E2 fusion substrate was cloned into a pET vector and contained from N- to C-terminus: the lipoyl binding domain of E2 (residues 62-160 pre-processing, NP 001909.4), a TEV protease site (LENLYFQG), residues 331-345 (pre-processing, NP 000700.1) from E1α, and 6×His (Tso, S. C. et al., J Biol Chem 2014, 289 (30), 20583-20593). The fusion substrate was expressed in BL21 (DE3) E. coli in LB media, and protein production was induced with 0.75 mM IPTG at an OD$_{600}$ of 1 and grown for 16 h at 30° C. Bacteria were lysed using a Microfluidizer in 50 mM sodium phosphate pH 7.5, 350 mM NaCl, 10 mM imidazole, 10% glycerol, 1 mM DTT, and protease inhibitors. Fusion substrate was purified by Ni-NTA affinity chromatography followed gel filtration chromatography in 50 mM sodium phosphate pH 7.5, 350 mM NaCl, 1.5 mM MgCl$_2$, 1 mM DTT, and 10% glycerol. For lipoylation, fusion substrate was incubated with LplA at a 10:1 (substrate:LplA) ratio in 20 mM sodium phosphate pH 7.4, 6 mM MgCl$_2$, 4 mM ATP, 2 mM DTT, 3 mM DL-6,8-thioctic acid at 37° C. The reaction was monitored using an Agilent 6530 Q-TOF coupled to an Agilent 1290 UPLC. The final lipoylated fusion substrate was purified by gel filtration chromatography in 50 mM HEPES pH 7.5, 350 mM NaCl, 1.5 mM MgCl$_2$, 1 mM DTT, 10% glycerol.

In Vitro FRET

BCKDK activity was monitored by phosphorylation of a HIS-tagged fusion BCKDHE1α-E2 substrate protein as described above and was detected using a time resolved-fluorescence resonance energy transfer (TR-FRET) assay system. Compounds were spotted into a 384 well plate, and purified human BCKDK protein was added to the plated compound. After incubation, the LBD-linker-E1 phosphorylation sequence was added in the presence of 15 µM ATP. The reaction was terminated with EDTA. Phosphorylated substrate was recognized by the addition of rabbit anti-E1 phospho Ser293 antibodies (Bethyl Laboratories—A304-672A), and the TR-FRET signal was developed by addition of anti-HIS donor molecules (Europium; Perkin Elmer-AD0205, AD0110, AD0111) and anti-Rabbit acceptor molecules (Ulight; Perkin Elmer-TRF502D, TRF502M, TRF502R). Recognition of phosphorylated E1 brought donor and acceptor molecules into close proximity, and excitation at 320 nm caused energy transfer from the Europium donor to the Ulight acceptor dye, which in turn generated light at 665 nm. Signal intensity was proportional to the level of BCKDK-mediated substrate phosphorylation. Reactions were normalized to zero percent effect with DMSO and one hundred percent effect with 600 µM Radicicol, a known BCKDK inhibitor. IC$_{50}$ curves were generated using ABASE software (IDBS, Boston Mass.).

In Table 2 assay data (IC$_{50}$s) are presented for the Examples below in accordance with the above-described assay (to two (2) significant figures as the geometric mean, based on the number of replicates tested (Number)).

TABLE 2

In Vitro FRET Assay Data

| Example Number | In Vitro FRET IC$_{50}$ (μM) | Number of Replicates | IUPAC Name |
|---|---|---|---|
| 1 | 0.11 | 3 | 3-(5,7-difluoro-3,4-dihydro-2H-1-benzopyran-6-yl)-6-fluoro-1-benzothiophene-2-carboxylic acid |
| 2 | 0.010 | 6 | 6-fluoro-3-(2,4,6-trifluoro-3-methoxyphenyl)-1-benzothiophene-2-carboxylic acid |
| 3 | 0.12 | 4 | 3-(5,7-difluoro-2-methyl-3,4-dihydro-2H-1-benzopyran-6-yl)-6-fluoro-1-benzothiophene-2-carboxylic acid |
| 4 | 1.7 | 3 | 6,7-difluoro-3-phenyl-1-benzothiophene-2-carboxylic acid |
| 5 | 3.2 | 4 | ammonium 4,6-difluoro-3-phenyl-1-benzothiophene-2-carboxylate |
| 6 | 4.1 | 3 | 6-chloro-5-fluoro-3-phenyl-1-benzothiophene-2-carboxylic acid |
| 7 | 0.024 | 3 | 3-(4,5-dichloro-2-fluorophenyl)-6-fluoro-1-benzothiophene-2-carboxylic acid |
| 8 | 0.41 | 3 | 3-(3,5-difluoro-2-methylpyridin-4-yl)-6-fluoro-1-benzothiophene-2-carboxylic acid |
| 9 | 0.015 | 12 | 6-fluoro-3-(2,4,5-trifluoro-3-methoxyphenyl)-1-benzothiophene-2-carboxylic acid |
| 10 | 0.022 | 6 | 6-chloro-3-(2,4,5-trifluoro-3-methylphenyl)-1-benzothiophene-2-carboxylic acid |
| 11 | 2.1 | 3 | 5,6-difluoro-3-phenyl-1-benzothiophene-2-carboxylic acid |
| 12 | 0.012[1] | 4 | ammonium 6-chloro-3-(2,4,5-trifluoro-3-methoxyphenyl)-1-benzothiophene-2-carboxylate |
| 13 | 0.011 | 3 | 6-chloro-3-(2,4-difluoro-3-methoxyphenyl)-1-benzothiophene-2-carboxylic acid |
| 14 | 0.0042 | 4 | 3-(6-chloro-2,4-difluoro-3-methoxyphenyl)-6-fluoro-1-benzothiophene-2-carboxylic acid |
| 15 | 2.0 | 4 | 3-(6-chloro-2,4-difluoro-3-methoxyphenyl)-6-fluoro-1-benzothiophene-2-carboxylic acid, ATROP-1 |
| 16 | 0.0040 | 7 | 3-(6-chloro-2,4-difluoro-3-methoxyphenyl)-6-fluoro-1-benzothiophene-2-carboxylic acid, ATROP-2 |
| 17 | 0.033 | 3 | 6-fluoro-3-(2,4,5-trifluoro-3-methoxyphenyl)-1-benzofuran-2-carboxylic acid |
| 18 | 0.028 | 3 | 6-chloro-3-(2,4,5-trifluoro-3-methoxyphenyl)-1-benzofuran-2-carboxylic acid |
| 19 | 0.19 | 3 | 6-fluoro-3-(2,3,4-trifluorophenyl)-1-benzothiophene-2-carboxylic acid |
| 20 | 0.64 | 3 | 6-chloro-3-(4-chloro-3-fluorophenyl)-1-benzothiophene-2-carboxylic acid |
| 21 | 1.2 | 2 | 3-(2,6-difluoro-4-methoxyphenyl)-6-fluoro-1-benzothiophene-2-carboxylic acid |
| 22 | 1.9 | 7 | 6-fluoro-3-(2,4,5-trifluoro-3-hydroxyphenyl)-1-benzothiophene-2-carboxylic acid |
| 23 | 0.034 | 4 | 6-fluoro-3-(2,4,5-trifluorophenyl)-1-benzothiophene-2-carboxylic acid |
| 24 | 0.0074 | 3 | 3-(3-chloro-2,4,5-trifluorophenyl)-6-fluoro-1-benzothiophene-2-carboxylic acid |
| 25 | 2.5 | 4 | 6-fluoro-3-(3-methoxyphenyl)-1-benzothiophene-2-carboxylic acid |
| 26 | 1.2 | 3 | 3-(2-fluoro-3-methoxyphenyl)-1-benzothiophene-2-carboxylic acid |
| 27 | 0.80 | 3 | 6-fluoro-3-(2-fluoro-3-methoxyphenyl)-1-benzothiophene-2-carboxylic acid |
| 28 | 1.1 | 3 | 3-(3,4-dihydro-2H-1-benzopyran-6-yl)-6-fluoro-1-benzothiophene-2-carboxylic acid |
| 29 | 2.9 | 3 | 3-(4-chloro-3-fluorophenyl)-6-fluoro-1-benzothiophene-2-carboxylic acid |
| 30 | 0.65 | 3 | 6-chloro-3-(2-fluoro-3-methoxyphenyl)-1-benzothiophene-2-carboxylic acid |
| 31 | 1.6 | 3 | 6-chloro-3-(3,4-dihydro-2H-1-benzopyran-6-yl)-1-benzothiophene-2-carboxylic acid |
| 32 | 0.65 | 3 | 6-fluoro-3-(5-fluoro-3,4-dihydro-2H-1-benzopyran-6-yl)-1-benzothiophene-2-carboxylic acid |
| 33 | 0.17 | 3 | 6-chloro-3-(2,3,4-trifluorophenyl)-1-benzothiophene-2-carboxylic acid |
| 34 | 3.1 | 3 | 3-(4-ethoxy-2,3-difluorophenyl)-6-fluoro-1-benzothiophene-2-carboxylic acid |
| 35 | 2.8 | 3 | 3-(2,3-difluoro-4-methoxyphenyl)-6-fluoro-1-benzothiophene-2-carboxylic acid |
| 36 | 0.29 | 3 | 3-(4-chloro-2-fluoro-5-methoxyphenyl)-6-fluoro-1-benzothiophene-2-carboxylic acid |
| 37 | 1.2 | 3 | 6-fluoro-3-(5,6,7,8-tetrahydronaphthalen-2-yl)-1-benzothiophene-2-carboxylic acid |
| 38 | 0.059 | 3 | 3-(4-chloro-2-fluoro-3-methylphenyl)-6-fluoro-1-benzothiophene-2-carboxylic acid |
| 39 | 6.4 | 3 | 3-(2,3-difluoro-4-propoxyphenyl)-6-fluoro-1-benzothiophene-2-carboxylic acid |
| 40 | 4.0 | 3 | 6-fluoro-3-(3-methyl-3,4-dihydro-2H-1-benzopyran-7-yl)-1-benzothiophene-2-carboxylic acid |
| 41 | 2.2 | 3 | 6-chloro-3-(2-methyl-3,4-dihydro-2H-1-benzopyran-6-yl)-1-benzothiophene-2-carboxylic acid, ENANT-1 |
| 42 | 1.2 | 3 | 6-chloro-3-(2-methyl-3,4-dihydro-2H-1-benzopyran-6-yl)-1-benzothiophene-2-carboxylic acid, ENANT-2 |
| 43 | 7.2 | 3 | 6-fluoro-3-(2-methyl-3,4-dihydro-2H-1-benzopyran-6-yl)-1-benzothiophene-2-carboxylic acid, ENANT-1 |
| 44 | 10 | 3 | 6-fluoro-3-(2-methyl-3,4-dihydro-2H-1-benzopyran-6-yl)-1-benzothiophene-2-carboxylic acid, ENANT-2 |
| 45 | 5.2 | 3 | 3-(2-methyl-3,4-dihydro-2H-1-benzopyran-6-yl)-1-benzothiophene-2-carboxylic acid, ENANT-1 |
| 46 | 2.3 | 3 | 3-(2-methyl-3,4-dihydro-2H-1-benzopyran-6-yl)-1-benzothiophene-2-carboxylic acid, ENANT-2 |
| 47 | 0.90 | 3 | 6-fluoro-3-phenyl-1-benzothiophene-2-carboxylic acid |
| 48 | 0.34 | 3 | 3-(2,6-difluorophenyl)-6-fluoro-1-benzothiophene-2-carboxylic acid |
| 49 | 1.4 | 3 | 3-(4-cyano-2-fluoro-3-methoxyphenyl)-6-fluoro-1-benzothiophene-2-carboxylic acid |
| 50 | 0.49 | 3 | 3-(3-ethoxy-2,4-difluorophenyl)-6-fluoro-1-benzothiophene-2-carboxylic acid |
| 51 | 0.47 | 3 | 3-(4-chloro-3-ethoxy-2-fluorophenyl)-6-fluoro-1-benzothiophene-2-carboxylic acid |
| 52 | 0.011 | 3 | 3-(4-chloro-2,6-difluoro-3-methoxyphenyl)-6-fluoro-1-benzothiophene-2-carboxylic acid |
| 53 | 0.33 | 3 | 6-fluoro-3-[2,4,5-trifluoro-3-(methoxymethyl)phenyl]-1-benzothiophene-2-carboxylic acid |
| 54 | 5.4 | 3 | 6-fluoro-3-(3-fluoro-4-methoxyphenyl)-1-benzothiophene-2-carboxylic acid |
| 55 | 0.078 | 3 | 3-(2,6-difluoro-3-methoxyphenyl)-6-fluoro-1-benzothiophene-2-carboxylic acid |
| 56 | 2.3 | 3 | 6-fluoro-3-(2-methyl-3,4-dihydro-2H-1-benzopyran-7-yl)-1-benzothiophene-2-carboxylic acid |
| 57 | 1.9 | 3 | 6-fluoro-3-(2-methyl-3,4-dihydro-2H-1-benzopyran-7-yl)-1-benzothiophene-2-carboxylic acid, ENANT-1 |
| 58 | 3.5 | 3 | 6-fluoro-3-(2-methyl-3,4-dihydro-2H-1-benzopyran-7-yl)-1-benzothiophene-2-carboxylic acid, ENANT-2 |
| 59 | 0.26 | 3 | 3-(4-chloro-2,6-difluorophenyl)-6-fluoro-1-benzothiophene-2-carboxylic acid |
| 60 | 0.046 | 3 | 6-fluoro-3-(2,4,6-trifluorophenyl)-1-benzothiophene-2-carboxylic acid |
| 61 | 0.17 | 3 | 3-(3,5-difluoro-2-methoxypyridin-4-yl)-6-fluoro-1-benzothiophene-2-carboxylic acid |
| 62 | 0.020 | 3 | 3-(2,4-difluoro-3-methoxyphenyl)-6-fluoro-1-benzothiophene-2-carboxylic acid |
| 63 | 0.0076 | 3 | 6-chloro-3-(2,4,6-trifluoro-3-methoxyphenyl)-1-benzothiophene-2-carboxylic acid |
| 64 | 0.62 | 3 | 3-(4-chloro-2-fluorophenyl)-6-fluoro-1-benzothiophene-2-carboxylic acid |
| 65 | 0.31 | 3 | 3-(4-chloro-2,3-difluorophenyl)-6-fluoro-1-benzothiophene-2-carboxylic acid |
| 66 | 0.35 | 3 | 6-fluoro-3-(8-fluoro-3,4-dihydro-2H-1-benzopyran-7-yl)-1-benzothiophene-2-carboxylic acid |
| 67 | 0.54 | 3 | 6-fluoro-3-(7-fluoro-2-methyl-3,4-dihydro-2H-1-benzopyran-6-yl)-1-benzothiophene-2-carboxylic acid |
| 68 | 0.82 | 3 | 6-fluoro-3-(7-fluoro-2-methyl-3,4-dihydro-2H-1-benzopyran-6-yl)-1-benzothiophene-2-carboxylic acid, ENANT-1 |
| 69 | 0.43 | 3 | 6-fluoro-3-(7-fluoro-2-methyl-3,4-dihydro-2H-1-benzopyran-6-yl)-1-benzothiophene-2-carboxylic acid, ENANT-2 |

TABLE 2-continued

In Vitro FRET Assay Data

| Example Number | In Vitro FRET IC$_{50}$ (µM) | Number of Replicates | IUPAC Name |
|---|---|---|---|
| 70 | 1.2 | 3 | 6-fluoro-3-(3-fluoro-2-methoxypyridin-4-yl)-1-benzothiophene-2-carboxylic acid |
| 71 | 0.76 | 3 | 6-fluoro-3-(8-fluoro-2-methyl-3,4-dihydro-2H-1-benzopyran-6-yl)-1-benzothiophene-2-carboxylic acid |
| 72 | 0.83 | 3 | 6-fluoro-3-(8-fluoro-2-methyl-3,4-dihydro-2H-1-benzopyran-6-yl)-1-benzothiophene-2-carboxylic acid, ENANT-1 |
| 73 | 1.3 | 3 | 6-fluoro-3-(8-fluoro-2-methyl-3,4-dihydro-2H-1-benzopyran-6-yl)-1-benzothiophene-2-carboxylic acid, ENANT-2 |
| 74 | 1.3 | 3 | 6-chloro-3-phenyl-1-benzothiophene-2-carboxylic acid |
| 75 | 0.056 | 3 | 3-(4-cyano-2,6-difluoro-3-methoxyphenyl)-6-fluoro-1-benzothiophene-2-carboxylic acid |
| 76 | 0.43 | 3 | 6-fluoro-3-(5-fluoro-2-methyl-3,4-dihydro-2H-1-benzopyran-6-yl)-1-benzothiophene-2-carboxylic acid |
| 77 | 0.66 | 3 | 6-fluoro-3-(5-fluoro-2-methyl-3,4-dihydro-2H-1-benzopyran-6-yl)-1-benzothiophene-2-carboxylic acid, ENANT-1 |
| 78 | 0.32 | 3 | 6-fluoro-3-(5-fluoro-2-methyl-3,4-dihydro-2H-1-benzopyran-6-yl)-1-benzothiophene-2-carboxylic acid, ENANT-2 |
| 79 | 0.026 | 3 | 3-(4-chloro-2-fluoro-3-methoxyphenyl)-6-fluoro-1-benzothiophene-2-carboxylic acid |
| 80 | 0.17 | 3 | 6-chloro-3-(5,7-difluoro-2-methyl-3,4-dihydro-2H-1-benzopyran-6-yl)-1-benzothiophene-2-carboxylic acid |
| 81 | 1.4 | 3 | ammonium 6-fluoro-3-(4-methyl-3,4-dihydro-2H-1-benzopyran-6-yl)-1-benzothiophene-2-carboxylate |
| 82 | 0.77 | 4 | 6-fluoro-3-(4-methyl-3,4-dihydro-2H-1-benzopyran-6-yl)-1-benzothiophene-2-carboxylic acid, ENANT-1 |
| 83 | 1.3 | 4 | 6-fluoro-3-(4-methyl-3,4-dihydro-2H-1-benzopyran-6-yl)-1-benzothiophene-2-carboxylic acid, ENANT-2 |
| 84 | 1.2 | 3 | 6-fluoro-3-(8-fluoro-2-methyl-3,4-dihydro-2H-1-benzopyran-7-yl)-1-benzothiophene-2-carboxylic acid, ENANT-1 |
| 85 | 1.7 | 3 | 6-fluoro-3-(8-fluoro-2-methyl-3,4-dihydro-2H-1-benzopyran-7-yl)-1-benzothiophene-2-carboxylic acid, ENANT-2 |
| 86 | 0.020 | 3 | 3-(3-ethyl-2,4-difluorophenyl)-6-fluoro-1-benzothiophene-2-carboxylic acid |
| 87 | 2.1 | 2 | 6-fluoro-3-(7-methyl-3,4-dihydro-2H-1-benzopyran-6-yl)-1-benzothiophene-2-carboxylic acid |
| 88 | 0.041 | 4 | 6-fluoro-3-(2,4,5-trifluoro-3-methylphenyl)-1-benzothiophene-2-carboxylic acid |
| 89 | 12 | 3 | 3-(3,5-difluoro-4-methoxyphenyl)-6-fluoro-1-benzothiophene-2-carboxylic acid |
| 90 | 0.17 | 2 | 3-(2,4-difluoro-5-methoxyphenyl)-6-fluoro-1-benzothiophene-2-carboxylic acid |
| 91 | 0.43 | 2 | 6-fluoro-3-(6-methyl-3,4-dihydro-2H-1-benzopyran-7-yl)-1-benzothiophene-2-carboxylic acid |
| 92 | 1.8 | 3 | 3-(5-ethoxy-2-fluorophenyl)-6-fluoro-1-benzothiophene-2-carboxylic acid |
| 93 | 0.93 | 4 | 3-(3-ethoxy-2,6-difluorophenyl)-6-fluoro-1-benzothiophene-2-carboxylic acid |
| 94 | 3.9 | 2 | 6-fluoro-3-[2,4,6-trifluoro-3-(propan-2-yloxy)phenyl]-1-benzothiophene-2-carboxylic acid |
| 95 | 0.093 | 4 | 3-(2,4-difluoro-5-methylphenyl)-6-fluoro-1-benzothiophene-2-carboxylic acid |
| 96 | 7.6 | 3 | 3-(2,6-difluoro-3-propoxyphenyl)-6-fluoro-1-benzothiophene-2-carboxylic acid |
| 97 | 0.037 | 4 | 3-(3-chloro-2,6-difluorophenyl)-6-fluoro-1-benzothiophene-2-carboxylic acid |
| 98 | 1.3 | 2 | 3-(2,3-dihydro-1-benzofuran-5-yl)-6-fluoro-1-benzothiophene-2-carboxylic acid |
| 99 | 0.54 | 2 | 6-fluoro-3-(7-fluoro-2,3-dihydro-1H-inden-5-yl)-1-benzothiophene-2-carboxylic acid |
| 100 | 2.5 | 2 | 3-(2,3-dihydro-1-benzofuran-6-yl)-6-fluoro-1-benzothiophene-2-carboxylic acid |
| 101 | 0.43 | 3 | 6-fluoro-3-(4-fluoro-2,3-dihydro-1H-inden-5-yl)-1-benzothiophene-2-carboxylic acid |
| 102 | 1.4 | 3 | 3-(2,4-difluoro-6-hydroxyphenyl)-6-fluoro-1-benzothiophene-2-carboxylic acid |
| 103 | 3.1 | 3 | 6-fluoro-3-(3-fluoro-2-methylpyridin-4-yl)-1-benzothiophene-2-carboxylic acid |
| 104 | 3.3 | 3 | 6-fluoro-3-(8-fluoro-3-methyl-3,4-dihydro-2H-1-benzopyran-7-yl)-1-benzothiophene-2-carboxylic acid |
| 105 | 1.2 | 2 | 3-(2,6-difluoro-4-methylphenyl)-6-fluoro-1-benzothiophene-2-carboxylic acid |
| 106 | 0.059 | 3 | 3-(4-chloro-2-fluoro-5-methylphenyl)-6-fluoro-1-benzothiophene-2-carboxylic acid |
| 107 | 1.1 | 2 | ammonium 3-(3,5-difluoropyridin-4-yl)-6-fluoro-1-benzothiophene-2-carboxylate |
| 108 | 0.018 | 3 | 3-(5-chloro-2,4-difluorophenyl)-6-fluoro-1-benzothiophene-2-carboxylic acid |
| 109 | 0.024 | 3 | 6-fluoro-3-(2,3,4,5-tetrafluorophenyl)-1-benzothiophene-2-carboxylic acid |
| 110 | 0.37 | 3 | 3-(2-ethyl-3,5-difluoropyridin-4-yl)-6-fluoro-1-benzothiophene-2-carboxylic acid |
| 111 | 0.27 | 3 | ammonium 3-(2-chloro-3,5-difluorophenyl)-6-fluoro-1-benzothiophene-2-carboxylate |
| 112 | 0.42 | 3 | 3-(2-ethyl-3-fluoropyridin-4-yl)-6-fluoro-1-benzothiophene-2-carboxylic acid |
| 113 | 0.082 | 3 | 3-(2,5-dichloro-3-fluorophenyl)-6-fluoro-1-benzothiophene-2-carboxylic acid |
| 114 | 0.14 | 3 | 3-(4-chloro-2,3-difluoro-5-methoxyphenyl)-6-fluoro-1-benzothiophene-2-carboxylic acid |
| 115 | 21 | 3 | 6-fluoro-3-(5-methyl-5,6,7,8-tetrahydronaphthalen-2-yl)-1-benzothiophene-2-carboxylic acid |
| 116 | 0.36 | 3 | ammonium 6-fluoro-3-(2,3,5-trifluoro-4-methoxyphenyl)-1-benzothiophene-2-carboxylate |
| 117 | 0.024 | 3 | 3-(2,4-difluoro-3-methylphenyl)-6-fluoro-1-benzothiophene-2-carboxylic acid |
| 118 | 0.32 | 3 | 6-fluoro-3-(7-fluoro-2,3-dihydro-1H-inden-4-yl)-1-benzothiophene-2-carboxylic acid |
| 119 | 43 | 3 | 3-(2-chloro-3-methoxyphenyl)-6-fluoro-1-benzothiophene-2-carboxylic acid |
| 120 | 0.25 | 3 | 3-(3,4-difluoro-2-methylphenyl)-6-fluoro-1-benzothiophene-2-carboxylic acid |
| 121 | 0.49 | 3 | 3-(2-chloro-4-fluoro-3-methylphenyl)-6-fluoro-1-benzothiophene-2-carboxylic acid |
| 122 | 0.91 | 3 | 3-(3-cyano-4-methylphenyl)-6-fluoro-1-benzothiophene-2-carboxylic acid |
| 123 | 24 | 3 | 3-(2-cyano-3-methoxyphenyl)-6-fluoro-1-benzothiophene-2-carboxylic acid |
| 124 | 6.5 | 3 | 3-(3-cyano-2-methylphenyl)-6-fluoro-1-benzothiophene-2-carboxylic acid |
| 125 | 0.25 | 3 | 3-(5-cyano-2-methylphenyl)-6-fluoro-1-benzothiophene-2-carboxylic acid |
| 126 | 15 | 2 | 6-fluoro-3-(3-methoxy-2-methylphenyl)-1-benzothiophene-2-carboxylic acid |
| 127 | 0.11 | 2 | 3-(3-chloro-2-fluoro-4-methylphenyl)-6-fluoro-1-benzothiophene-2-carboxylic acid |
| 128 | 0.15 | 3 | 6-chloro-3-(2,6-difluorophenyl)-1-benzothiophene-2-carboxylic acid |
| 129 | 0.074 | 3 | 6-chloro-3-(2,6-difluoro-3-methoxyphenyl)-1-benzothiophene-2-carboxylic acid |
| 130 | 0.70 | 3 | 6-chloro-3-(3-ethoxy-2,4-difluorophenyl)-1-benzothiophene-2-carboxylic acid |
| 131 | 0.050 | 3 | ammonium 6-chloro-3-(4-chloro-2-fluoro-5-methylphenyl)-1-benzothiophene-2-carboxylate |
| 132 | 0.015 | 3 | ammonium 6-chloro-3-(5-chloro-2,4-difluorophenyl)-1-benzothiophene-2-carboxylate |
| 133 | 0.047 | 3 | 6-chloro-3-(2,4,5-trifluorophenyl)-1-benzothiophene-2-carboxylic acid |
| 134 | 0.013 | 4 | 6-chloro-3-(3-ethyl-2,4,5-trifluorophenyl)-1-benzothiophene-2-carboxylic acid |
| 135 | 2.6 | 4 | 3-(2,6-difluoro-3,5-dimethylphenyl)-6-fluoro-1-benzothiophene-2-carboxylic acid |
| 136 | 0.017 | 3 | ammonium 6-chloro-3-(4-chloro-2,5-difluoro-3-methylphenyl)-1-benzothiophene-2-carboxylate |
| 137 | 0.033 | 3 | 6-chloro-3-(2,4-difluoro-5-methylphenyl)-1-benzothiophene-2-carboxylic acid |

TABLE 2-continued

In Vitro FRET Assay Data

| Example Number | In Vitro FRET IC$_{50}$ (µM) | Number of Replicates | IUPAC Name |
|---|---|---|---|
| 138 | 0.012 | 3 | 6-chloro-3-(4-chloro-2-fluoro-3-methoxyphenyl)-1-benzothiophene-2-carboxylic acid |
| 139 | 0.0067 | 3 | ammonium 3-(3-ethyl-2,4,5-trifluorophenyl)-6-fluoro-1-benzothiophene-2-carboxylate |
| 140 | 0.033 | 3 | 6-fluoro-3-(2,3,5,6-tetrafluorophenyl)-1-benzothiophene-2-carboxylic acid |
| 141 | 0.015 | 3 | 6-chloro-3-(2,4-difluoro-3-methylphenyl)-1-benzothiophene-2-carboxylic acid |
| 142 | 0.12 | 3 | 6-chloro-3-(4,5-dichloro-2-fluorophenyl)-1-benzothiophene-2-carboxylic acid |
| 143 | 0.016 | 3 | 6-chloro-3-(3-ethyl-2,4-difluorophenyl)-1-benzothiophene-2-carboxylic acid |
| 144 | 19 | 3 | 3-(2,6-difluoro-3,5-dimethoxyphenyl)-6-fluoro-1-benzothiophene-2-carboxylic acid |
| 145 | 0.15 | 3 | 6-chloro-3-(2-chloro-3,5-difluorophenyl)-1-benzothiophene-2-carboxylic acid |
| 146 | 0.018 | 3 | 6-chloro-3-(4-chloro-2-fluoro-3-methylphenyl)-1-benzothiophene-2-carboxylic acid |
| 147 | 0.017 | 3 | 3-(3-cyclopropyl-2,4-difluorophenyl)-6-fluoro-1-benzothiophene-2-carboxylic acid |
| 148 | 0.036 | 3 | 3-(2-chloro-4,6-difluorophenyl)-6-fluoro-1-benzothiophene-2-carboxylic acid |
| 149 | 0.016 | 3 | ammonium 6-chloro-3-(2,3,4,5-tetrafluorophenyl)-1-benzothiophene-2-carboxylate |
| 150 | 0.047 | 3 | 3-(6-chloro-2-fluoro-3-methoxyphenyl)-6-fluoro-1-benzothiophene-2-carboxylic acid |
| 151 | 0.15 | 3 | 3-(2,4-dichloro-6-fluorophenyl)-6-fluoro-1-benzothiophene-2-carboxylic acid |
| 152 | 0.22 | 4 | 3-(5-chloro-2,4-difluoro-3-methylphenyl)-6-fluoro-1-benzothiophene-2-carboxylic acid |
| 153 | 1.1 | 4 | ammonium 3-(3-cyano-5-fluoro-2-methylphenyl)-6-fluoro-1-benzothiophene-2-carboxylate |
| 154 | 0.11 | 4 | 3-(2-chloro-4,6-difluoro-3-methoxyphenyl)-6-fluoro-1-benzothiophene-2-carboxylic acid |
| 155 | 0.14 | 3 | 3-(4-chloro-2,5-difluorophenyl)-6-fluoro-1-benzothiophene-2-carboxylic acid |
| 156 | 42 | 3 | 3-(2-chloro-6-fluoro-3-methoxyphenyl)-6-fluoro-1-benzothiophene-2-carboxylic acid |
| 157 | 0.021 | 3 | 3-(2,4,5-trifluoro-3-methoxyphenyl)-1-benzothiophene-2-carboxylic acid |
| 158 | 2.3 | 7 | 3-[3-(difluoromethyl)-2,4-difluorophenyl]-6-fluoro-1-benzothiophene-2-carboxylic acid |
| 159 | >35 | 4 | 3-(2-cyano-4-fluoro-3-methoxyphenyl)-6-fluoro-1-benzothiophene-2-carboxylic acid |

[1]Biological data obtained on the neutral acid, rather than the ammonium salt.

Phospho BCKDHA Alpha Surefire Cell Assay

Prior to conducting the assay, BCKDH antibodies (Bethyl A303-790A) were biotinylated using the ChromaLink™ One-Shot Antibody Biotinylation Kit (TriLink Technologies B-9007-009K) and phospho (S293) BCKDHA antibodies (Bethyl A303-672A) were CaptSur tagged using the Lightning-Link® CaptSure™ Conjugation Kit (TGR Biosciences 6300007). Human skeletal myocytes (Gibco A11440) were previously immortalized via the introduction of hTERT into the cells.

Human skeletal myocytes (Gibco A11440) were plated in a 384 well plate at a density of 15,000 live cells/well and grown in skeletal muscle growth media containing the media supplement and chick embryo extract (Promocell C-23060 and C-23160, MP92850145). After overnight incubation, media was removed, and BCKDK inhibitors were added in assay media (growth media diluted 10-fold in PBS). After 60 minutes, the media was removed, the cells were washed with PBS and lysed in 10 µL of buffer (Cell Signaling #9803) containing 2 nM biotinylated total BCKDH antibodies and 1× protease/phosphatase inhibitor cocktail (Cell Signaling 5872). Samples were incubated for 60 minutes, and 5 µL of diluted CaptSure tagged Phospho BCKDHA Antibody (1:400) and anti-CaptSure acceptor beads (40 µg/µL) in 1× immunoassay buffer (Perkin Elmer AL000F) were added to the lysates. After a 60 minute incubation, 5 µL streptavidin donor beads (40 µg/µL) beads were added in 1× immunoassay buffer while protecting from light. Fluorescence was emitted when the phospho and total BCKDH antibodies were within proximity, signifying phosphorylation of S293 BCKDH. Fluorescence was monitored on the Envision plate reader. The zero percent effect was determined from DMSO treatment and the maximal effect was assessed relative to the BCKDK inhibitor BT2. (Tso, S. C.; Gui, W. J.; Wu, C. Y.; et al. Benzothiophene carboxylate derivatives as novel allosteric inhibitors of branched-chain alpha-ketoacid dehydrogenase kinase. J Biol Chem 2014, 289, 20583-20593.). IC$_{50}$ curves were generated using ActivityBase software (IDBS, Boston Mass.).

In Table 3 assay data (IC$_{50}$s) are presented for the Examples below in accordance with the above-described assay (to two (2) significant figures as the geometric mean, based on the number of replicates tested (Number)).

TABLE 3

SureFire Alpha Assay Data

| Example Number | SureFire Alpha Assay (µM) | Number of Replicates | IUPAC Name |
|---|---|---|---|
| 1 | 0.43 | 3 | 3-(5,7-difluoro-3,4-dihydro-2H-1-benzopyran-6-yl)-6-fluoro-1-benzothiophene-2-carboxylic acid |
| 2 | 0.067 | 4 | 6-fluoro-3-(2,4,6-trifluoro-3-methoxyphenyl)-1-benzothiophene-2-carboxylic acid |
| 3 | 1.0 | 3 | 3-(5,7-difluoro-2-methyl-3,4-dihydro-2H-1-benzopyran-6-yl)-6-fluoro-1-benzothiophene-2-carboxylic acid |
| 4 | >60 | 1 | 6,7-difluoro-3-phenyl-1-benzothiophene-2-carboxylic acid |
| 5 | >60 | 1 | ammonium 4,6-difluoro-3-phenyl-1-benzothiophene-2-carboxylate |
| 6 | N.D.[1] | | 6-chloro-5-fluoro-3-phenyl-1-benzothiophene-2-carboxylic acid |
| 7 | 0.094 | 5 | 3-(4,5-dichloro-2-fluorophenyl)-6-fluoro-1-benzothiophene-2-carboxylic acid |
| 8 | 0.72 | 1 | 3-(3,5-difluoro-2-methylpyridin-4-yl)-6-fluoro-1-benzothiophene-2-carboxylic acid |
| 9 | 0.046 | 10 | 6-fluoro-3-(2,4,5-trifluoro-3-methoxyphenyl)-1-benzothiophene-2-carboxylic acid |
| 10 | 0.066 | 5 | 6-chloro-3-(2,4,5-trifluoro-3-methylphenyl)-1-benzothiophene-2-carboxylic acid |
| 11 | N.D. | | 5,6-difluoro-3-phenyl-1-benzothiophene-2-carboxylic acid |

TABLE 3-continued

SureFire Alpha Assay Data

| Example Number | SureFire Alpha Assay (µM) | Number of Replicates | IUPAC Name |
|---|---|---|---|
| 12 | 0.11[2] | 3 | ammonium 6-chloro-3-(2,4,5-trifluoro-3-methoxyphenyl)-1-benzothiophene-2-carboxylate |
| 13 | 0.048 | 5 | 6-chloro-3-(2,4-difluoro-3-methoxyphenyl)-1-benzothiophene-2-carboxylic acid |
| 14 | 0.023 | 3 | 3-(6-chloro-2,4-difluoro-3-methoxyphenyl)-6-fluoro-1-benzothiophene-2-carboxylic acid |
| 15 | >60 | 3 | 3-(6-chloro-2,4-difluoro-3-methoxyphenyl)-6-fluoro-1-benzothiophene-2-carboxylic acid, ATROP-1 |
| 16 | 0.015 | 9 | 3-(6-chloro-2,4-difluoro-3-methoxyphenyl)-6-fluoro-1-benzothiophene-2-carboxylic acid, ATROP-2 |
| 17 | 0.88 | 3 | 6-fluoro-3-(2,4,5-trifluoro-3-methoxyphenyl)-1-benzofuran-2-carboxylic acid |
| 18 | 0.57 | 3 | 6-chloro-3-(2,4,5-trifluoro-3-methoxyphenyl)-1-benzofuran-2-carboxylic acid |
| 19 | 4.4 | 4 | 6-fluoro-3-(2,3,4-trifluorophenyl)-1-benzothiophene-2-carboxylic acid |
| 20 | 2.4 | 2 | 6-chloro-3-(4-chloro-3-fluorophenyl)-1-benzothiophene-2-carboxylic acid |
| 21 | N.D. |  | 3-(2,6-difluoro-4-methoxyphenyl)-6-fluoro-1-benzothiophene-2-carboxylic acid |
| 22 | 23 | 3 | 6-fluoro-3-(2,4,5-trifluoro-3-hydroxyphenyl)-1-benzothiophene-2-carboxylic acid |
| 23 | 0.95 | 2 | 6-fluoro-3-(2,4,5-trifluorophenyl)-1-benzothiophene-2-carboxylic acid |
| 24 | 0.40 | 2 | 3-(3-chloro-2,4,5-trifluorophenyl)-6-fluoro-1-benzothiophene-2-carboxylic acid |
| 25 | 5.6 | 5 | 6-fluoro-3-(3-methoxyphenyl)-1-benzothiophene-2-carboxylic acid |
| 26 | 5.5 | 3 | 3-(2-fluoro-3-methoxyphenyl)-1-benzothiophene-2-carboxylic acid |
| 27 | 3.1 | 3 | 6-fluoro-3-(2-fluoro-3-methoxyphenyl)-1-benzothiophene-2-carboxylic acid |
| 28 | 4.9 | 3 | 3-(3,4-dihydro-2H-1-benzopyran-6-yl)-6-fluoro-1-benzothiophene-2-carboxylic acid |
| 29 | N.D. |  | 3-(4-chloro-3-fluorophenyl)-6-fluoro-1-benzothiophene-2-carboxylic acid |
| 30 | 2.6 | 2 | 6-chloro-3-(2-fluoro-3-methoxyphenyl)-1-benzothiophene-2-carboxylic acid |
| 31 | N.D. |  | 6-chloro-3-(3,4-dihydro-2H-1-benzopyran-6-yl)-1-benzothiophene-2-carboxylic acid |
| 32 | 1.9 | 2 | 6-fluoro-3-(5-fluoro-3,4-dihydro-2H-1-benzopyran-6-yl)-1-benzothiophene-2-carboxylic acid |
| 33 | 1.1 | 2 | 6-chloro-3-(2,3,4-trifluorophenyl)-1-benzothiophene-2-carboxylic acid |
| 34 | >60 | 1 | 3-(4-ethoxy-2,3-difluorophenyl)-6-fluoro-1-benzothiophene-2-carboxylic acid |
| 35 | >60 | 1 | 3-(2,3-difluoro-4-methoxyphenyl)-6-fluoro-1-benzothiophene-2-carboxylic acid |
| 36 | 3.0 | 1 | 3-(4-chloro-2-fluoro-5-methoxyphenyl)-6-fluoro-1-benzothiophene-2-carboxylic acid |
| 37 | 25 | 1 | 6-fluoro-3-(5,6,7,8-tetrahydronaphthalen-2-yl)-1-benzothiophene-2-carboxylic acid |
| 38 | 0.46 | 3 | 3-(4-chloro-2-fluoro-3-methylphenyl)-6-fluoro-1-benzothiophene-2-carboxylic acid |
| 39 | >60 | 1 | 3-(2,3-difluoro-4-propoxyphenyl)-6-fluoro-1-benzothiophene-2-carboxylic acid |
| 40 | >54 | 2 | 6-fluoro-3-(3-methyl-3,4-dihydro-2H-1-benzopyran-7-yl)-1-benzothiophene-2-carboxylic acid |
| 41 | >40 | 2 | 6-chloro-3-(2-methyl-3,4-dihydro-2H-1-benzopyran-6-yl)-1-benzothiophene-2-carboxylic acid, ENANT-1 |
| 42 | >24 | 4 | 6-chloro-3-(2-methyl-3,4-dihydro-2H-1-benzopyran-6-yl)-1-benzothiophene-2-carboxylic acid, ENANT-2 |
| 43 | >60 | 2 | 6-fluoro-3-(2-methyl-3,4-dihydro-2H-1-benzopyran-6-yl)-1-benzothiophene-2-carboxylic acid, ENANT-1 |
| 44 | >56 | 2 | 6-fluoro-3-(2-methyl-3,4-dihydro-2H-1-benzopyran-6-yl)-1-benzothiophene-2-carboxylic acid, ENANT-2 |
| 45 | >60 | 2 | 3-(2-methyl-3,4-dihydro-2H-1-benzopyran-6-yl)-1-benzothiophene-2-carboxylic acid, ENANT-1 |
| 46 | >29 | 2 | 3-(2-methyl-3,4-dihydro-2H-1-benzopyran-6-yl)-1-benzothiophene-2-carboxylic acid, ENANT-2 |
| 47 | >60 | 4 | 6-fluoro-3-phenyl-1-benzothiophene-2-carboxylic acid |
| 48 | 12 | 1 | 3-(2,6-difluorophenyl)-6-fluoro-1-benzothiophene-2-carboxylic acid |
| 49 | 7.5 | 1 | 3-(4-cyano-2-fluoro-3-methoxyphenyl)-6-fluoro-1-benzothiophene-2-carboxylic acid |
| 50 | 7.5 | 6 | 3-(3-ethoxy-2,4-difluorophenyl)-6-fluoro-1-benzothiophene-2-carboxylic acid |
| 51 | 12 | 4 | 3-(4-chloro-3-ethoxy-2-fluorophenyl)-6-fluoro-1-benzothiophene-2-carboxylic acid |
| 52 | 0.064 | 3 | 3-(4-chloro-2,6-difluoro-3-methoxyphenyl)-6-fluoro-1-benzothiophene-2-carboxylic acid |
| 53 | 4.2 | 2 | 6-fluoro-3-[2,4,5-trifluoro-3-(methoxymethyl)phenyl]-1-benzothiophene-2-carboxylic acid |
| 54 | N.D. |  | 6-fluoro-3-(3-fluoro-4-methoxyphenyl)-1-benzothiophene-2-carboxylic acid |
| 55 | 1.1 | 4 | 3-(2,6-difluoro-3-methoxyphenyl)-6-fluoro-1-benzothiophene-2-carboxylic acid |
| 56 | N.D. |  | 6-fluoro-3-(2-methyl-3,4-dihydro-2H-1-benzopyran-7-yl)-1-benzothiophene-2-carboxylic acid |
| 57 | >60 | 4 | 6-fluoro-3-(2-methyl-3,4-dihydro-2H-1-benzopyran-7-yl)-1-benzothiophene-2-carboxylic acid, ENANT-1 |
| 58 | N.D. |  | 6-fluoro-3-(2-methyl-3,4-dihydro-2H-1-benzopyran-7-yl)-1-benzothiophene-2-carboxylic acid, ENANT-2 |
| 59 | >60 | 1 | 3-(4-chloro-2,6-difluorophenyl)-6-fluoro-1-benzothiophene-2-carboxylic acid |
| 60 | 2.9 | 4 | 6-fluoro-3-(2,4,6-trifluorophenyl)-1-benzothiophene-2-carboxylic acid |
| 61 | 2.1 | 4 | 3-(3,5-difluoro-2-methoxypyridin-4-yl)-6-fluoro-1-benzothiophene-2-carboxylic acid |
| 62 | 0.21 | 5 | 3-(2,4-difluoro-3-methoxyphenyl)-6-fluoro-1-benzothiophene-2-carboxylic acid |
| 63 | 0.071 | 3 | 6-chloro-3-(2,4,6-trifluoro-3-methoxyphenyl)-1-benzothiophene-2-carboxylic acid |
| 64 | 11 | 2 | 3-(4-chloro-2-fluorophenyl)-6-fluoro-1-benzothiophene-2-carboxylic acid |
| 65 | 1.8 | 2 | 3-(4-chloro-2,3-difluorophenyl)-6-fluoro-1-benzothiophene-2-carboxylic acid |
| 66 | 3.8 | 1 | 6-fluoro-3-(8-fluoro-3,4-dihydro-2H-1-benzopyran-7-yl)-1-benzothiophene-2-carboxylic acid |
| 67 | 5.1 | 1 | 6-fluoro-3-(7-fluoro-2-methyl-3,4-dihydro-2H-1-benzopyran-6-yl)-1-benzothiophene-2-carboxylic acid |
| 68 | 6.0 | 1 | 6-fluoro-3-(7-fluoro-2-methyl-3,4-dihydro-2H-1-benzopyran-6-yl)-1-benzothiophene-2-carboxylic acid, ENANT-1 |
| 69 | 3.6 | 1 | 6-fluoro-3-(7-fluoro-2-methyl-3,4-dihydro-2H-1-benzopyran-6-yl)-1-benzothiophene-2-carboxylic acid, ENANT-2 |
| 70 | N.D. |  | 6-fluoro-3-(3-fluoro-2-methoxypyridin-4-yl)-1-benzothiophene-2-carboxylic acid |
| 71 | 4.5 | 3 | 6-fluoro-3-(8-fluoro-2-methyl-3,4-dihydro-2H-1-benzopyran-6-yl)-1-benzothiophene-2-carboxylic acid |
| 72 | 4.5 | 2 | 6-fluoro-3-(8-fluoro-2-methyl-3,4-dihydro-2H-1-benzopyran-6-yl)-1-benzothiophene-2-carboxylic acid, ENANT-1 |
| 73 | N.D. |  | 6-fluoro-3-(8-fluoro-2-methyl-3,4-dihydro-2H-1-benzopyran-6-yl)-1-benzothiophene-2-carboxylic acid, ENANT-2 |
| 74 | >60 | 4 | 6-chloro-3-phenyl-1-benzothiophene-2-carboxylic acid |
| 75 | >60 | 2 | 3-(4-cyano-2,6-difluoro-3-methoxyphenyl)-6-fluoro-1-benzothiophene-2-carboxylic acid |
| 76 | 3.6 | 1 | 6-fluoro-3-(5-fluoro-3,4-dihydro-2H-1-benzopyran-6-yl)-1-benzothiophene-2-carboxylic acid |
| 77 | 8.6 | 2 | 6-fluoro-3-(5-fluoro-3,4-dihydro-2H-1-benzopyran-6-yl)-1-benzothiophene-2-carboxylic acid, ENANT-1 |
| 78 | 3.9 | 1 | 6-fluoro-3-(5-fluoro-3,4-dihydro-2H-1-benzopyran-6-yl)-1-benzothiophene-2-carboxylic acid, ENANT-2 |
| 79 | 0.23 | 4 | 3-(4-chloro-2-fluoro-3-methoxyphenyl)-6-fluoro-1-benzothiophene-2-carboxylic acid |
| 80 | 4.0 | 1 | 6-chloro-3-(5,7-difluoro-3,4-dihydro-2H-1-benzopyran-6-yl)-1-benzothiophene-2-carboxylic acid |
| 81 | N.D. |  | ammonium 6-fluoro-3-(4-methyl-3,4-dihydro-2H-1-benzopyran-6-yl)-1-benzothiophene-2-carboxylate |
| 82 | N.D. |  | 6-fluoro-3-(4-methyl-3,4-dihydro-2H-1-benzopyran-6-yl)-1-benzothiophene-2-carboxylic acid, ENANT-1 |
| 83 | N.D. |  | 6-fluoro-3-(4-methyl-3,4-dihydro-2H-1-benzopyran-6-yl)-1-benzothiophene-2-carboxylic acid, ENANT-2 |
| 84 | N.D. |  | 6-fluoro-3-(8-fluoro-2-methyl-3,4-dihydro-2H-1-benzopyran-7-yl)-1-benzothiophene-2-carboxylic acid, ENANT-1 |
| 85 | N.D. |  | 6-fluoro-3-(8-fluoro-2-methyl-3,4-dihydro-2H-1-benzopyran-7-yl)-1-benzothiophene-2-carboxylic acid, ENANT-2 |

TABLE 3-continued

SureFire Alpha Assay Data

| Example Number | SureFire Alpha Assay (μM) | Number of Replicates | IUPAC Name |
|---|---|---|---|
| 86 | 0.31 | 2 | 3-(3-ethyl-2,4-difluorophenyl)-6-fluoro-1-benzothiophene-2-carboxylic acid |
| 87 | N.D. | | 6-fluoro-3-(7-methyl-3,4-dihydro-2H-1-benzopyran-6-yl)-1-benzothiophene-2-carboxylic acid |
| 88 | 0.24 | 6 | 6-fluoro-3-(2,4,5-trifluoro-3-methylphenyl)-1-benzothiophene-2-carboxylic acid |
| 89 | N.D. | | 3-(3,5-difluoro-4-methoxyphenyl)-6-fluoro-1-benzothiophene-2-carboxylic acid |
| 90 | N.D. | | 3-(2,4-difluoro-5-methoxyphenyl)-6-fluoro-1-benzothiophene-2-carboxylic acid |
| 91 | N.D. | | 6-fluoro-3-(6-methyl-3,4-dihydro-2H-1-benzopyran-7-yl)-1-benzothiophene-2-carboxylic acid |
| 92 | N.D. | | 3-(5-ethoxy-2-fluorophenyl)-6-fluoro-1-benzothiophene-2-carboxylic acid |
| 93 | 17 | 1 | 3-(3-ethoxy-2,6-difluorophenyl)-6-fluoro-1-benzothiophene-2-carboxylic acid |
| 94 | N.D. | | 6-fluoro-3-[2,4,6-trifluoro-3-(propan-2-yloxy)phenyl]-1-benzothiophene-2-carboxylic acid |
| 95 | 1.0 | 2 | 3-(2,4-difluoro-5-methylphenyl)-6-fluoro-1-benzothiophene-2-carboxylic acid |
| 96 | N.D. | | 3-(2,6-difluoro-3-propoxyphenyl)-6-fluoro-1-benzothiophene-2-carboxylic acid |
| 97 | 0.54 | 3 | 3-(3-chloro-2,6-difluorophenyl)-6-fluoro-1-benzothiophene-2-carboxylic acid |
| 98 | N.D. | | 3-(2,3-dihydro-1-benzofuran-5-yl)-6-fluoro-1-benzothiophene-2-carboxylic acid |
| 99 | N.D. | | 6-fluoro-3-(7-fluoro-2,3-dihydro-1H-inden-5-yl)-1-benzothiophene-2-carboxylic acid |
| 100 | N.D. | | 3-(2,3-dihydro-1-benzofuran-6-yl)-6-fluoro-1-benzothiophene-2-carboxylic acid |
| 101 | N.D. | | 6-fluoro-3-(4-fluoro-2,3-dihydro-1H-inden-5-yl)-1-benzothiophene-2-carboxylic acid |
| 102 | N.D. | | 3-(2,4-difluoro-6-hydroxyphenyl)-6-fluoro-1-benzothiophene-2-carboxylic acid |
| 103 | N.D. | | 6-fluoro-3-(3-fluoro-2-methylpyridin-4-yl)-1-benzothiophene-2-carboxylic acid |
| 104 | N.D. | | 6-fluoro-3-(8-fluoro-3-methyl-3,4-dihydro-2H-1-benzopyran-7-yl)-1-benzothiophene-2-carboxylic acid |
| 105 | N.D. | | 3-(2,6-difluoro-4-methylphenyl)-6-fluoro-1-benzothiophene-2-carboxylic acid |
| 106 | 0.48 | 2 | 3-(4-chloro-2-fluoro-5-methylphenyl)-6-fluoro-1-benzothiophene-2-carboxylic acid |
| 107 | 8.6 | 1 | ammonium 3-(3,5-difluoropyridin-4-yl)-6-fluoro-1-benzothiophene-2-carboxylate |
| 108 | 0.62 | 3 | 3-(5-chloro-2,4-difluorophenyl)-6-fluoro-1-benzothiophene-2-carboxylic acid |
| 109 | 0.60 | 5 | 6-fluoro-3-(2,3,4,5-tetrafluorophenyl)-1-benzothiophene-2-carboxylic acid |
| 110 | 0.55 | 1 | 3-(2-ethyl-3,5-difluoropyridin-4-yl)-6-fluoro-1-benzothiophene-2-carboxylic acid |
| 111 | >60 | 1 | ammonium 3-(2-chloro-3,5-difluorophenyl)-6-fluoro-1-benzothiophene-2-carboxylate |
| 112 | 2.3 | 1 | 3-(2-ethyl-3-fluoropyridin-4-yl)-6-fluoro-1-benzothiophene-2-carboxylic acid |
| 113 | N.D. | | 3-(2,5-dichloro-3-fluorophenyl)-6-fluoro-1-benzothiophene-2-carboxylic acid |
| 114 | 1.8 | 2 | 3-(4-chloro-2,3-difluoro-5-methoxyphenyl)-6-fluoro-1-benzothiophene-2-carboxylic acid |
| 115 | N.D. | | 6-fluoro-3-(5-methyl-5,6,7,8-tetrahydronaphthalen-2-yl)-1-benzothiophene-2-carboxylic acid |
| 116 | N.D. | | ammonium 6-fluoro-3-(2,3,5-trifluoro-4-methoxyphenyl)-1-benzothiophene-2-carboxylate |
| 117 | 0.12 | 3 | 3-(2,4-difluoro-3-methylphenyl)-6-fluoro-1-benzothiophene-2-carboxylic acid |
| 118 | N.D. | | 6-fluoro-3-(7-fluoro-2,3-dihydro-1H-inden-4-yl)-1-benzothiophene-2-carboxylic acid |
| 119 | N.D. | | 3-(2-chloro-3-methoxyphenyl)-6-fluoro-1-benzothiophene-2-carboxylic acid |
| 120 | N.D. | | 3-(3,4-difluoro-2-methylphenyl)-6-fluoro-1-benzothiophene-2-carboxylic acid |
| 121 | N.D. | | 3-(2-chloro-4-fluoro-3-methylphenyl)-6-fluoro-1-benzothiophene-2-carboxylic acid |
| 122 | N.D. | | 3-(3-cyano-4-methylphenyl)-6-fluoro-1-benzothiophene-2-carboxylic acid |
| 123 | N.D. | | 3-(2-cyano-3-methoxyphenyl)-6-fluoro-1-benzothiophene-2-carboxylic acid |
| 124 | N.D. | | 3-(3-cyano-2-methylphenyl)-6-fluoro-1-benzothiophene-2-carboxylic acid |
| 125 | N.D. | | 3-(5-cyano-2-methylphenyl)-6-fluoro-1-benzothiophene-2-carboxylic acid |
| 126 | N.D. | | 6-fluoro-3-(3-methoxy-2-methylphenyl)-1-benzothiophene-2-carboxylic acid |
| 127 | N.D. | | 3-(3-chloro-2-fluoro-4-methylphenyl)-6-fluoro-1-benzothiophene-2-carboxylic acid |
| 128 | N.D. | | 6-chloro-3-(2,6-difluorophenyl)-1-benzothiophene-2-carboxylic acid |
| 129 | 1.8 | 1 | 6-chloro-3-(2,6-difluoro-3-methoxyphenyl)-1-benzothiophene-2-carboxylic acid |
| 130 | N.D. | | 6-chloro-3-(3-ethoxy-2,4-difluorophenyl)-1-benzothiophene-2-carboxylic acid |
| 131 | N.D. | | ammonium 6-chloro-3-(4-chloro-2-fluoro-5-methylphenyl)-1-benzothiophene-2-carboxylate |
| 132 | 0.47 | 2 | ammonium 6-chloro-3-(5-chloro-2,4-difluorophenyl)-1-benzothiophene-2-carboxylate |
| 133 | 0.73 | 2 | 6-chloro-3-(2,4,5-trifluorophenyl)-1-benzothiophene-2-carboxylic acid |
| 134 | 0.080 | 4 | 6-chloro-3-(3-ethyl-2,4,5-trifluorophenyl)-1-benzothiophene-2-carboxylic acid |
| 135 | N.D. | | 3-(2,6-difluoro-3,5-dimethylphenyl)-6-fluoro-1-benzothiophene-2-carboxylic acid |
| 136 | 0.12 | 3 | ammonium 6-chloro-3-(4-chloro-2,5-difluoro-3-methylphenyl)-1-benzothiophene-2-carboxylate |
| 137 | 0.54 | 2 | 6-chloro-3-(2,4-difluoro-5-methylphenyl)-1-benzothiophene-2-carboxylic acid |
| 138 | 0.16 | 3 | 6-chloro-3-(4-chloro-2-fluoro-3-methoxyphenyl)-1-benzothiophene-2-carboxylic acid |
| 139 | 0.060 | 7 | ammonium 3-(3-ethyl-2,4,5-trifluorophenyl)-6-fluoro-1-benzothiophene-2-carboxylate |
| 140 | 3.8 | 2 | 6-fluoro-3-(2,3,5,6-tetrafluorophenyl)-1-benzothiophene-2-carboxylic acid |
| 141 | 0.23 | 2 | 6-chloro-3-(2,4-difluoro-3-methylphenyl)-1-benzothiophene-2-carboxylic acid |
| 142 | N.D. | | 6-chloro-3-(4,5-dichloro-2-fluorophenyl)-1-benzothiophene-2-carboxylic acid |
| 143 | 0.20 | 2 | 6-chloro-3-(3-ethyl-2,4-difluorophenyl)-1-benzothiophene-2-carboxylic acid |
| 144 | N.D. | | 3-(2,6-difluoro-3,5-dimethoxyphenyl)-6-fluoro-1-benzothiophene-2-carboxylic acid |
| 145 | N.D. | | 6-chloro-3-(2-chloro-3,5-difluorophenyl)-1-benzothiophene-2-carboxylic acid |
| 146 | 0.11 | 3 | 6-chloro-3-(4-chloro-2-fluoro-3-methylphenyl)-1-benzothiophene-2-carboxylic acid |
| 147 | 0.19 | 3 | 3-(3-cyclopropyl-2,4-difluorophenyl)-6-fluoro-1-benzothiophene-2-carboxylic acid |
| 148 | 4.0 | 2 | 3-(2-chloro-4,6-difluorophenyl)-6-fluoro-1-benzothiophene-2-carboxylic acid |
| 149 | 0.95 | 2 | ammonium 6-chloro-3-(2,3,4,5-tetrafluorophenyl)-1-benzothiophene-2-carboxylate |
| 150 | 1.1 | 1 | 3-(6-chloro-2-fluoro-3-methoxyphenyl)-6-fluoro-1-benzothiophene-2-carboxylic acid |
| 151 | N.D. | | 3-(2,4-dichloro-6-fluorophenyl)-6-fluoro-1-benzothiophene-2-carboxylic acid |
| 152 | N.D. | | 3-(5-chloro-2,4-difluoro-3-methylphenyl)-6-fluoro-1-benzothiophene-2-carboxylic acid |
| 153 | N.D. | | ammonium 3-(3-cyano-5-fluoro-2-methylphenyl)-6-fluoro-1-benzothiophene-2-carboxylate |
| 154 | 4.2 | 2 | 3-(2-chloro-4,6-difluoro-3-methoxyphenyl)-6-fluoro-1-benzothiophene-2-carboxylic acid |
| 155 | N.D. | | 3-(4-chloro-2,5-difluorophenyl)-6-fluoro-1-benzothiophene-2-carboxylic acid |
| 156 | N.D. | | 3-(2-chloro-6-fluoro-3-methoxyphenyl)-6-fluoro-1-benzothiophene-2-carboxylic acid |
| 157 | 0.23 | 4 | 3-(2,4,5-trifluoro-3-methoxyphenyl)-1-benzothiophene-2-carboxylic acid |

TABLE 3-continued

SureFire Alpha Assay Data

| Example Number | SureFire Alpha Assay (µM) | Number of Replicates | IUPAC Name |
|---|---|---|---|
| 158 | 0.23 | 1 | 3-[3-(difluoromethyl)-2,4-difluorophenyl]-6-fluoro-1-benzothiophene-2-carboxylic acid |
| 159 | N.D. | | 3-(2-cyano-4-fluoro-3-methoxyphenyl)-6-fluoro-1-benzothiophene-2-carboxylic acid |

[1]N.D.—Not determined
[2]Biological data obtained on the neutral acid, rather than the ammonium salt.

Kidney Disease Model

ZSF1 (ZSF1-Lepr$^{fa}$Lepr$^{cp}$/Crl) rats were purchased from Charles River labs and were aged to 20 weeks, at which time Teklad 2920 diet containing 1.36 g BT2/kg was administered ad libidum. After 4 weeks of BT2 treatment, a 5 hour urine collection was performed. Obese ZSF1 rats produced 14.2±7.6 mL urine while BT2 treated rats produced 4.4±2.7 mL urine. Protein was measured via BCA assay (Thermo Fisher) in the urine and normalized to creatinine (Sieman's). Obese ZSF1 rats had 61.6±4.4 mg protein/mg creatinine while BT2 treated rats had 55.4±7.2 mg protein/mg creatinine. After 4 additional weeks of BT2 treatment, animals were euthanized. Kidney weights were 2.5±0.3 g in obese ZSF1 rats but were 2.09±0.1 g after BT2 treatment. Histological sections were prepared from kidney and stained with hematoxylin and eosin. A veterinary pathologist graded the sections for diabetic nephropathy on a scale of 0-4. Obese ZSF1 rats had a diabetic nephropathy score of 3.8±0.4 while BT2 treated rats had a diabetic nephropathy score of 2.9±0.8. Data are reported as mean±SD.

Heart Failure Model

ZSF1 (ZSF1-Lepr$^{fa}$Lepr$^{cp}$/Crl) rats were purchased from Charles River labs and were aged to 20 weeks, at which time Teklad 2920 diet containing Example 9, (0.35 g/kg chow and 1.35 g/kg chow) was administered ad libidum. Echocardiography was performed on all animals after 7 weeks of treatment. ZSF1 obese rats on standard chow demonstrated a 1% decrease in Ejection Fraction (EF) % (83.66±2.96 vs. 82.70±2.57) and a 2.5% decrease in Fractional Shortening (FS) % (74.11±4.62 vs. 71.77±3.66) compared to ZSF1 lean rats on chow diet. Animals fed with high dose Example 9 diet demonstrated a significant 4% improvement in EF % (85.58±3.52) and a significant 6% improvement in FS % (75.80±2.30) compared with ZSF1 obese rats fed control chow. Exercise capacity was assessed in all animals after 9 weeks of treatment. ZSF1 obese rats on standard chow diet demonstrated a significant 73% reduction in distance traveled (584.25±121.15 vs. 158.48±32.89 meters) and 46% reduction in time to fatigue (39.83±5.52 vs. 21.55±2.56 mins) compared to the ZSF1 lean rats on chow diet. The ZSF1 obese rats on the high dose Example 9 diet showed a significant 24% increase in both distance run (196.64±47.47 m; p=0.008) and 14% increase in time to fatigue (24.50±3.54 min; p=0.011) compared to the ZSF1 obese rats on chow diet demonstrating an improved exercise capacity. After 11 weeks of treatment, animals were euthanized, and whole hearts and left atria were weighed. ZSF1 obese rats fed control chow displayed increased left atria weight (27.64±4.05 mg vs. 34.23±4.74 mg), consistent with the development of cardiac hypertrophy. Animals that were fed high dose Example 9 diet demonstrated a 14% reduction in left atria weight compared with ZSF1 obese rats fed a control chow diet (29.32 mg±4.30 mg; p=0.06). Data are reported as mean±SD.

Powder X-Ray Diffraction

Powder X-ray diffraction analysis for the compound of Example 9 was conducted using a Bruker AXS D8 Endeavor diffractometer equipped with a Cu radiation source (K-α average). The divergence slit was set at 15 mm continuous illumination. Diffracted radiation was detected by a PSD-Lynx Eye detector and the dector PSD opening set at 2.99 degrees. The X-ray tube voltage and amperage were set to 40 kV and 40 mA respectively. Data was collected in the Theta-Theta goniometer at the Cu wavelength from 3.0 to 40.0 degrees 2-Theta using a step size of 0.01 degrees and a step time of 1.0 second. Antiscatter screen was set to a fixed distance of 3.0 mm. Samples were prepared by placing them in a silicon low background sample holder and rotated during collection.

Figure 2:
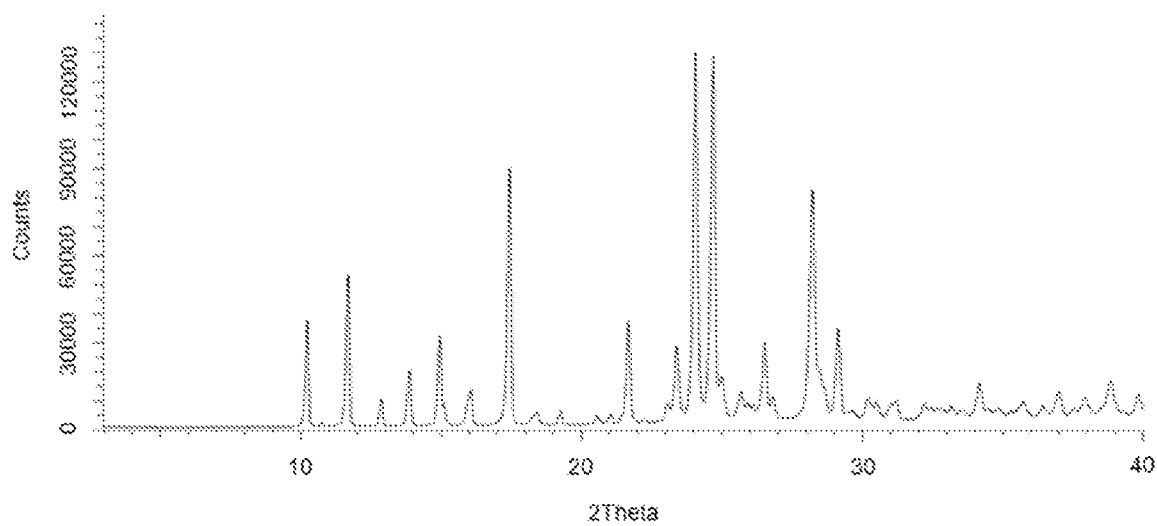
FIG. 2 is a characteristic X-ray powder diffraction pattern showing 6-Fluoro-3-(2,4,5-trifluoro-3-methoxyphenyl)-1-benzothiophene-2-carboxylic acid (Example 9), Form 2 Anhydrous (Vertical Axis: Intensity (CPS); Horizontal Axis: Two theta (degrees)).
Figure 3:
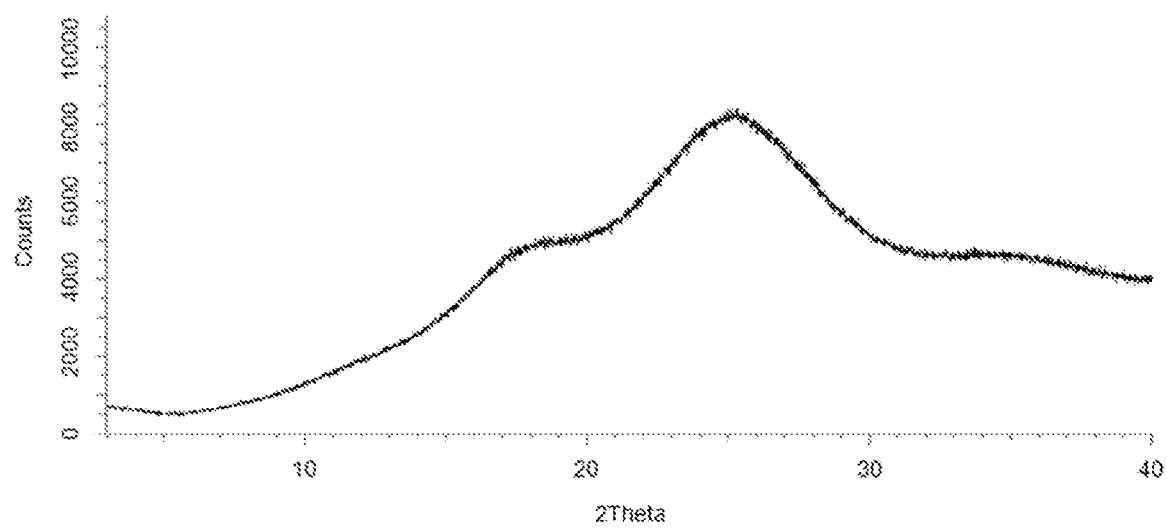
FIG. 3 is a characteristic X-ray powder diffraction pattern showing 6-Fluoro-3-(2,4,5-trifluoro-3-methoxyphenyl)-1-benzothiophene-2-carboxylic acid (Example 9), Amorphous Form 3 (Vertical Axis: Intensity (CPS); Horizontal Axis: Two theta (degrees)).

Data were collected using Bruker DIFFRAC Plus software and analysis was performed by EVA diffract plus software. The PXRD data file was not processed prior to peak searching. Using the peak search algorithm in the EVA software, peaks selected with a threshold value of 10 were used to make preliminary peak assignments. To ensure validity, adjustments were manually made; the output of automated assignments was visually checked and peak positions were adjusted to the peak maximum. Peaks with relative intensity of 3% were generally chosen. The peaks which were not resolved or were consistent with noise were not selected. A typical error associated with the peak position from PXRD stated in USP up to +/−0.2° 2-Theta (USP-941). FIGS. 1, 2 and 3 show the characteristic x-ray powder diffraction patterns of crystalline Anhydrous Form 1, Example 9 and crystalline Anhydrous Form 2, Example 9, and Amorphous Form 3 of Example 9, respectively. The PXRD data from these figures are further described below.

TABLE 4a

Key PXRD peaks to characterize crystalline material of Example 9, Anhydrous Form 1 and Example 9, Anhydrous Form 2

| Example 9, Form 1 | Example 9, Form 2 |
|---|---|
| Angle 2Θ (°) | Angle 2Θ (°) |
| 7.6, 14.6, 17.2, 25.4, 27.9 | 10.2, 13.9, 15.0, 24.7, 28.2 |

TABLE 4b

PXRD peaks for crystalline material
of Example 9, Anhydrous Form 1

| Angle 2 θ (°) | Relative intensity (%) |
|---|---|
| 7.6 | 16.6 |
| 11.1 | 19.1 |
| 11.5 | 48.7 |
| 13.2 | 3.1 |
| 14.6 | 39.0 |
| 16.8 | 4.6 |
| 17.2 | 98.0 |
| 17.7 | 6.3 |
| 18.2 | 8.9 |
| 20.2 | 51.6 |
| 20.3 | 40.5 |
| 21.7 | 56.9 |
| 22.4 | 3.2 |
| 23.4 | 19.3 |
| 23.7 | 8.2 |
| 23.9 | 12.4 |
| 24.9 | 16.1 |
| 25.1 | 91.0 |
| 25.4 | 75.3 |
| 26.7 | 54.0 |
| 27.2 | 10.9 |
| 27.9 | 100.0 |
| 28.5 | 6.8 |
| 29.2 | 15.9 |
| 29.4 | 12.9 |
| 30.8 | 12.2 |
| 31.3 | 3.1 |
| 32.5 | 14.9 |
| 33.6 | 42.8 |
| 33.9 | 7.8 |
| 35.2 | 28.1 |
| 36.7 | 7.6 |
| 37.7 | 5.0 |
| 38.7 | 3.2 |
| 39.8 | 3.7 |

TABLE 4c

PXRD peaks for crystalline material
of Example 9, Anhydrous Form 2

| Angle 2 θ (°) | Relative intensity (%) |
|---|---|
| 10.2 | 27.3 |
| 11.7 | 38.4 |
| 12.9 | 7.1 |
| 13.9 | 14.4 |
| 15.0 | 23.5 |
| 15.1 | 5.6 |
| 16.1 | 9.7 |
| 17.4 | 67.8 |
| 18.4 | 3.7 |
| 19.3 | 3.7 |
| 21.7 | 27.8 |
| 23.1 | 5.3 |
| 23.4 | 20.7 |
| 24.1 | 100.0 |
| 24.7 | 97.4 |
| 25.0 | 11.3 |
| 25.7 | 7.5 |
| 26.5 | 20.9 |
| 26.8 | 6.0 |
| 28.2 | 62.4 |
| 28.6 | 7.6 |
| 29.1 | 25.1 |
| 30.2 | 5.6 |
| 30.5 | 4.8 |
| 31.0 | 3.9 |
| 31.2 | 5.3 |
| 32.2 | 4.5 |
| 33.2 | 3.5 |
| 34.2 | 9.6 |
| 35.7 | 4.4 |
| 36.4 | 3.1 |
| 37.0 | 6.7 |
| 37.9 | 4.8 |
| 38.9 | 9.4 |
| 39.8 | 5.0 |

Throughout this application, various publications are referenced. The disclosures of these publications in their entireties are hereby incorporated by reference into this application for all purposes.

It will be apparent to those skilled in the art that various modifications and variations can be made without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A compound of Formula I

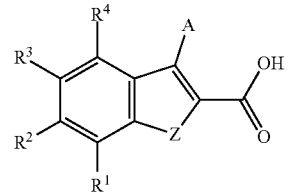

Formula I wherein
Z is S;
A is

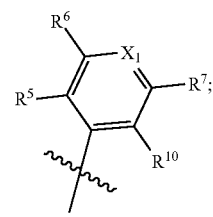

$X_1$ is $CR^{11}$;
each of $R^1$, $R^3$ and $R^4$ are independently selected from H;
$R^2$ is fluoro;
each of $R^5$, $R^6$, $R^7$, $R^8$, $R^9$ and $R^{11}$ are independently selected from H, halo, hydroxyl, amino, cyano, ($C_1$-$C_4$) alkyl, ($C_3$-$C_6$) cycloalkyl, ($C_1$-$C_4$) alkoxy, ($C_1$-$C_4$) fluoroalkyl, ($C_3$-$C_6$) fluorocycloalkyl, ($C_1$-$C_4$) fluoroalkoxy, or ($C_1$-$C_4$) alkyl-($C_1$-$C_4$) alkoxy; and $R^{10}$ is H, fluoro, chloro, cyano, or ($C_1$-$C_4$) alkyl;
wherein at least one $R^5$, $R^6$, $R^7$, $R^{10}$ and $R^{11}$ is other than H;
or a pharmaceutically acceptable salt of said compound.

2. The compound as recited in claim 1, wherein $R^5$ is fluoro, chloro, cyano or ($C_1$-$C_4$) alkyl and $R^{10}$ is H, fluoro or chloro; and wherein $R^6$ and $R^7$ are each independently selected from H, fluoro, chloro, cyano, ($C_1$-$C_4$) alkyl, and ($C_1$-$C_4$) alkoxy; or a pharmaceutically acceptable salt thereof.

3. The compound as recited in claim 2, wherein $R^{11}$ is H, fluoro, chloro, cyano, ($C_1$-$C_4$) alkyl, or ($C_1$-$C_4$) alkoxy; or a pharmaceutically acceptable salt thereof.

4. The compound of claim 1, wherein the compound is:
6-fluoro-3-(2,4,6-trifluoro-3-methoxyphenyl)-1-benzothiophene-2-carboxylic acid;
6-fluoro-3-(2,4,5-trifluoro-3-methoxyphenyl)-1-benzothiophene-2-carboxylic acid;
3-(6-chloro-2,4-difluoro-3-methoxyphenyl)-6-fluoro-1-benzothiophene-2-carboxylic acid;
3-(6-chloro-2,4-difluoro-3-methoxyphenyl)-6-fluoro-1-benzothiophene-2-carboxylic acid, ATROP-2;
3-(3-chloro-2,4,5-trifluorophenyl)-6-fluoro-1-benzothiophene-2-carboxylic acid;
3-(4-chloro-2,6-difluoro-3-methoxyphenyl)-6-fluoro-1-benzothiophene-2-carboxylic acid; or
ammonium 3-(3-ethyl-2,4,5-trifluorophenyl)-6-fluoro-1-benzothiophene-2-carboxylate;
or a pharmaceutically acceptable salt thereof.

5. The compound of claim 1, wherein the compound is:
6-fluoro-3-(2,4,5-trifluoro-3-methoxyphenyl)-1-benzothiophene-2-carboxylic acid; or
3-(6-chloro-2,4-difluoro-3-methoxyphenyl)-6-fluoro-1-benzothiophene-2-carboxylic acid, ATROP-2;
or a pharmaceutically acceptable salt thereof.

6. A method of treating fatty liver, nonalcoholic fatty liver disease, nonalcoholic steatohepatitis, nonalcoholic steatohepatitis with liver fibrosis, nonalcoholic steatohepotitis with cirrhosis or nonalcoholic steatohepatitis with cirrhosis or hepatocellular carcinoma comprising administering to a human in need of such treatment a therapeutically effective amount of a compound of claim 1 or a pharmaceutically acceptable salt of said compound.

7. A method of treating or reducing the risk of hospitalization for heart failure, cardiovascular death, congestive heart failure, heart failure with New York Heart Association Class I-IV symptoms, heart failure with reduced left ventricular function (HF-rEF), heart failure with preserved left ventricular function (HF-pEF), heart failure with midrange ejection fraction (HF-mrEF), cardiovascular death, heart failure in patients with Type II diabetes mellitus, coronary heart disease, unstable angina, peripheral arterial disease peripheral vascular disease, renovascular disease, pulmonary hypertension, vasculitis, acute coronary syndromes or modification of cardiovascular risk comprising administering to a human in need of such treatment a therapeutically effective amount of a compound of claim 1 or a pharmaceutically acceptable salt of said compound.

8. A method of treating Type I diabetes, Type II diabetes mellitus, idiopathic Type I diabetes (Type 1b), latent autoimmune diabetes in adults (LADA), early-onset Type 2 diabetes (EOD), youth-onset atypical diabetes (YOAD), maturity onset diabetes of the young (MODY), malnutrition-related diabetes, gestational diabetes, coronary heart disease, ischemic stroke, restenosis after angioplasty, peripheral vascular disease, intermittent claudication, myocardial infarction, dyslipidemia, post-prandial lipemia, conditions of impaired glucose tolerance (IGT), conditions of impaired fasting plasma glucose, metabolic acidosis, ketosis, arthritis, diabetic retinopathy, macular degeneration, cataract, diabetic nephropathy, glomerulosclerosis, chronic renal failure, diabetic neuropathy, metabolic syndrome, syndrome X, hyperglycemia, hyperinsulinemia, hypertriglyceridemia, insulin resistance, impaired glucose metabolism, skin or connective tissue disorders, foot ulcerations or ulcerative colitis, endothelial dysfunction or impaired vascular compliance, hyper apo B lipoproteinemia, kidney disease, end-stage kidney disease, chronic kidney disease at risk of progression, or maple syrup urine disease comprising administering to a human in need of such treatment a therapeutically effective amount of a compound of claim 1 or a pharmaceutically acceptable salt of said compound.

9. A method of treating hepatocellular carcinoma, kidney renal clear cell carcinoma, head and neck squamous cell carcinoma, colorectal adenocarcinoma, mesothelioma, stomach adenocarcinoma, adrenocortical carcinoma, kidney papillary cell carcinoma, cervical and endocervical carcinoma, bladder urothelial carcinoma, lung adenocarcinoma comprising administering to a human in need of such treatment a therapeutically effective amount of a compound of claim 1 or a pharmaceutically acceptable salt thereof.

10. A pharmaceutical composition which comprises a therapeutically effective amount of a compound of claim 1 or a pharmaceutically acceptable salt of said compound and a pharmaceutically acceptable carrier, vehicle or diluent.

11. A compound, wherein the compound is:

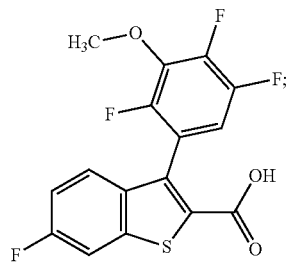 [SMILES: COc1c(F)c(F)cc(-c2c(C(=O)O)sc3cc(F)ccc23)c1F]

or a pharmaceutically acceptable salt thereof.

12. The compound of claim 11, or a pharmaceutically acceptable salt thereof, wherein the compound is crystalline, and has an X-ray powder diffractogram comprising diffraction peaks at 7.6±0.2, 14.6±0.2, and 27.9±0.2, as determined on a diffractometer using Cu-Kα radiation with a wavelength of 1.54056 Å.

13. The compound of claim 11, or a pharmaceutically acceptable salt thereof, wherein the compound has an amorphous form.

14. A compound, wherein the compound is

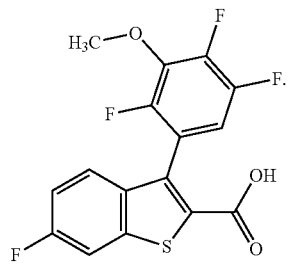 [SMILES: COc1c(F)c(F)cc(-c2c(C(=O)O)sc3cc(F)ccc23)c1F]

15. A compound, wherein the compound is:
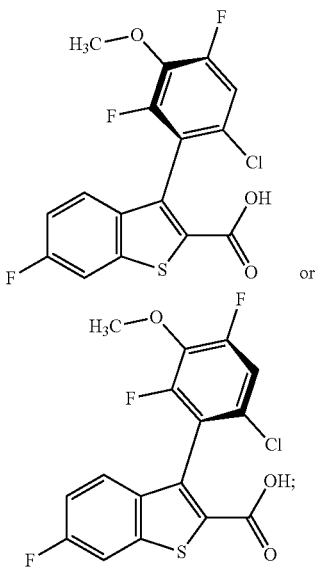
or a mixture thereof;
or a pharmaceutically acceptable salt of said compound or mixture of compounds.
16. A compound, wherein the compound is
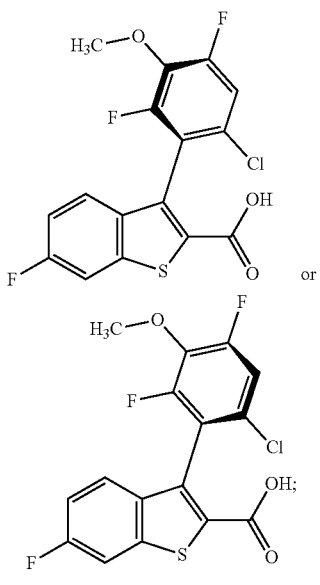
or a mixture thereof.
* * * * *